United States Patent
Thangaraj

(10) Patent No.: US 11,586,661 B2
(45) Date of Patent: Feb. 21, 2023

(54) SYSTEMS AND METHODS FOR DOCUMENTATION THROUGH GLEANING CONTENT WITH AN INTUITIVE USER EXPERIENCE

(71) Applicant: Palanisamy Thangaraj, Bothell, WA (US)

(72) Inventor: Palanisamy Thangaraj, Bothell, WA (US)

( * ) Notice: Subject to any disclaimer, the term of this patent is extended or adjusted under 35 U.S.C. 154(b) by 24 days.

(21) Appl. No.: 17/111,510

(22) Filed: Dec. 4, 2020

(65) Prior Publication Data

US 2022/0179595 A1 Jun. 9, 2022

(51) Int. Cl.
*G06F 3/04842* (2022.01)
*G06F 3/0482* (2013.01)
*G06F 16/383* (2019.01)
*G06F 16/38* (2019.01)

(52) U.S. Cl.
CPC ............ *G06F 16/38* (2019.01); *G06F 3/0482* (2013.01); *G06F 3/04842* (2013.01)

(58) Field of Classification Search
CPC .... G06F 3/1204; G06F 3/0482; G06F 3/0483; G06F 3/04842; G06F 3/1256; G06F 16/48; G06F 40/169; H04L 51/02; H04L 51/046; H04L 51/216; H04M 1/72436; H04M 1/72445; G06Q 10/103; G06Q 50/01; G06Q 40/258
See application file for complete search history.

(56) References Cited

U.S. PATENT DOCUMENTS

| | | | | |
|---|---|---|---|---|
| 6,009,441 A * | 12/1999 | Mathieu | ................ | G06F 16/986 715/236 |
| 8,374,639 B2 * | 2/2013 | McGary | ................ | H04M 15/00 455/466 |
| 8,589,996 B2 * | 11/2013 | Ma | ..................... | H04N 21/4622 709/219 |
| 8,862,635 B2 * | 10/2014 | Cormode | .......... | G06F 16/24578 707/808 |
| 8,898,087 B1 * | 11/2014 | Salzmann | ............ | G06Q 50/167 705/64 |
| 8,978,149 B2 * | 3/2015 | Barraclough | ........... | H04L 65/61 709/224 |
| 9,479,605 B2 * | 10/2016 | Kleppner | ................ | H04L 41/22 |
| 9,560,495 B2 * | 1/2017 | Appelman | .............. | H04W 4/12 |
| 9,613,011 B2 * | 4/2017 | Lund | ..................... | H04N 21/436 |
| 9,753,926 B2 * | 9/2017 | Flake | .................... | G06F 16/532 |
| 9,800,525 B1 * | 10/2017 | Lerner | .................... | H04L 51/56 |
| 9,824,377 B1 * | 11/2017 | Wheeler | ................... | H04L 67/02 |
| 9,836,490 B2 * | 12/2017 | Greenberg | ............. | G06Q 10/10 |
| 10,073,979 B2 * | 9/2018 | Von Kaenel | ............ | G06F 16/00 |
| 10,200,335 B2 * | 2/2019 | Richter | ................... | H04L 51/52 |
| 10,255,253 B2 * | 4/2019 | Akselrod | ................ | G06F 40/14 |
| 10,503,806 B2 * | 12/2019 | Flake | ................ | G06F 40/103 |
| 11,301,532 B2 * | 4/2022 | Chandra | ............ | G06F 16/9535 |
| 11,361,015 B2 * | 6/2022 | Yoon | ....................... | G06F 16/44 |
| 2004/0205493 A1 * | 10/2004 | Simpson | ................ | G06Q 30/02 707/E17.119 |
| 2005/0102630 A1 * | 5/2005 | Chen | ..................... | G06F 3/0486 715/769 |
| 2007/0157115 A1 * | 7/2007 | Peters | ................. | G06F 9/45512 715/808 |
| 2007/0266011 A1 * | 11/2007 | Rohrs | ................. | G06F 16/9535 |
| 2007/0266342 A1 * | 11/2007 | Chang | ................ | G06F 16/9535 715/810 |
| 2008/0046845 A1 * | 2/2008 | Chandra | ............ | G06F 16/9577 715/764 |
| 2013/0080266 A1 * | 3/2013 | Molyneux | ............... | G06Q 10/00 715/234 |
| 2014/0229481 A1 * | 8/2014 | Qureshi | .................. | G06Q 10/10 707/736 |
| 2014/0282426 A1 * | 9/2014 | Kirshenbaum | ........... | G06F 8/70 717/128 |
| 2016/0041961 A1 * | 2/2016 | Romney | ............... | G06F 40/106 715/230 |
| 2020/0159373 A1 * | 5/2020 | Bakker | ..................... | G06F 9/543 |
| 2021/0209177 A1 * | 7/2021 | Abdunabi | ........... | G06F 16/9538 |

* cited by examiner

*Primary Examiner* — Andrew R Dyer
*Assistant Examiner* — Phoebe X Pan

(57) ABSTRACT

Systems and methods for Documentation Through Gleaning Content [extract content (information) from various sources. collect gradually and bit by bit.] with an enhanced, easy to use and intuitive user interface experience. This is the system to glean the content such as text, image, audio, video in bit by bit from various sources such as web pages, document viewers, word of mouth, SMS, email, internet messenger, social medias etc., and tagged [labeled] to the document/topic in shorter amount of time. At any point of time one or more gleaned content(s) are compiled as a single document without the need of an editor. The team of users can use any type of devices to collaborate, review and publish the document.

34 Claims, 120 Drawing Sheets

System Overview – Gleaning Content

SYSTEMS AND METHODS FOR DOCUMENTATION THROUGH GLEANING CONTENT WITH AN INTUITIVE USER EXPERIENCE

Systems and methods for Documentation Through Gleaning Content [extract content (information) from various sources. collect gradually and hit by bit.] with an enhanced, easy to use and intuitive user interface experience. This is the system to glean the content such as text, image, audio, video in bit by bit from various sources such as web pages, document viewers, word of mouth, SMS, email, internet messenger, social medias etc., and tagged [labeled] to the document/topic in shorter amount of time. At any point of time one or more gleaned content(s) are compiled as a single document without the need of an editor. The team of users can use any type of devices to collaborate, review and publish the document.

COPYRIGHT NOTICE

Vote: The gleaned content is subject to legal requirements. copyright laws and permissions.

BACKGROUND OF THE INVENTION

When a team of user(s) decide to do a research paper on a particular document/topic, although document/topic editors exist to prepare a document/topic and collaborate with one or more users, the user absolutely needs to open/launch the editor to compile the document/topic. User also needs to switch between multiple windows and applications to get the necessary information required to make the document. In addition to this, the user requires document/topic editor supporting devices based on the document/topic type.

The invention is to identify and glean [extract (information) from various sources. collect gradually and bit by bit.] the content such as text, image, audio, video from various sources such as web pages, document/topic viewers, word of mouth, SMS, email, internet messenger, social medias etc., and tagged [labeled] to the document/topic in shorter amount of time. At any point of time one or more gleaned content(s) are compiled as a single document/topic without the help of any editor. The team of users can use any type of devices to collaborate, review and publish the document/topic.

BRIEF SUMMARY OF THE INVENTION

This is a user-friendly system to glean the content, data, images, audio, and video from multiple sources such as internet, local document, etc., along with authentic references within a few clicks and produce a document in a single click. The entire process can be completed in a very short time frame.

If required, the team members can create multiple versions of the document using divide-and-conquer/content elimination processes. Team members can review the document, merge, and publish in a few clicks.

This system could be adopted in the field of research, students, team events, surveys, news, entertainment, sports, and games etc.

There may be many scenarios that students working together on a research work and searching for contents from multiple sources and bring them together as a single document/topic. They could leverage this invention to extract the information bit by bit, groom, sieve and create a well-formed document/topic, collaborate, and publish. Having collected all the information from different sources, it could be used as they wish such as dashboard projections.

This invention is developed as a browser extension to use across internet browsers, mobile (smart phone) applications and as document editor plugins. The proposed user interface devices are desktop, laptop, tablet, mobile, etc., using supported browsers CHROME, EDGE, FIREFOX, SAFARI, etc., with supported operating systems such as MAC OS, LINUX, WINDOWS, ANDROID, IOS, etc.

The system is intended to cover the categories of providing a web featuring technology that enables users to share, bookmark, index, store, collect and showcase content, articles, images, calendars, products, projects, and other information resources in electronic form in the nature and field of any research.

This invention helps to accomplish the entire process (Glean elegantly, Collaborate seamlessly and Publish Instantly™) on the fly in a short period of time.

BRIEF SUMMARY—DIAGRAM REFERENCES

FIG. 8 illustrates screen diagram S-10-300-B: Glean—View Topics By Selection.

FIG. 15 illustrates screen diagram S-10-600-A: Search Tags By Selection.

DETAILED DESCRIPTION OF THE INVENTION

Gleaning

Figure 1:
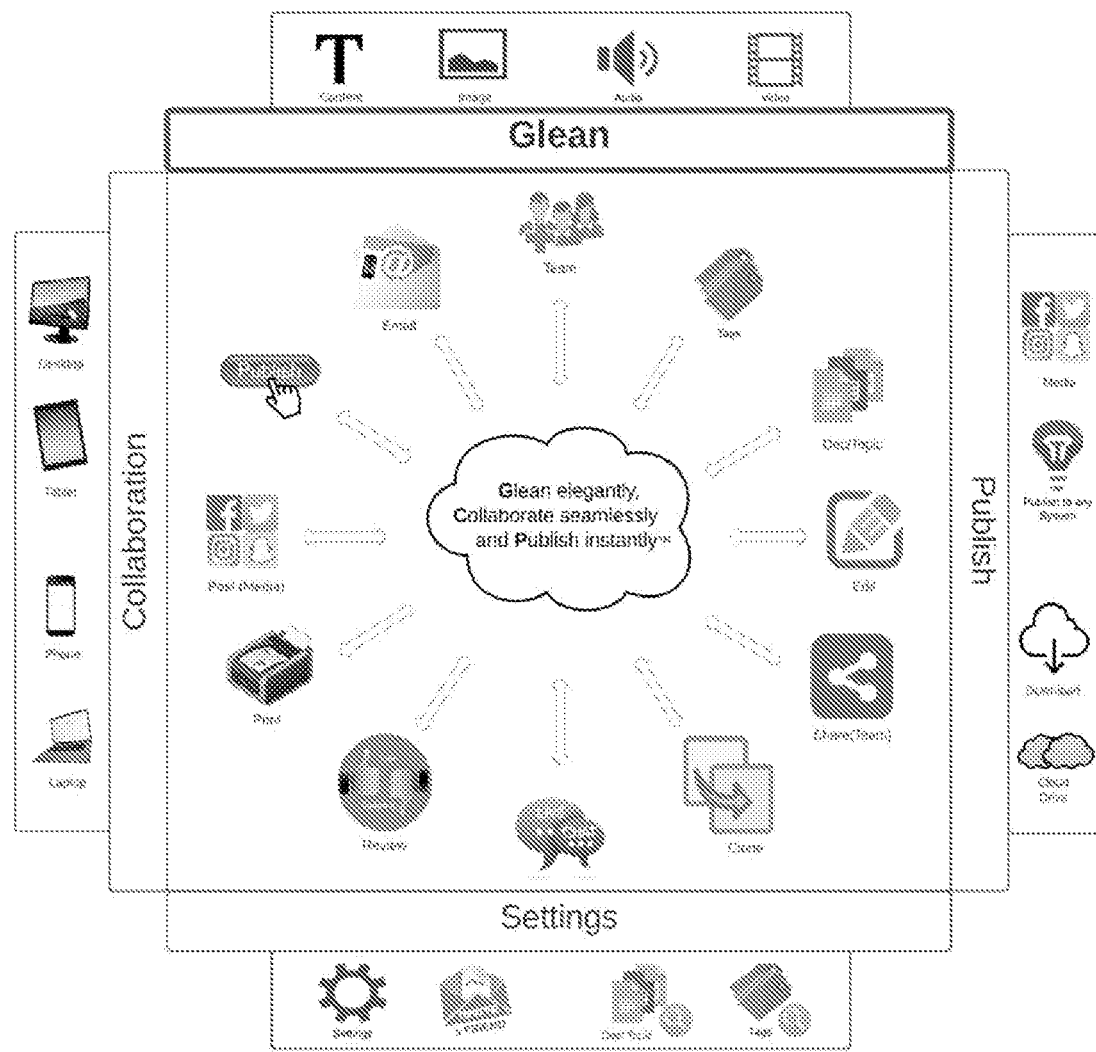
FIG. 1 illustrates screen diagram System Overview—Gleaning Content.
Figure 2:
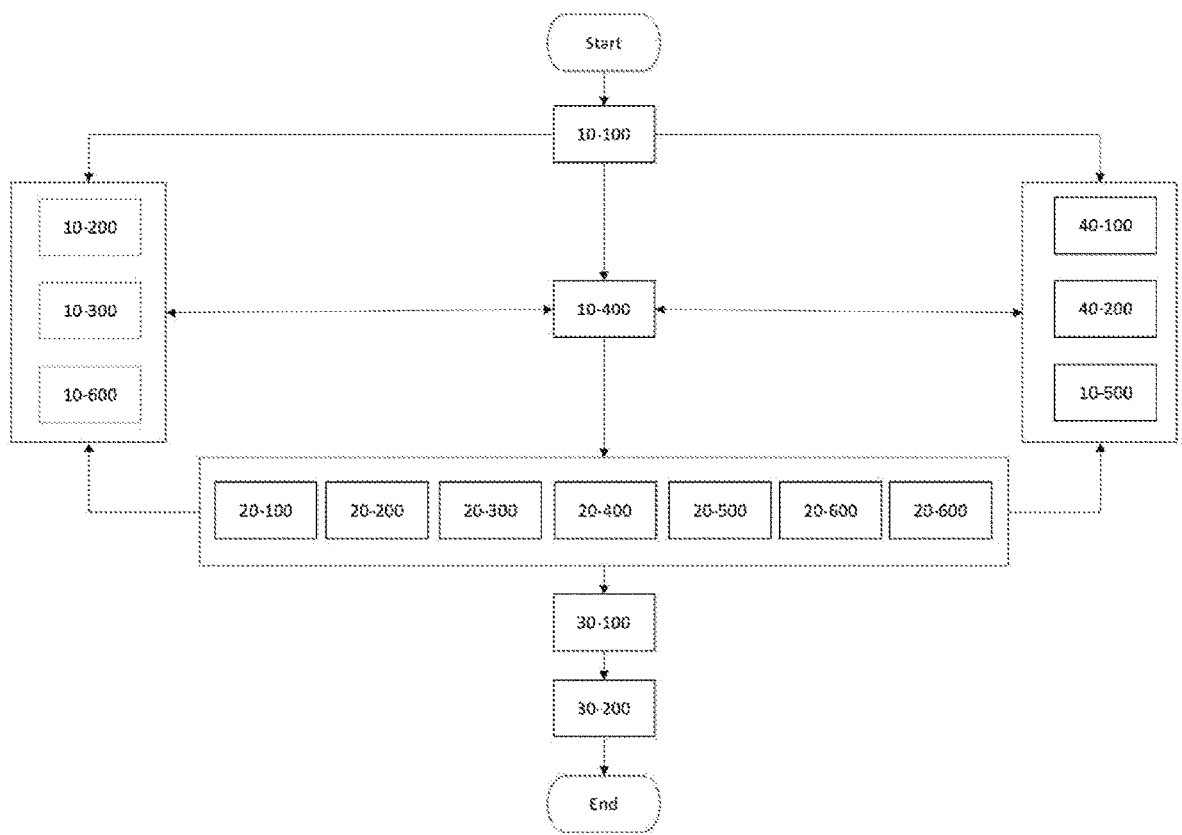
FIG. 2 illustrates flow diagram Gleaning Process Flow Overview.
Figure 3:
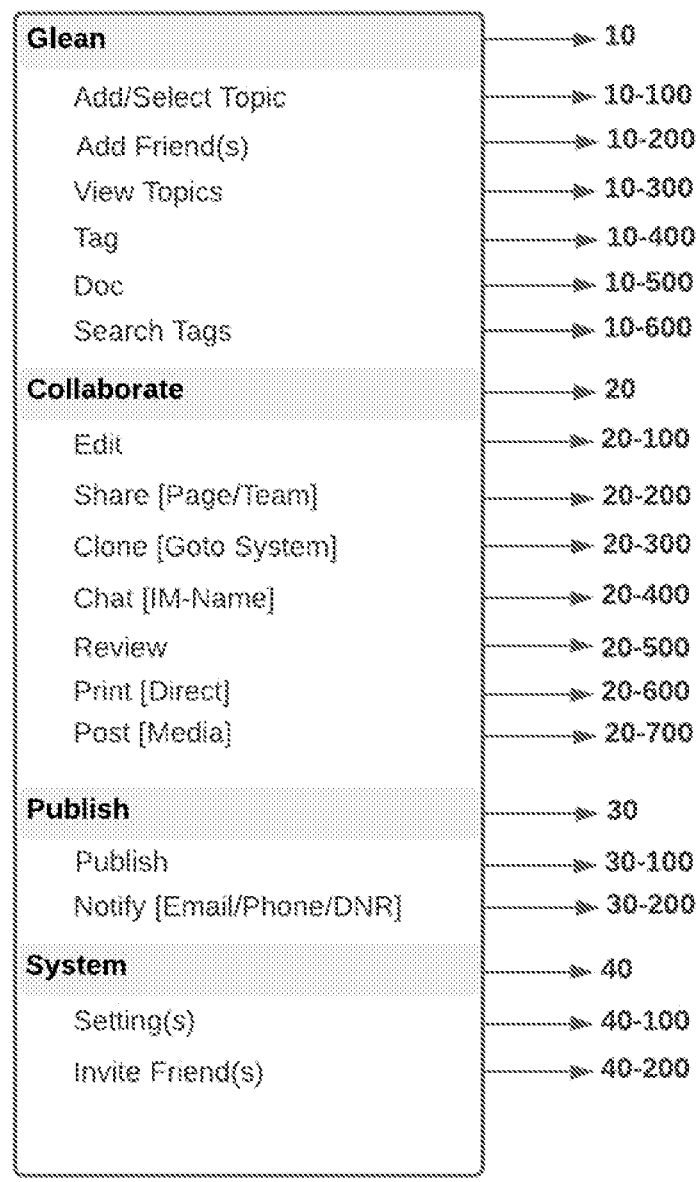
FIG. 3 illustrates screen diagram S-00: Main Menu.
Figure 4:
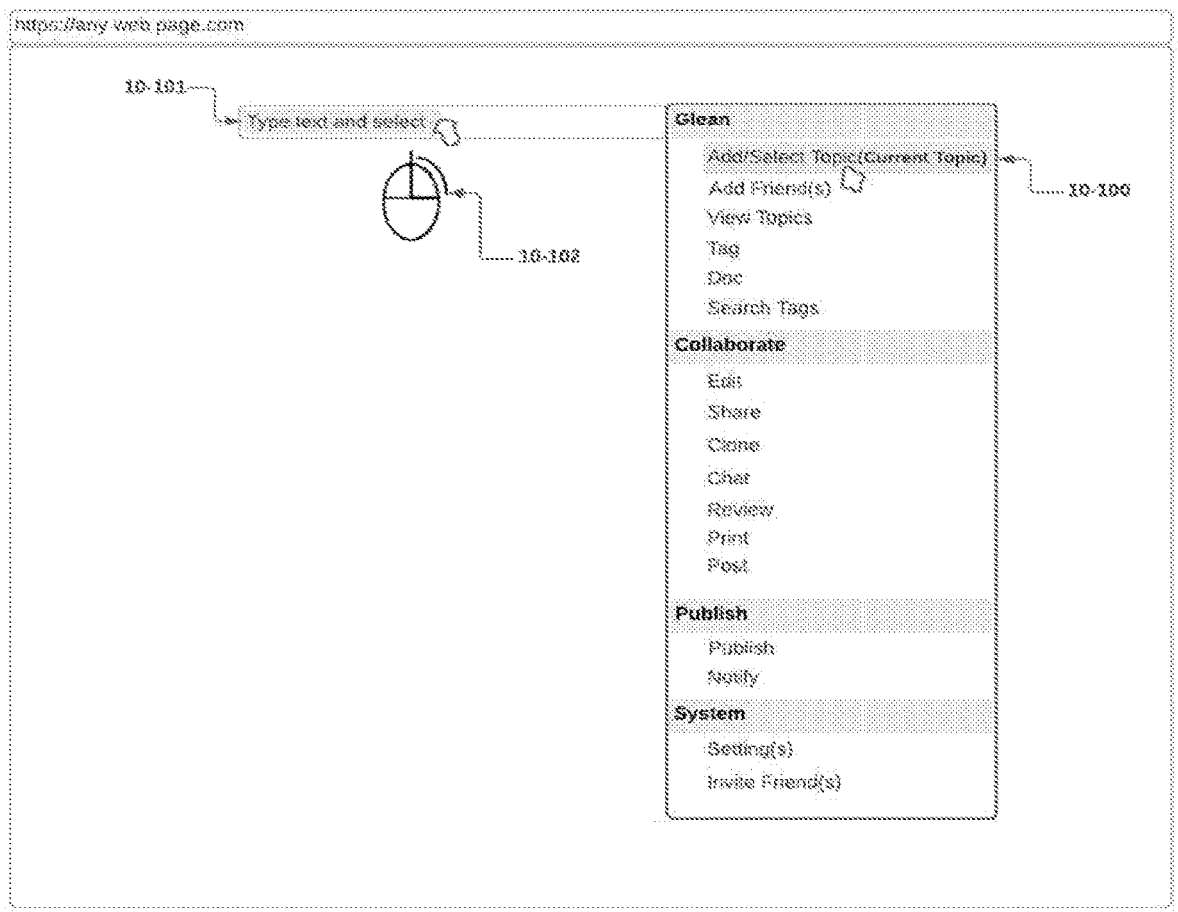
FIG. 4 illustrates screen diagram S-10-100-A: Glean—Add/Select Topic By Edit Box.
Figure 21:
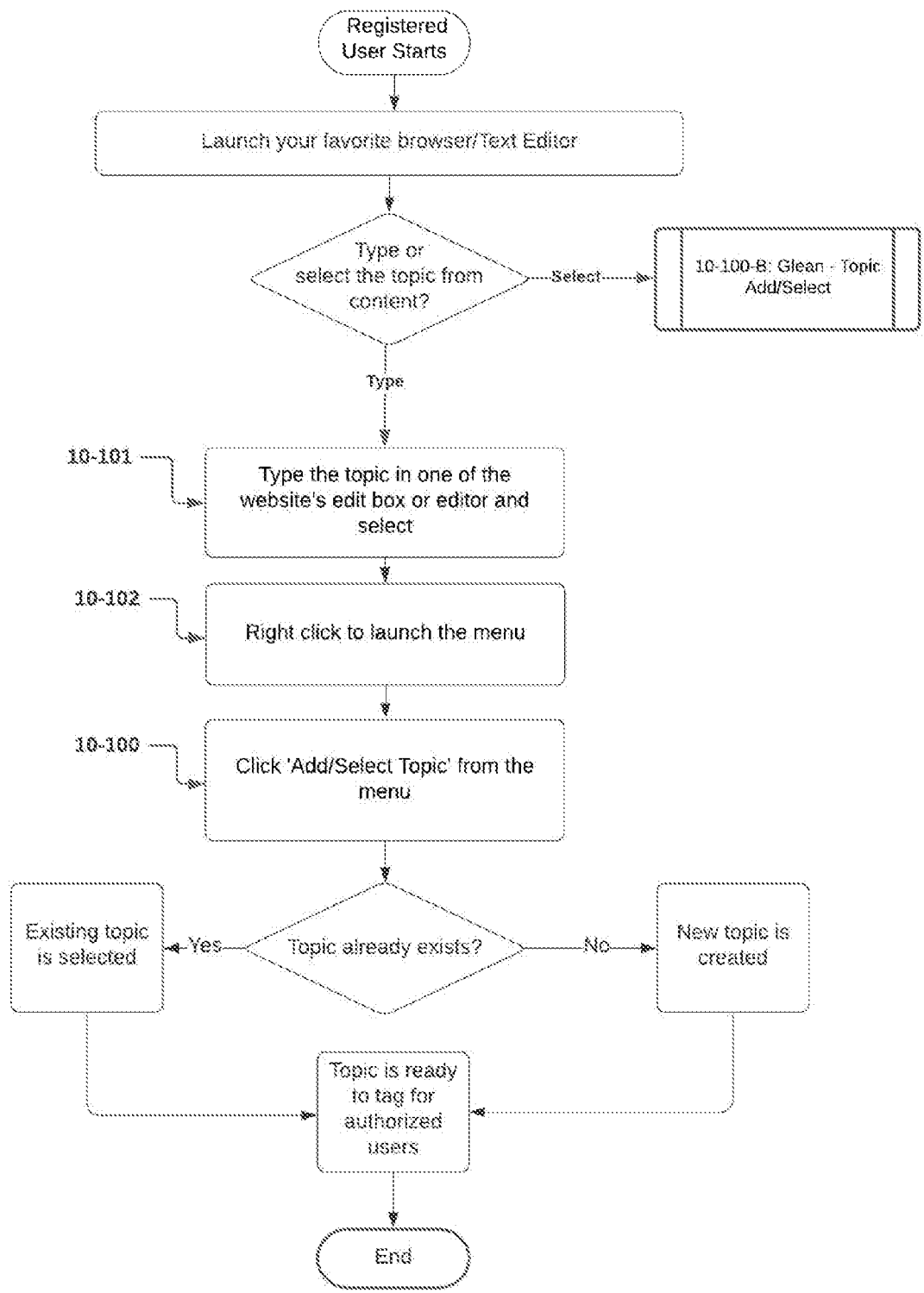
FIG. 21 illustrates flow diagram F-10-100-A: Glean—Topic Add/Select.

FIG. 4 with screen diagram S-10-100-A is an illustrative screen display of the method for creating a new topic or selecting an existing topic for further action (example: view, print doe etc.). The user can type a suitable topic name in any of the text box/text editor from web page or any other document (example: WORD, EXCEL, PDF, etc.) 10-101 and right click the mouse 10-102 to view list of menu options FIG. 3 with main menu diagram S-00 for further action. User selects the menu "Add/Select Topic" 10-100. If the topic is already existing for the current user, it will be selected else a new topic will be created and selected for further action. FIG. 21 illustrates flow diagram F-10-100-A of FIG. 4 with screen diagram S-10-100-A.

Figure 5:
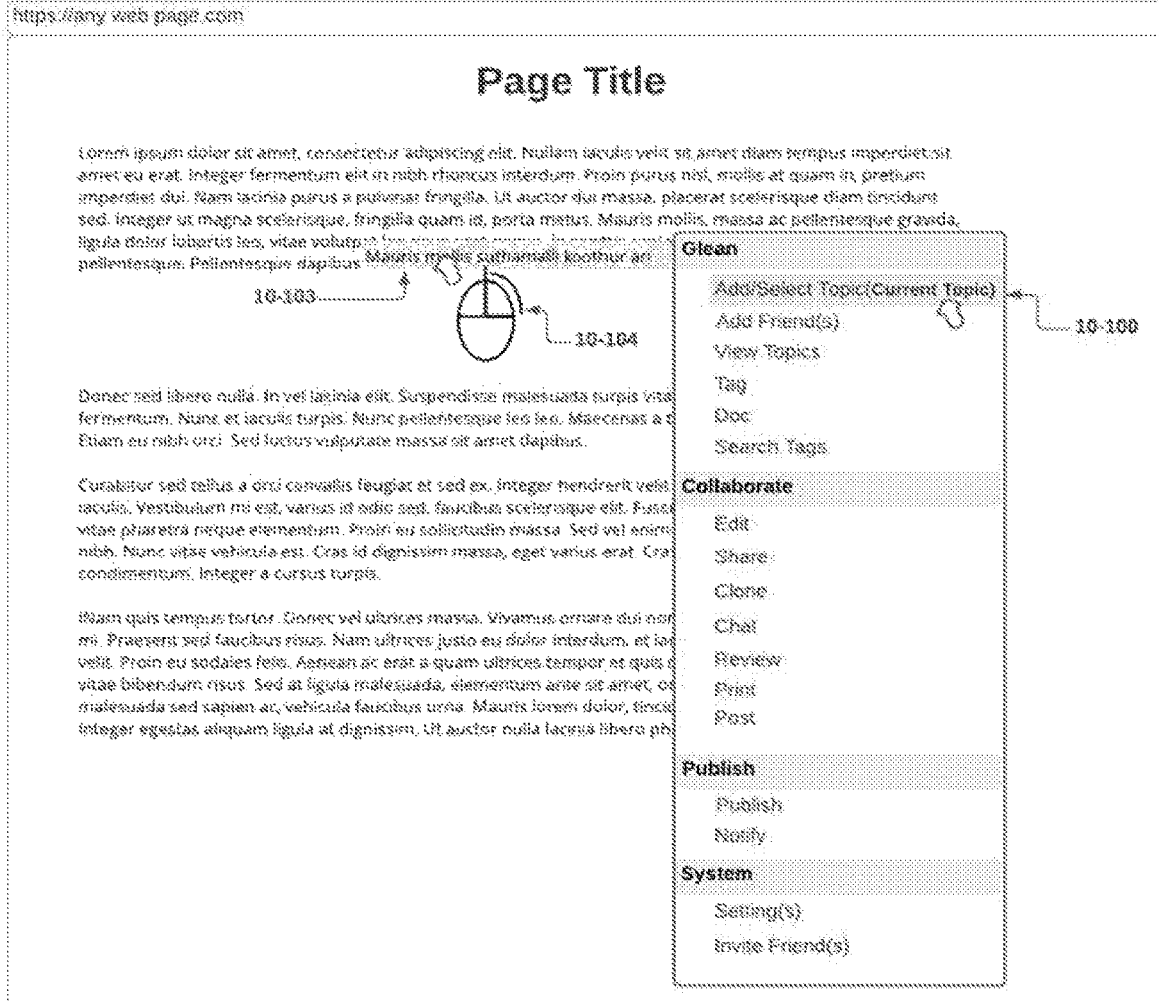
FIG. 5 illustrates screen diagram S-10-100-B: Glean—Add/Select Topic By Selection.

FIG. 5 with screen diagram S-10-100-B is an illustrative screen display of the method for creating a new topic or selecting an existing topic for further action (example: view, print doc etc.). The user can identify and select a suitable topic name from web page or any other document (example: WORD, EXCEL, PDF, etc.) 10-103 and right click the mouse 10-104 to view list of menu options FIG. 3 with main menu diagram S-00 for further action. User selects the menu "Add/Select Topic" 10-100. If the topic is already existing for the current user, it will be selected else a new topic will be created and selected for further action.

Figure 22:
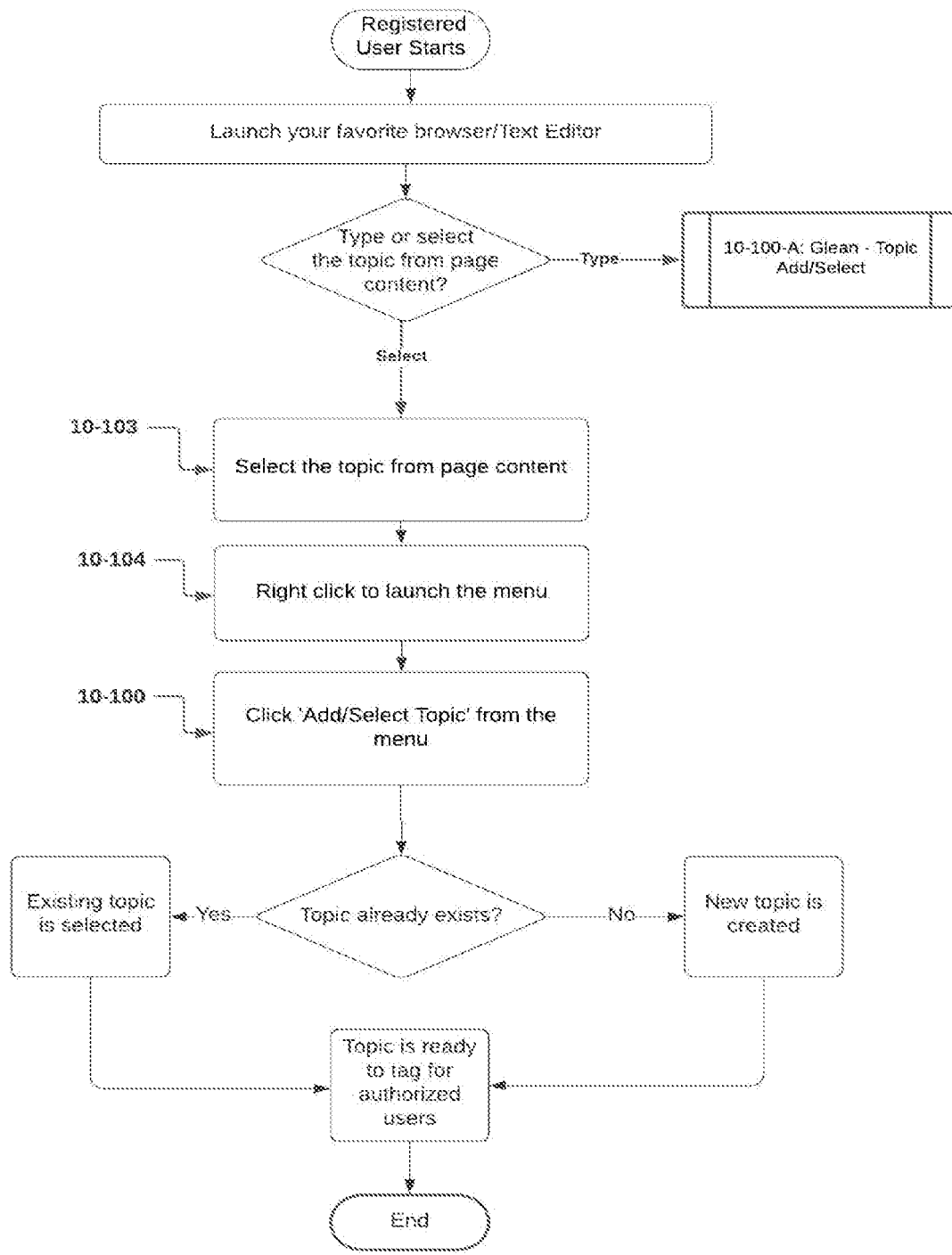
FIG. 22 illustrates flow diagram F-10-100-B: Glean—Topic Add/Select.

FIG. 22 illustrates flow diagram F-10-100-B of FIG. 5 with screen diagram S-10-100-B.

Figure 6:
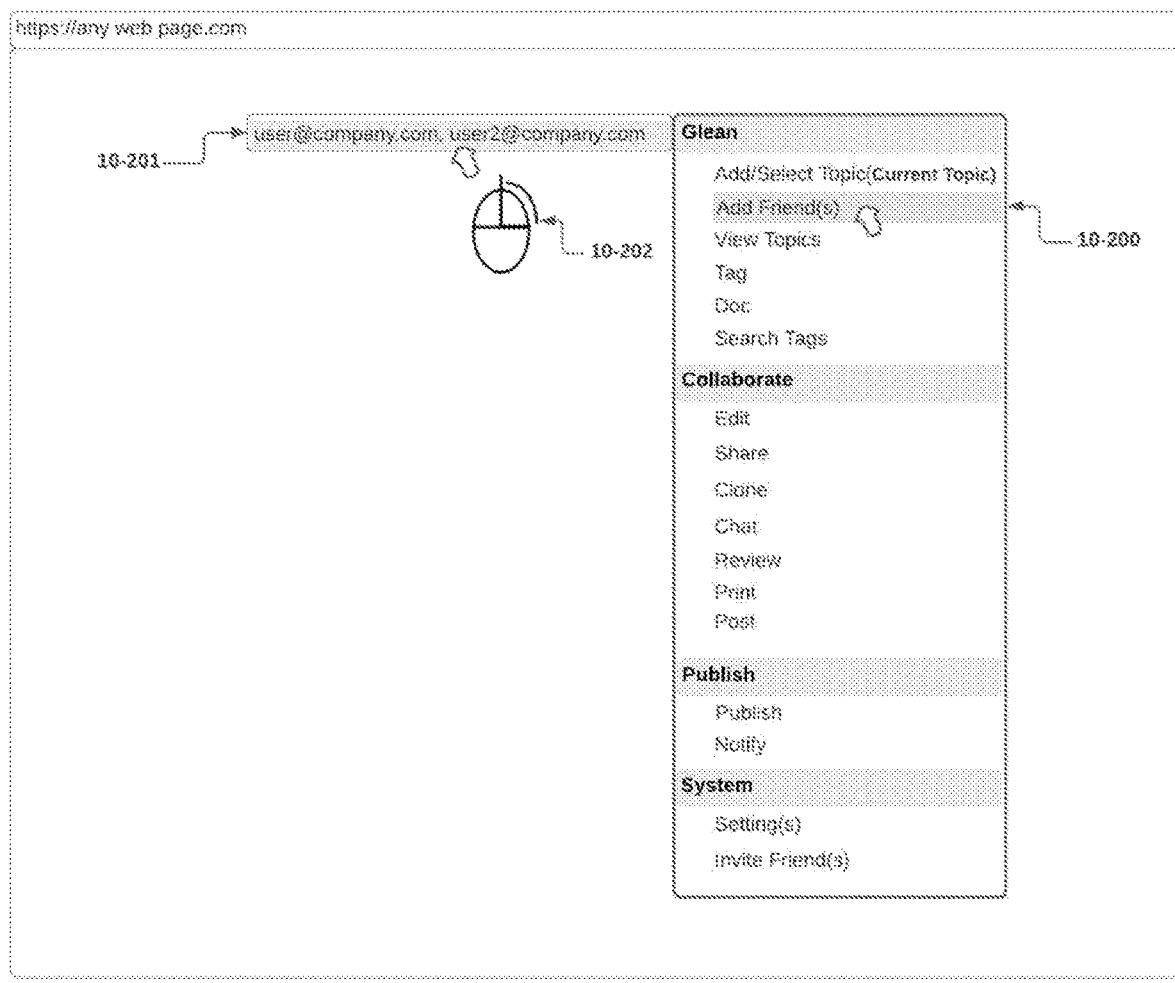
FIG. 6 illustrates screen diagram S-10-200: Glean—Add Friend(s) By Typing or Selecting Email Address(es).

FIG. 6 with screen diagram S-10-200 is an illustrative screen display of the method for adding member(s) from the user friends' list to the selected topic to work as a team. A topic must be selected as a pre-requisite to add member(s). The user can type the email address(es) of his/her friend(s) in any of the available text box/text editor from web page or any other document (example: WORD, EXCEL, PDF, etc.). Alternatively, user can also select email address(es) from contact list. 10-201 and right click the mouse 10-202 to view list of menu options FIG. 3 with main menu diagram S-00 for further action. User selects the menu "Add Friend(s)" 10-200. The system will search user's friend(s) list. In case of the friend(s) already existing, they will be added/assigned to the selected topic for collaboration. Otherwise, follow FIG. 112 with screen diagram S-40-200-A. which is an illustrative screen display of Invite Friend(s).

Figure 23:
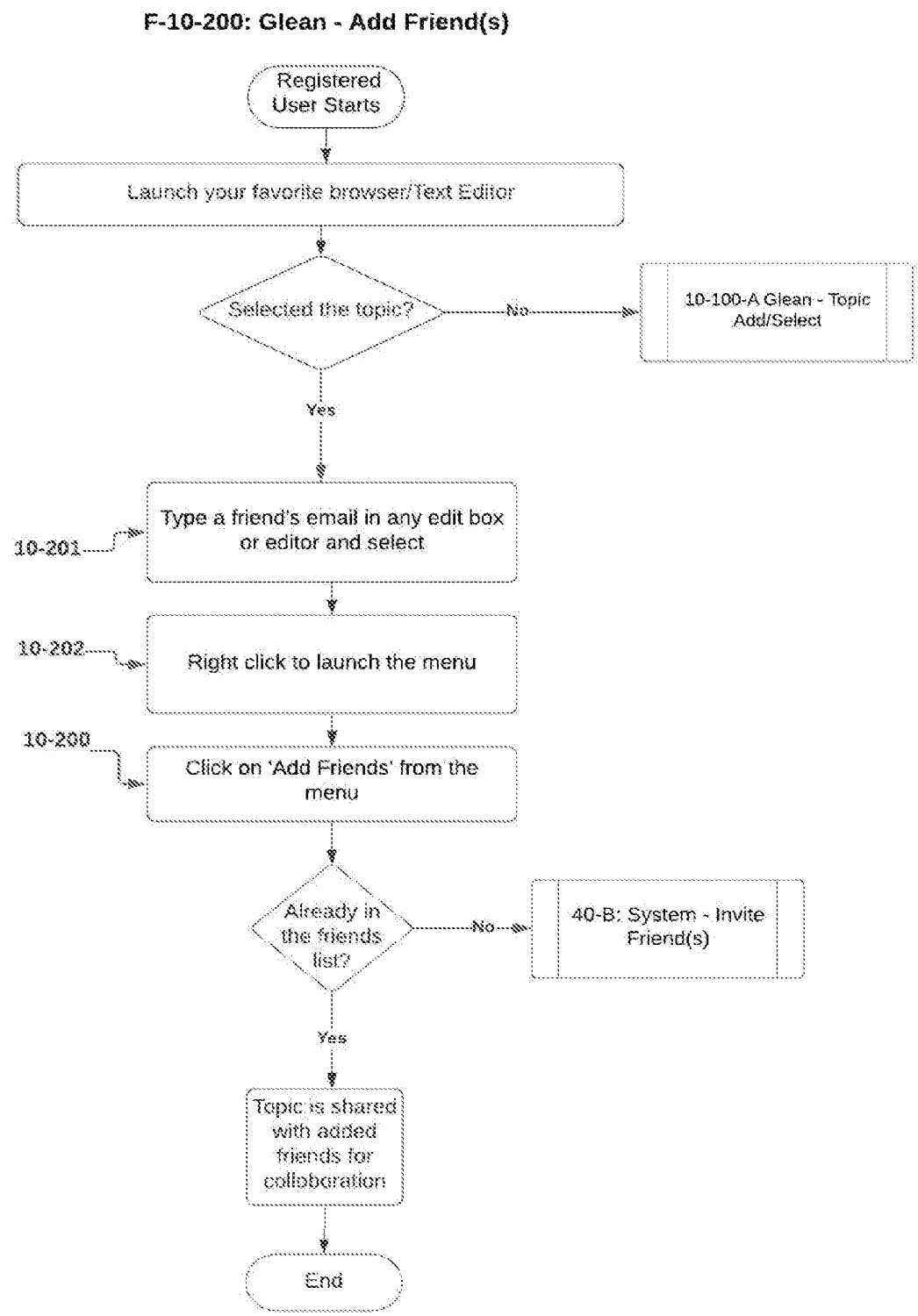
FIG. 23 illustrates flow diagram F-10-200: Glean—Add Friend(s).

FIG. 23 illustrates flow diagram F-10-200 of FIG. 6 with screen diagram S-10-200.

Figure 7:
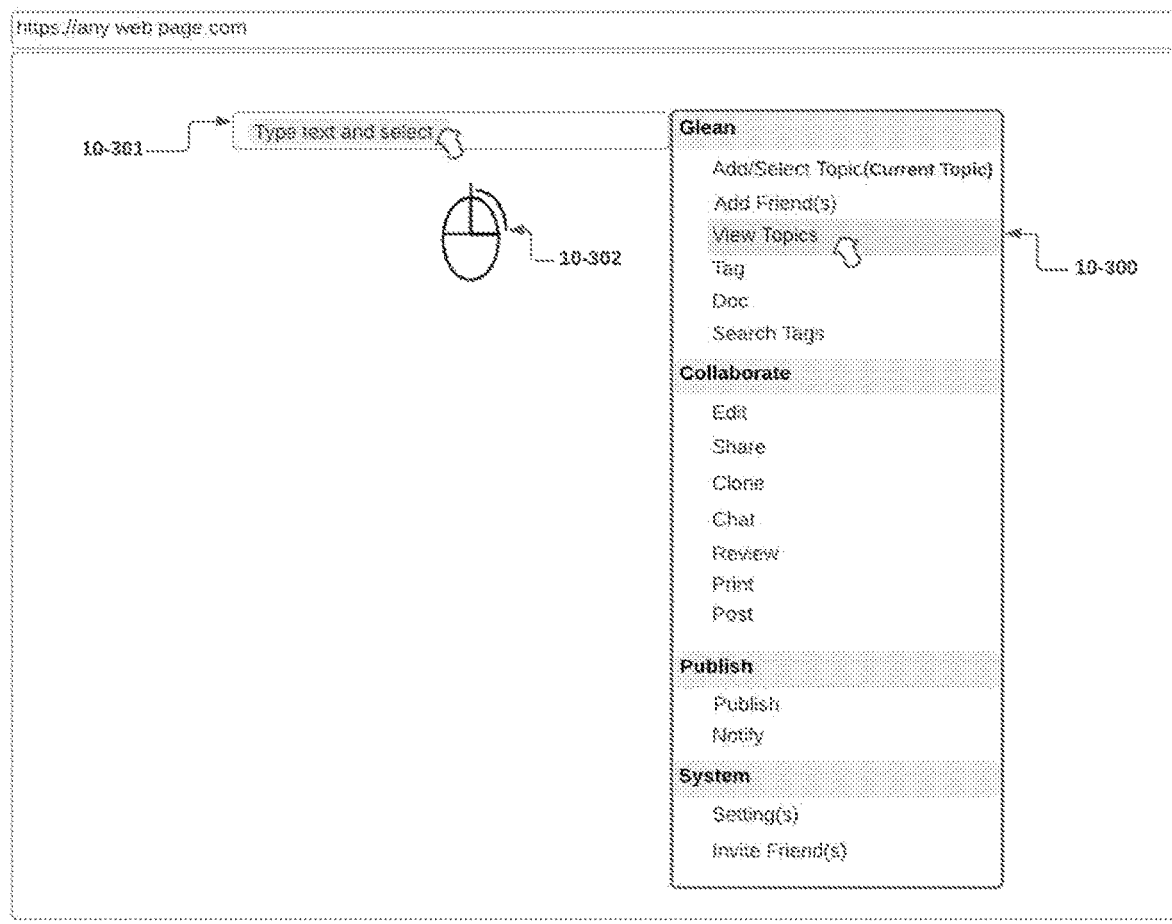
FIG. 7 illustrates screen diagram S-10-300-A: Glean—View Topics By Edit Box.

FIG. 7 with screen diagram S-10-300-A is an illustrative screen display of the method of searching a topic to verify if the topic exists. The user can type the topic name in any of the available text box/text editor from web page or any other document (example: WORD, EXCEL, PDF, etc.) 10-301 and right click the mouse 10-302 to view list of menu options FIG. 3 with main menu diagram S-00 for further action. User selects the menu "Search Topic" 10-300. The system will navigate to the search result page FIG. 9 with screen diagram S-10-300-C for user further action (example: FIG. 4 with screen diagram S-10-100-A], etc.).

Figure 24:
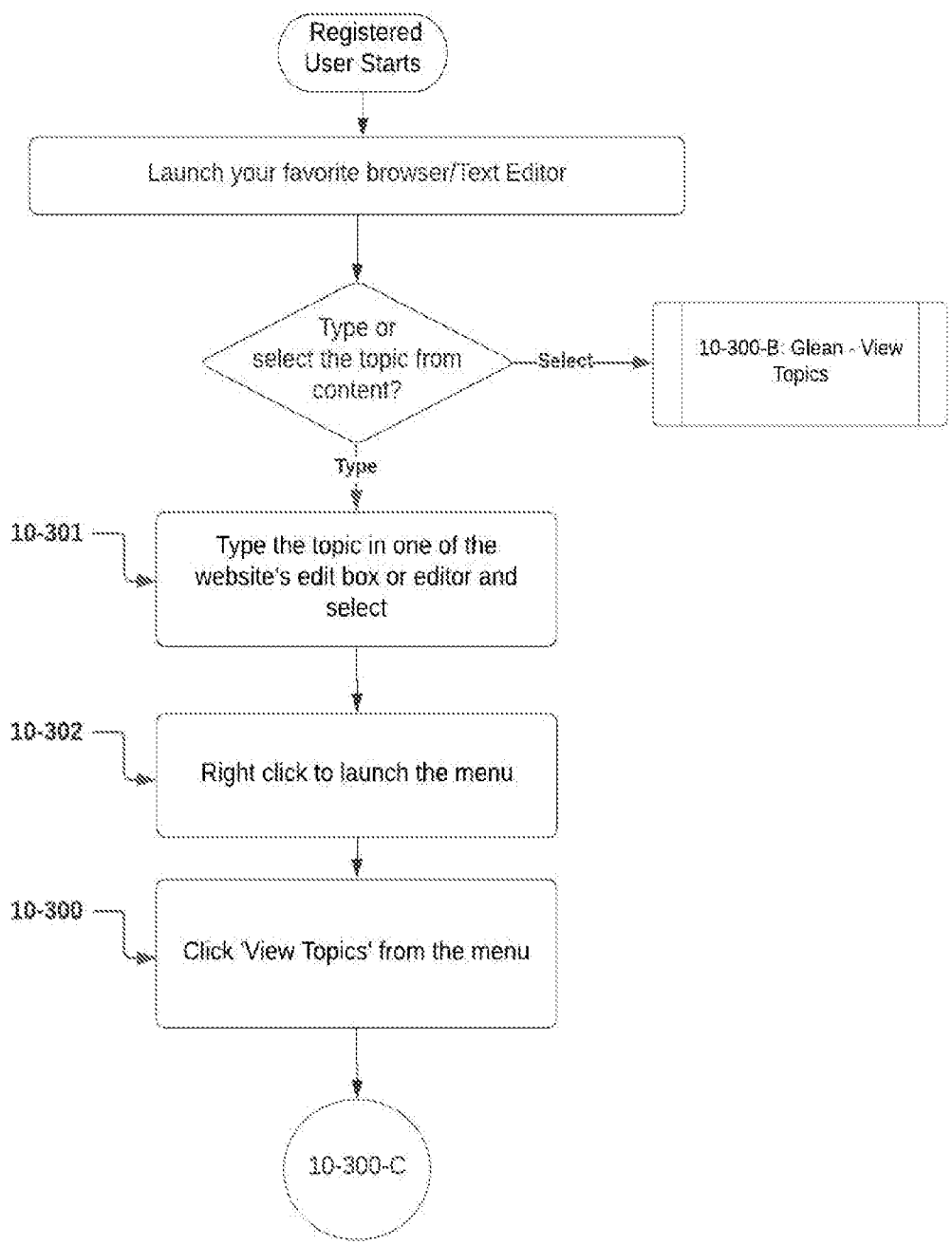
FIG. 24 illustrates flow diagram F-10-300-A: Glean—View Topics.

FIG. 24 illustrates flow diagram F-10-300-A of FIG. 7 with screen diagram S-10-300-A.

Figure 8:
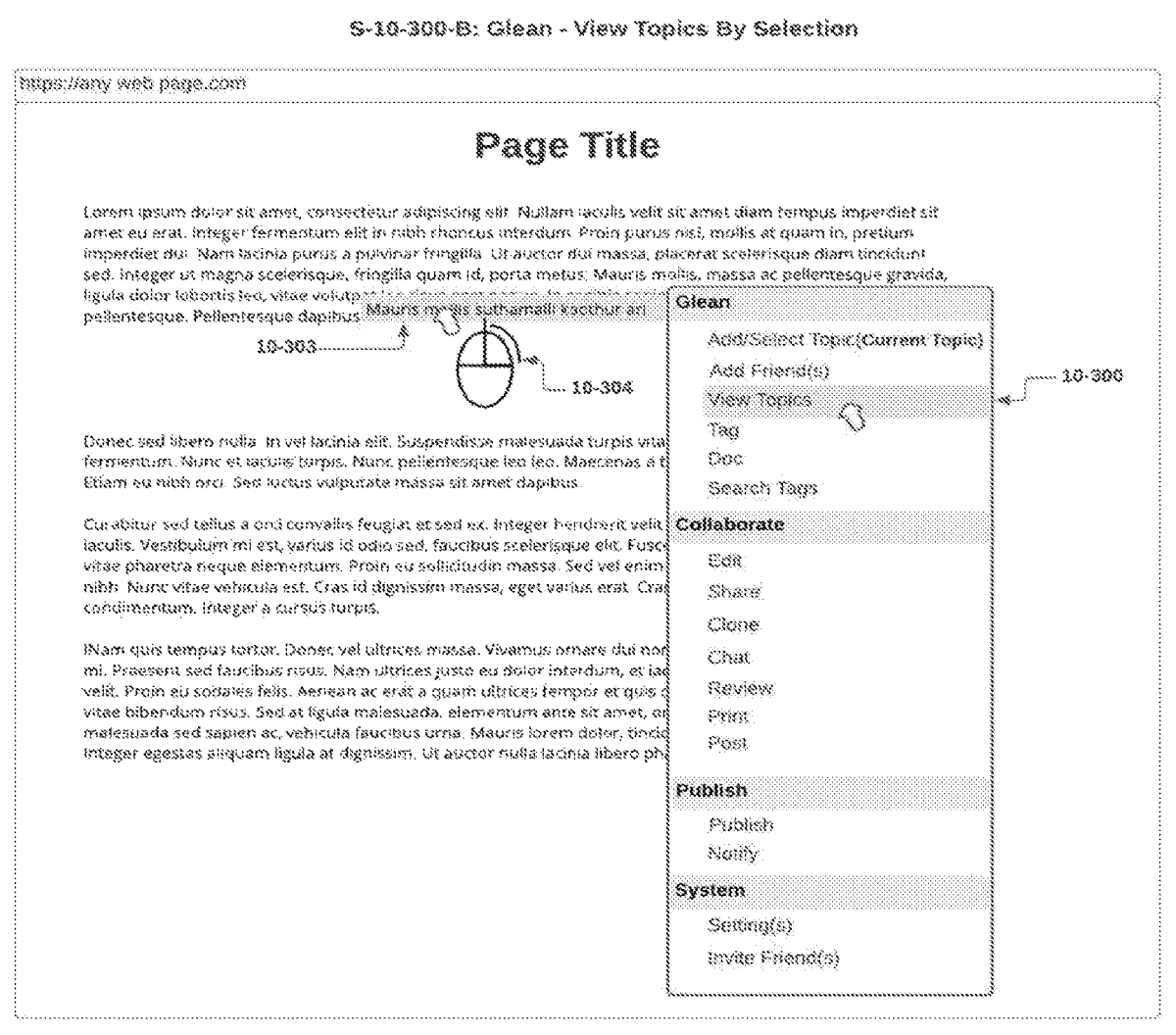

FIG. 8 with screen diagram S-10-300-B is an illustrative screen display of the method of searching a topic to verify the topic existence. The user can identify and select a topic name from web page or any other document (example: WORD, EXCEL, PDF, etc.) 10-303 and right click the mouse 10-304 to view list of menu options FIG. 3 with main menu diagram S-00 for further action. User selects the menu "Search Topic" 10-300. The system will navigate to the search result page FIG. 9 with screen diagram S-10-300-C for user further action (example: FIG. 7 with screen diagram S-10-300-A etc.).

Figure 25:
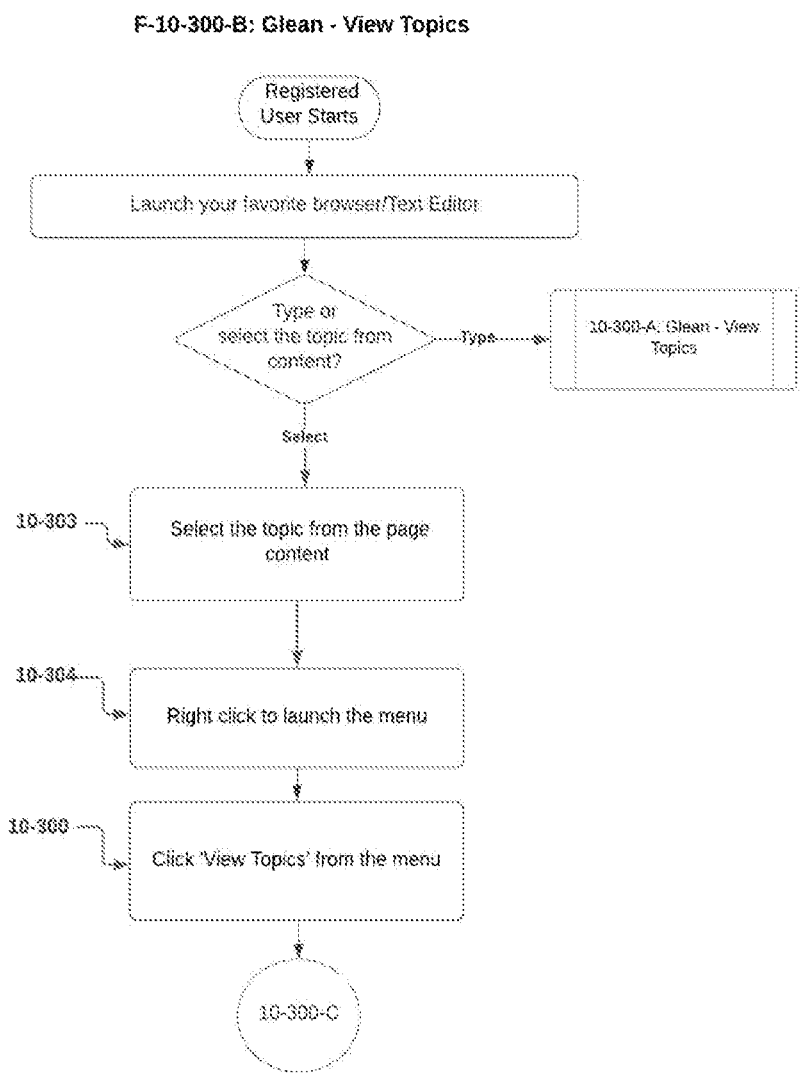
FIG. 25 illustrates flow diagram F-10-300-B: Glean—View Topics.

FIG. 25 illustrates flow diagram F-10-300-B of FIG. 8 with screen diagram S-10-300-B.

Figure 9:
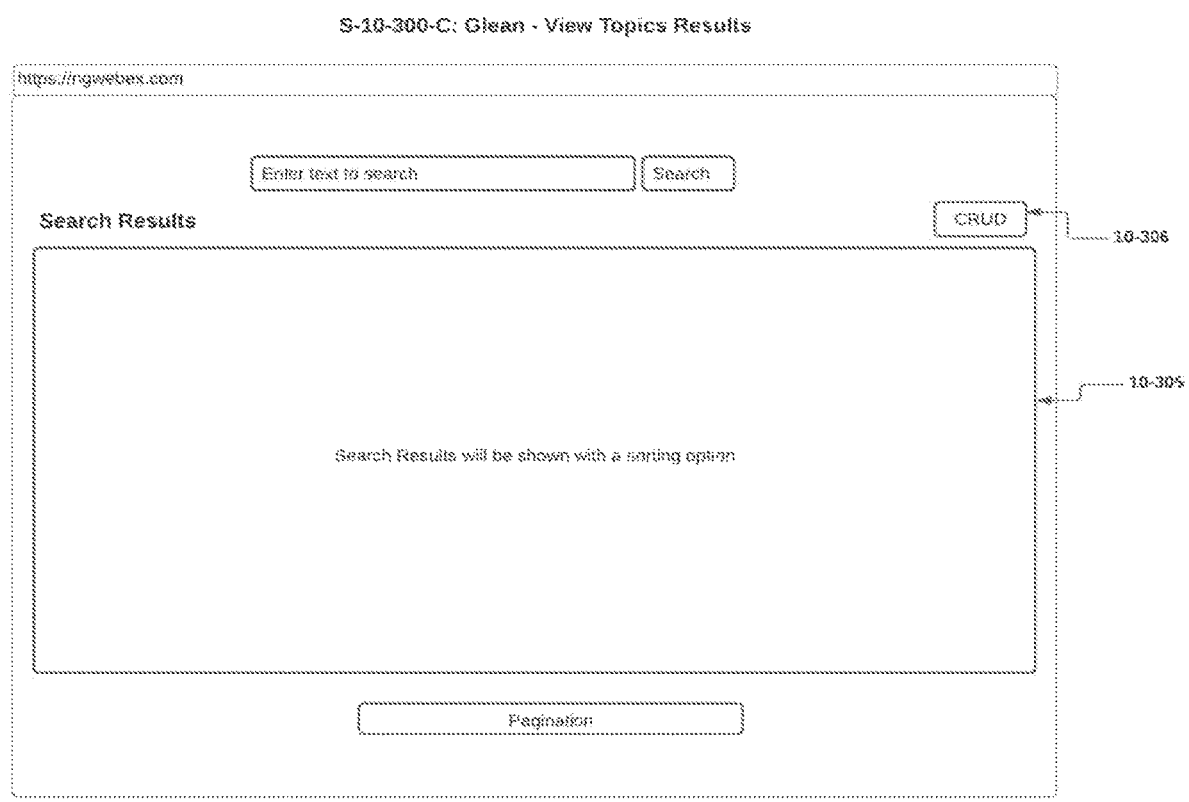
FIG. 9 illustrates screen diagram S-10-300-C: Glean—View Topics Results.

FIG. 9 with screen diagram S-10-300-C is an illustrative screen display of viewing search result for topic. List of search results are shown 10-305 and the user can perform preferred CRUD action 10-306.

Figure 26:
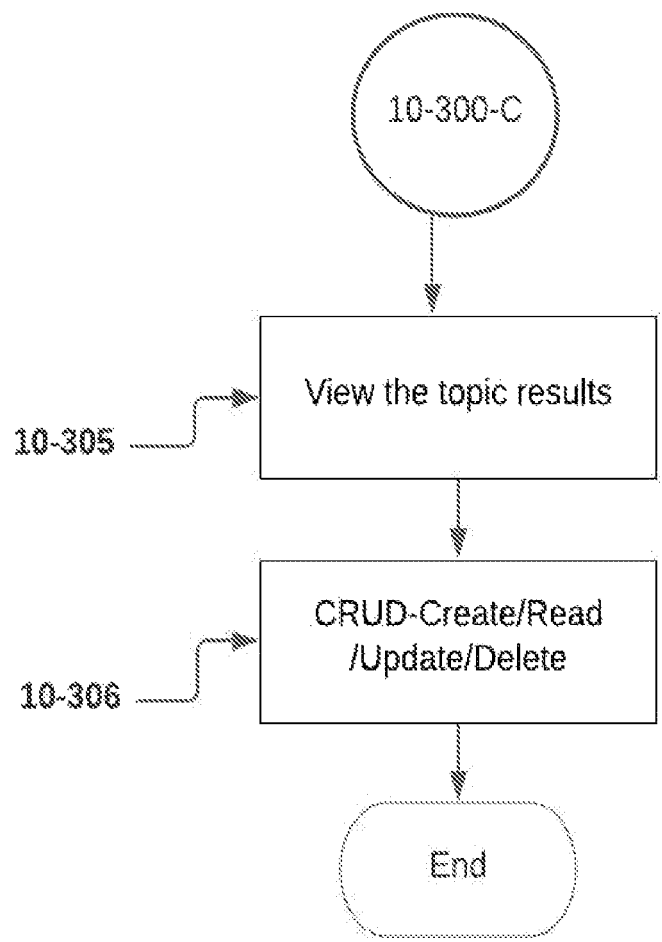
FIG. 26 illustrates flow diagram F-10-300-C: Glean—View Topic Results.

FIG. 26 illustrates flow diagram F-10-300-C of FIG. 9 with screen diagram S-10-300-C.

Figure 10:
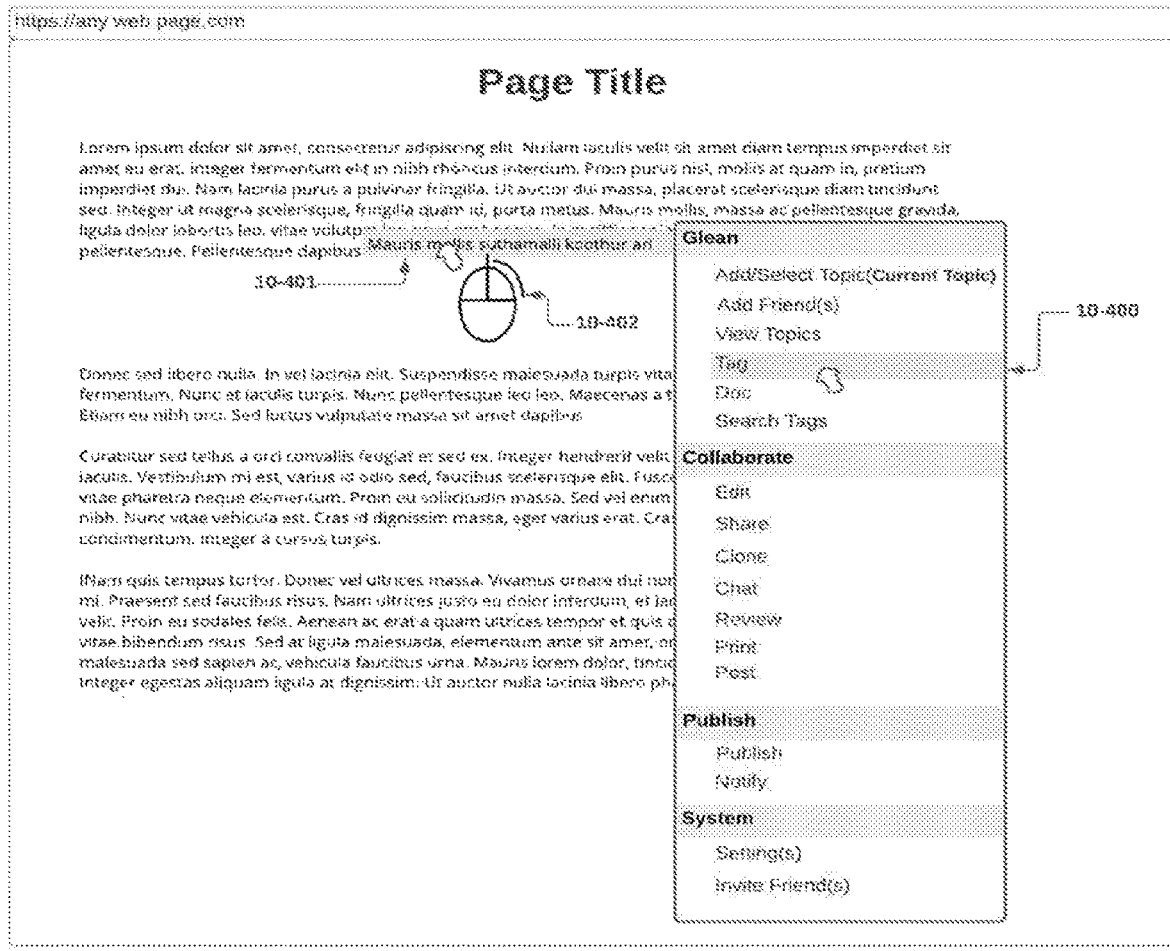
FIG. 10 illustrates screen diagram S-10-400-A: Glean—Tag By Selection and Right Click.

FIG. 10 with screen diagram S-10-400-A is an illustrative screen display of the method for tagging a content to the selected topic. A topic must be selected as a pre-requisite to tag any content. The user can identify and select the content (text, image, media etc.) from web page or any other document (example: WORD, EXCEL, PDF, etc.) 10-401 and right click the mouse 10-402 to view list of menu options FIG. 3 with main menu diagram S-00 for further action. User selects the menu "Tag" 10-400. The selected content will be tagged under the selected topic.

Figure 27:
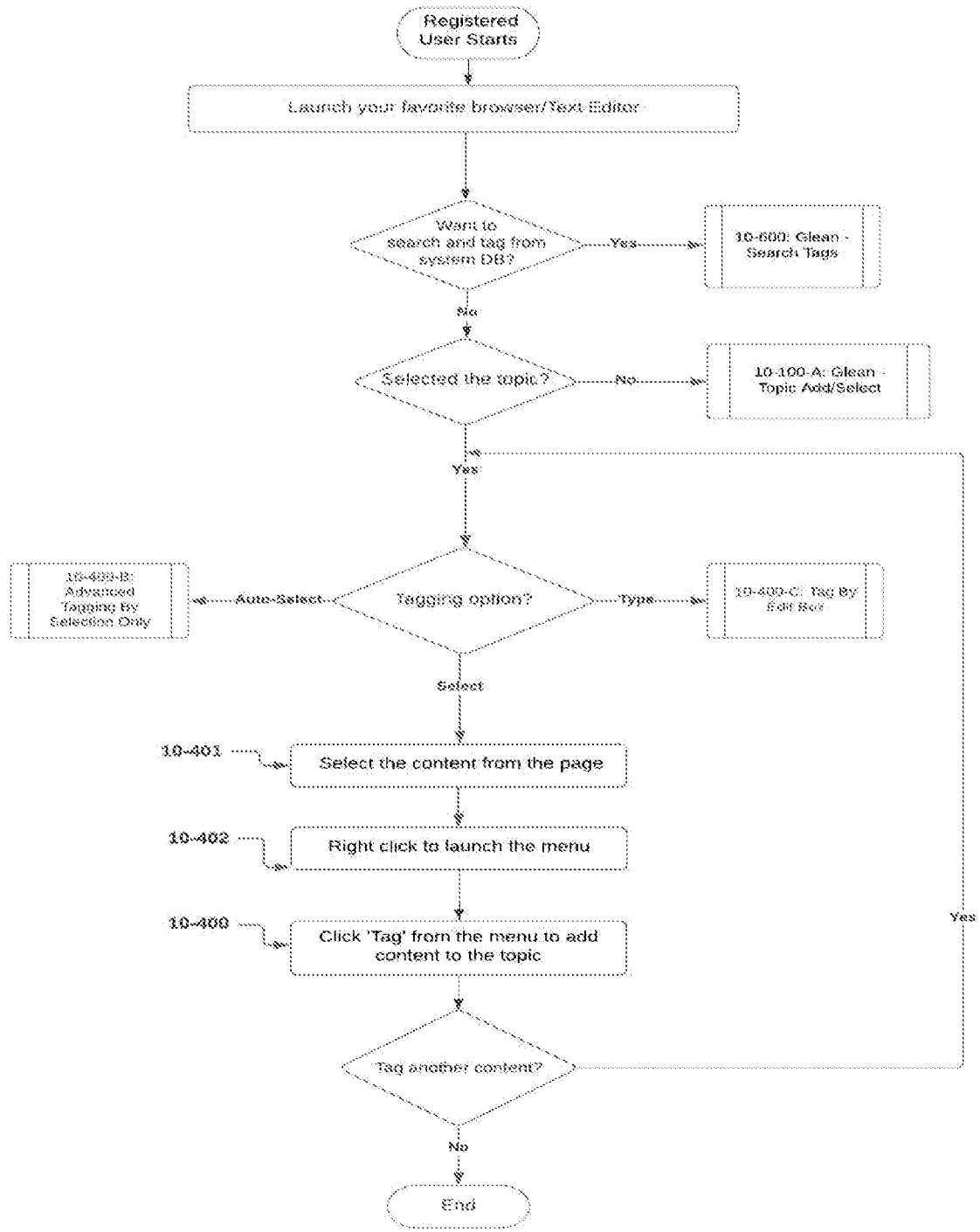
FIG. 27 illustrates flow diagram F-10-400-A: Glean—Tag By Selection and Right Click.

FIG. 27 illustrates flow diagram F-10-400-A of FIG. 10 with screen diagram S-10-400-A.

Figure 11:
FIG. 11 illustrates screen diagram S-10-400-B: Advanced Tagging By Selection Only.

FIG. 11 with screen diagram S-10-400-B is an illustrative screen display of the method for auto-tagging a content to the selected topic. A topic must be selected as a pre-requisite to tag any content. The user can identify and select the content (text, image, media, etc.) from web page or any other document (example: WORD, EXCEL, PDF, etc.) 10-403. The selected content will be automatically tagged under the selected topic when the user releases the mouse button. There is no need to click on the menu. The user can set this option for tagging at the system settings.

Figure 28:
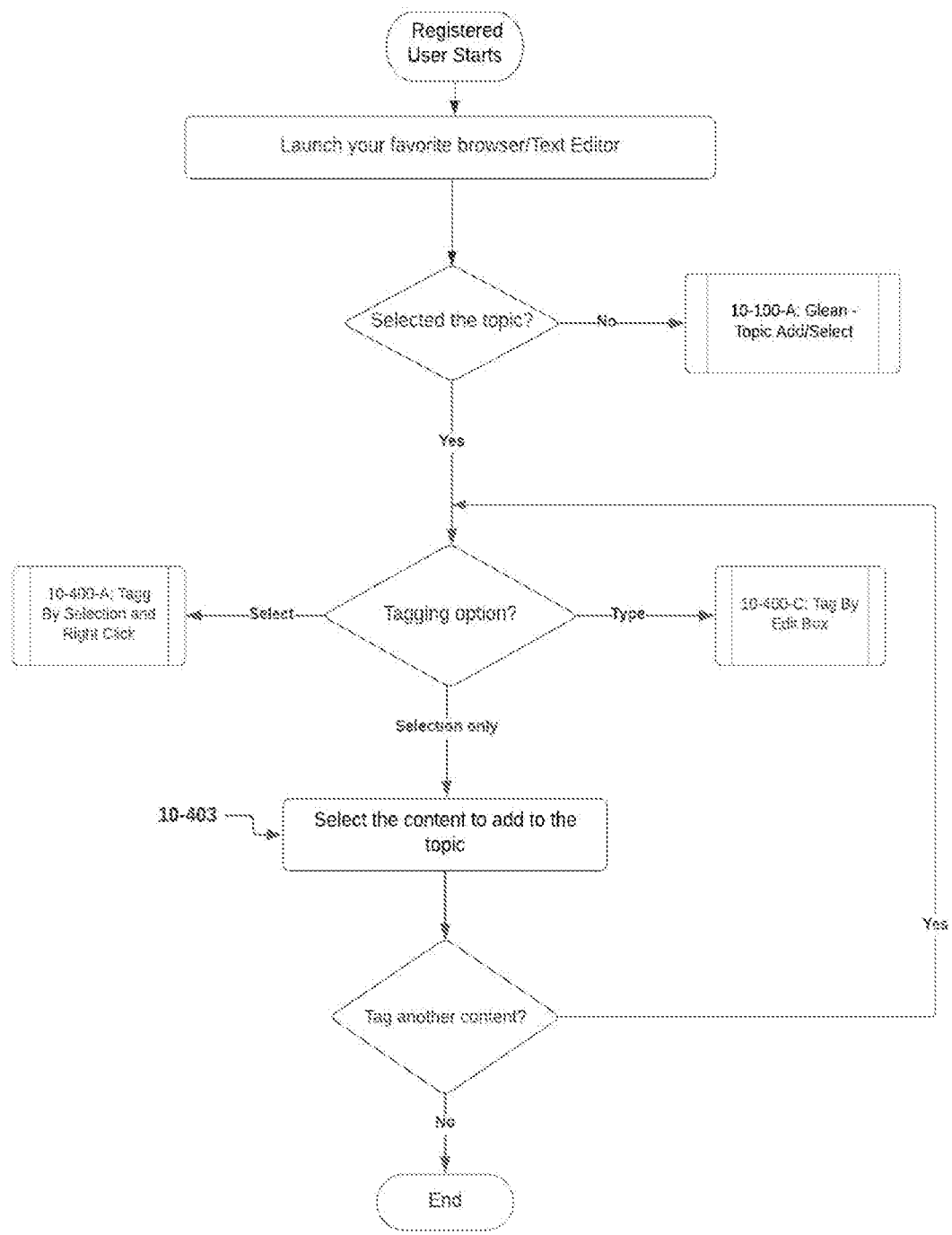
FIG. 28 illustrates flow diagram F-10-400-B: Advanced Tagging By Selection Only.

FIG. 28 illustrates flow diagram F-10-400-B of FIG. 11 with screen diagram S-10-400-B.

Figure 12:
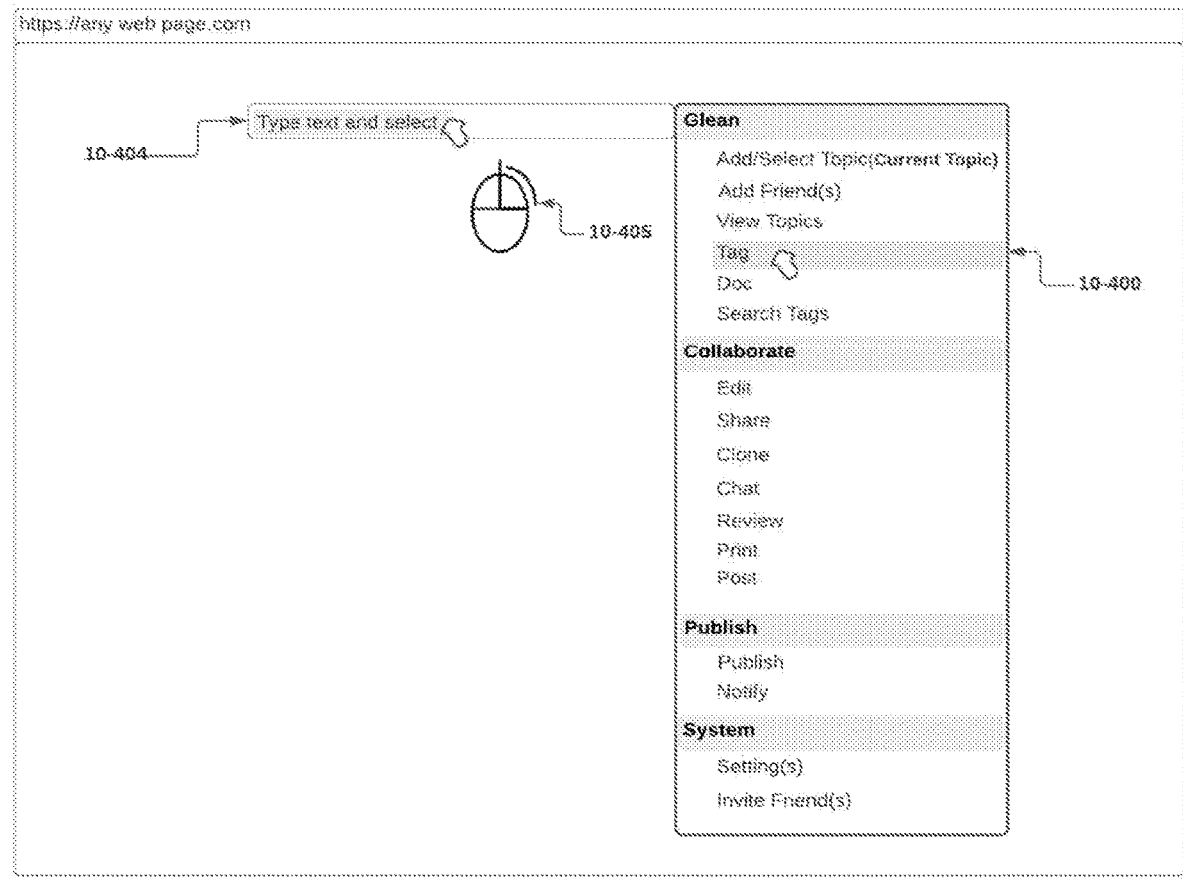
FIG. 12 illustrates screen diagram S-10-400-C: Tag By Edit Box.

FIG. 12 with screen diagram S-10-400-C is an illustrative screen display of the method for tagging a content to the selected topic. A topic must be selected as a pre-requisite to tag any content. The user can type the content in any of the available text box/text editor from web page or any other document (example: WORD, EXCEL, PDF, etc.) 10-404 and right click the mouse 10-405 to view list of menu options FIG. 3 with main menu diagram S-00 for further action. User selects the menu "Tag" 10-400. The selected content will be tagged under the selected topic.

Figure 29:
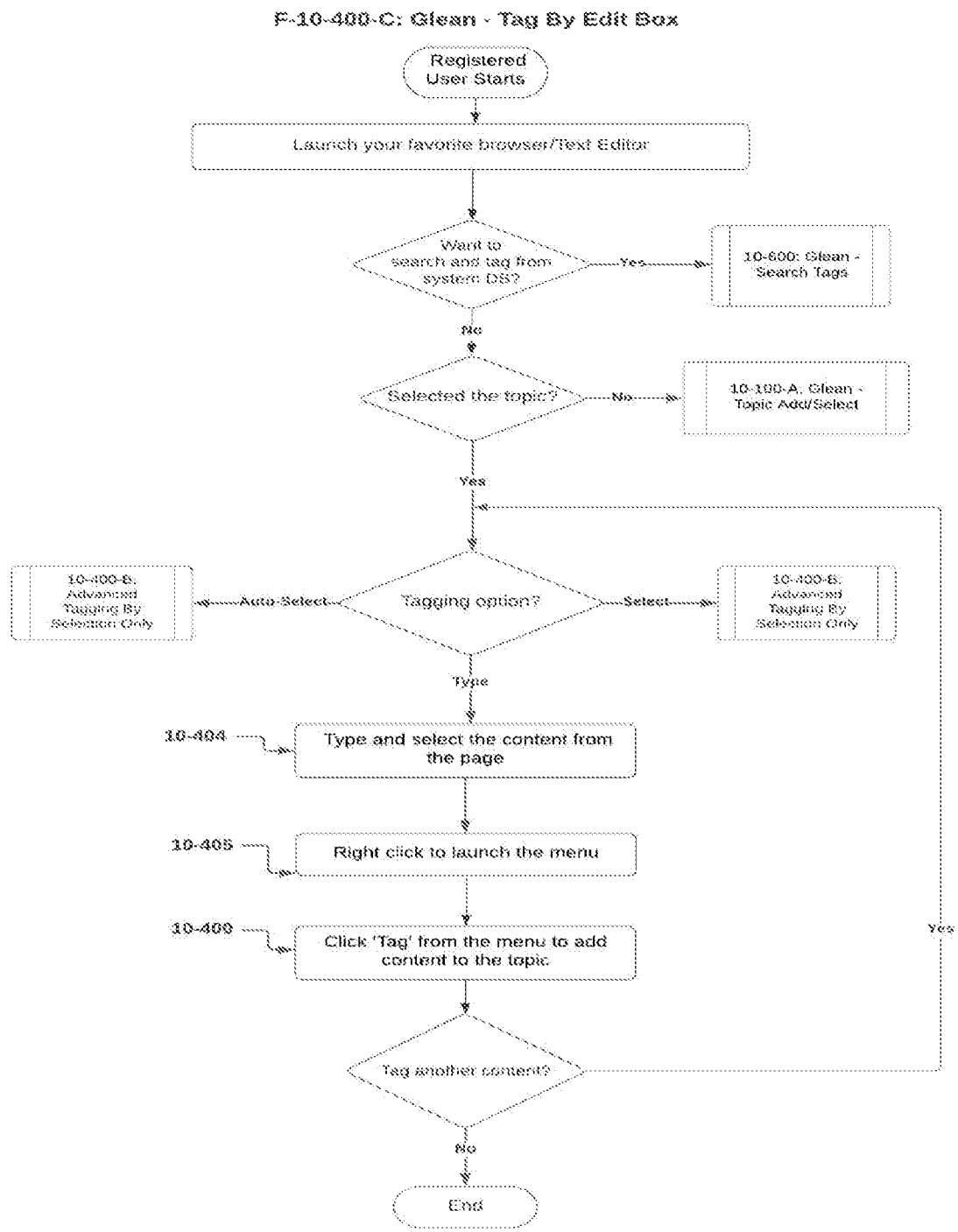
FIG. 29 illustrates flow diagram F-10-400-C: Glean—Tag By Edit Box.

FIG. 29 illustrates flow diagram F-10-400-C of FIG. 12 with screen diagram S-10-400-C.

Figure 13:
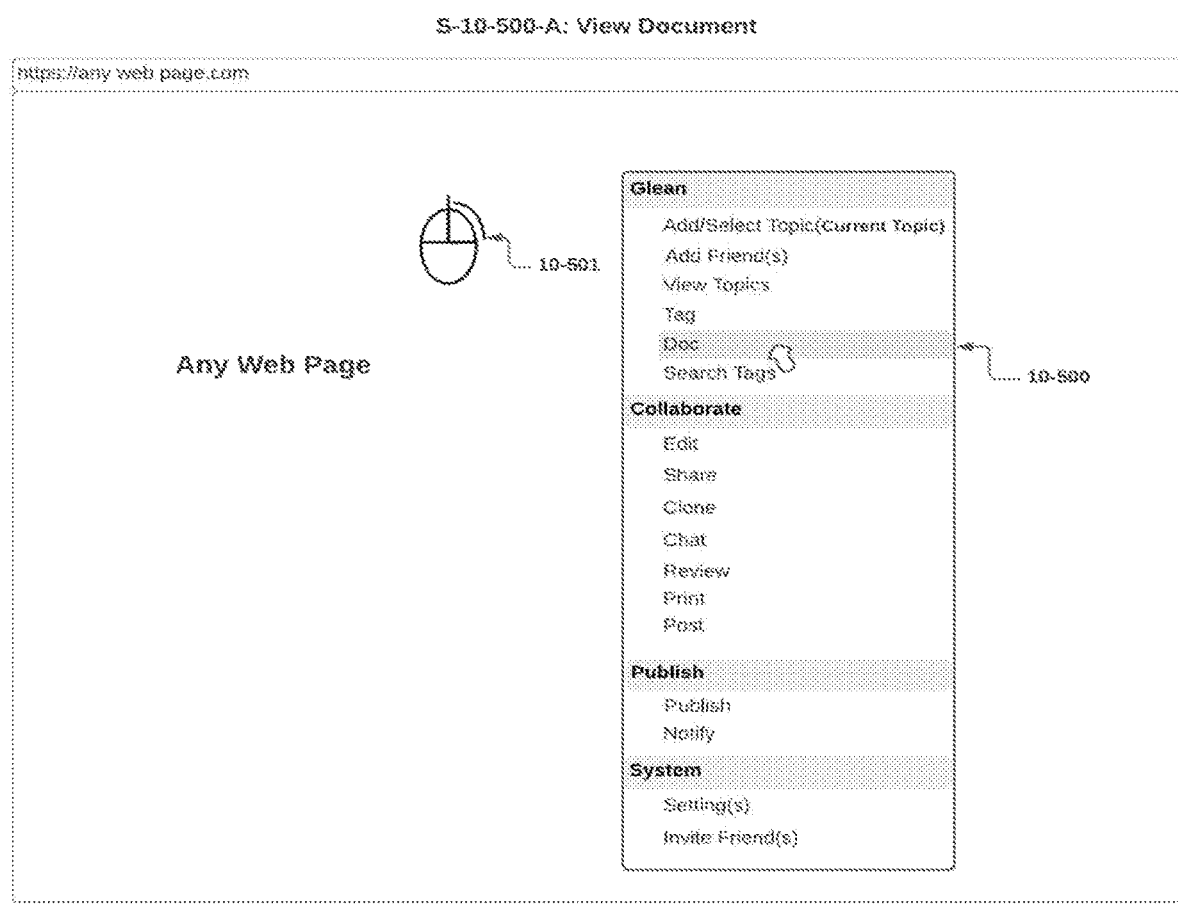
FIG. 13 illustrates screen diagram S-10-500-A: View Document.

FIG. 13 with screen diagram S-10-500-A is an illustrative screen display of the method for viewing a document of the selected topic. A topic must be selected as a pre-requisite to view a document. From any web page or any other document (example: WORD, EXCEL, PDF, etc.), the user can right click the mouse 10-501 to view list of menu options FIG. 3 with main menu diagram S-00 for further action. User selects the menu "Doe" 10-500. The document page is displayed for further actions FIG. 14 with screen diagram S-10-500-B.

Figure 30:
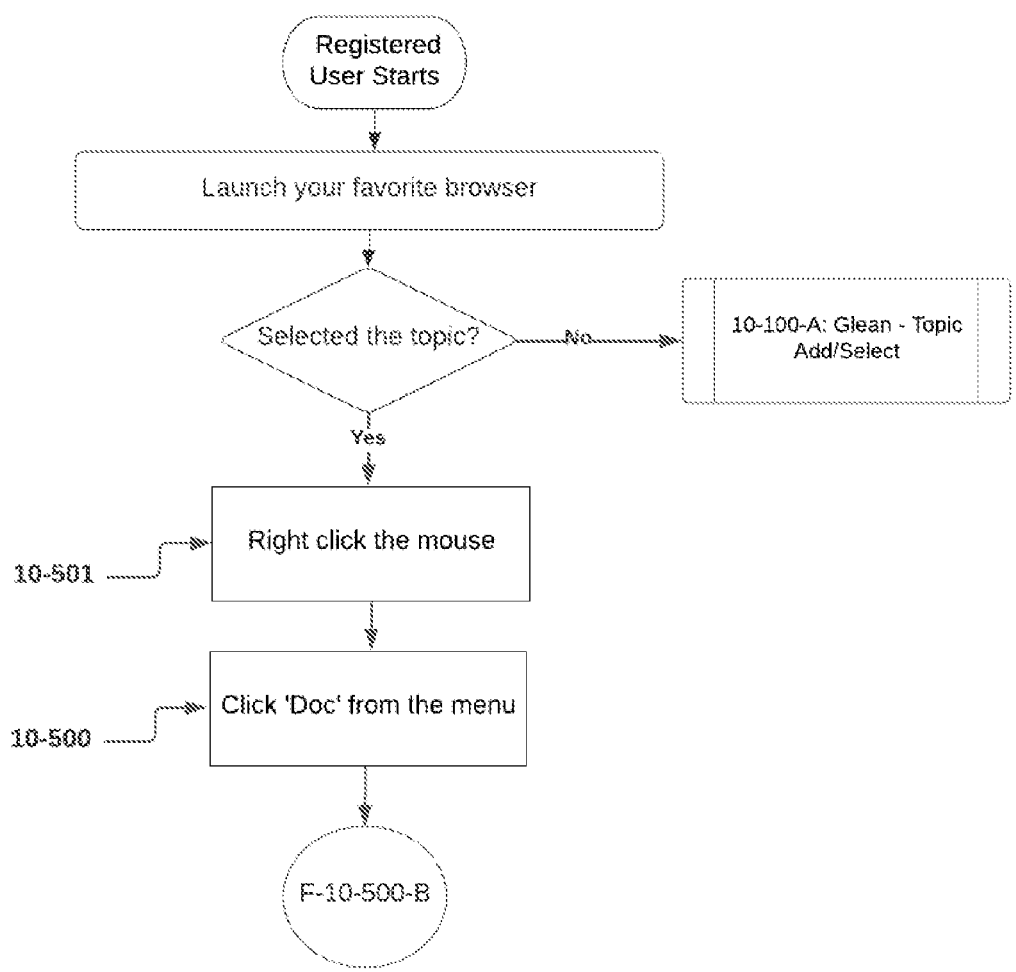
FIG. 30 illustrates flow diagram F-10-500-A: Glean—Doc.

FIG. 30 illustrates flow diagram F-10-500-A of FIG. 13 with screen diagram S-10-500-A.

Figure 14:
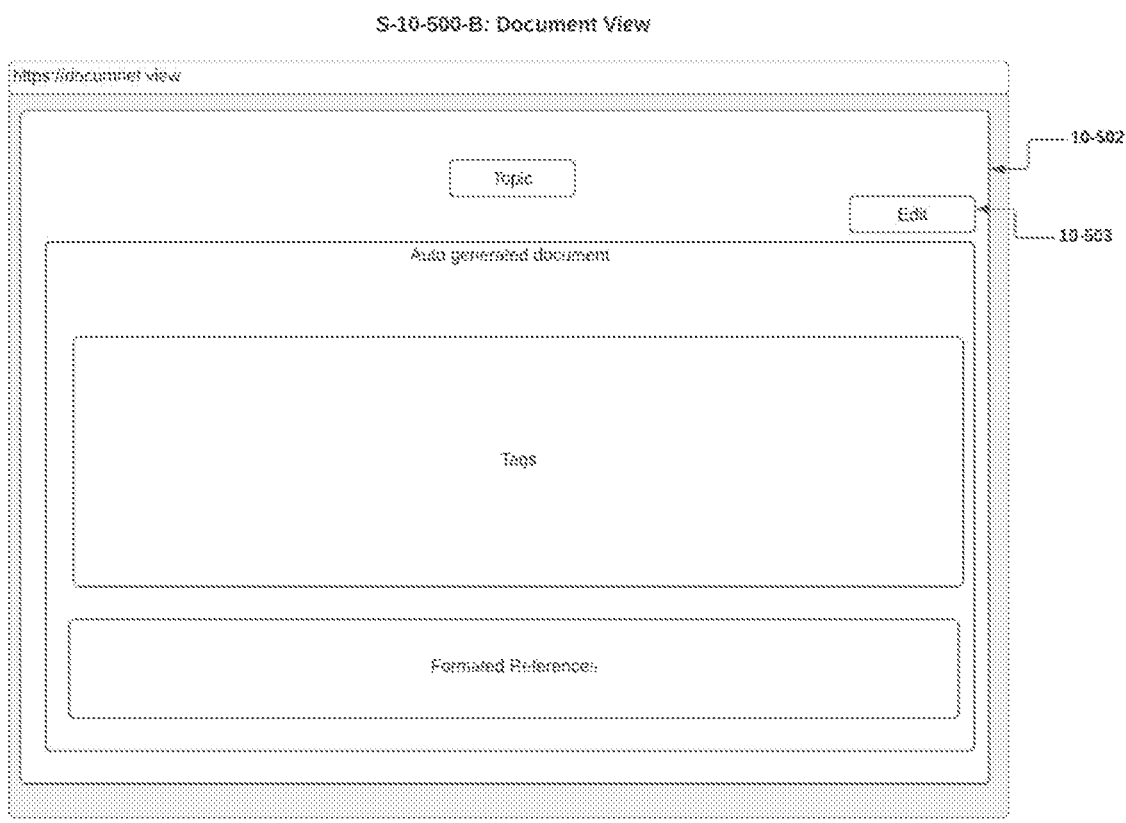
FIG. 14 illustrates screen diagram S-10-500-B: Document View.

FIG. 14 with screen diagram S-10-500-B is an illustrative screen display of viewing the document 10-502. User can perform the preferred action (example: Edit the document, review the document, etc.) 10-503.

Figure 31:
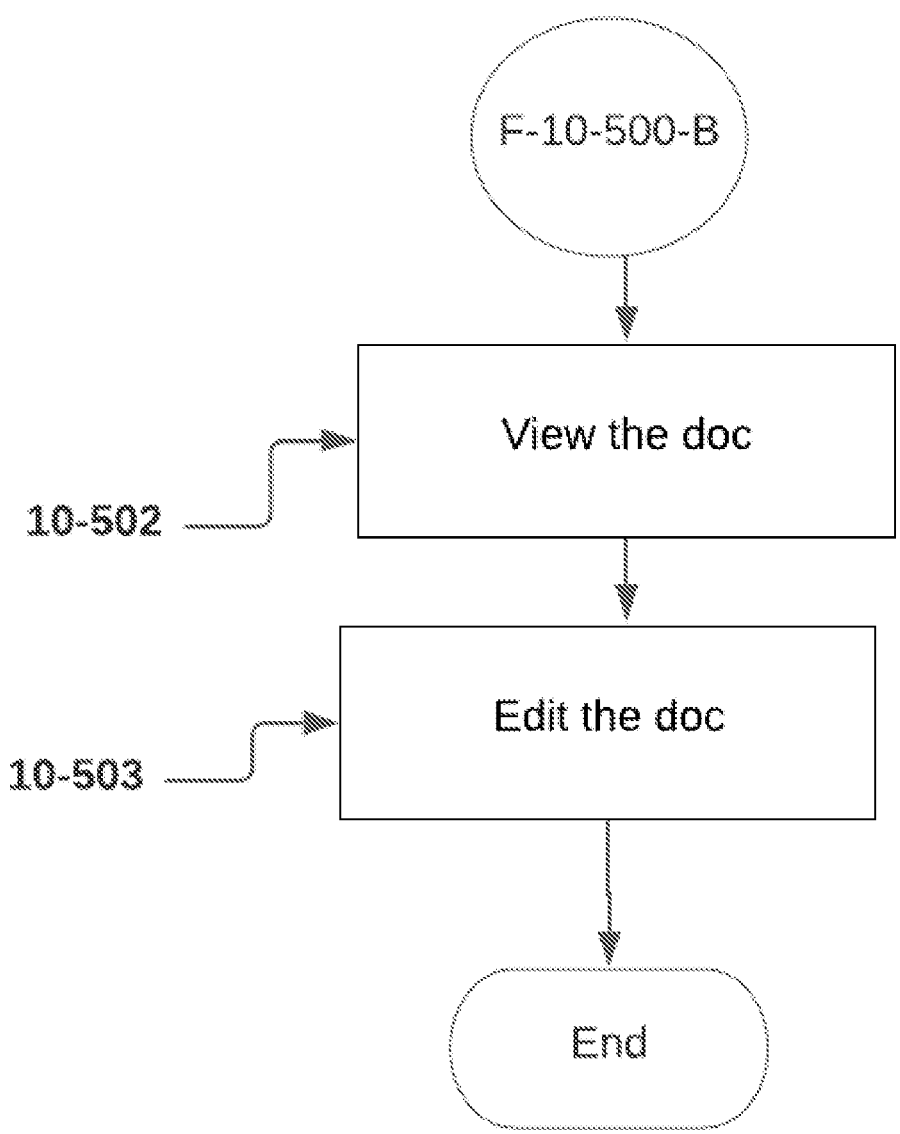
FIG. 31 illustrates flow diagram F-10-500-B: Document View.

FIG. 31 illustrates flow diagram F-10-500-B of FIG. 14 with screen diagram S-10-500-B.

Figure 15:
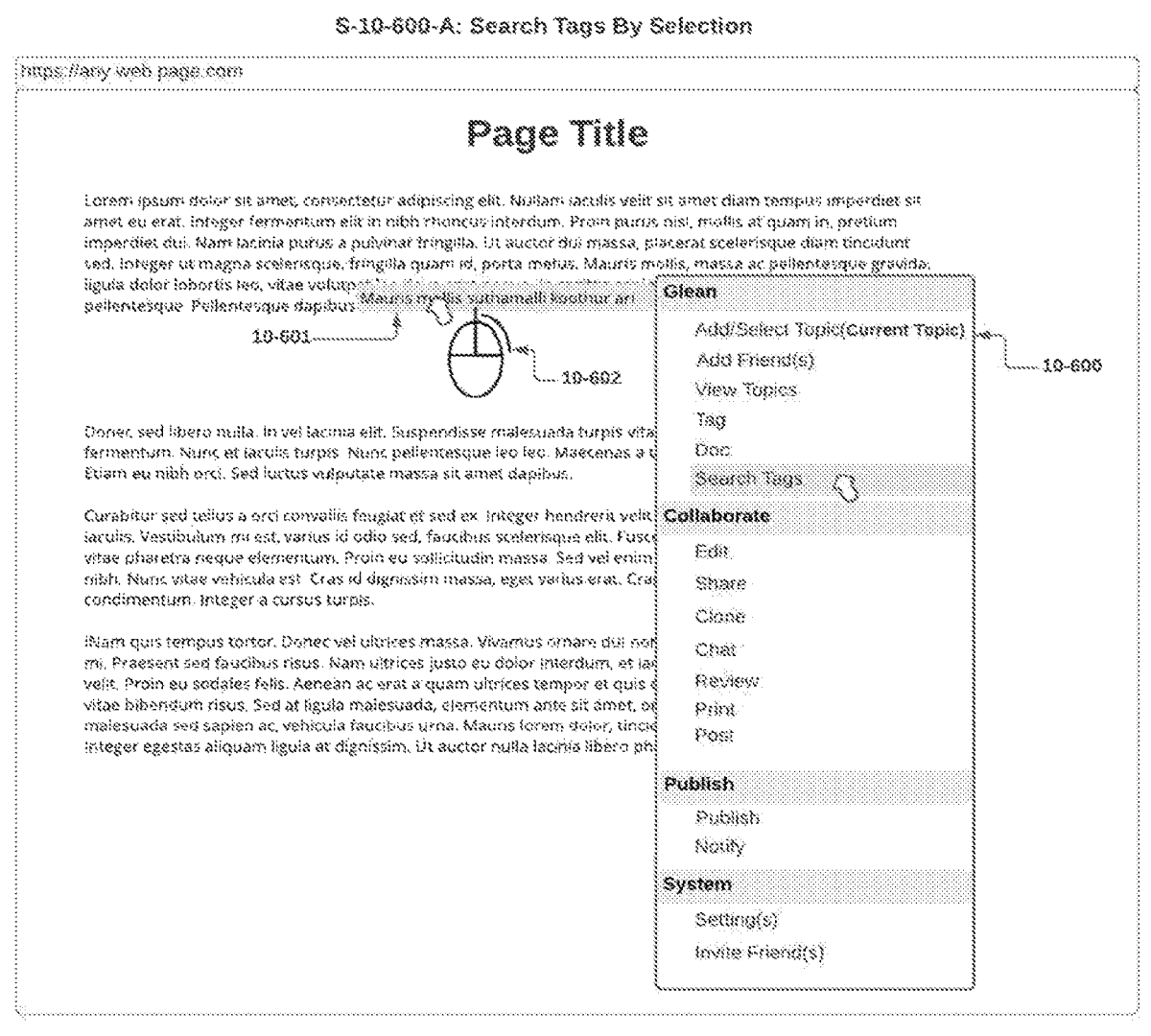

FIG. 15 with screen diagram S-10-600-A is an illustrative screen display of the method for searching a tagged content to verify the content is tagged under the selected or any other topics. The user can identify and select text/content from web page or any other document (example: WORD, EXCEL, PDF, etc.) 10-601 and right click the mouse 10-602 to view list of menu options FIG. 3 with main menu diagram S-00 for further action. User selects the menu "Search Tags" 10-600. The system will navigate to the search result page FIG. 16 with screen diagram S-10-600-B for user further action.

Figure 32:
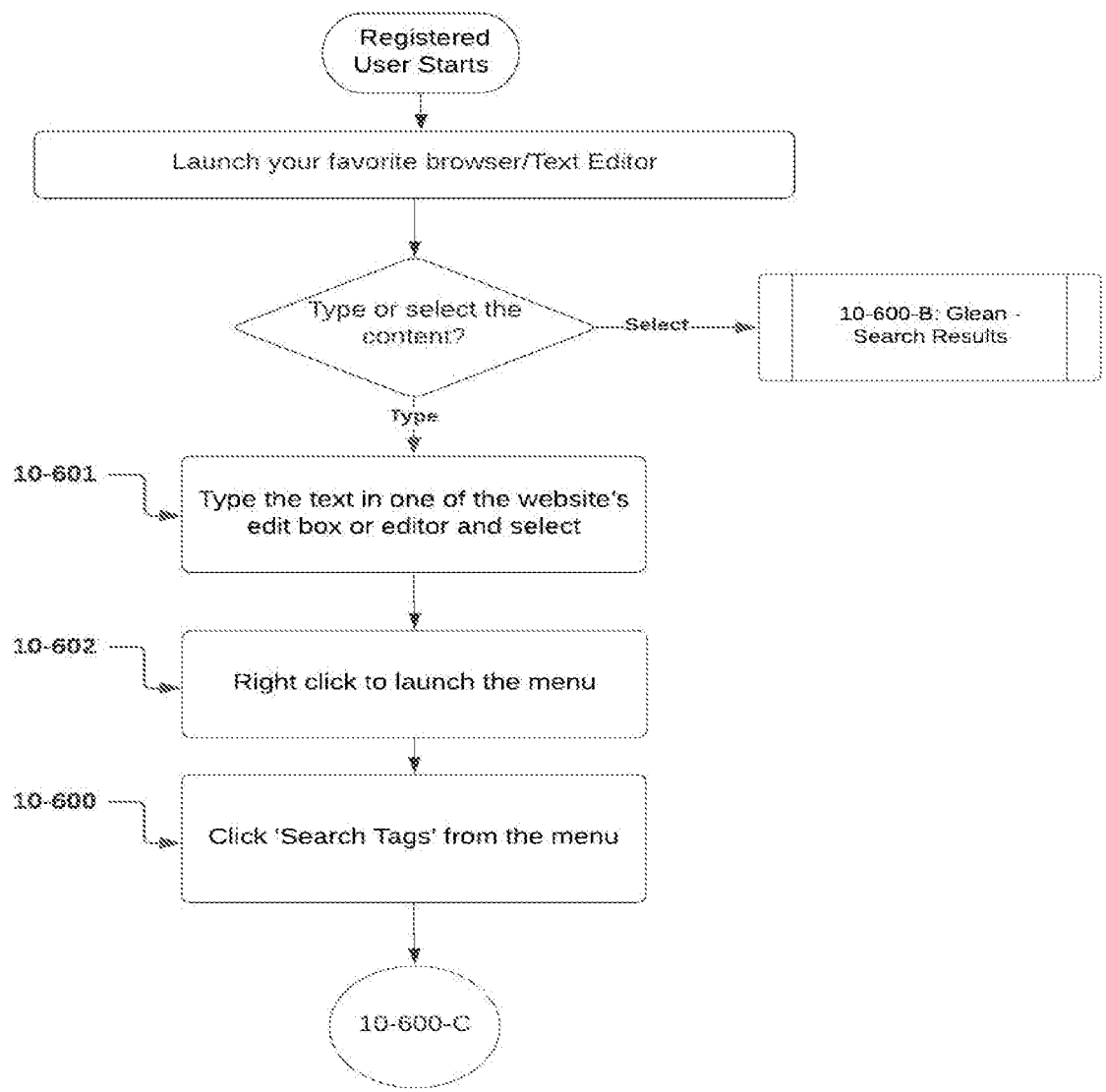
FIG. 32 illustrates flow diagram F-10-600-A: Glean—Search Tags.

FIG. 32 illustrates flow diagram F-10-600-A of FIG. 15 with screen diagram S-10-600-A.

Figure 16:
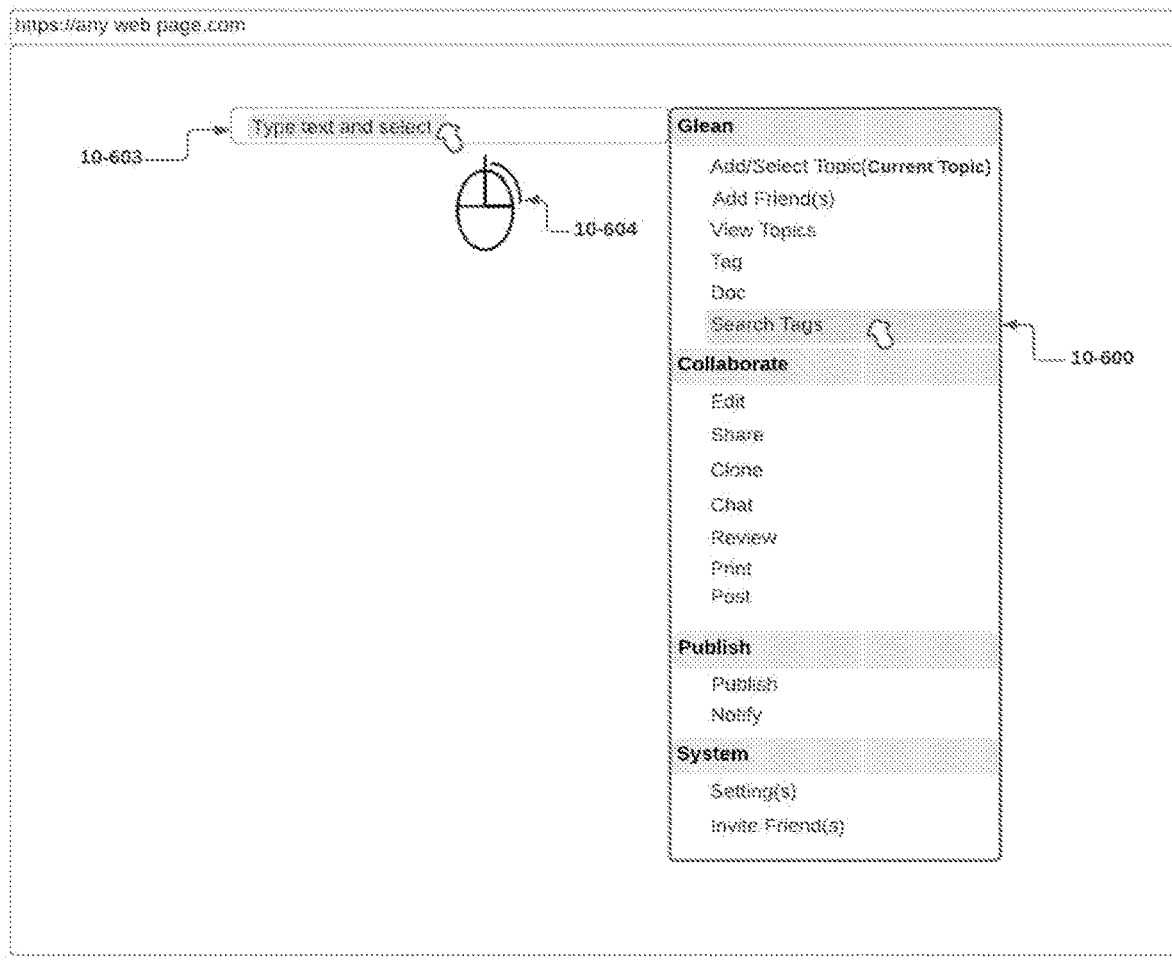
FIG. 16 illustrates screen diagram S-10-600-B: Search Tags By Edit Box.

FIG. 16 with screen diagram S-10-600-B is an illustrative screen display of the method for searching a tag to verify a content is tagged under the selected topic. The user can type the text/content in any of the textbox/text-editor from web page or any other document (example: WORD, EXCEL, PDF, etc.) 10-603 and right click the mouse 10-604 to view list of menu options FIG. 3 with main menu diagram S-00 for further action. User selects the menu "Search Tags" 10-600. The system will navigate to the search result page FIG. 17 with screen diagram S-10-600-C for user further action.

Figure 33:
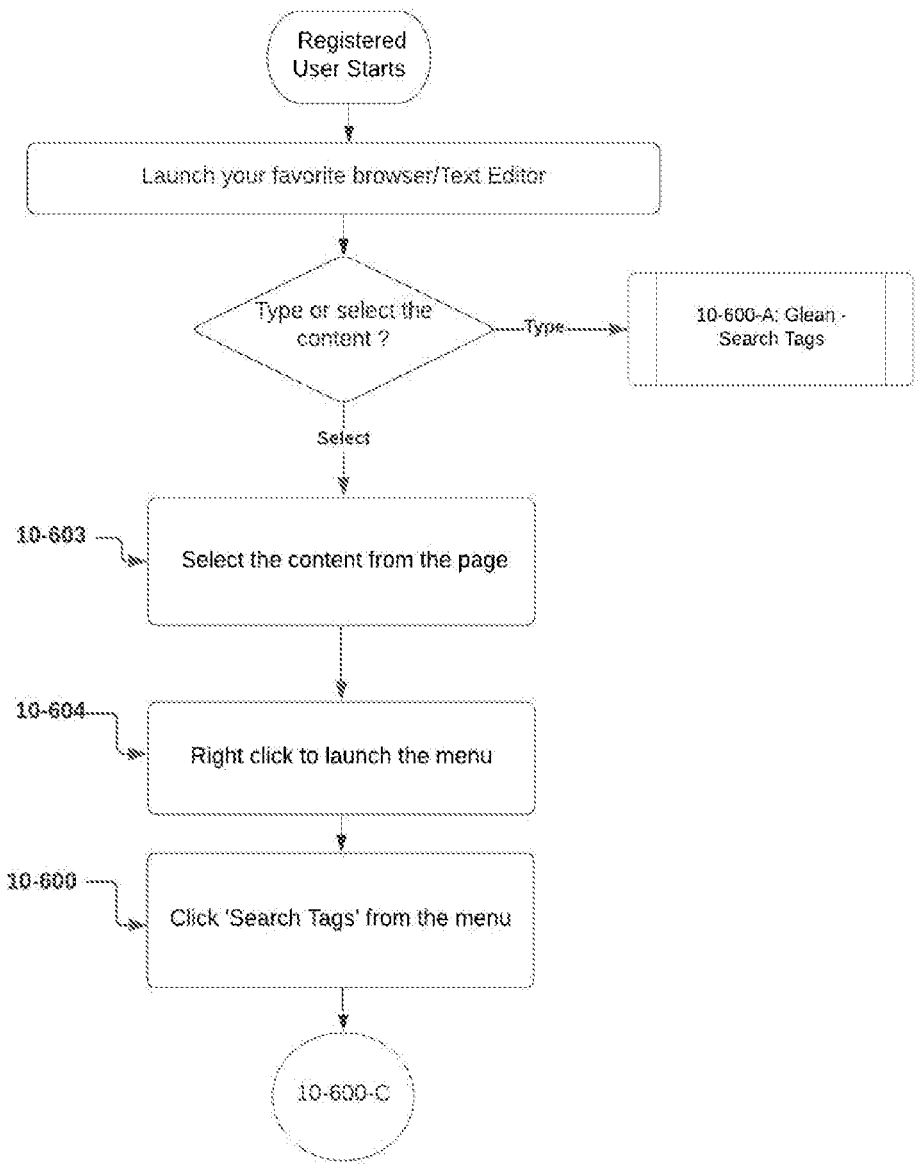
FIG. 33 illustrates flow diagram F-10-600-B: Glean—Search Tags.

FIG. 33 illustrates flow diagram F-10-600-B of FIG. 16 with screen diagram S-10-600-B.

Figure 17:
FIG. 17 illustrates screen diagram S-10-600-C: Tags Search View.

FIG. 17 with screen diagram S-10-600-C is an illustrative screen display of viewing search result for tags. Lit of search result is shown 10-605 and the user can perform preferred action.

Figure 34:
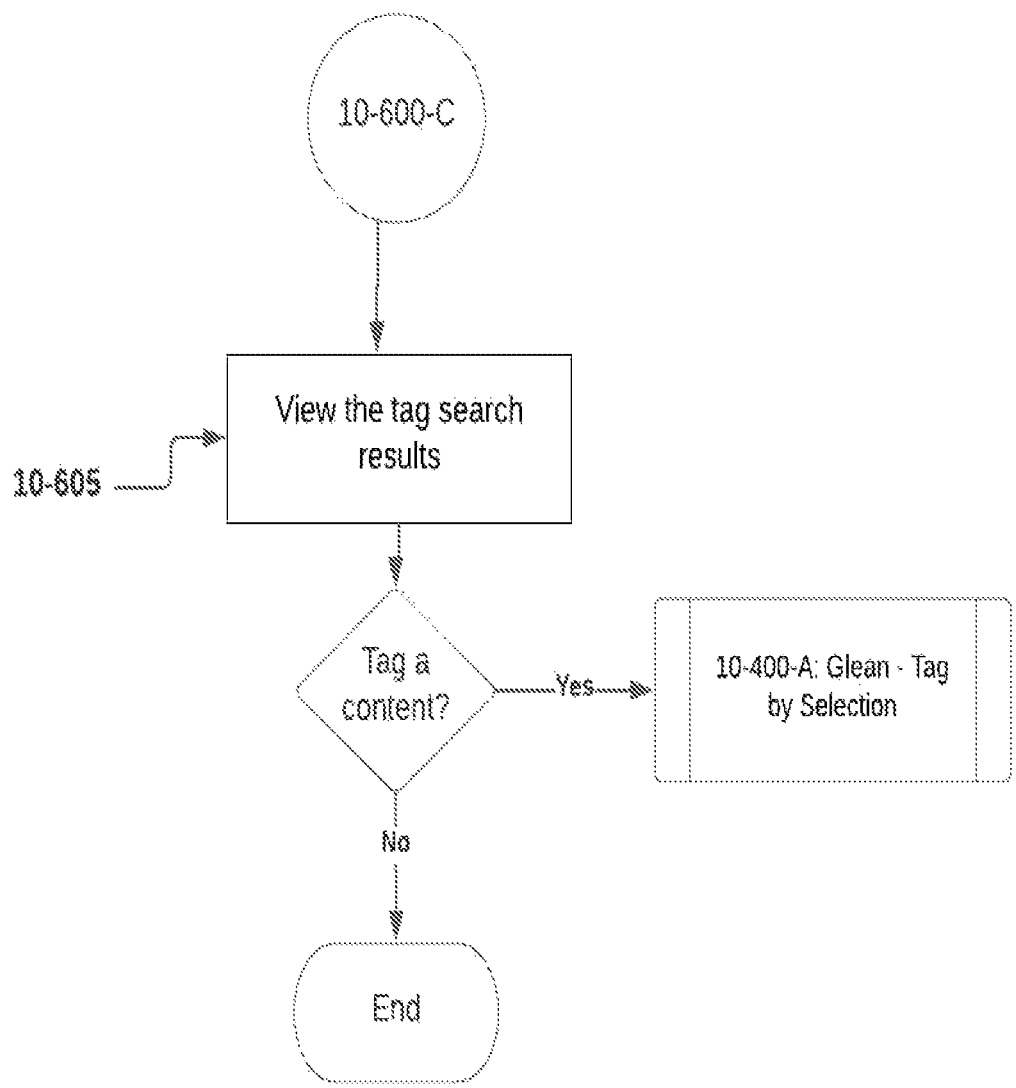
FIG. 34 illustrates flow diagram F-10-600-C: Glean—Search Tag Results.

FIG. 34 illustrates flow diagram F-10-600-C of FIG. 17 with screen diagram S-10-600-C.

Figure 18:
FIG. 18 illustrates screen diagram S-10-700: —Tags Via IM.

FIG. 18 with screen diagram S-10-700 is an illustrative screen display of the method for tagging a content from IM/Chat under the selected topic. The user can create a topic 10-701 or select an existing topic 10-703. The user can type the text/content in the message box 10-704 and click the Send button 10-705 to tag the content.

Figure 35:
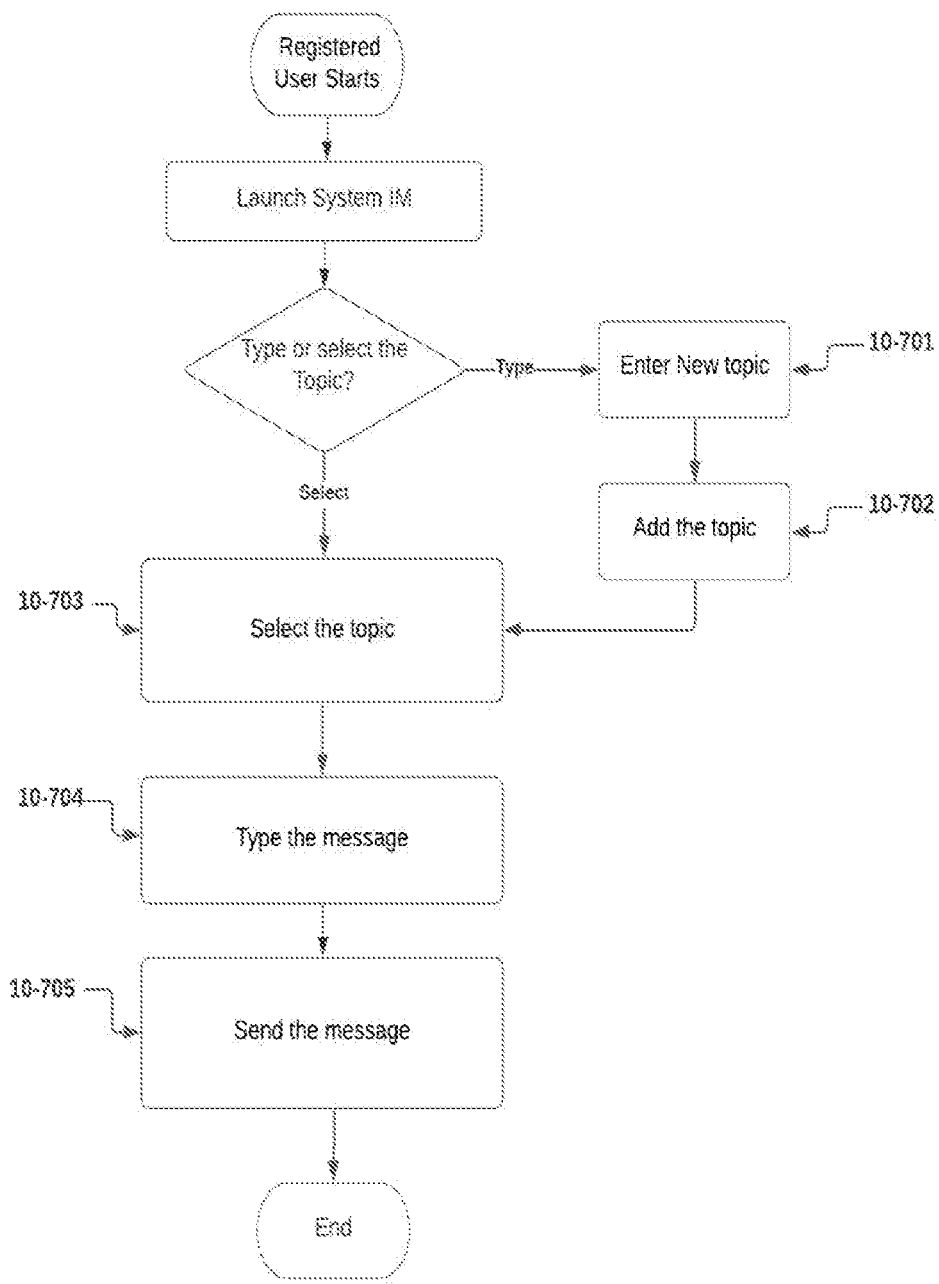
FIG. 35 illustrates flow diagram F-10-700: —Tags Via IM.

FIG. 35 illustrates flow diagram F-10-700 of FIG. 18 with screen diagram S-10-700.

Figure 19:
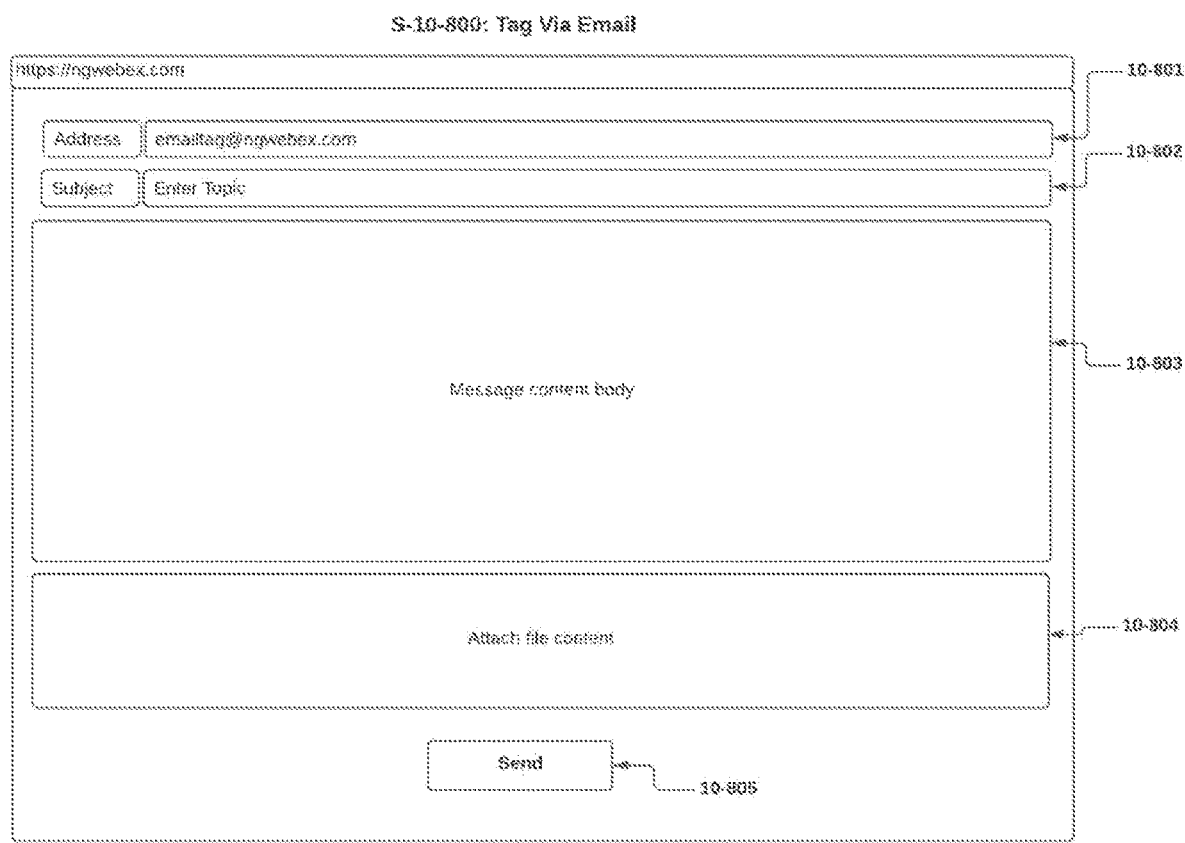
FIG. 19 illustrates screen diagram S-10-800: Tag Via Email.
Figure 36:
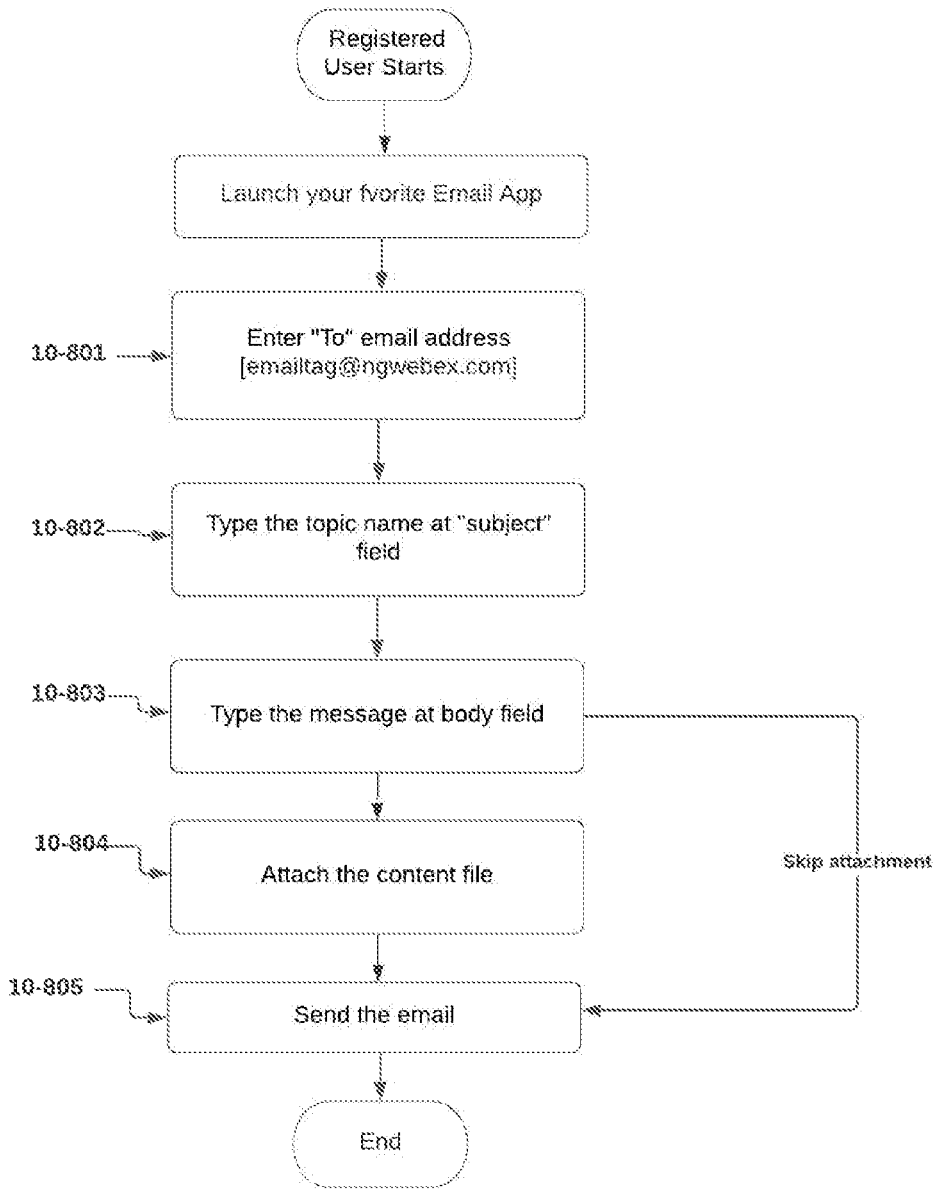
FIG. 36 illustrates flow diagram F-10-800: Tag Via Email.

FIG. 19 with screen diagram S-10-800 is an illustrative screen display of the method for tagging a content from registered email along with optional attachment(s). The user can use any email system to send the email for tagging purpose. The user types the email address 10-801, and the topic name in the subject 10-802 and the message in the email body 10803. Also optionally attach any file(s) 10-804 and send the email 10-805. The email and attachment will be tagged under the given topic FIG. 36 illustrates flow diagram F-10-800 of FIG. 19 with screen diagram S-10-800.

Figure 20:
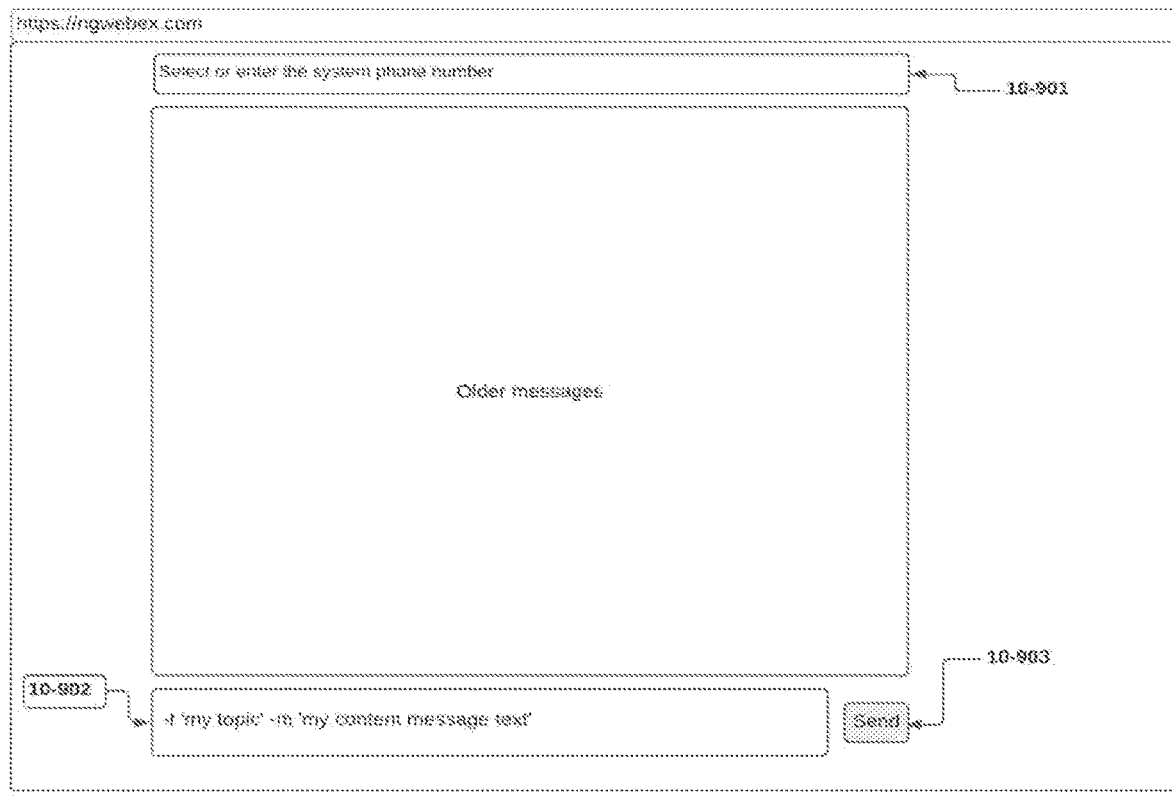
FIG. 20 illustrates screen diagram S-10-900: Tag Via Phone SMS Message.

FIG. 20 with screen diagram S-10-900 is an illustrative screen display of the method for tagging a content from registered SMS capable phone under the selected topic. The user selects the contact or type the phone number 10-901. The user types the text/content 10-902 and click Send button 10-903 to tag the text under the selected topic.

Figure 37:
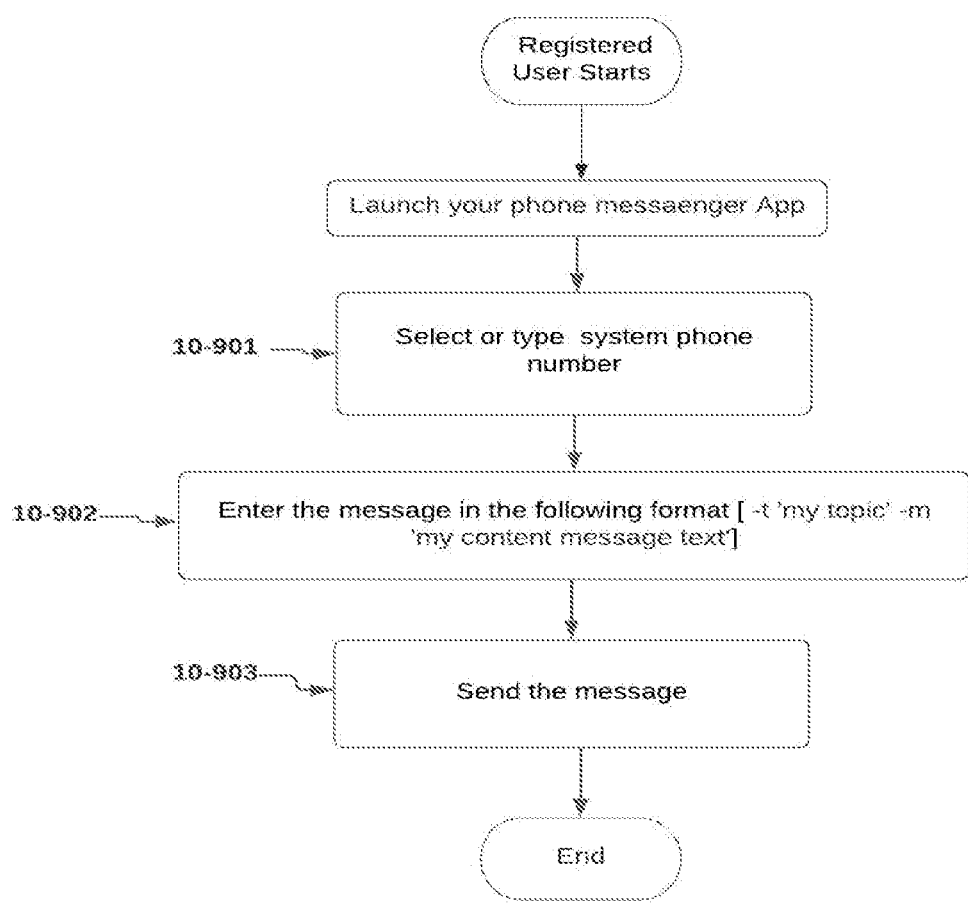
FIG. 37 illustrates flow diagram F-10-900: Tag Via Phone SMS Message.

FIG. 37 illustrates flow diagram F-10-900 of FIG. 20 with screen diagram S-10-900

Collaboration

Figure 63:
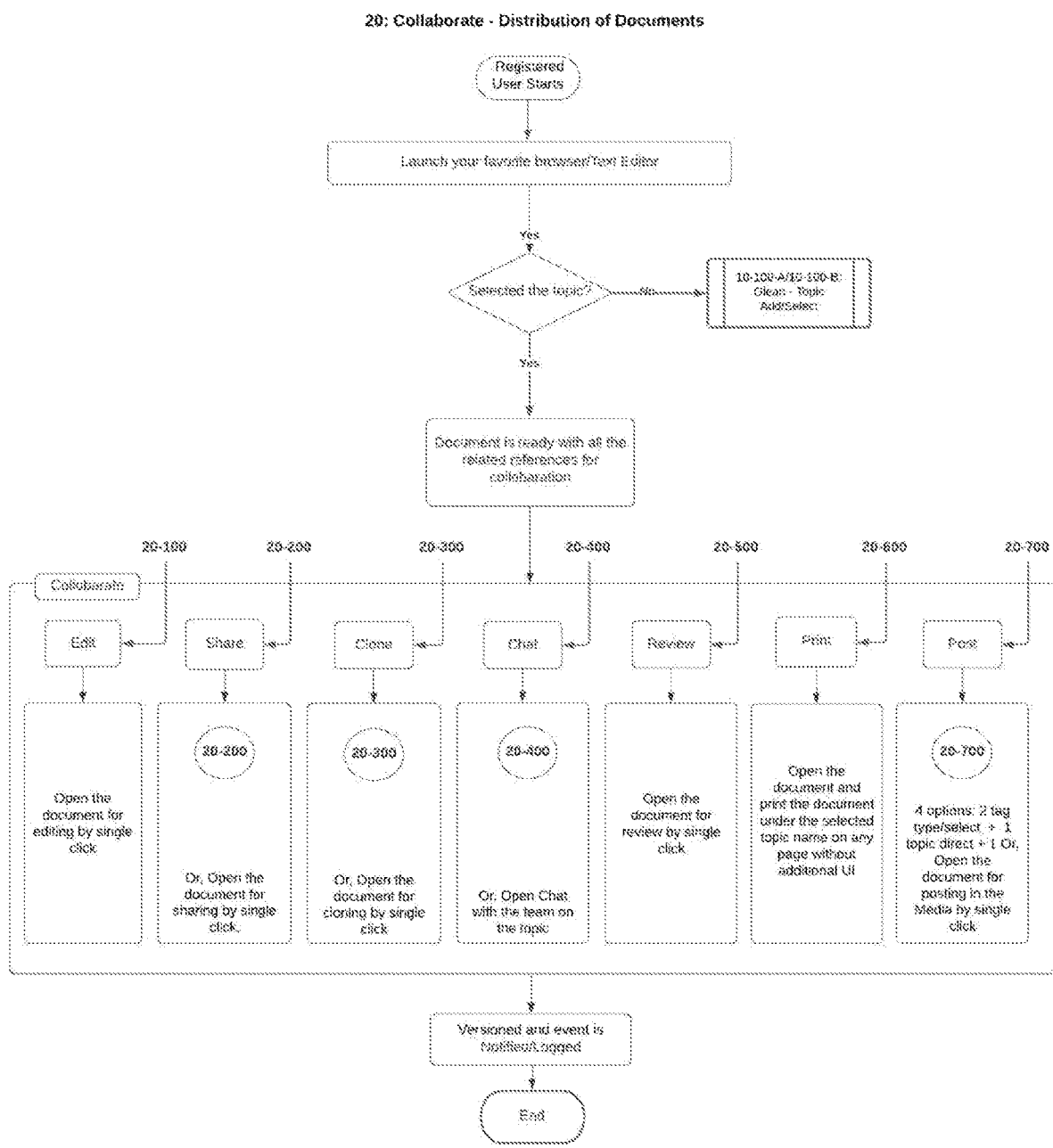
FIG. 63 illustrates screen diagram 20: Collaborate—Distribution of Documents.

FIG. 63 illustrates flow diagram 20 Collaborate—Distribution of Documents is an illustrative screen flow display of team collaboration on the gleaned document/topic.

Figure 38:
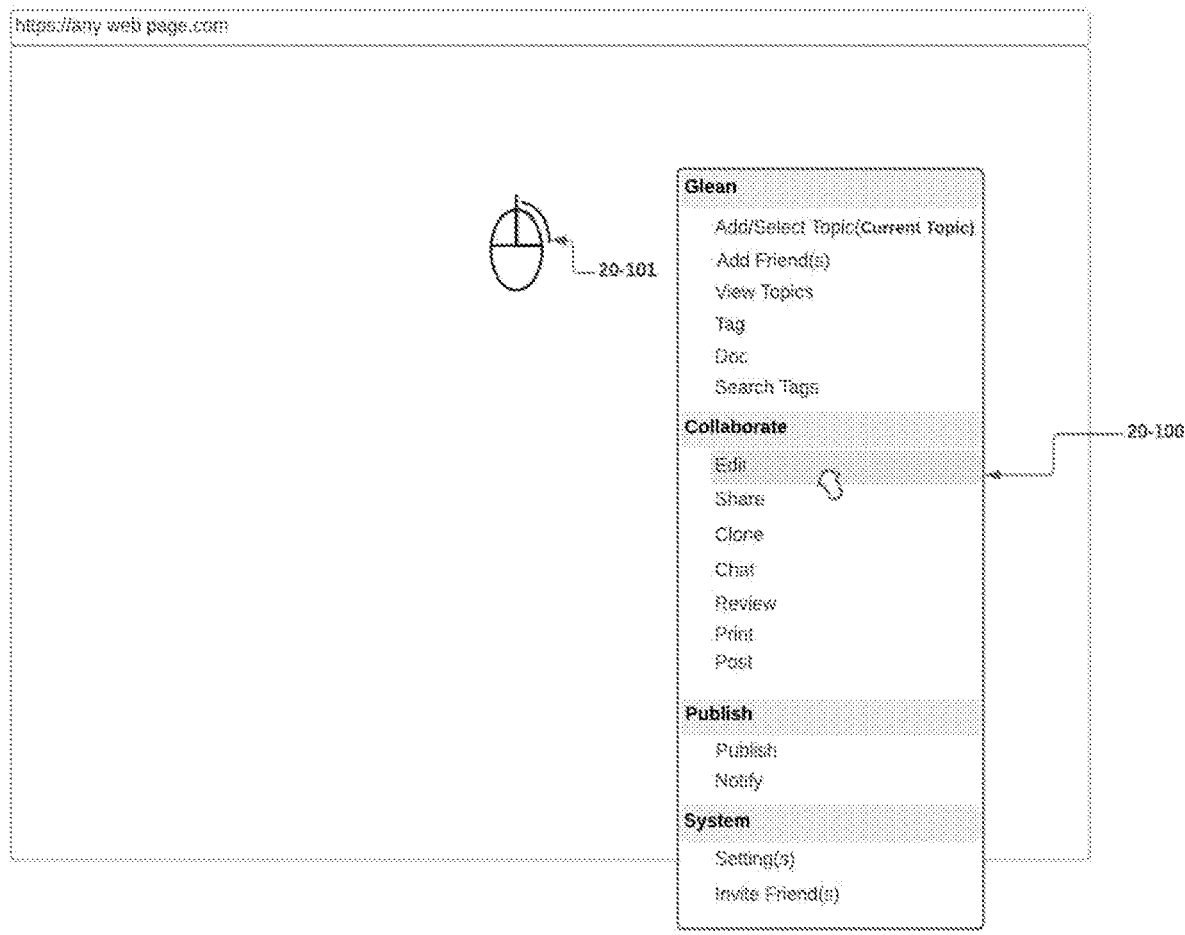
FIG. 38 illustrates screen diagram S-20-100-A: Collaborate—Edit.

FIG. 38 with screen diagram S-20-100-A is an illustrative screen display of editing a document for the selected topic. A topic must be selected as a pre-requisite to edit the document. From any web page or any other document (example: WORD, EXCEL, PDF, etc.), the user can right click the mouse 20-101 to view list of menu options FIG. 3 with main menu diagram S-00 for further action. User selects the menu "Edit" 20-100. The document page is displayed FIG. 39 with screen diagram S-20-100-B.

Figure 64:
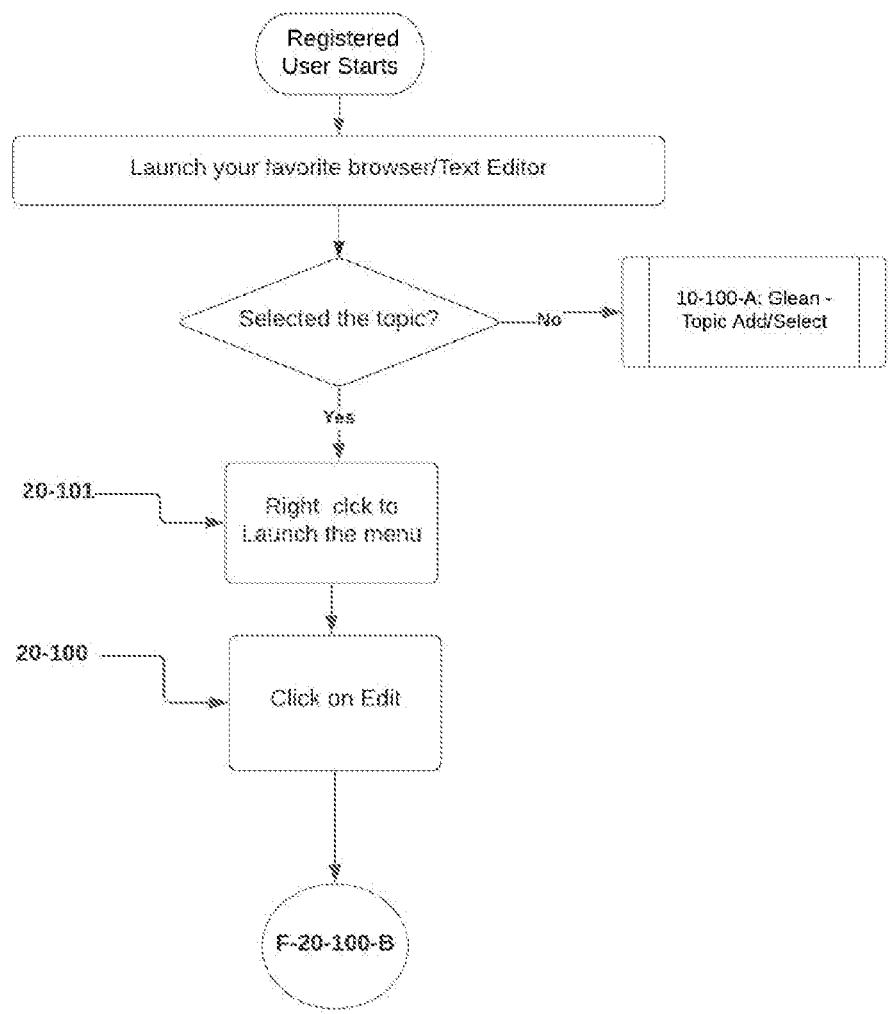
FIG. 64 illustrates flow diagram F-20-100-A: Collaborate—Edit.

FIG. 64 illustrates flow diagram F-20-100-A of FIG. 38 with screen diagram S-20-100-A.

Figure 39:
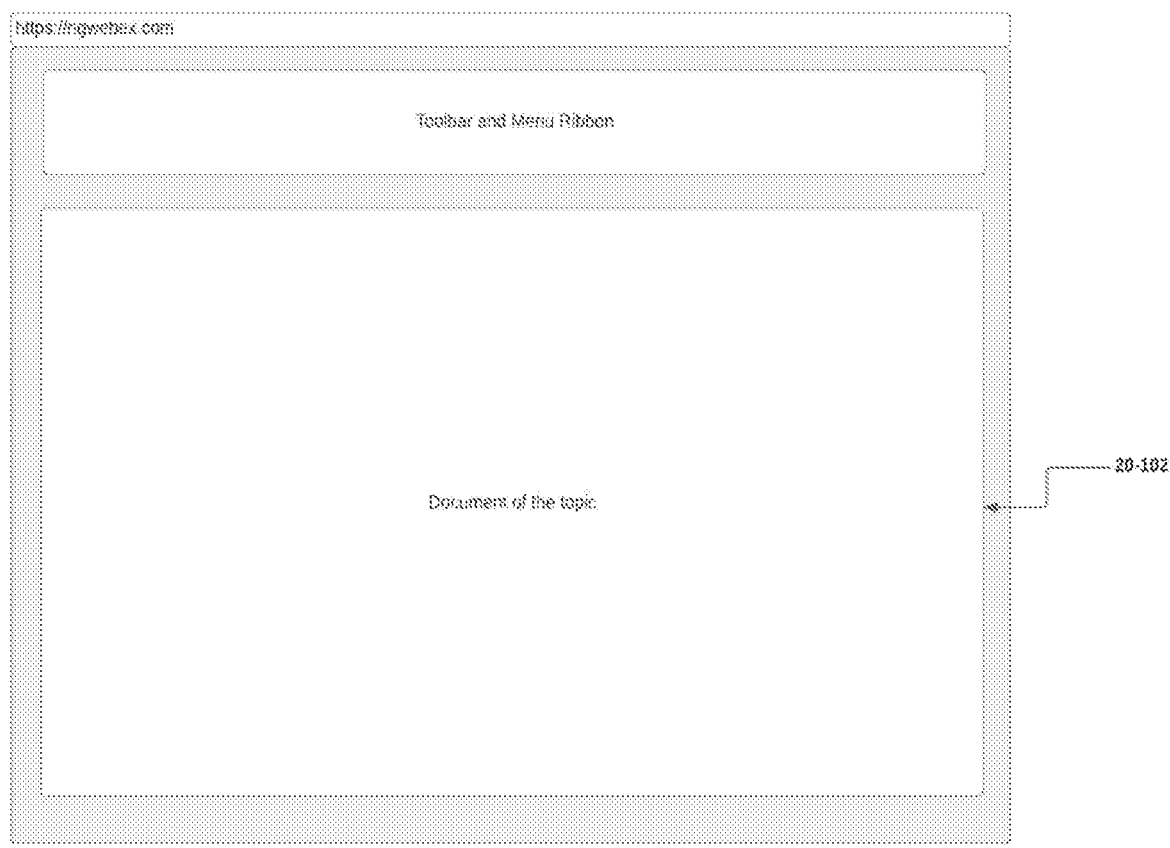
FIG. 39 illustrates screen diagram S-20-100-B: Collaborate—Edit Using web Page.

FIG. 39 with screen diagram S-20-100-B is an illustrative screen display of viewing the document for the selected topic. User can view and edit document 20-102.

Figure 65:
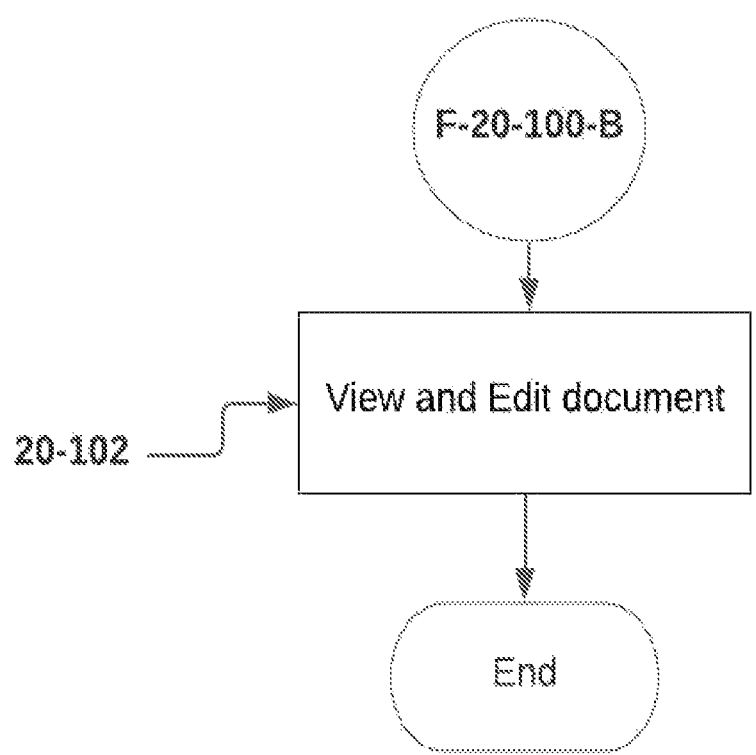
FIG. 65 illustrates flow diagram F-20-100-B: Collaborate—Edit Using web Page.

FIG. 65 illustrates flow diagram F-20-100-B of FIG. 39 with screen diagram S-20-100-B.

Figure 40:
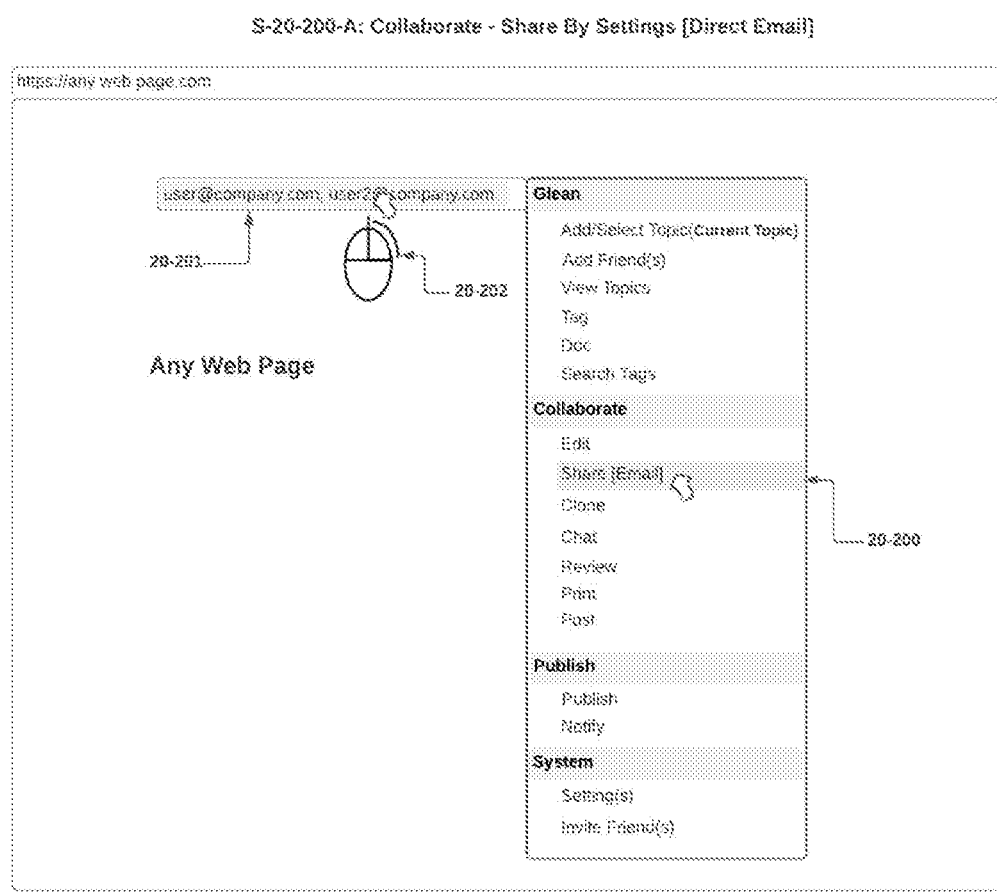
FIG. 40 illustrates screen diagram S-20-200-A: Collaborate—Share By Settings [Direct Email].

FIG. 40 with screen diagram S-20-200-A is an illustrative screen display of sharing the document with the team member(s) based on personalized setting. A topic must be selected as a pre-requisite to share the document. The user can type the email address(es) and select (in a pre-defined format) in any of the available edit box/text editor from web page or any other document (example: WORD, EXCEL, PDF, etc.) 20-201 and right click the mouse 20-202 to view list of menu options FIG. 3 with main menu diagram S-00 for further action. User selects the menu "Share" 20-200. The system send notification accordingly (refer to the system process at FIG. [F-40-200-A]).

Figure 66:
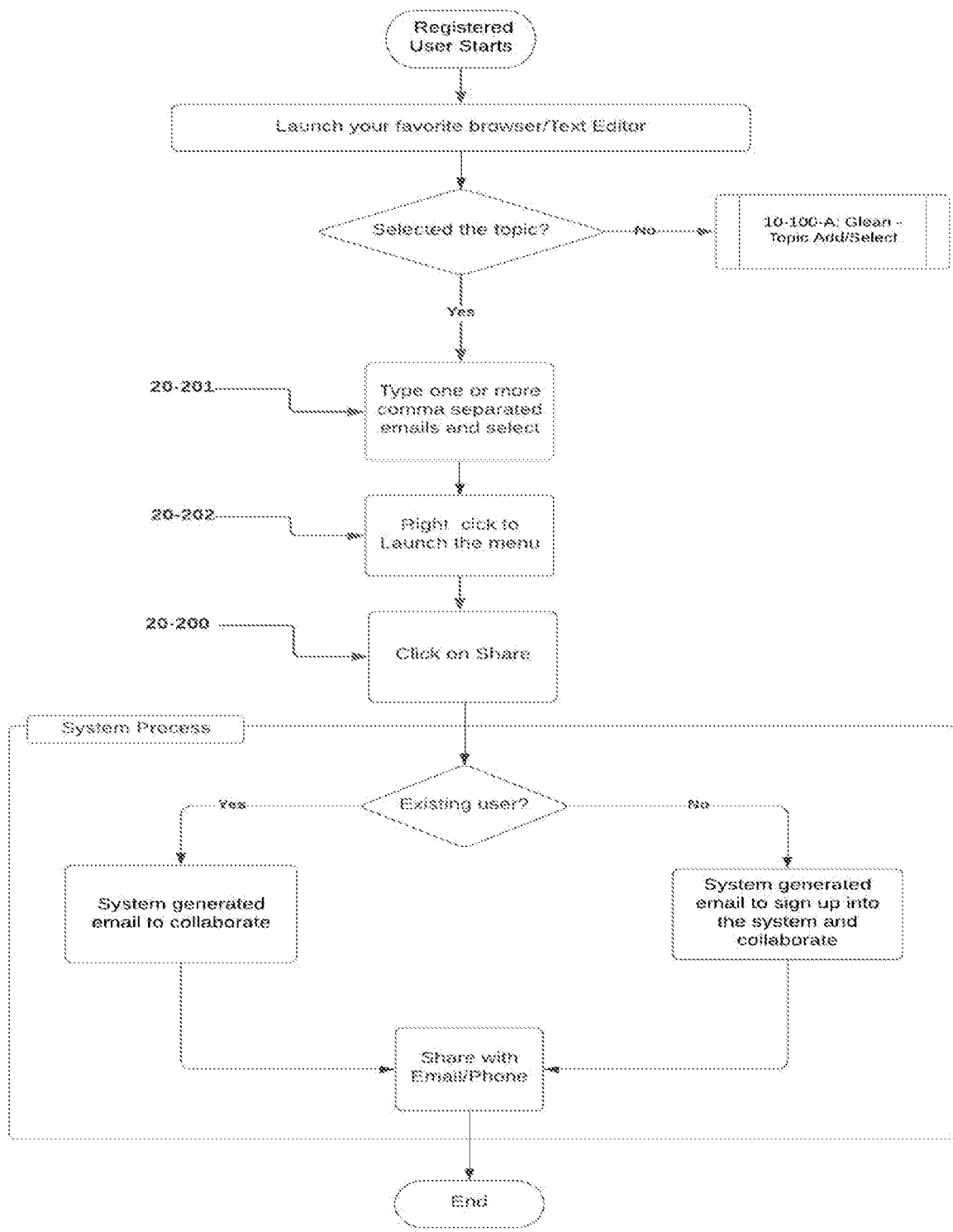
FIG. 66 illustrates flow diagram F-20-200-A: Collaborate—Share By Settings [Direct Email].

FIG. 66 illustrates flow diagram F-20-200-A of FIG. 40 with screen diagram S-20-200-A.

Figure 41:
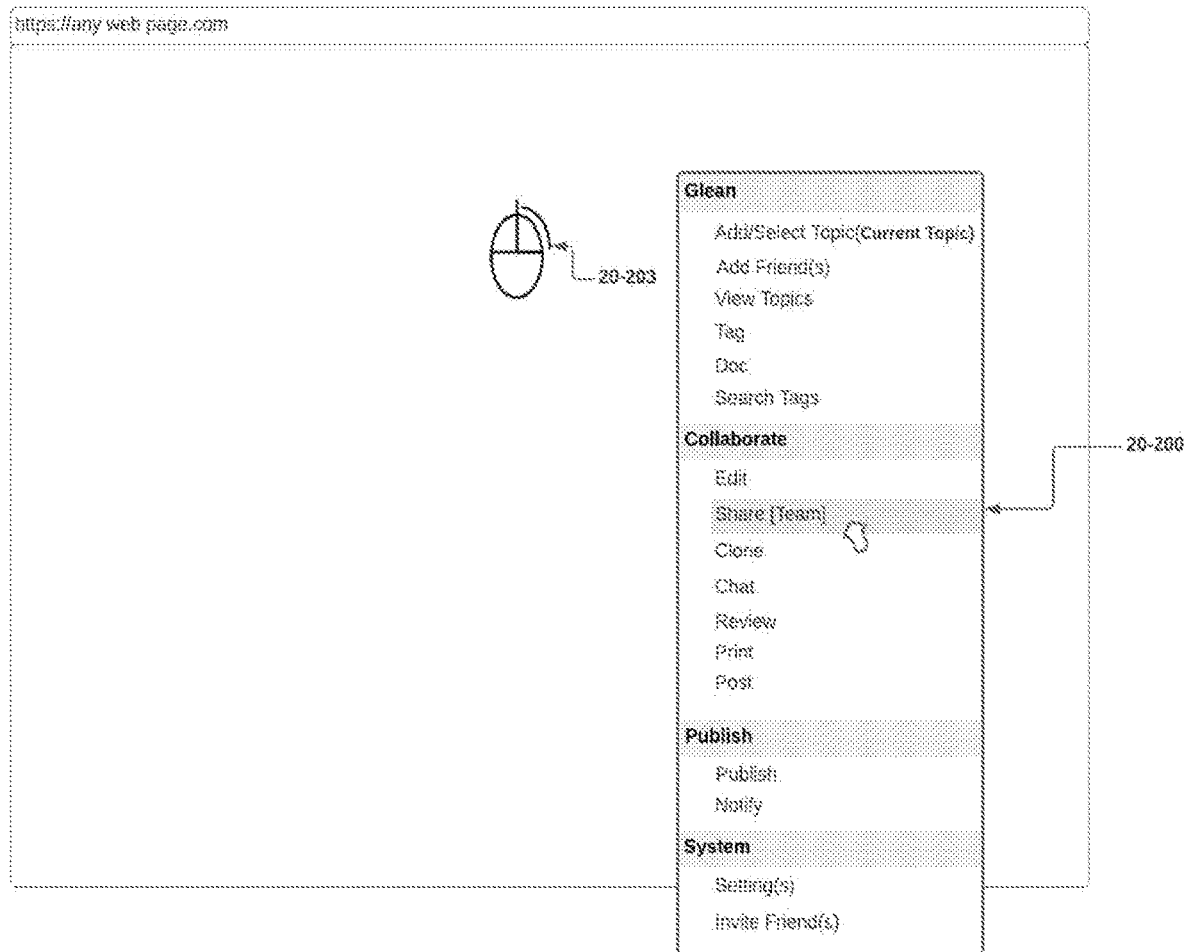
FIG. 41 illustrates screen diagram S-20-200-B: Collaborate—Share by Settings [Directly To Team].

FIG. 41 with screen diagram S-20-200-B is an illustrative screen display of sharing the document with team members based on personalized settings. A topic must be selected as a pre-requisite to share the document with team. From any web page or any other document (example: WORD, EXCEL, PDF, etc.), the user can right click the mouse 20-203 to view list of menu options FIG. 3 with main menu diagram S-00 for further action. User selects the menu "Share" 20-200. The notification is sent to the team members.

Figure 67:
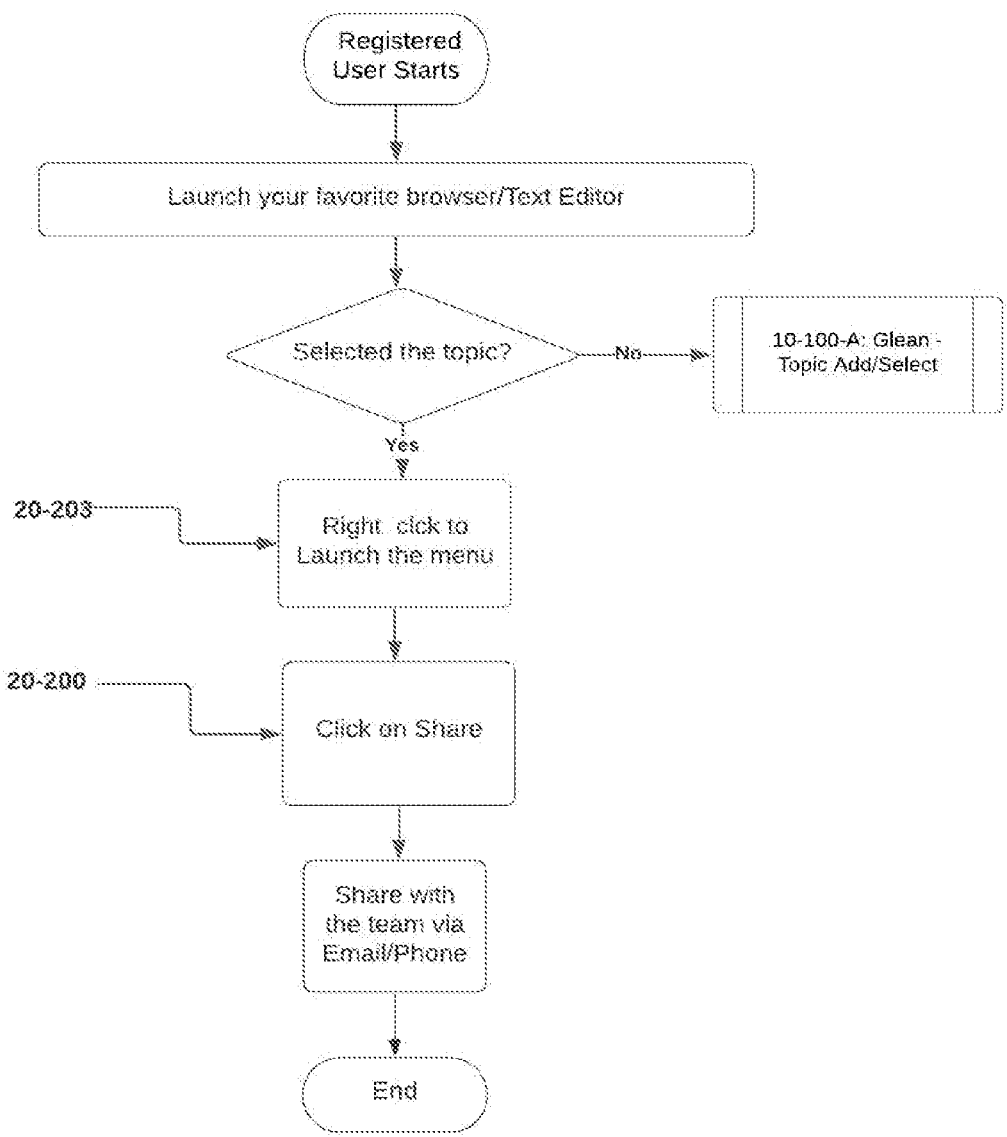
FIG. 67 illustrates flow diagram F-20-200-B: Collaborate—Share by Settings [Directly To Team].

FIG. 67 illustrates flow diagram F-20-200-B of FIG. 41 with screen diagram S-20-200-B.

Figure 42:
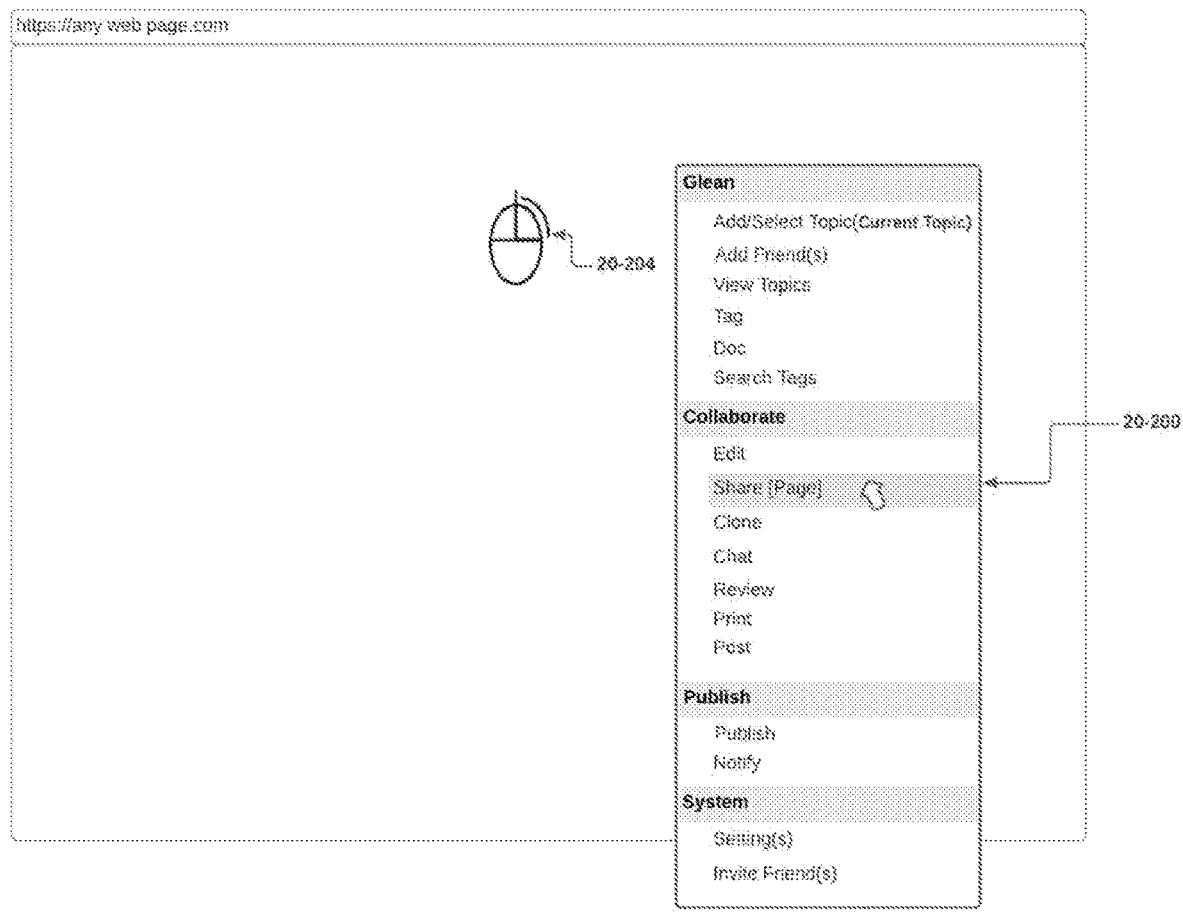
FIG. 42 illustrates screen diagram S-20-200-C: Collaborate—Share by Settings [Page].

FIG. 42 with screen diagram S-20-200-C is an illustrative screen display of sharing the team member based on personalized setting. A topic must be selected as a pre-requisite to share the document with team. From any web page or any other document (example: WORD, EXCEL, PDF, etc.), the user can right click the mouse 20-204 to view list of menu options FIG. 3 with main menu diagram S-00 for further action. User selects the menu "Share" 20-200. The system sharing page is displayed FIG. 43 with screen diagram S-20-200-D to share the document with further actions.

Figure 68:
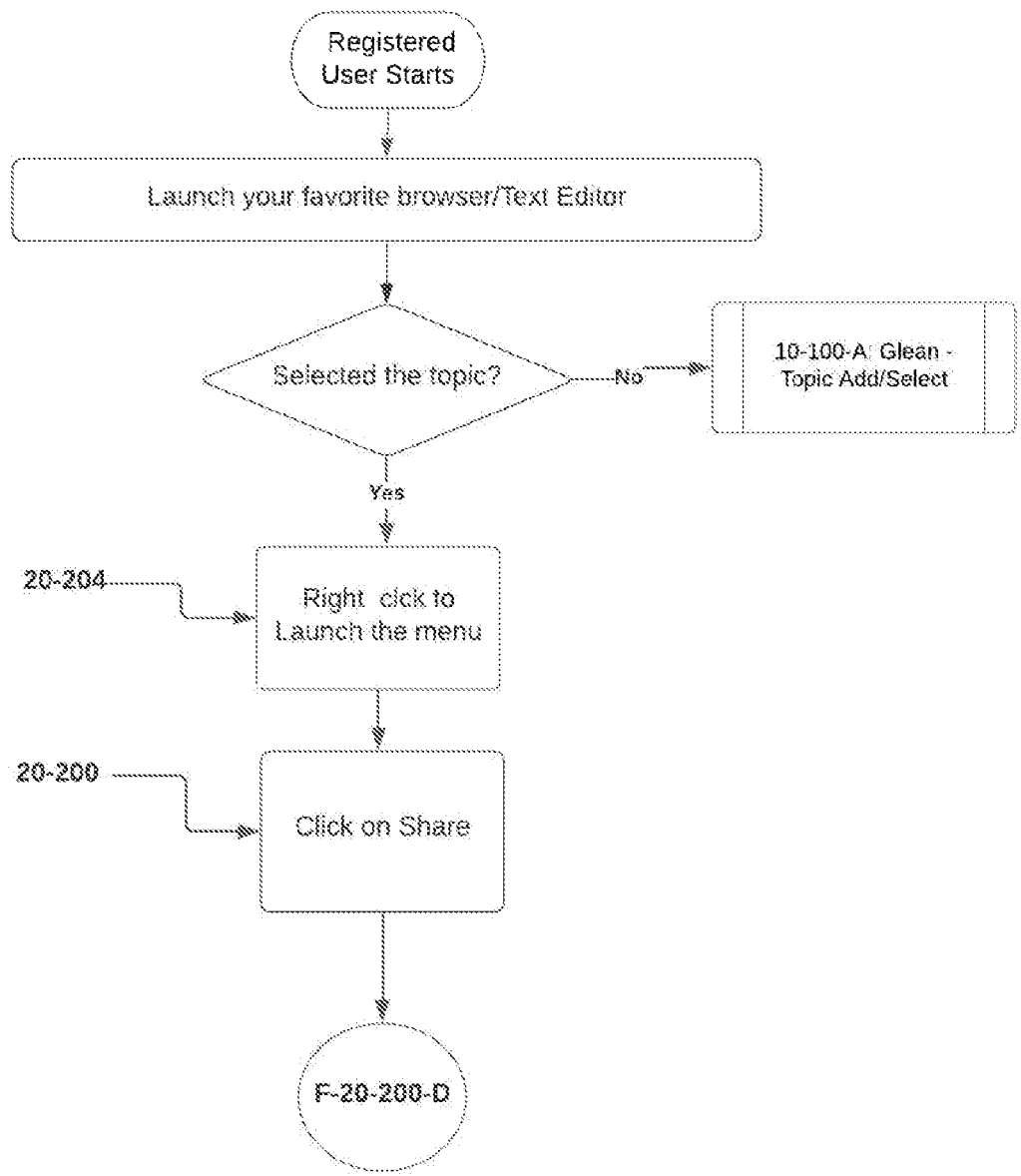
FIG. 68 illustrates flow diagram F-20-200-C: Collaborate—Share by Settings [Page].

FIG. 68 illustrates flow diagram F-20-200-C of FIG. 42 with screen diagram S-20-200-C.

Figure 43:
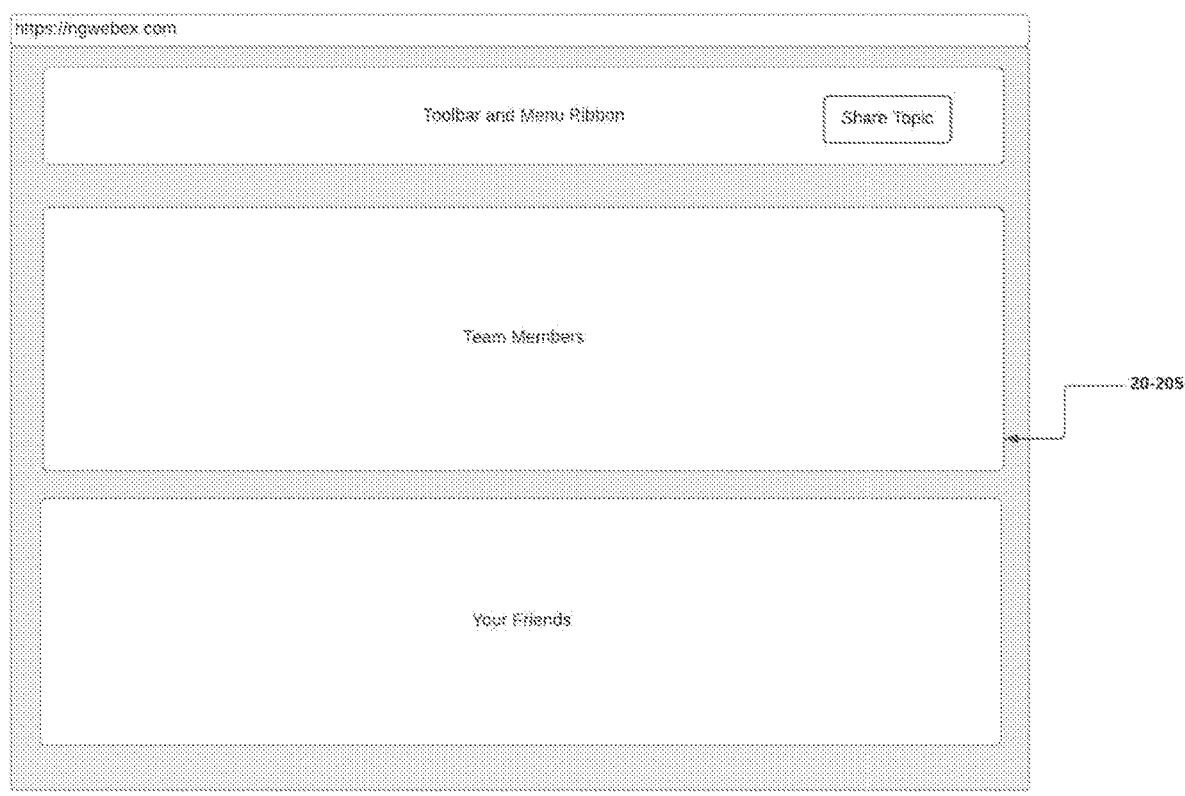
FIG. 43 illustrates screen diagram S-20-200-D: Collaborate—Share Using web Page.

FIG. 43 with screen diagram S-20-200-D is an illustrative screen display of sharing the document page. User can select the team member(s) and share the document 20-205.

Figure 69:
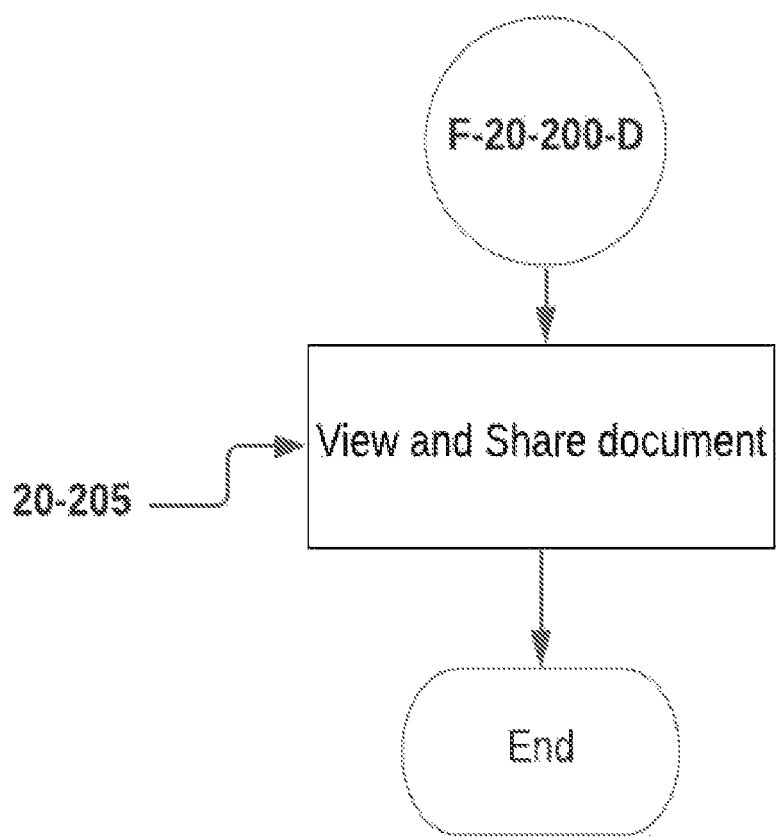
FIG. 69 illustrates flow diagram F-20-200-D: Collaborate—Share Using web Page.

FIG. 69 illustrates flow diagram F-20-200-D of FIG. 43 with screen diagram S-20-200-D.

Figure 44:
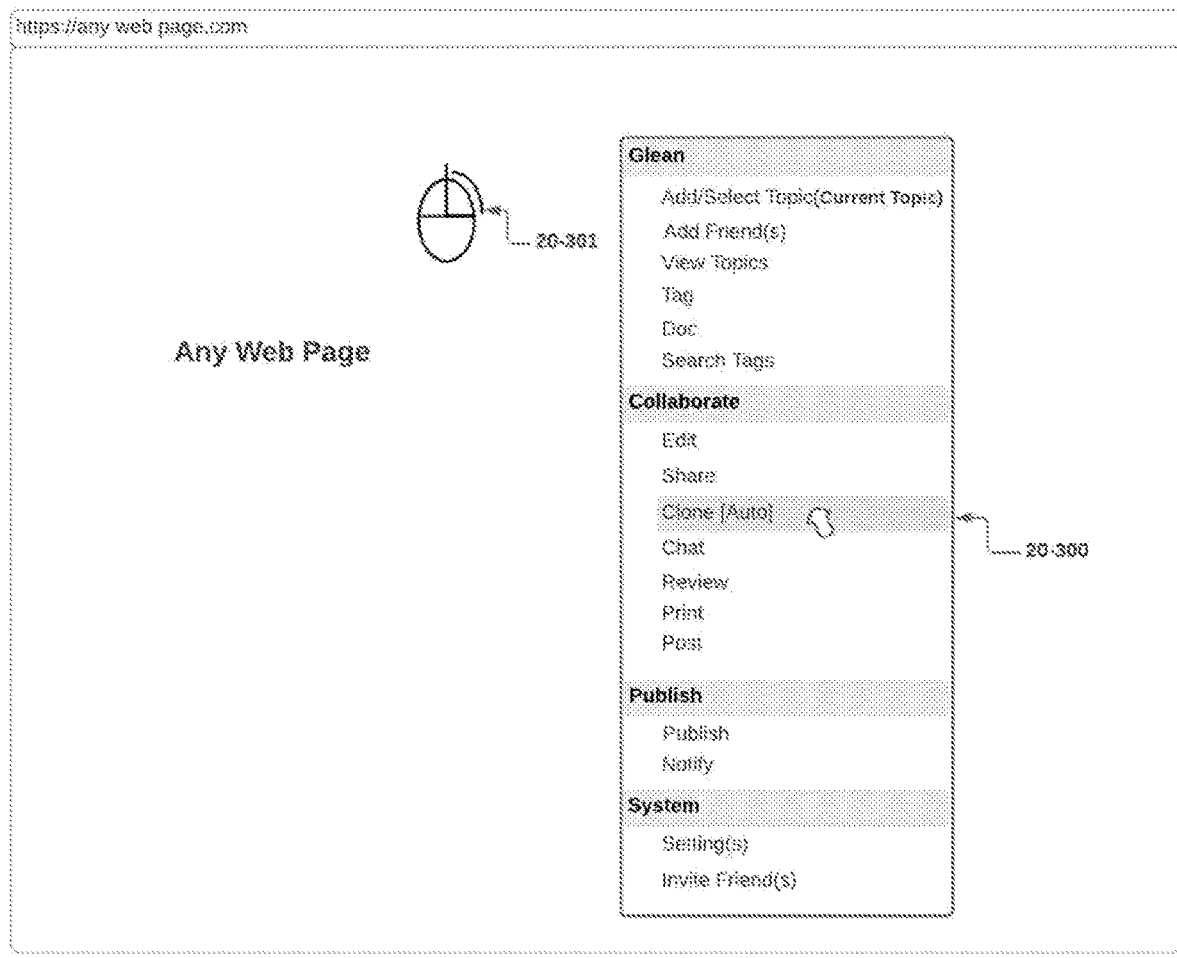
FIG. 44 illustrates screen diagram S-20-300-A: Auto Clone Topic.

FIG. FIG. 44 with screen diagram S-20-300-A is an illustrative screen display of cloning the document based on personalized setting. A topic must be selected as a pre-requisite to clone the document. From any web page or any other document (example: WORD, EXCEL, PDF, etc.), the user can right click the mouse 20-301 to view list of menu options FIG. 3 with main menu diagram S-00 for further action. User selects the menu "Clone" 20-300. The system will clone the document with a predefined naming convention.

Figure 70:
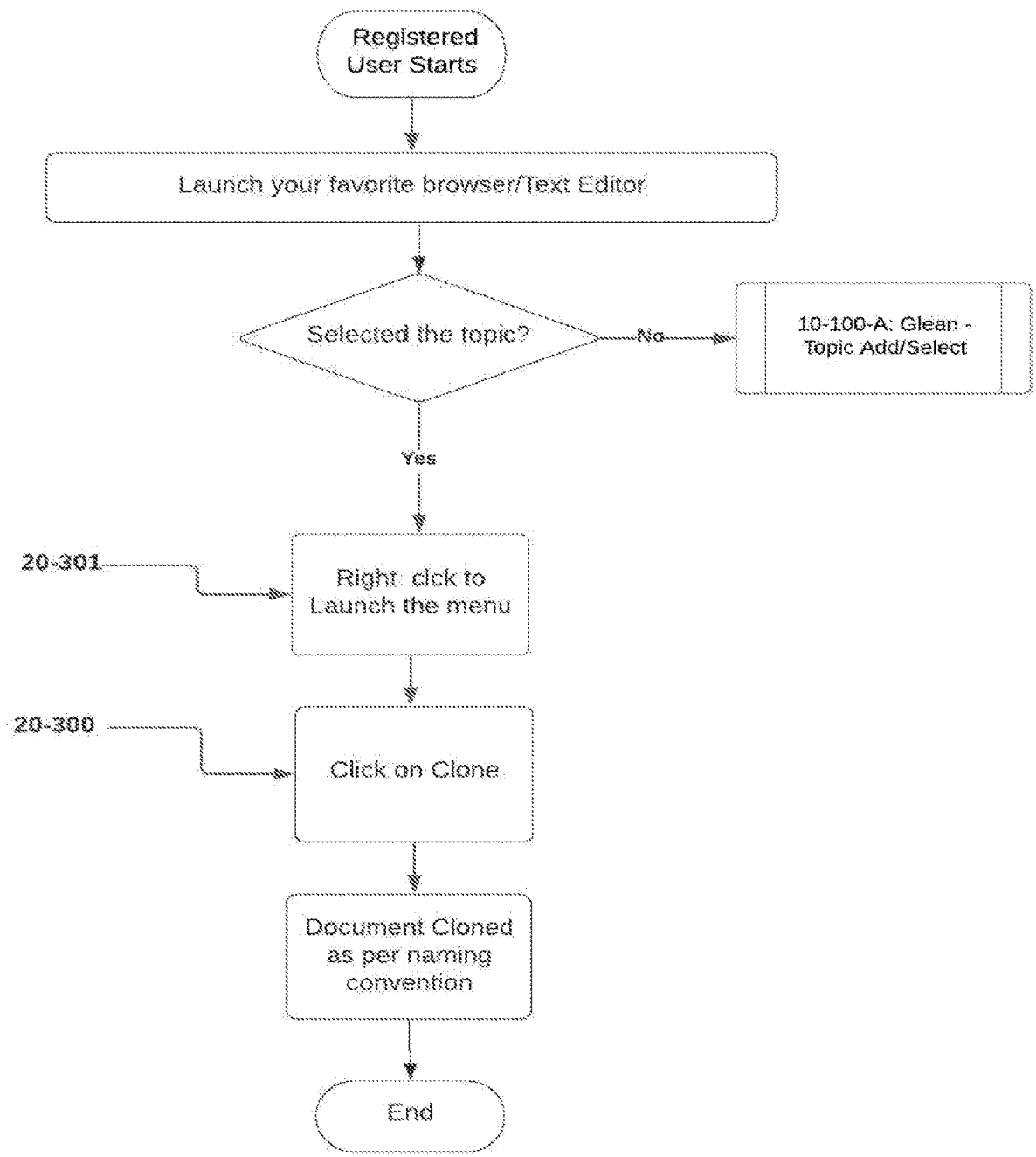
FIG. 70 illustrates flow diagram F-20-300-A: Auto Clone Topic.

FIG. 70 illustrates flow diagram F-20-300-A of FIG. 44 with screen diagram S-20-300-A.

Figure 45:
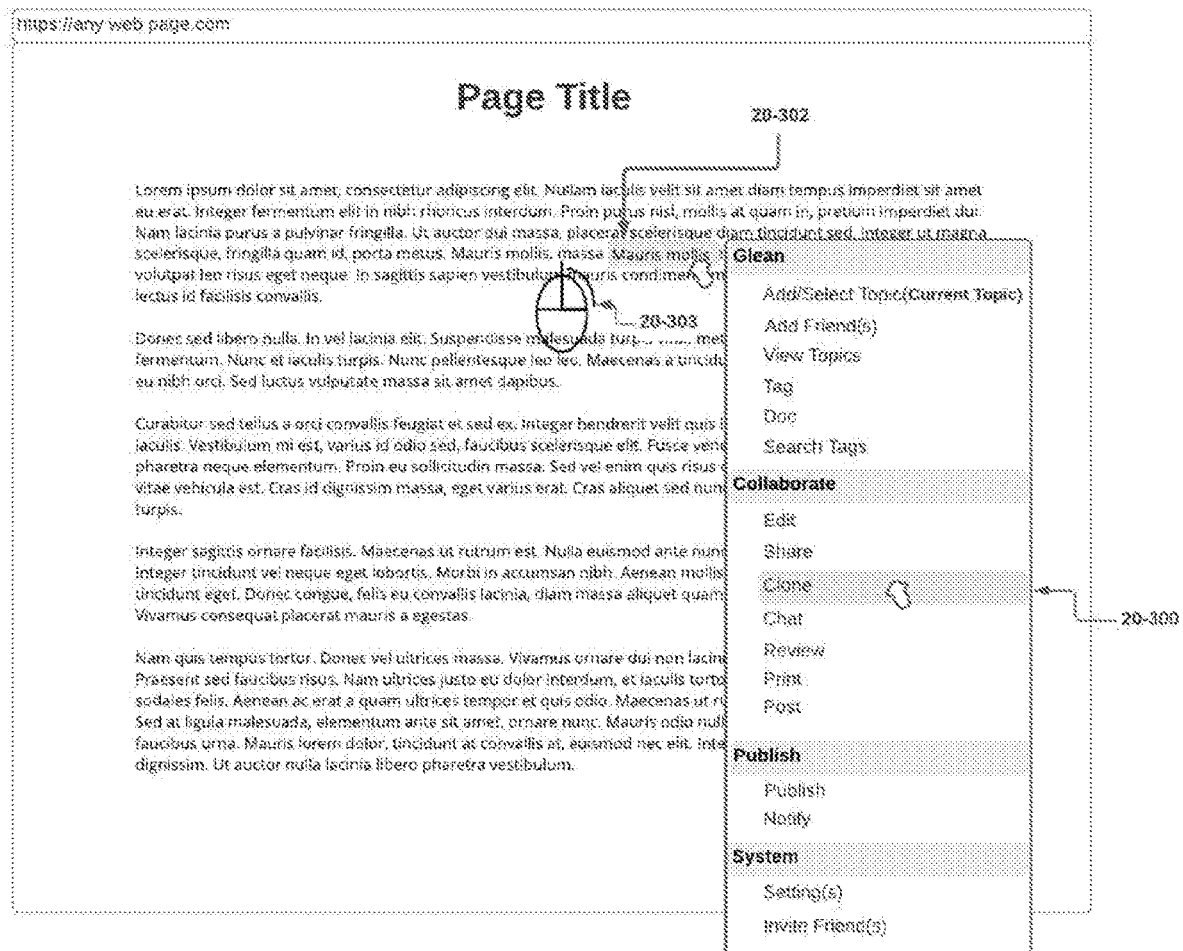
FIG. 45 illustrates screen diagram S-20-300-B: Clone Topic By Selection.

FIG. 45 with screen diagram S-20-300-B is an illustrative screen display of cloning the document based on personalized setting. A topic must be selected as a pre-requisite to clone the document. The user can select the preferred name from web page or any other document (example: WORD, EXCEL, PDF, etc.) 20-302 and right click the mouse 20-303 to view list of menu options FIG. 3 with main menu diagram S-00 for further action. User selects the menu "Clone" 20-300. The system will clone the document with the given name.

Figure 71:
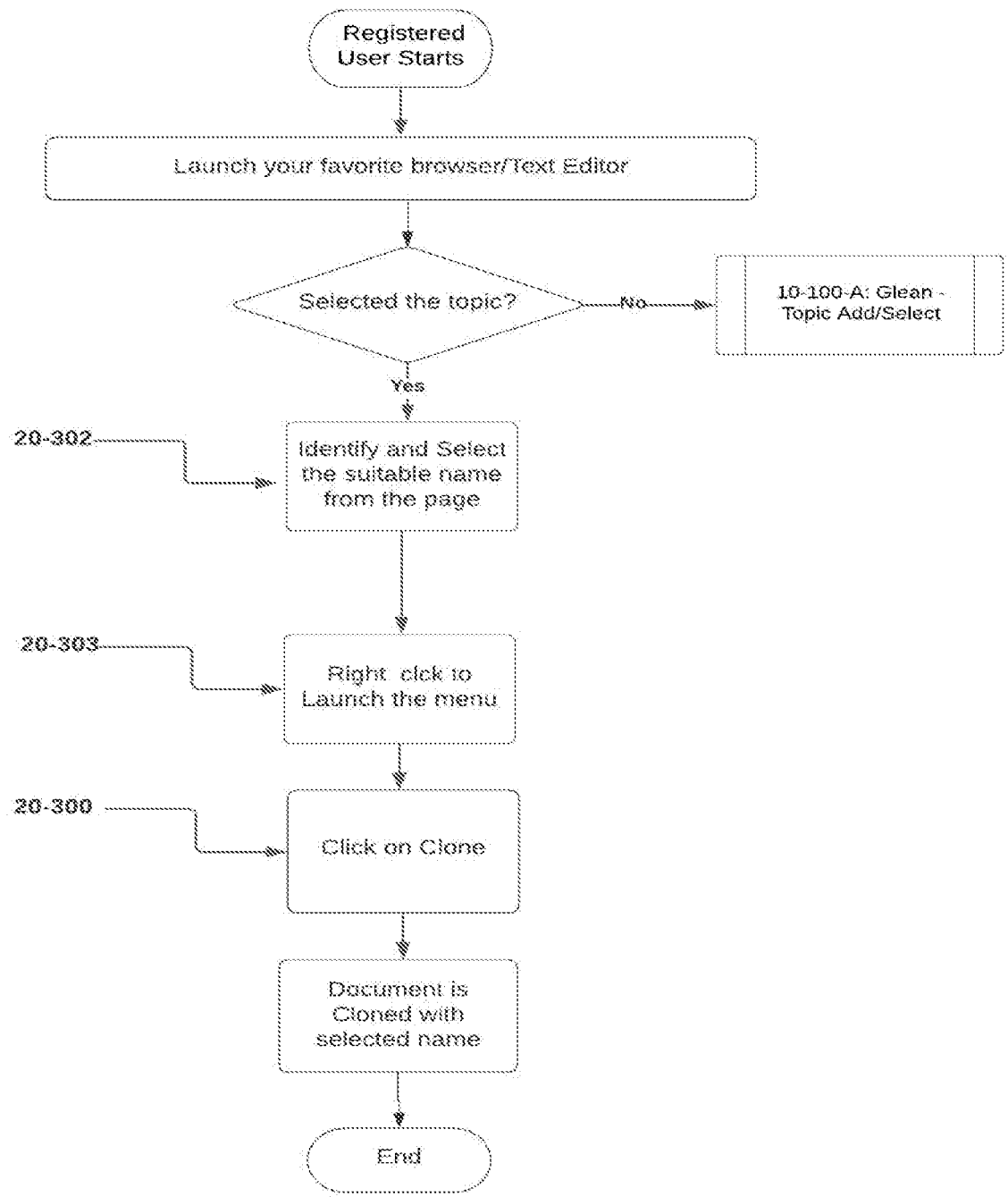
FIG. 71 illustrates flow diagram F-20-300-B: Clone Topic By Selection.

FIG. 71 illustrates flow diagram F-20-300-B of FIG. 45 with screen diagram S-20-300-B.

Figure 46:
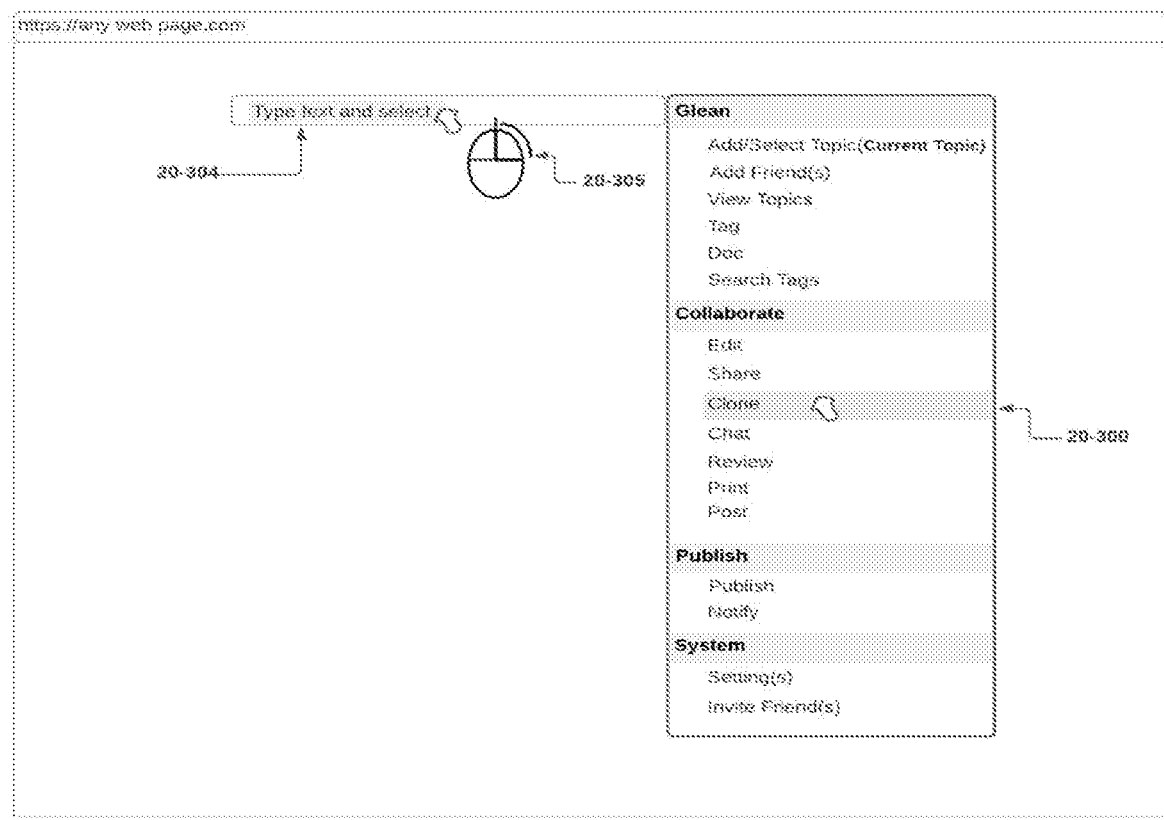
FIG. 46 illustrates screen diagram S-20-300-C: Clone Topic By Edit.

FIG. 46 with screen diagram S-20-300-C is an illustrative screen display of cloning the document based on personalized setting. A topic must be selected as a pre-requisite to clone the document. The user can type the preferred name in any of the edit box in the web page or any in other document (example: WORD, EXCEL, PDF, etc.) 20-304, select the typed clone name and right click the mouse 20-305 to view list of menu options FIG. 3 with main menu diagram S-00 for further action. User selects the menu "Clone" 20-300. The system will clone the document with the given name.

Figure 72:
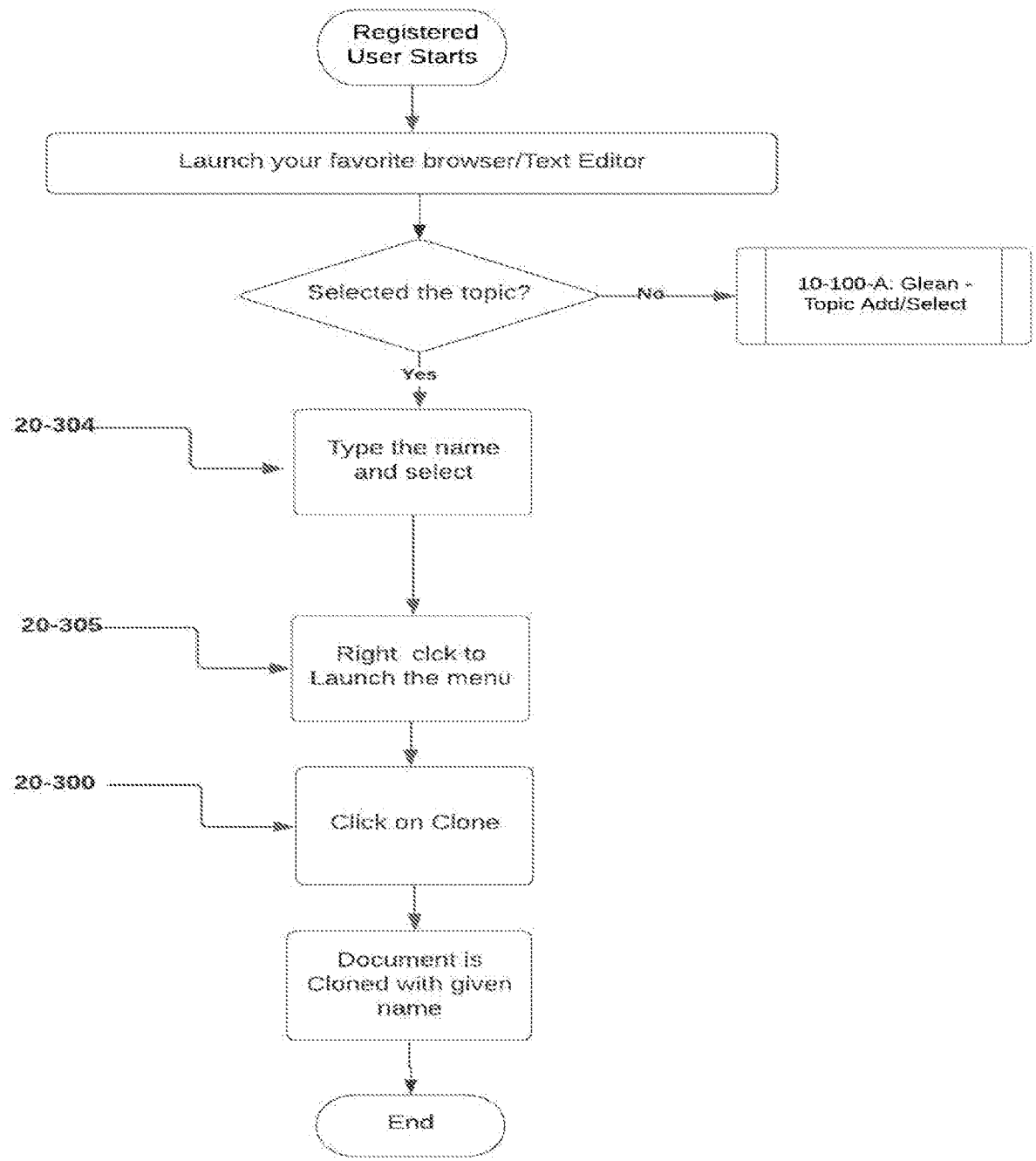
FIG. 72 illustrates flow diagram F-20-300-C: Clone Topic By Edit.

FIG. 72 illustrates flow diagram F-20-300-C of FIG. 46 with screen diagram S-20-300-C.

Figure 47:
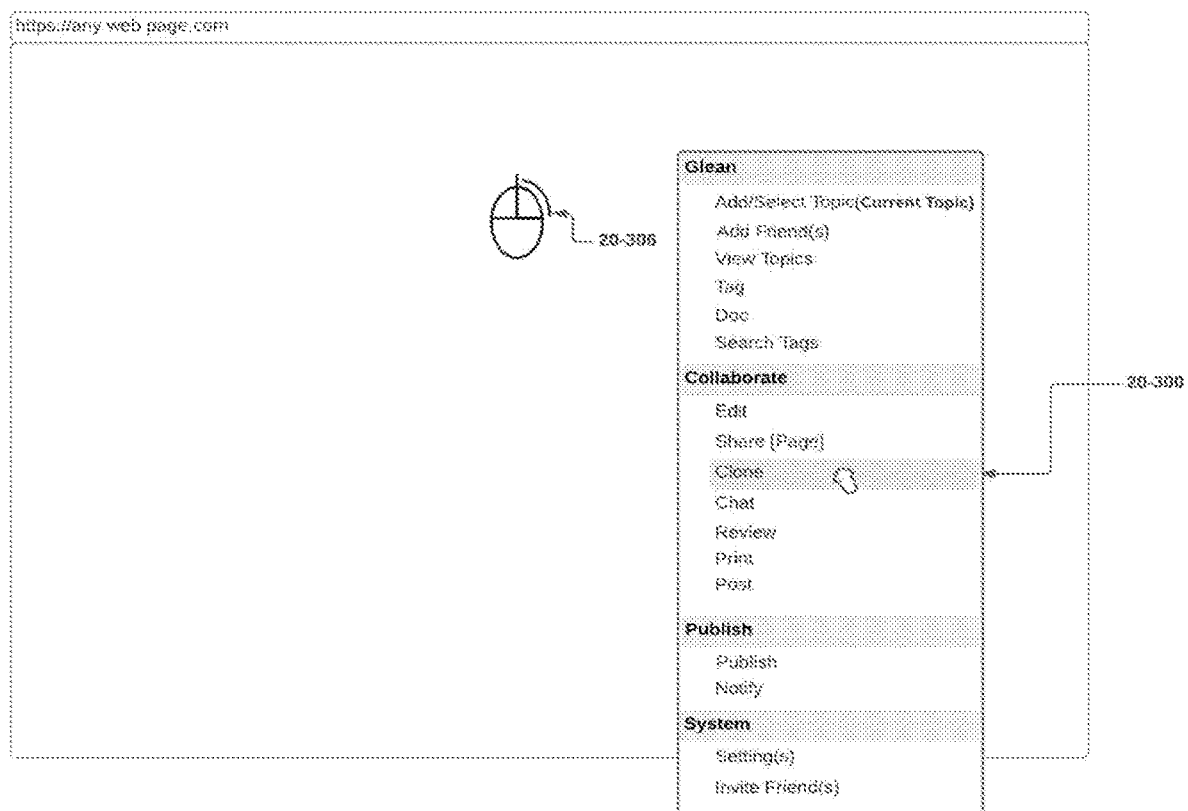
FIG. 47 illustrates screen diagram S-20-300-D: Collaborate—Clone by Settings [Page].
Figure 73:
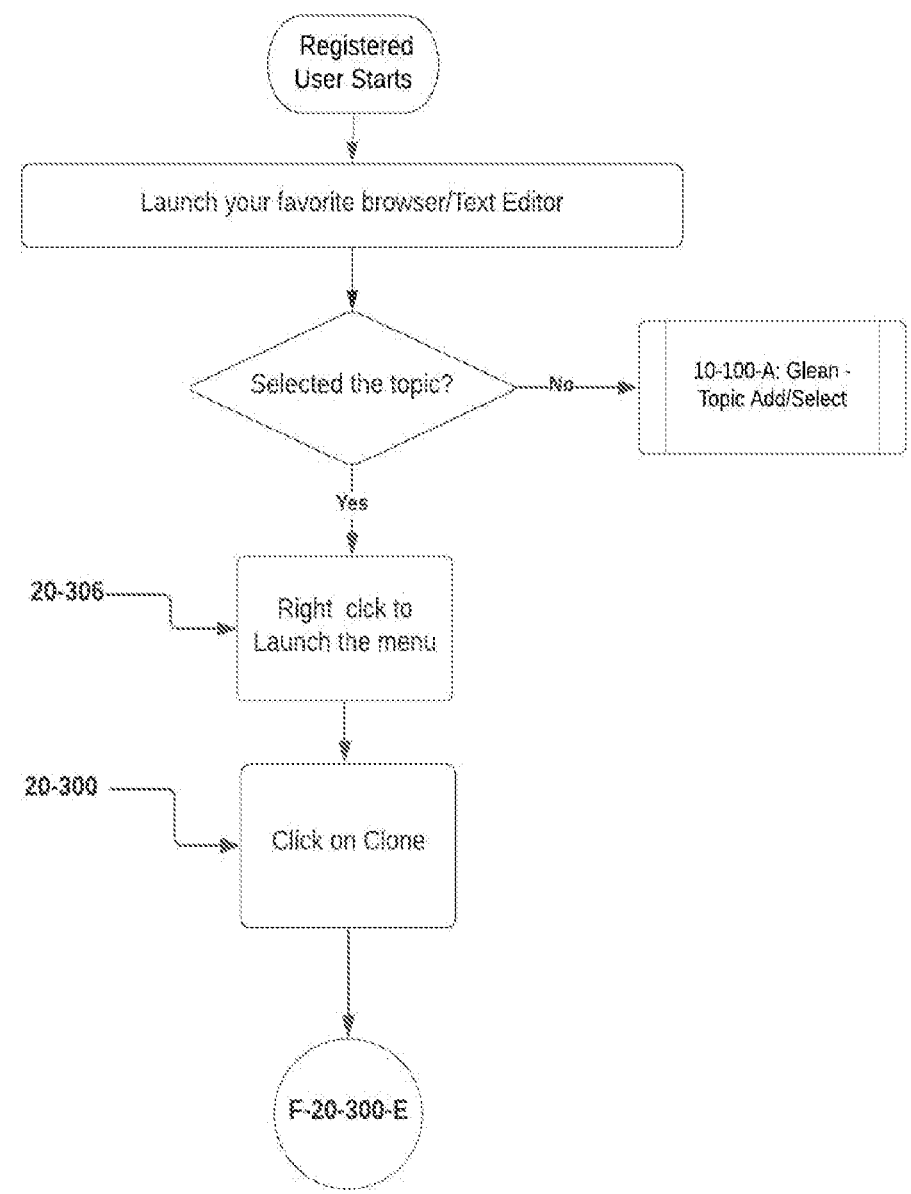
FIG. 73 illustrates flow diagram F-20-300-D: Collaborate—Clone by Settings [Page].

FIG. 47 with screen diagram S-20-300-1) is an illustrative screen display of cloning a document based on personalized setting. A topic must be selected as a pre-requisite to clone the document. From any web page or any other document (example: WORD, EXCEL, PDF, etc.), the user can right click the mouse 20-306 to view list of menu options FIG. 3 with main menu diagram S-00 for further action. User selects the menu "Clone" 20-300. The cloning page is displayed FIG. 73 illustrates flow diagram F-20-300-D of FIG. 47 with screen diagram S-20-300-D.

Figure 48:
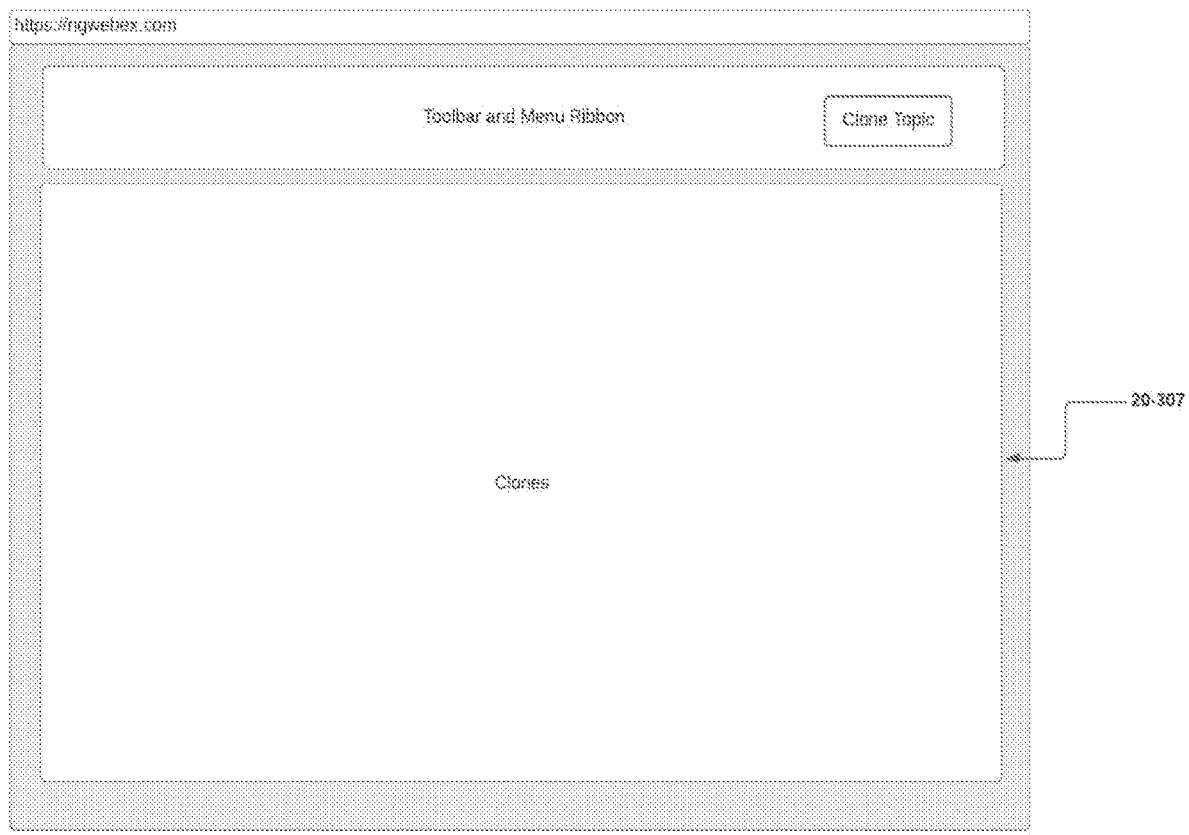
FIG. 48 illustrates screen diagram S-20-300-E: Collaborate—Clone Using web Page.

FIG. 48 with screen diagram S-20-300-E is an illustrative screen display of cloning the document page for the selected topic. User can clone document 20-307.

Figure 74:
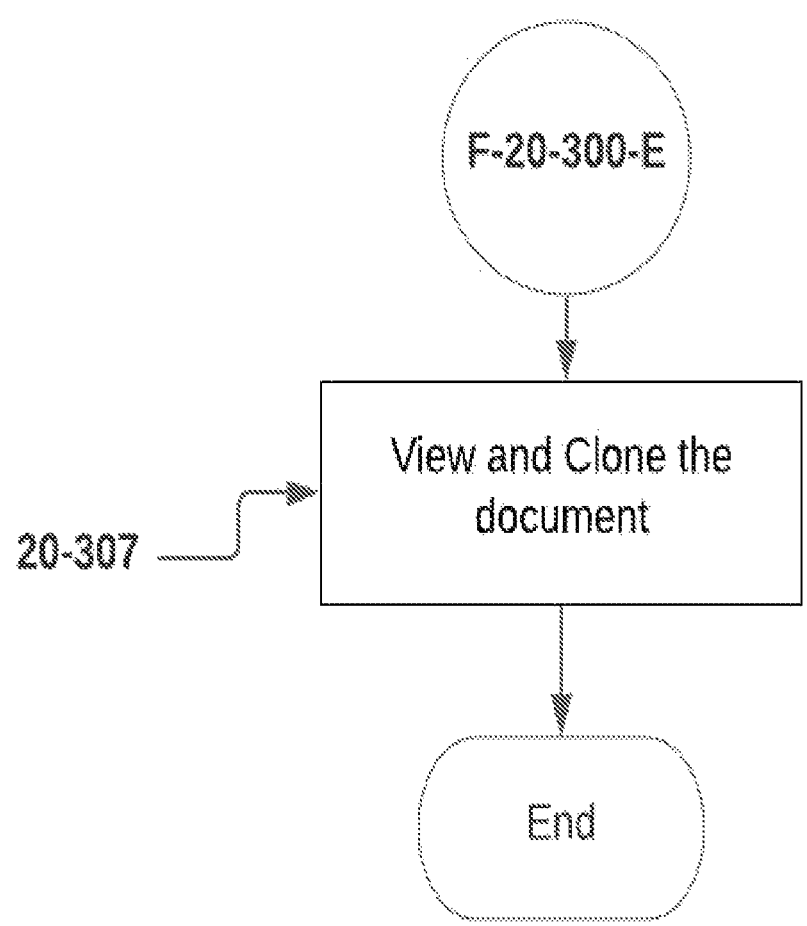
FIG. 74 illustrates flow diagram F-20-300-E: Collaborate—Clone Using web Page.

FIG. 74 illustrates flow diagram F-20-300-E of FIG. 48 with screen diagram S-20-300-E.

Figure 49:
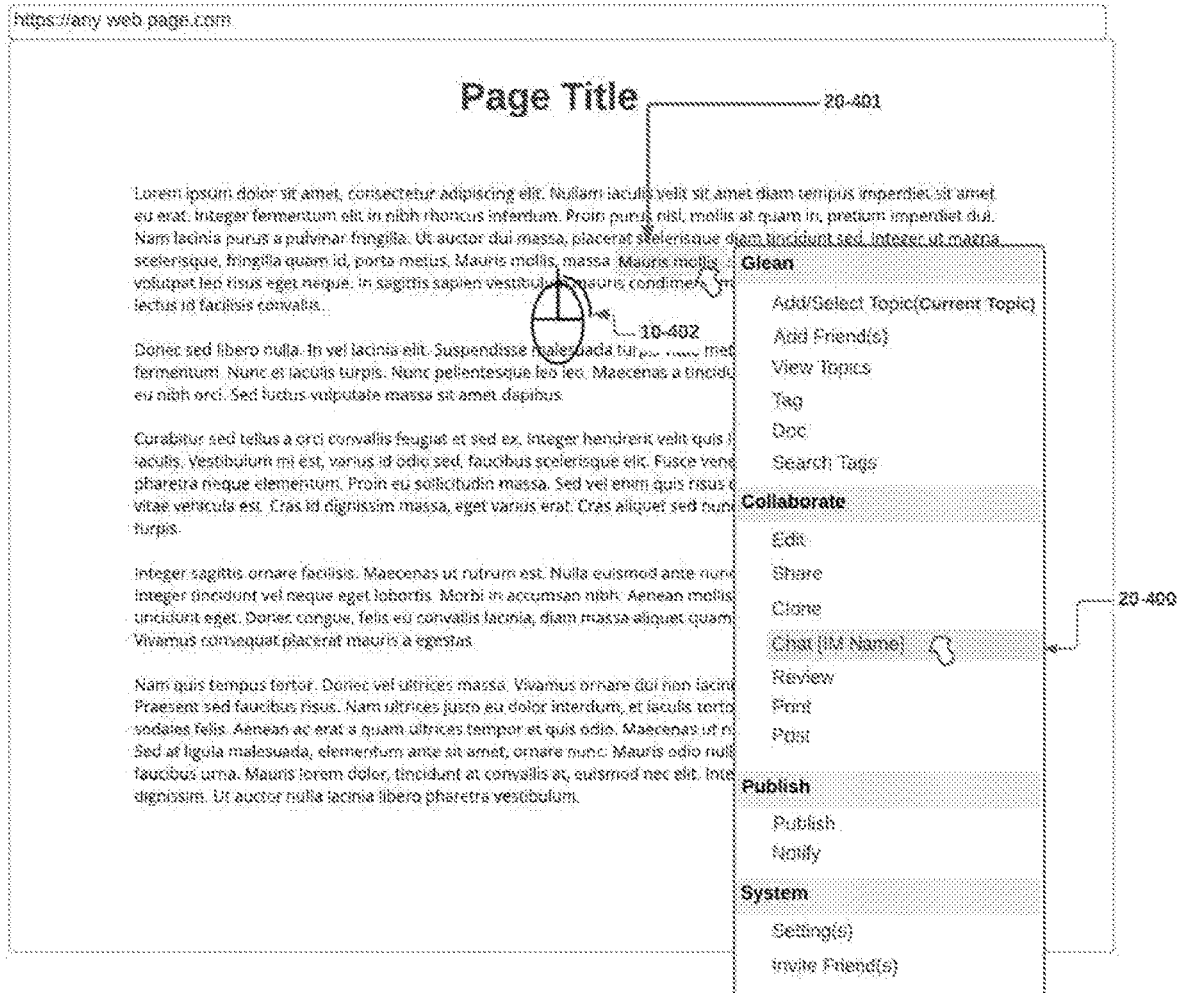
FIG. 49 illustrates screen diagram S-20-400-A: Chat on Topic Directly By Selection.

FIG. 49 with screen diagram S-20-400-A is an illustrative screen display of posting a message in any IM (Internet Messenger) based on personalized setting. The user can select the text/content in the web page or in any other document (example: WORD, EXCEL, PDF, etc.) 20-401 and right click the mouse 20-402 to view list of menu options FIG. 3 with main menu diagram S-00 for further action. User selects the menu "Chat" 20-400. The system posts the selected text/content to any IM as configured by the user.

Figure 75:
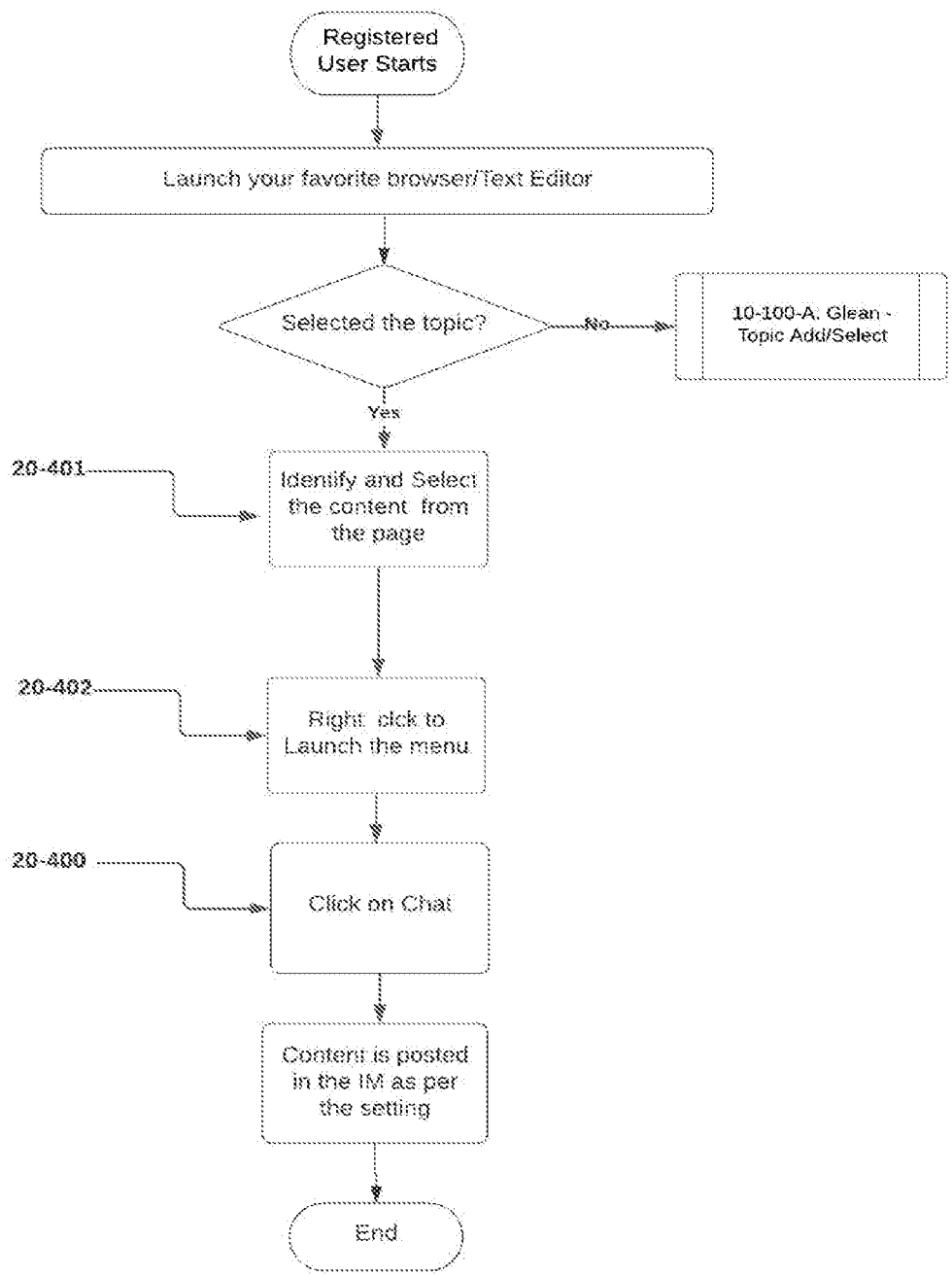
FIG. 75 illustrates flow diagram F-20-400-A: Chat on Topic Directly By Selection.

FIG. 75 illustrates flow diagram F-20-400-A of FIG. 49 with screen diagram S-20-400-A.

Figure 50:
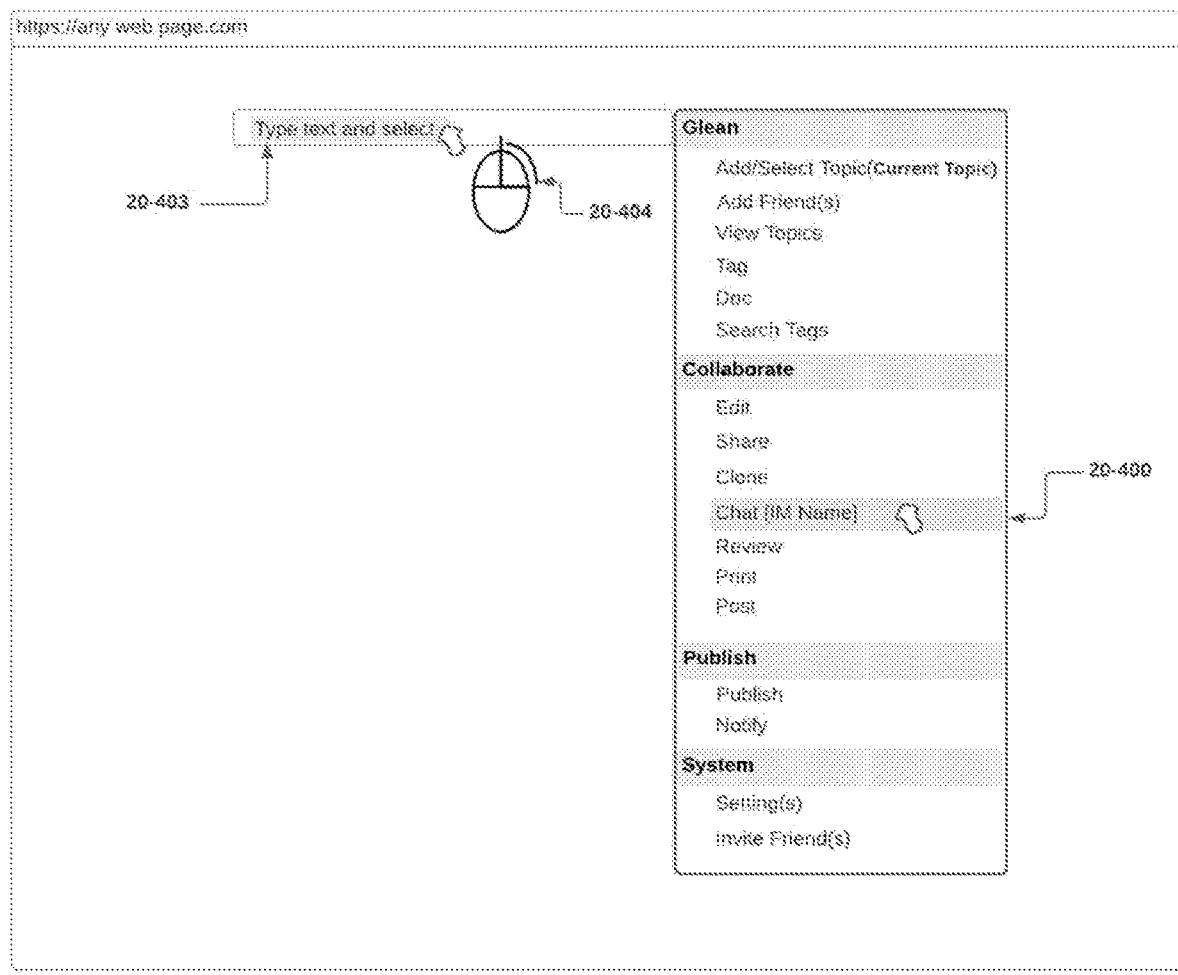
FIG. 50 illustrates screen diagram S-20-400-B: Chat on Topic Directly By Edit.

FIG. 50 with screen diagram S-20-400-B is an illustrative screen display of posting a message in any IM (Internet Messenger) based on personalized setting. The user can type and select the text/message in any of the edit box in the web page or any other document (example: WORD, EXCEL, PDF, etc.) 20-403 and right click the mouse 20-404 to view list of menu options FIG. 3 with main menu diagram S-00 for further action. User selects the menu "Chat" 20-400. The system posts the text/message to any IM as configured by the user.

Figure 76:
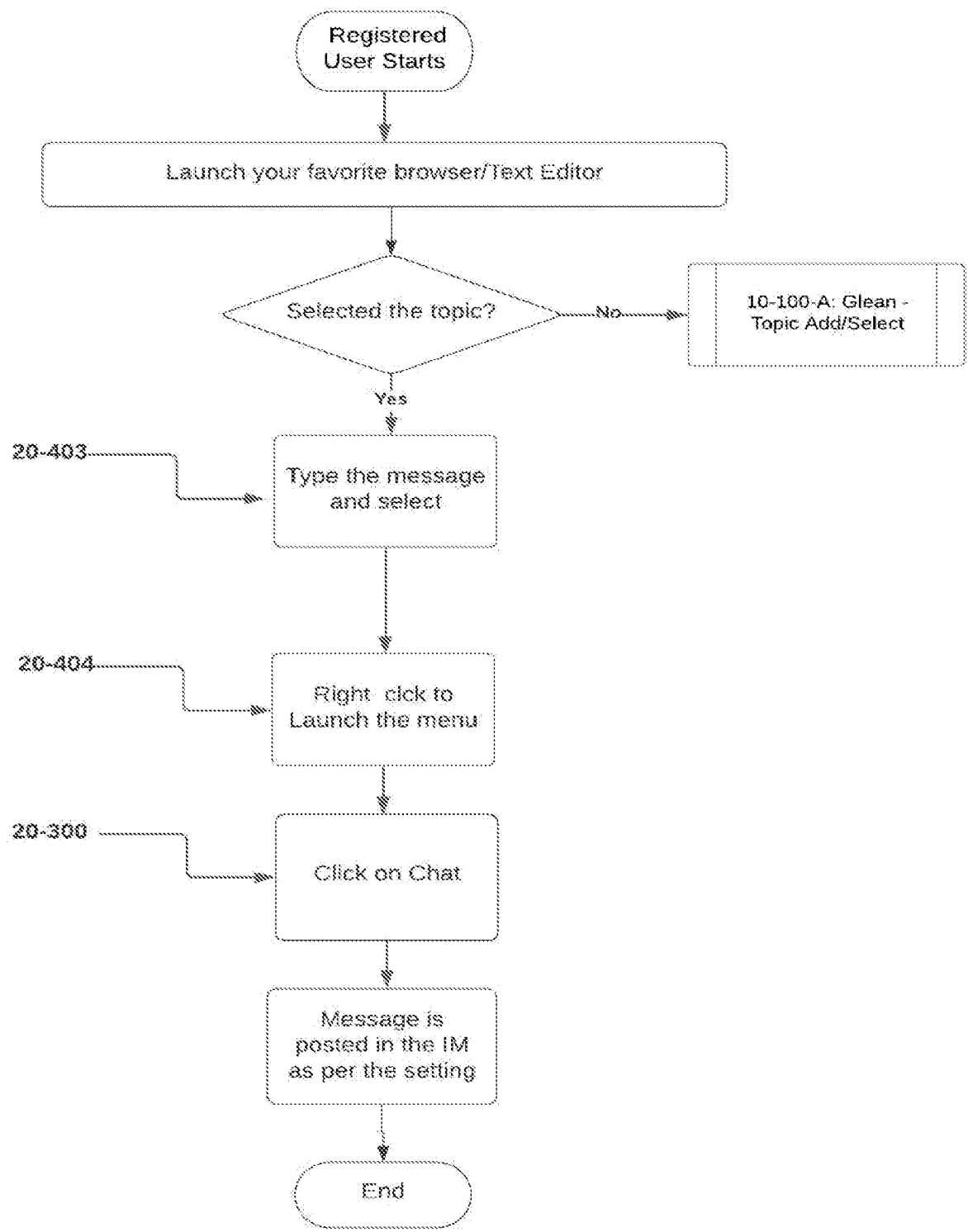
FIG. 76 illustrates flow diagram F-20-400-B: Chat on Topic Directly By Edit.

FIG. 76 illustrates flow diagram F-20-400-B of FIG. 50 with screen diagram S-20-400-B.

Figure 51:
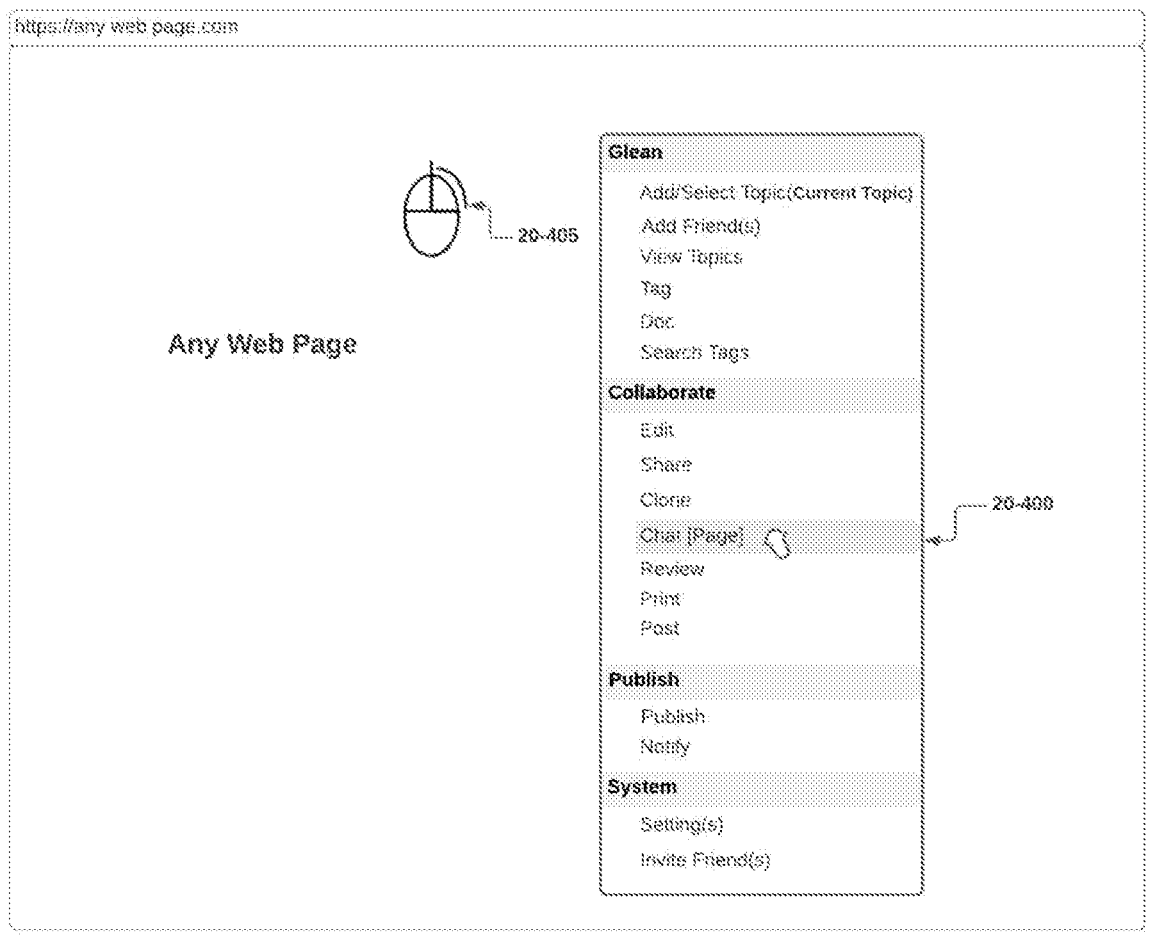
FIG. 51 illustrates screen diagram S-20-400-C: Open Chat/Tag on Topic.

FIG. 51 with screen diagram S-20-400-C is an illustrative screen display of chatting function based on personalized setting. From any web page or any other document (example: WORD, EXCEL, PDF, etc.), the user can right click the mouse 20405 to view list of menu options FIG. 3 with main menu diagram S-00 for further action. User selects the menu "Chat" 20-400. The chatting page is displayed FIG. 52 with screen diagram S-20-400-D.

Figure 77:
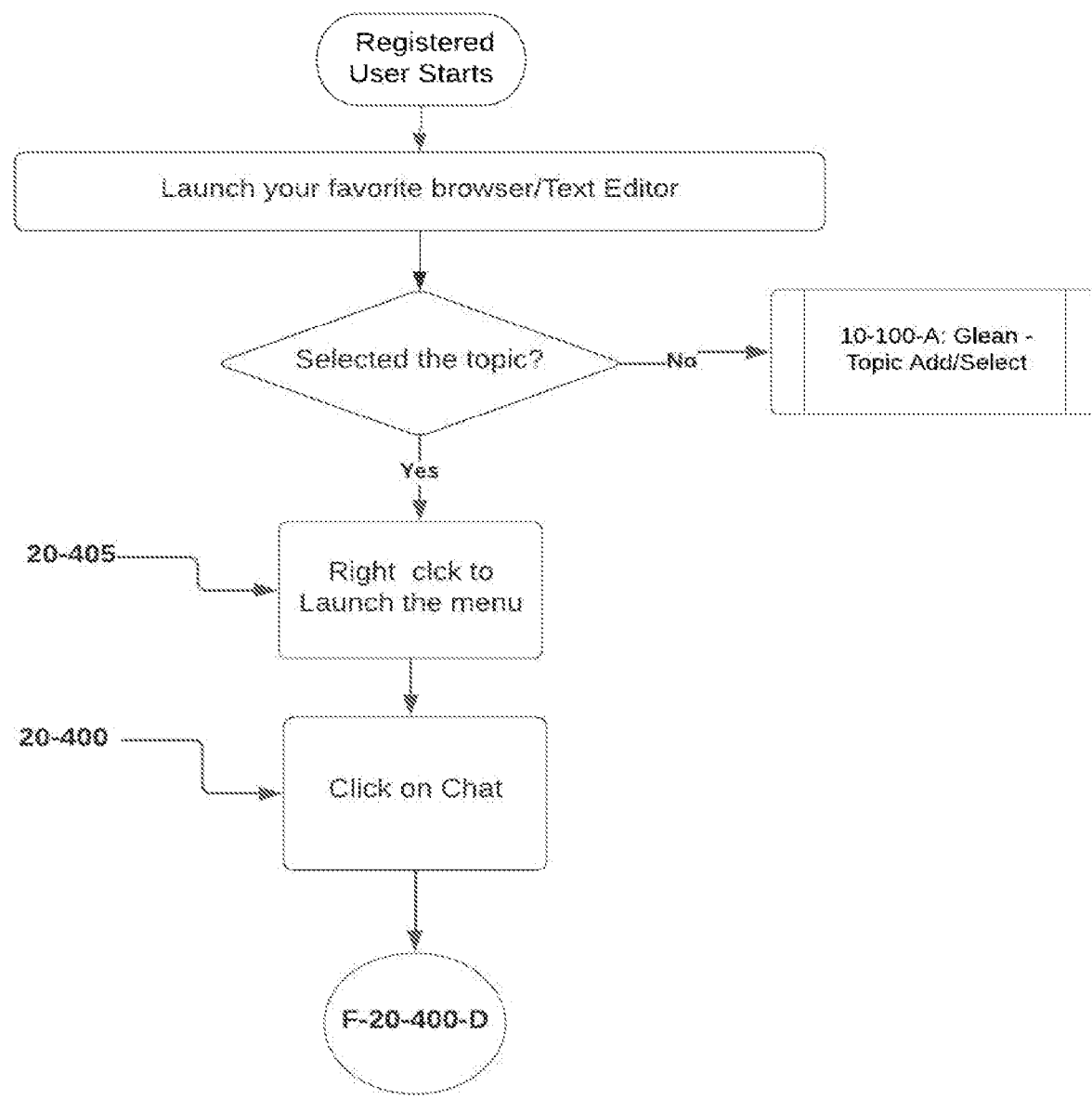
FIG. 77 illustrates flow diagram F-20-400-C: Open Chat on Topic.

FIG. 77 illustrates flow diagram F-20-400-C of FIG. 51 with screen diagram S-20-400-C.

Figure 52:
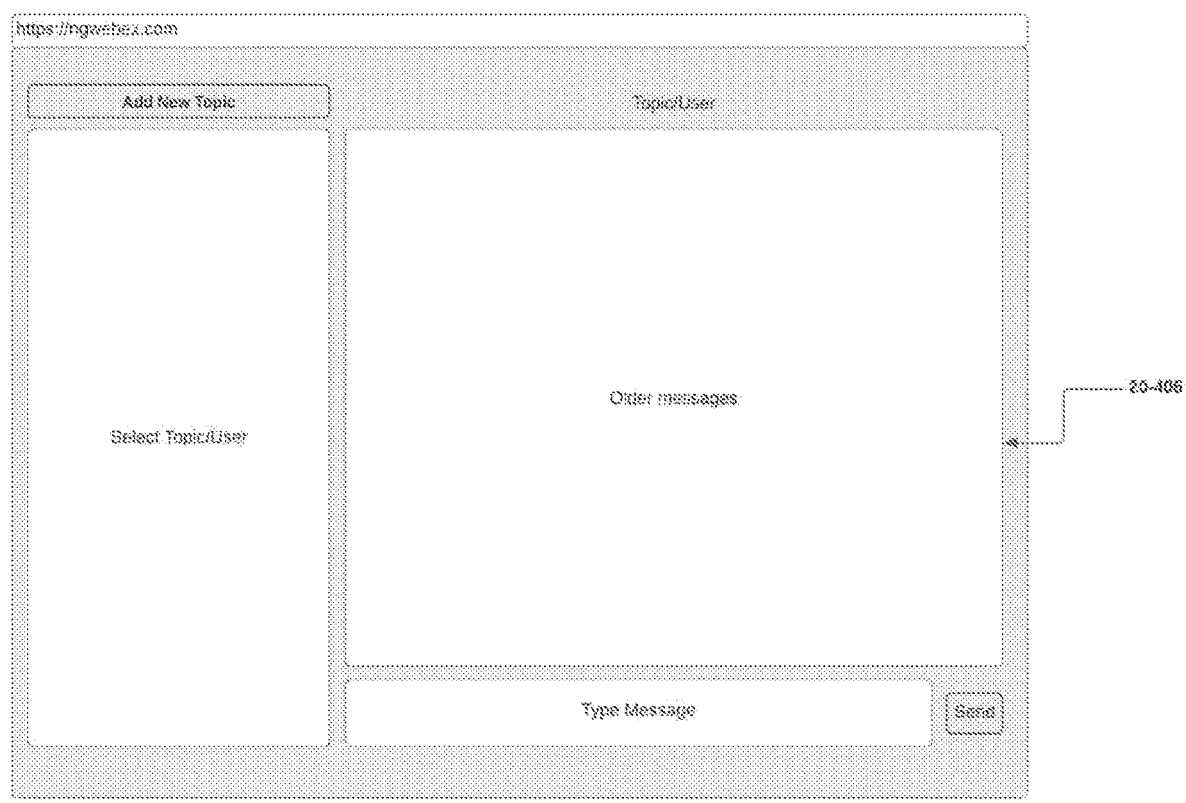
FIG. 52 illustrates screen diagram S-20-400-D: Collaborate—Chat By Settings [Page].

FIG. 52 with screen diagram S-20-400-D is an illustrative screen display of chatting page. User can chat with team member(s) 20-406.

Figure 78:
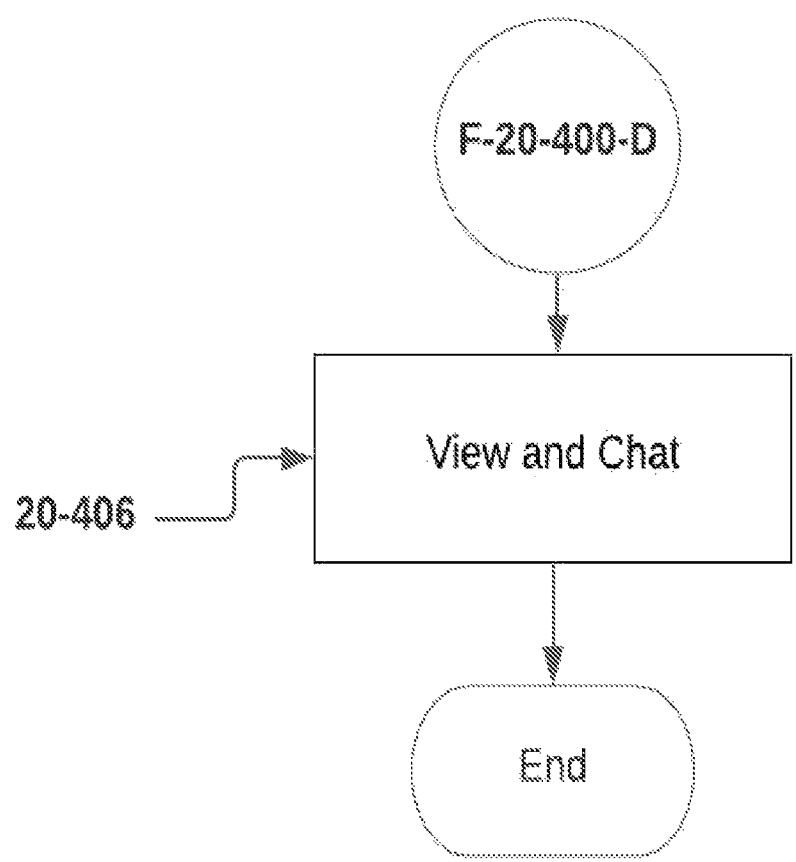
FIG. 78 illustrates flow diagram F-20-400-D: Collaborate—Chat By Settings [Page].

FIG. 78 illustrates flow diagram F-20-400-D of FIG. 52 with screen diagram S-20-400-D.

Figure 53:
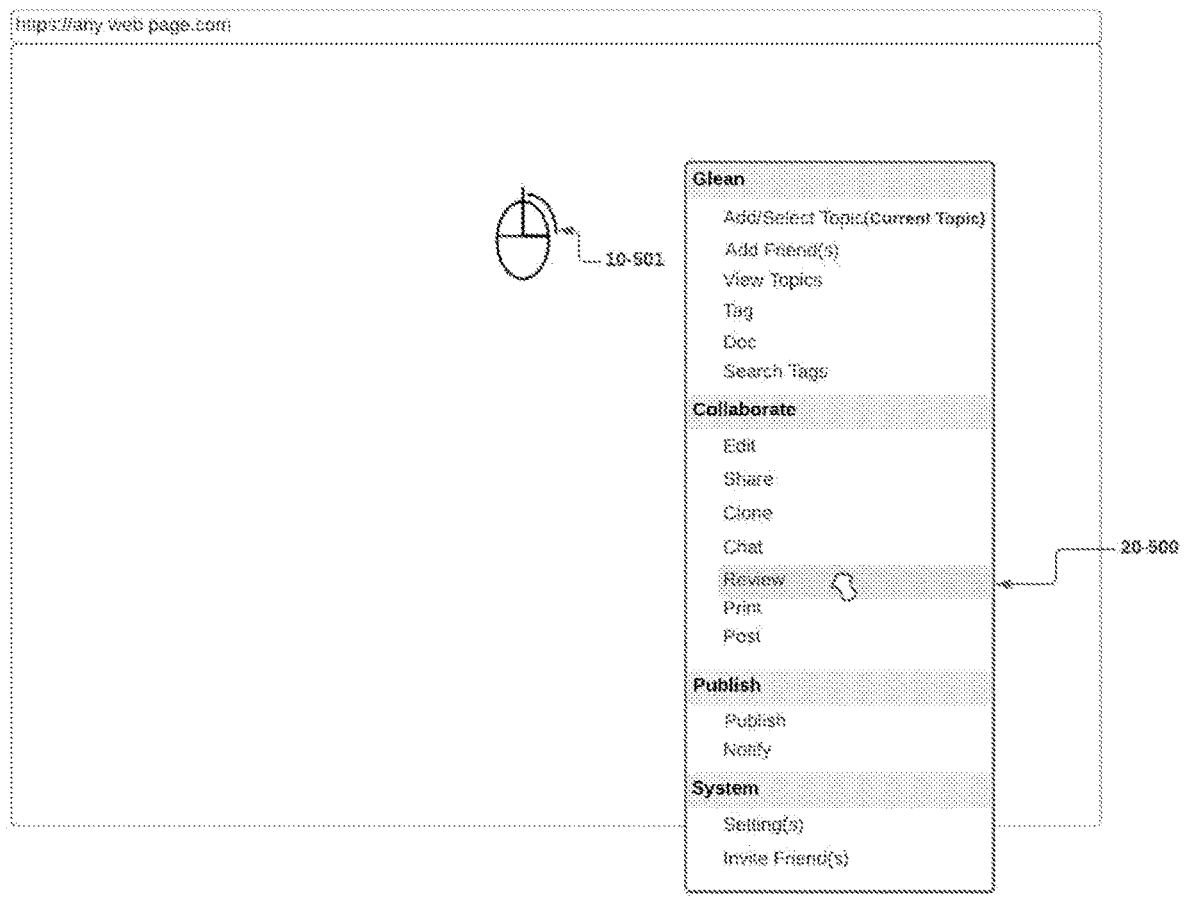
FIG. 53 illustrates screen diagram S-20-500-A: Review Topic.

FIG. 53 with screen diagram S-20-500-A is an illustrative screen display of reviewing a document on the selected topic. A topic must be selected as a pre-requisite to review the document. From any web page or any other document (example: WORD, EXCEL, PDF, etc.), the user can right click the mouse 20-501 to view list of menu options FIG. 3 with main menu diagram S-00 for further action. User selects the menu "Review" 20-500. The document review page is displayed FIG. 54 with screen diagram S-20-500-B.

Figure 79:
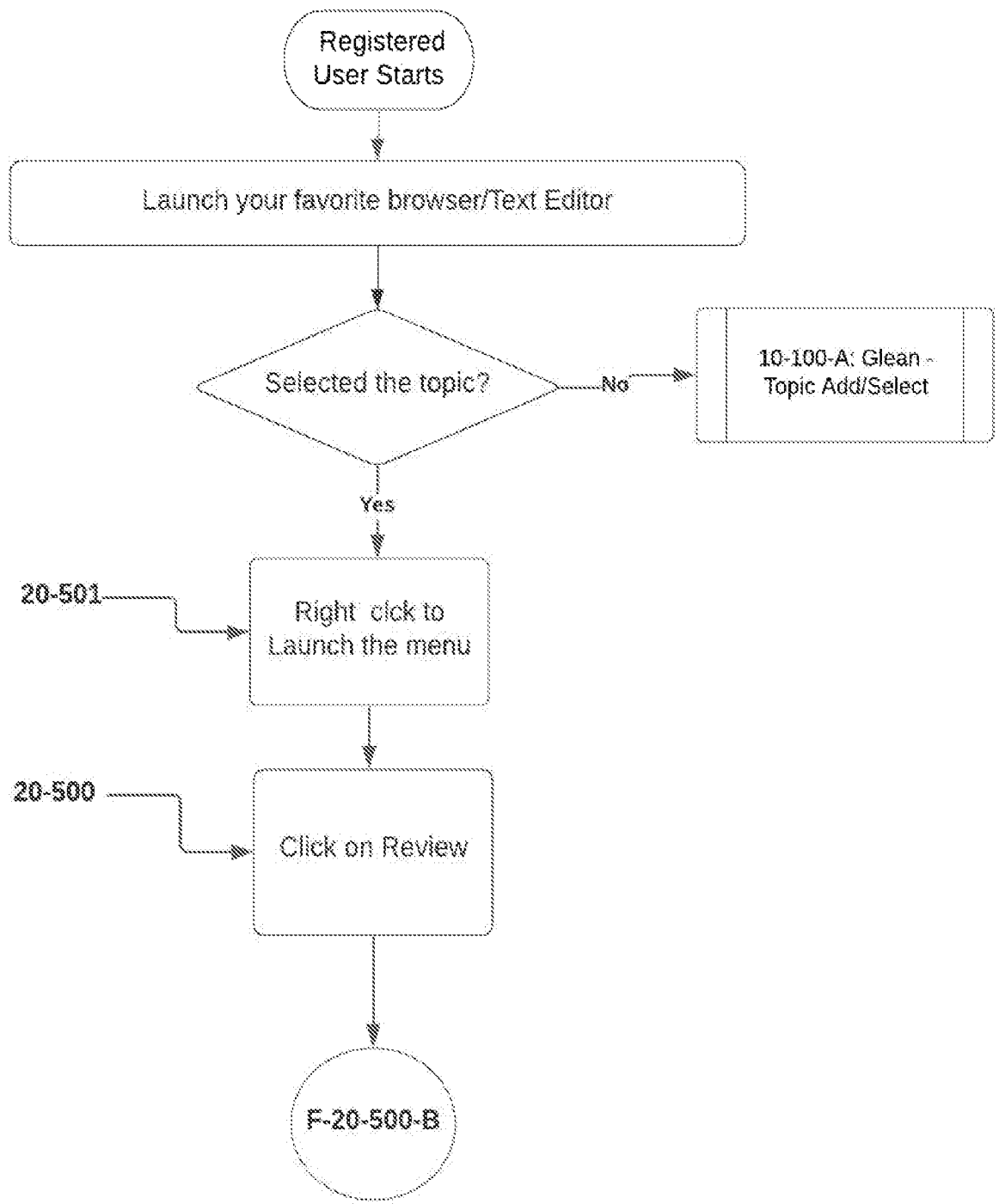
FIG. 79 illustrates flow diagram F-20-500-A: Review Topic.

FIG. 79 illustrates flow diagram F-20-500-A of FIG. 53 with screen diagram S-20-500-A.

Figure 54:
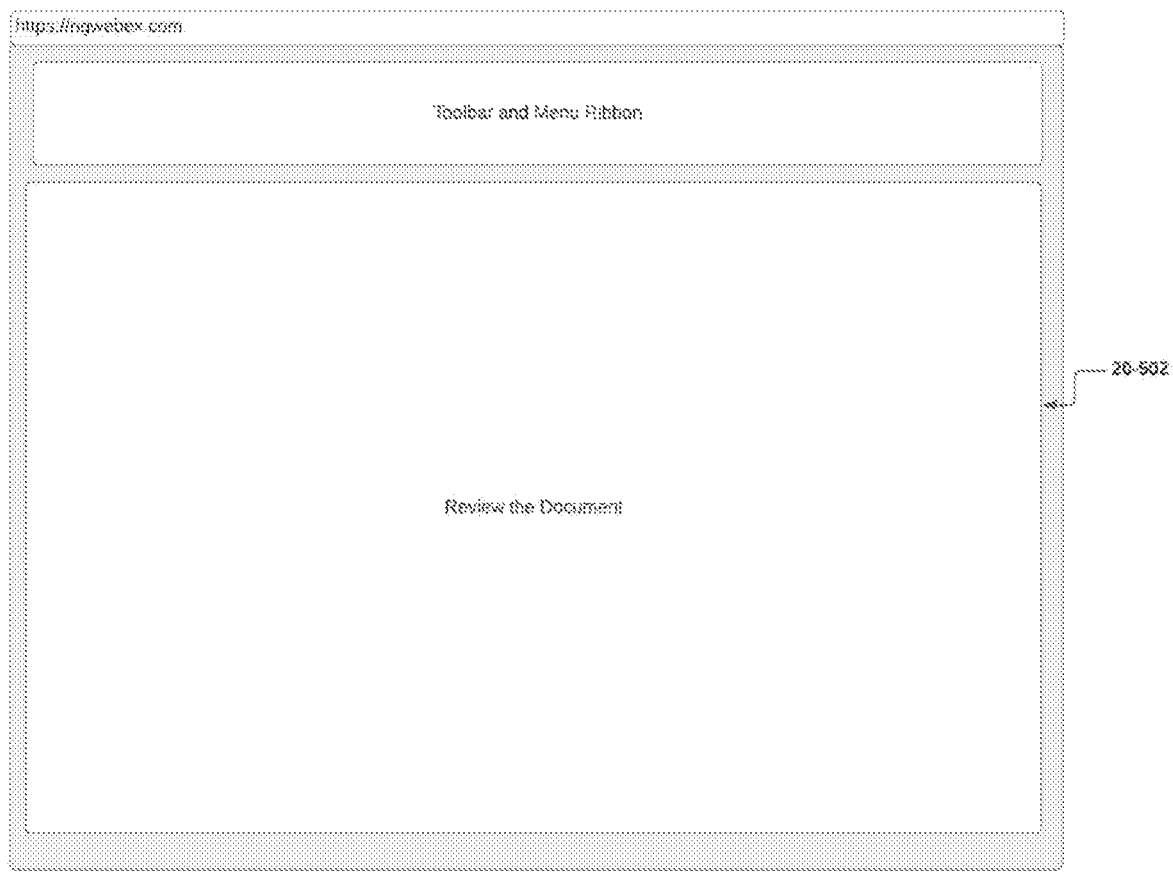
FIG. 54 illustrates screen diagram S-20-500-B: Review Topic Page.

FIG. 54 with screen diagram S-20-500-B is an illustrative screen display of document review page. User can review the document 20-502.

Figure 80:
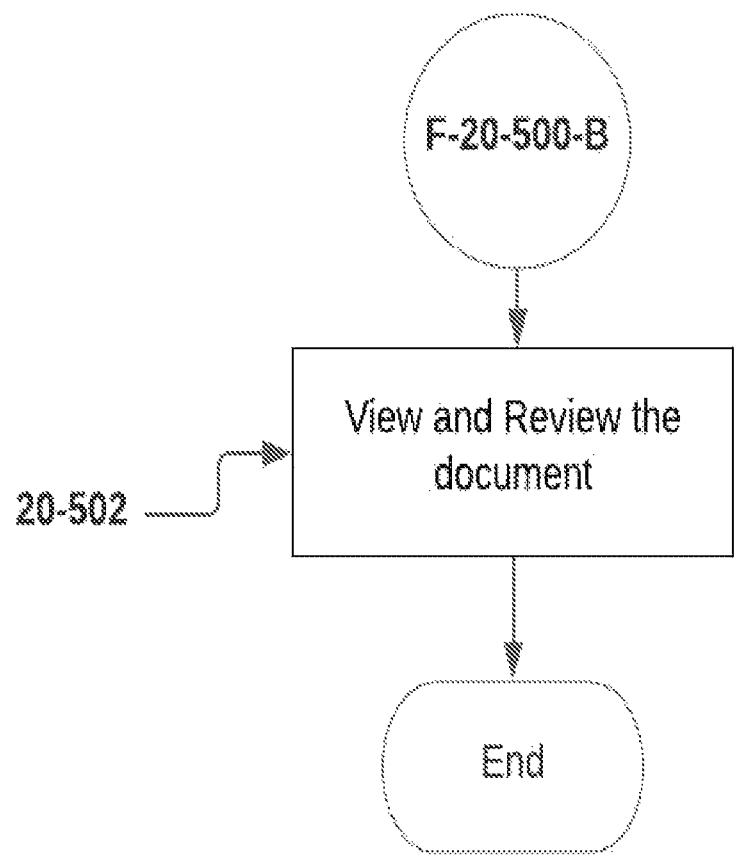
FIG. 80 illustrates flow diagram F-20-500-B: Review Topic Page.

FIG. 80 illustrates flow diagram F-20-500-B of FIG. 54 with screen diagram S-20-500-B.

Figure 55:
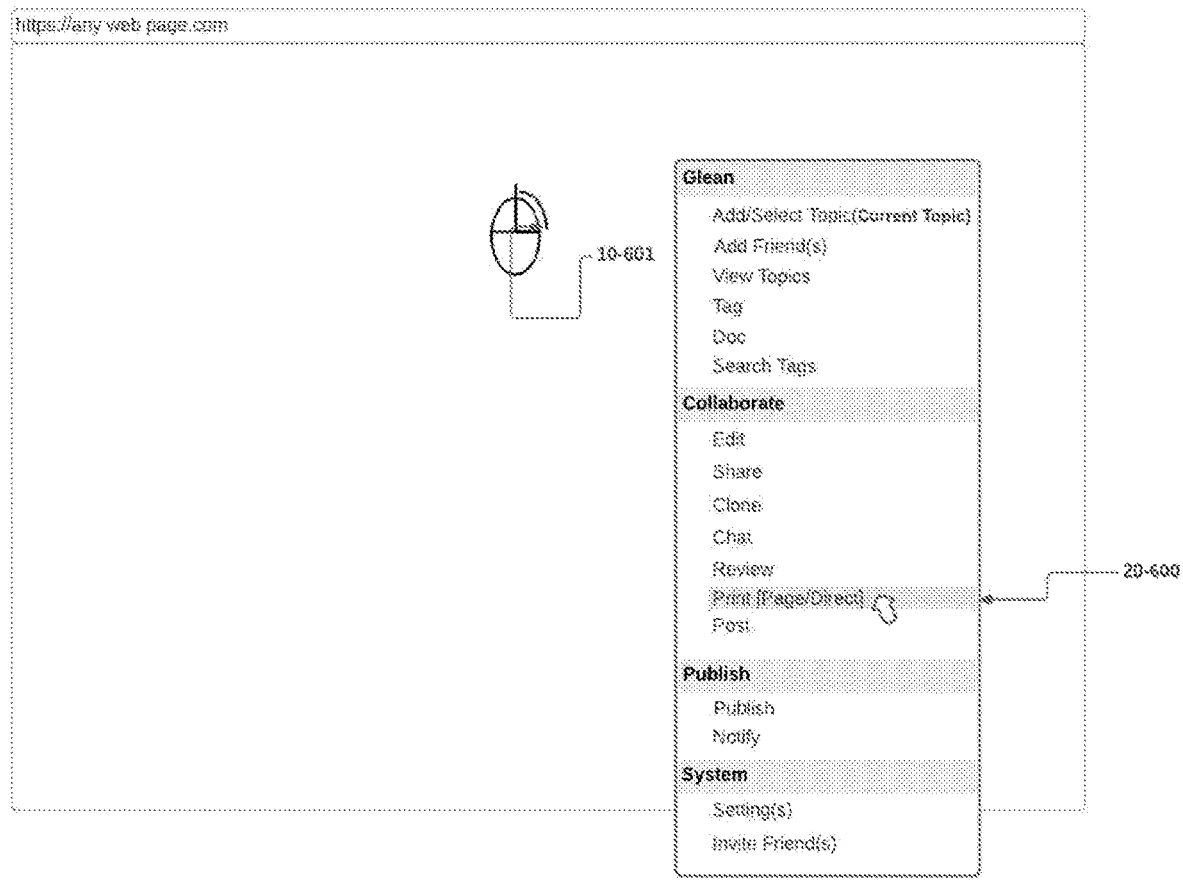
FIG. 55 illustrates screen diagram S-20-600-A: Print Document Directly Or Navigate to Print Page.

FIG. 55 with screen diagram S-20-600-A is an illustrative screen display of printing a document on the selected topic. A topic must be selected as a pre-requisite to print the document. From any web page or any other document (example: WORD, EXCEL, PDF, etc.), the user can right click the mouse 20-601 to view list of menu options FIG. 3 with main menu diagram S-00 for further action. User selects the menu "Print" 20-600. The document print preview page is displayed FIG. 56 with screen diagram S-20-600-B.

Figure 81:
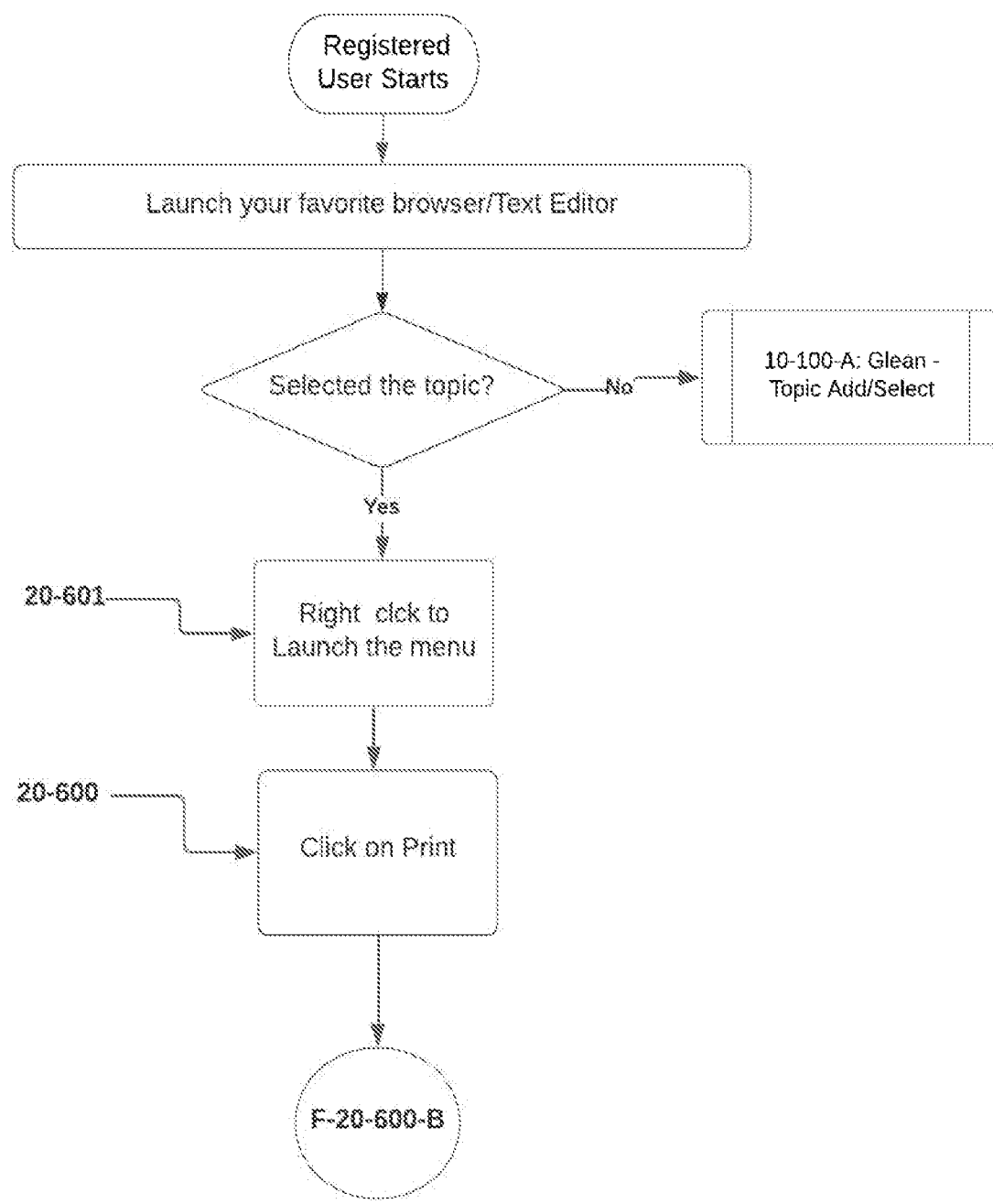
FIG. 81 illustrates flow diagram F-20-600-A: Print Document.

FIG. 81 illustrates flow diagram F-20-600-A of FIG. 55 with screen diagram S-20-600-A.

Figure 56:
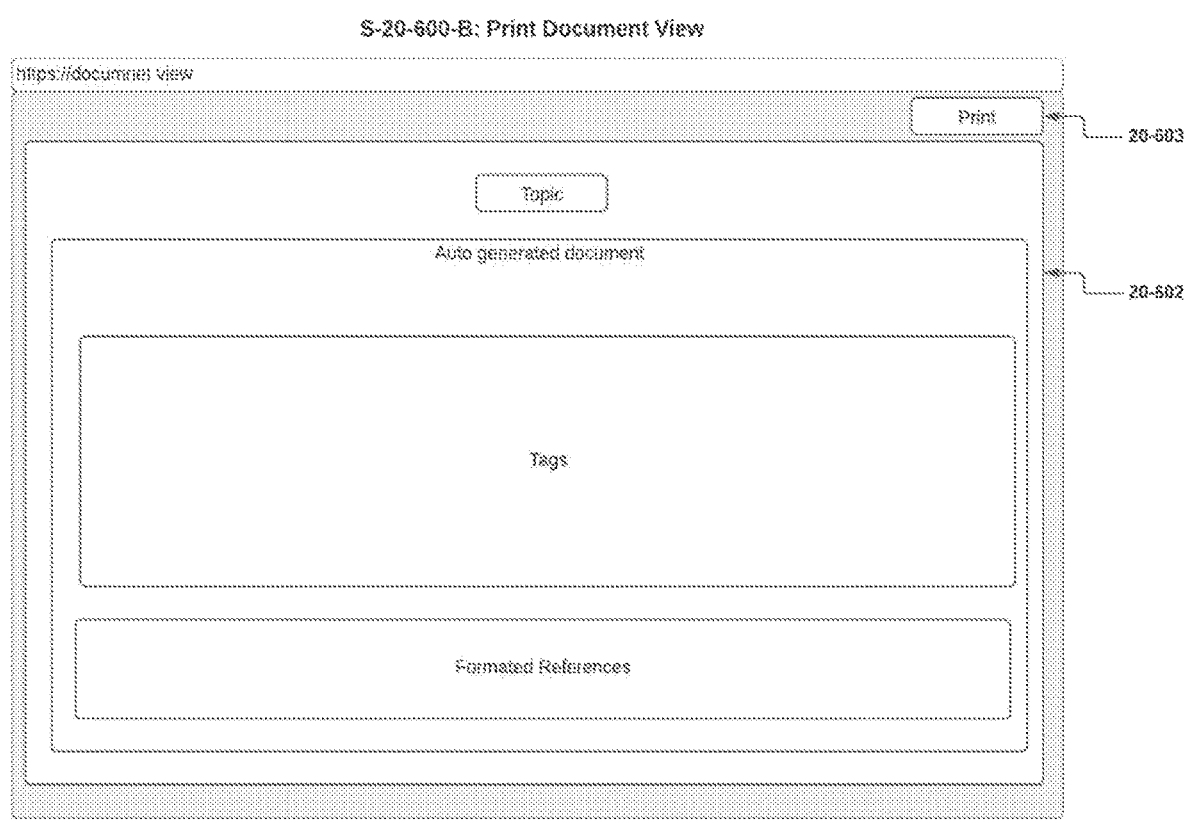
FIG. 56 illustrates screen diagram S-20-600-B: Print Document View.

FIG. 56 with screen diagram S-20-600-B is an illustrative screen display of document print page. User can view the document 20602 and print the document 20-603.

Figure 82:
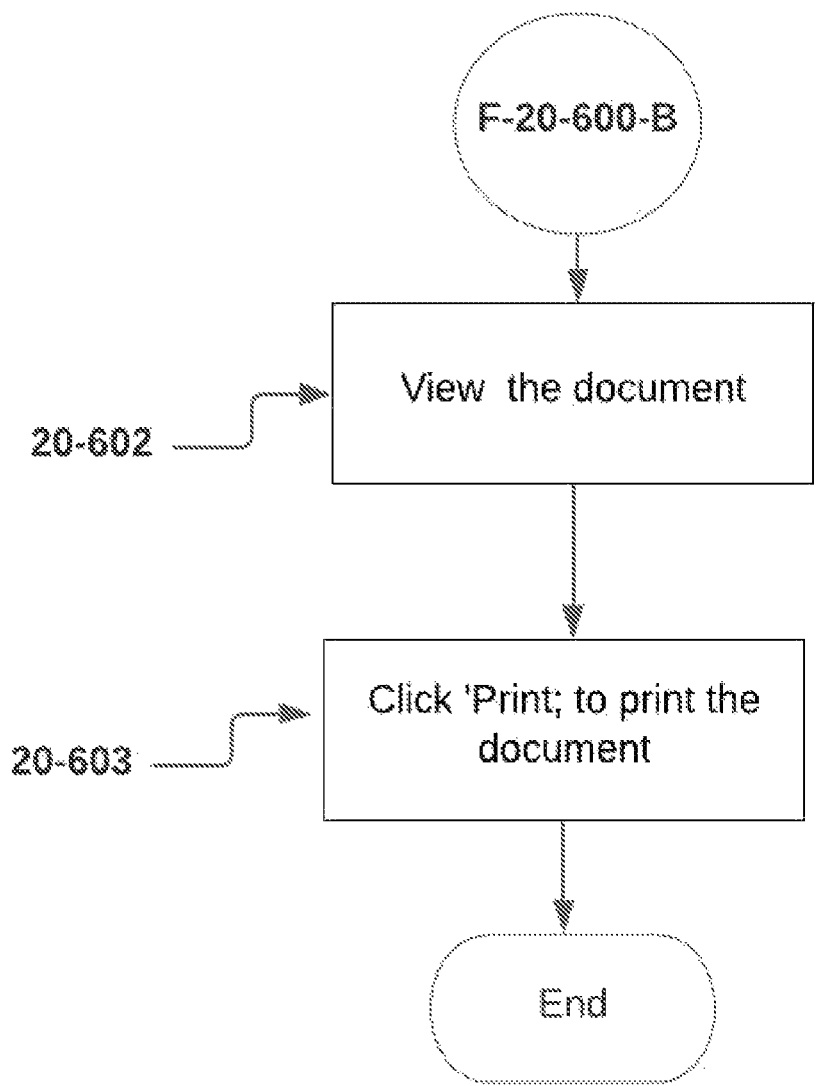
FIG. 82 illustrates flow diagram F-20-600-B: Print Document View.

FIG. 82 illustrates flow diagram F-20-600-B of FIG. 56 with screen diagram S-20-600-B.

Figure 57:
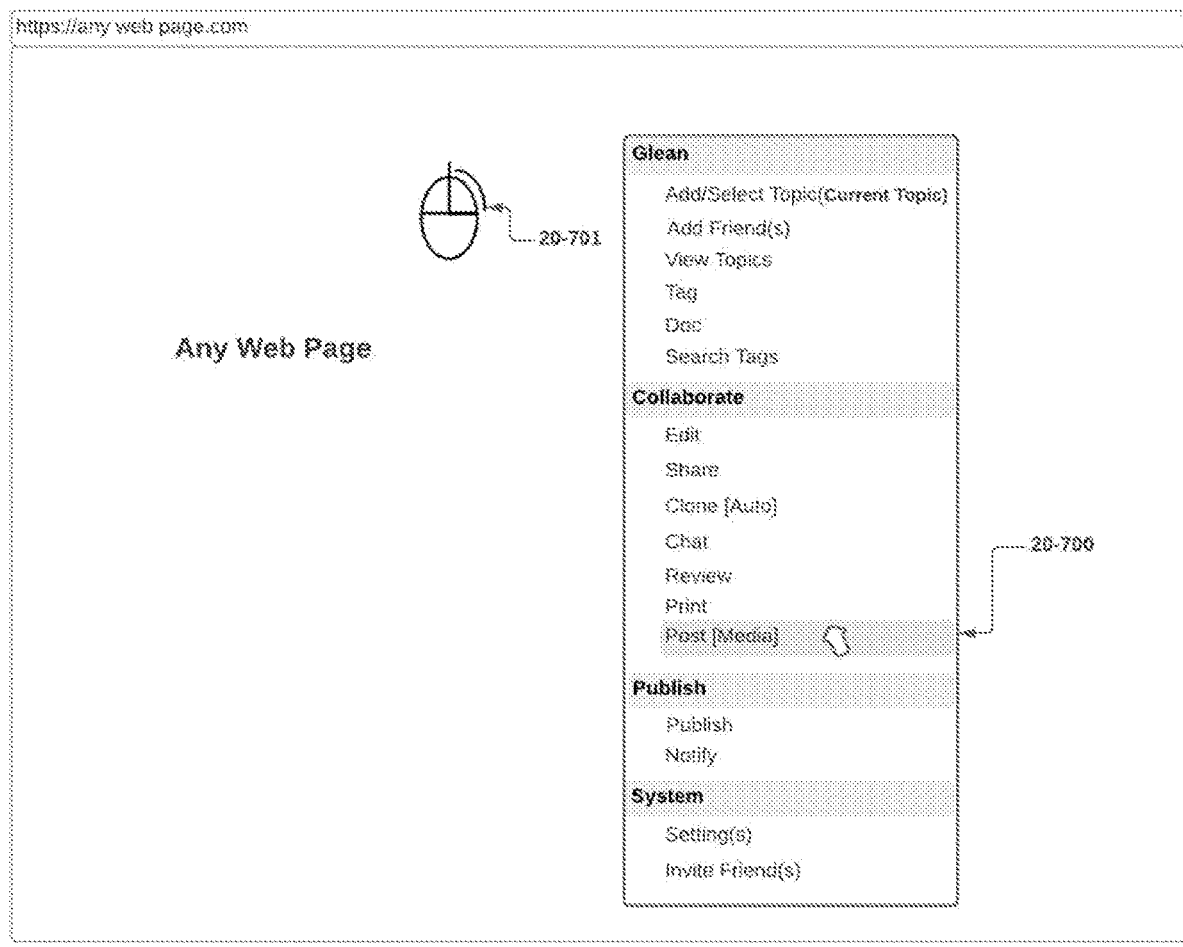
FIG. 57 illustrates screen diagram S-20-700-A: Auto Post Topic.

FIG. 57 with screen diagram S-20-700-A is an illustrative screen display of posting the topic document link in social media based on personalized setting on the selected topic. A topic must be selected as a pre-requisite to post the message. From any web page or any other document (example: WORD, EXCEL, PDF, etc.), the user can right click the mouse 20701 to view list of menu options FIG. 3 with main menu diagram S-00 for further action. User selects the menu "Post" 20-700. The topic will be posted in the social media.

Figure 83:
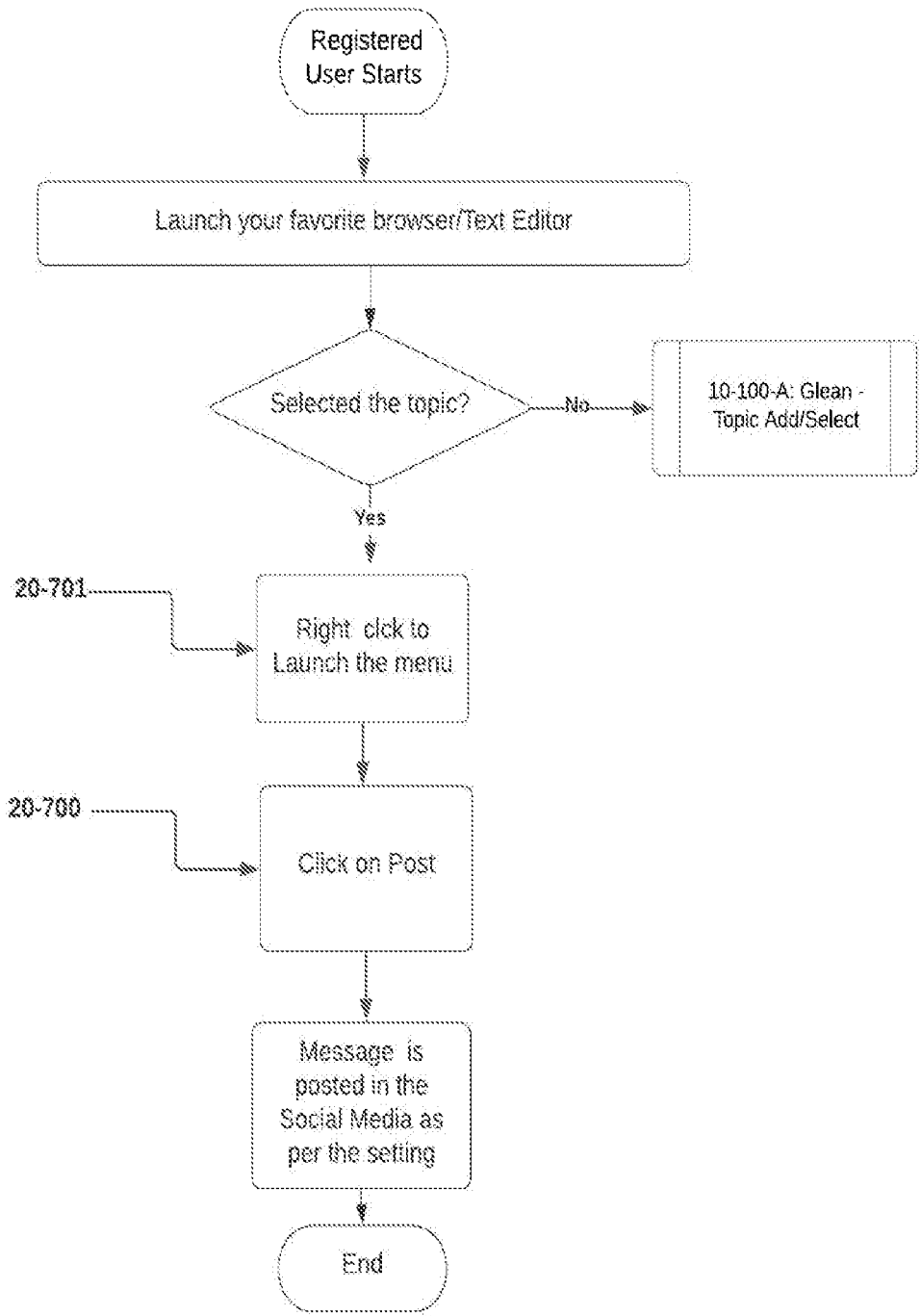
FIG. 83 illustrates flow diagram F-20-700-A: Auto Post Topic.

FIG. 83 illustrates flow diagram F-20-700-A of FIG. 57 with screen diagram S-20-700-A.

Figure 58:
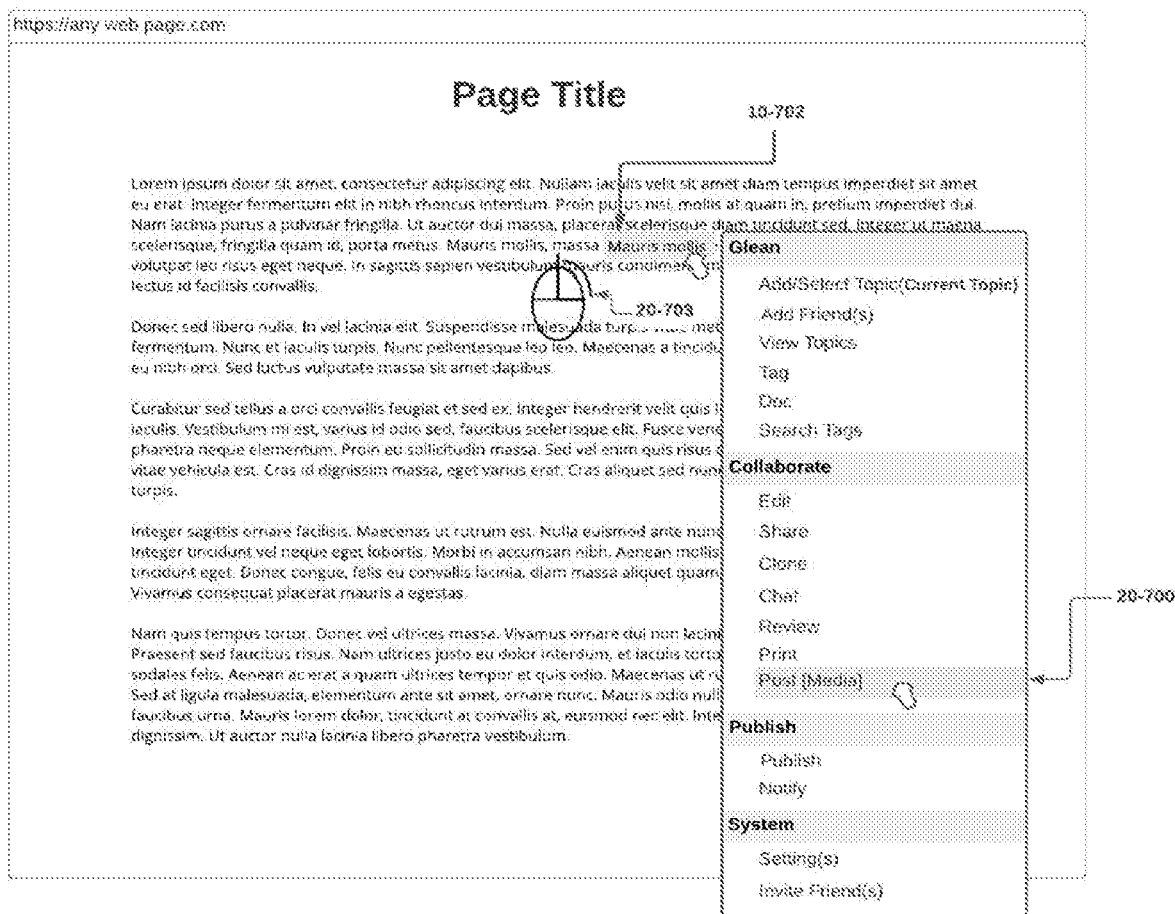
FIG. 58 illustrates screen diagram S-20-700-B: Post Text By Selection.

FIG. 58 with screen diagram S-20-700-B is an illustrative screen display of posting a message in in social media based on personalized setting on the selected topic. A topic must be selected as a pre-requisite to post the message. The user can select the text/content in the web page or in any other document (example: WORD, EXCEL, PDF, etc.) 20-702 and right click the mouse 20-703 to view list of menu options FIG. 3 with main menu diagram S-00 for further action. User selects the menu "Post" 20-700. The message will be posted in the social media.

Figure 84:
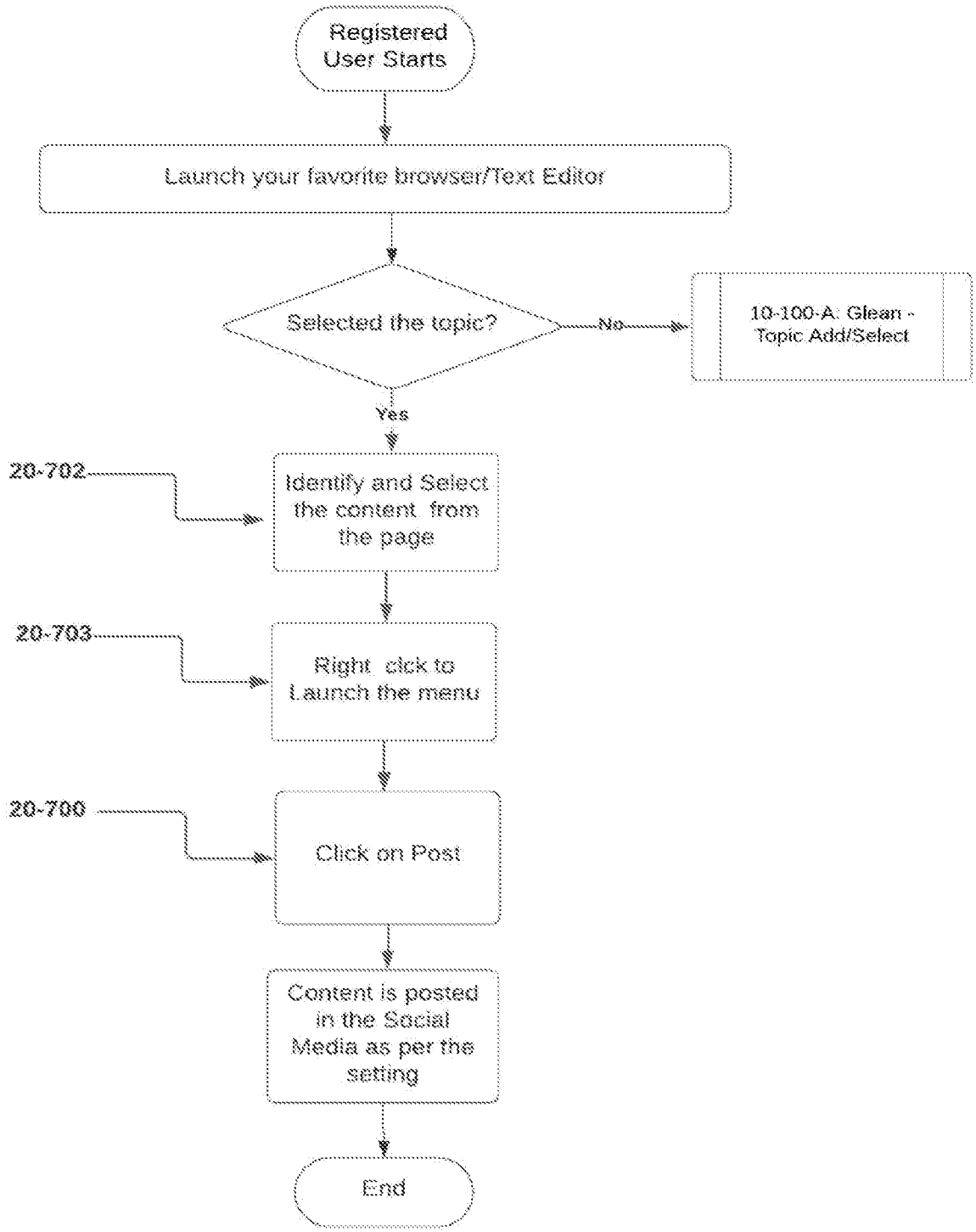
FIG. 84 illustrates flow diagram F-20-700-B: Post Text By Selection.

FIG. 84 illustrates flow diagram F-20-700-B of FIG. 58 with screen diagram S-20-700-B.

Figure 59:
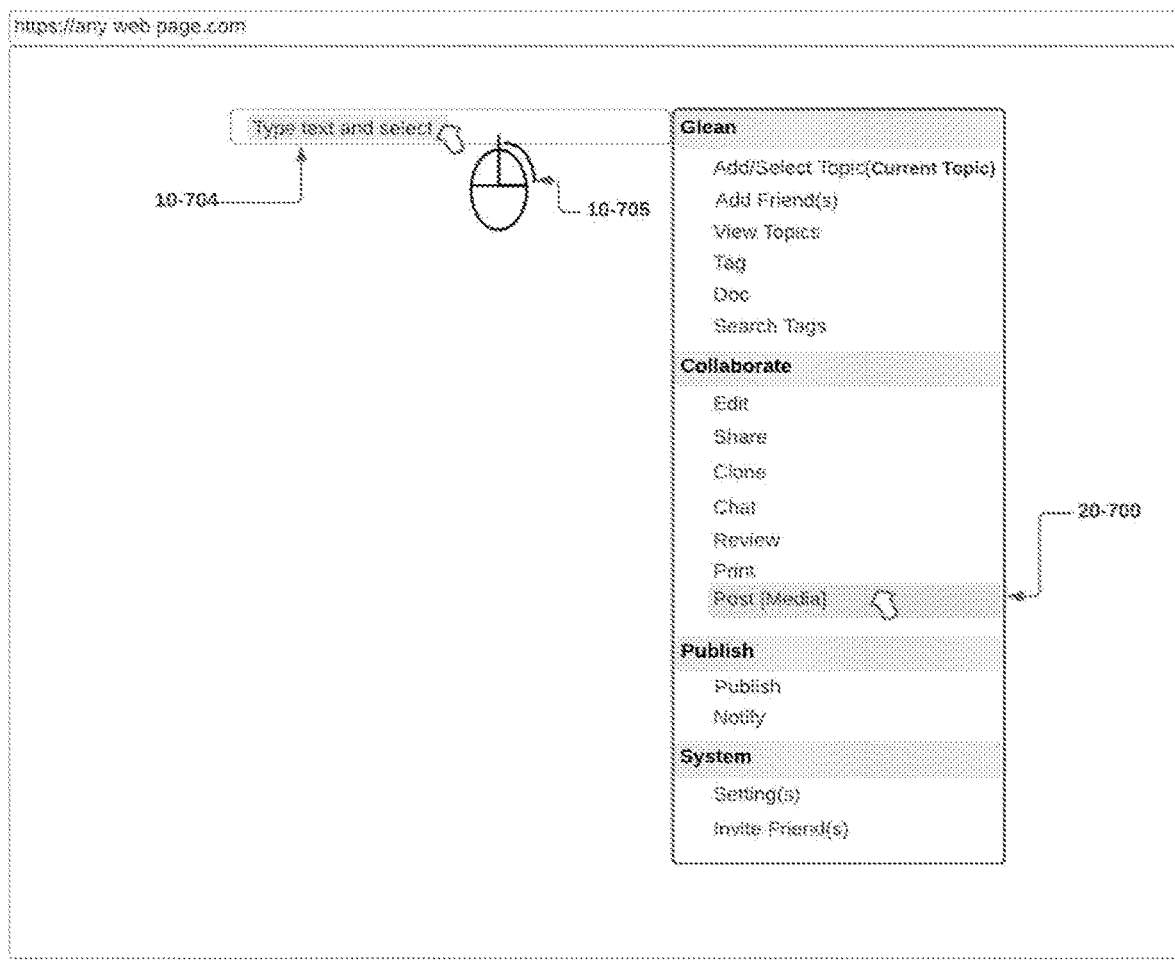
FIG. 59 illustrates screen diagram S-20-700-C: Post Text By Edit.

FIG. 59 with screen diagram S-20-700-C is an illustrative screen display of posting a message in in social media based on personalized setting on the selected topic. A topic must be selected as a pre-requisite to post the message. The user can type and select the text/message in any of the edit box in the web page or any other document (example: WORD, EXCEL, PDF, etc.) 20-704 and right click the mouse 20-705 to view list of menu options FIG. 3 with main menu diagram S-00 for further action.

User selects the menu "Post" 20-700. The message will be posted in the social media.

Figure 85:
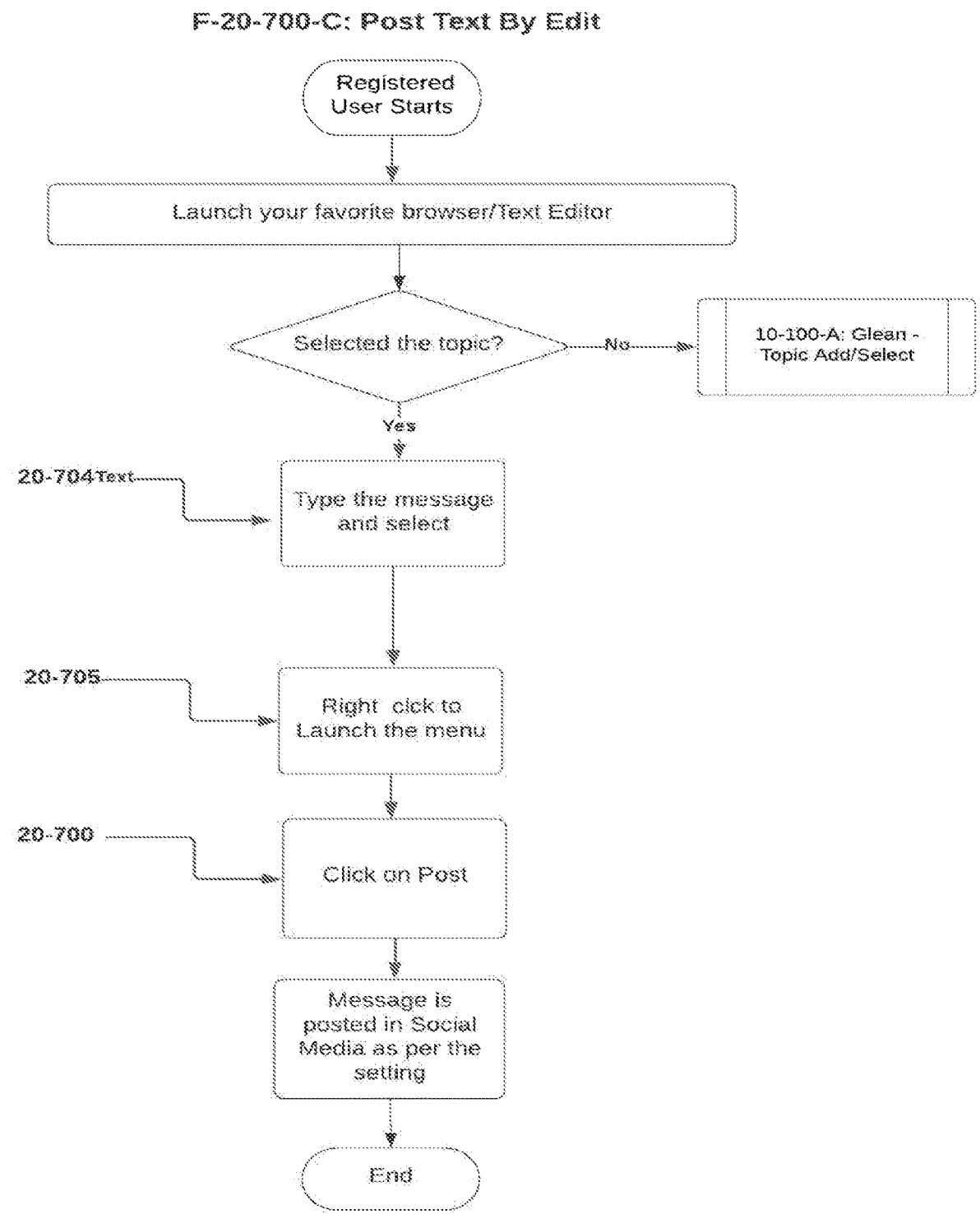
FIG. 85 illustrates flow diagram F-20-700-C: Post Text By Edit.

FIG. 85 illustrates flow diagram F-20-700-C of FIG. 59 with screen diagram S-20-700-C.

Figure 60:
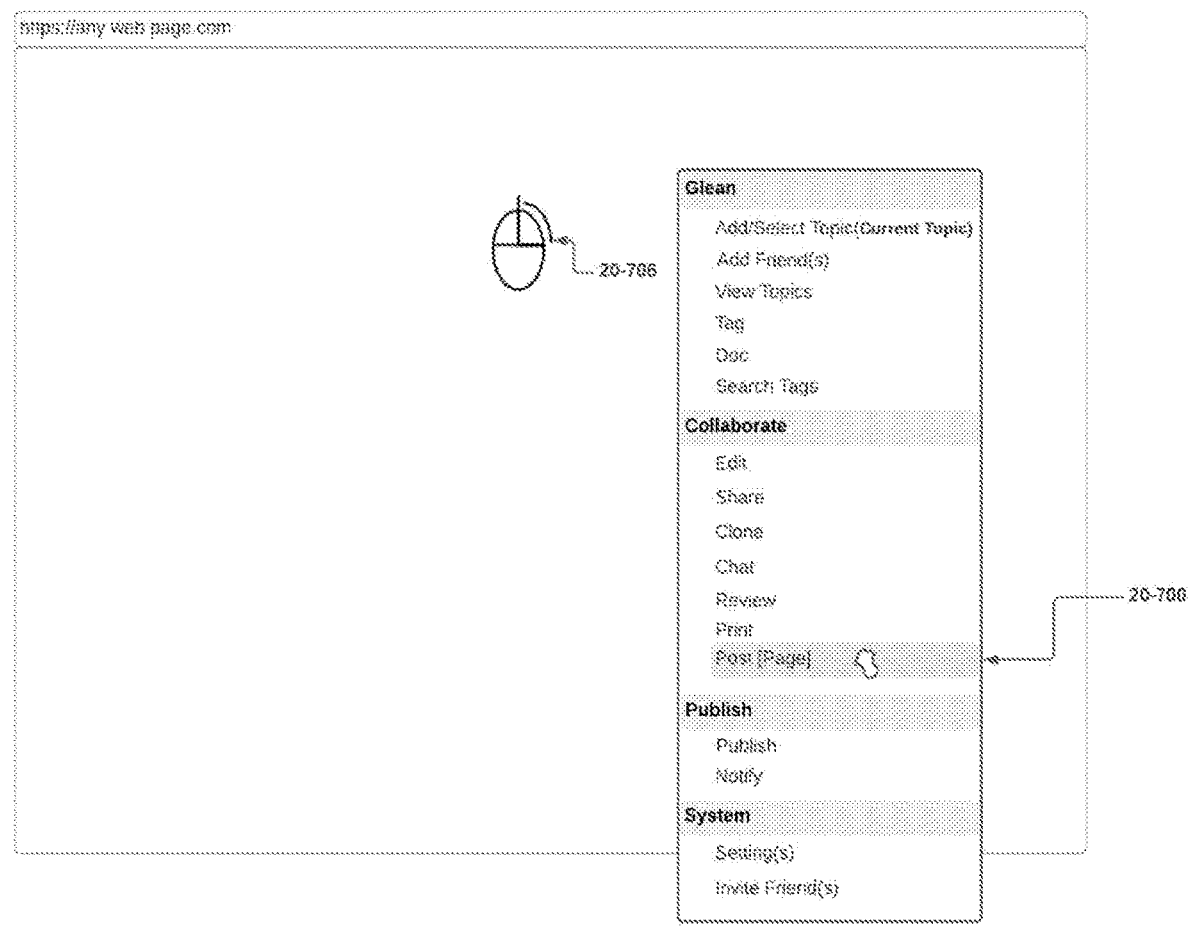
FIG. 60 illustrates screen diagram S-20-700-D: Collaborate—Post By Settings [Page].

FIG. 60 with screen diagram S-20-700-D is an illustrative screen display of posting a message function based on personalized setting on the selected topic. A topic must be selected as a pre-requisite to post the message. From any web page or any other document (example: WORD, EXCEL, PDF, etc.), the user can right click the mouse 20-706 to view list of menu options FIG. 3 with main menu diagram S-00 for further action. User selects the menu "Post" 20-700. The document page is displayed FIG. 61 with screen diagram S-20-700-E.

Figure 86:
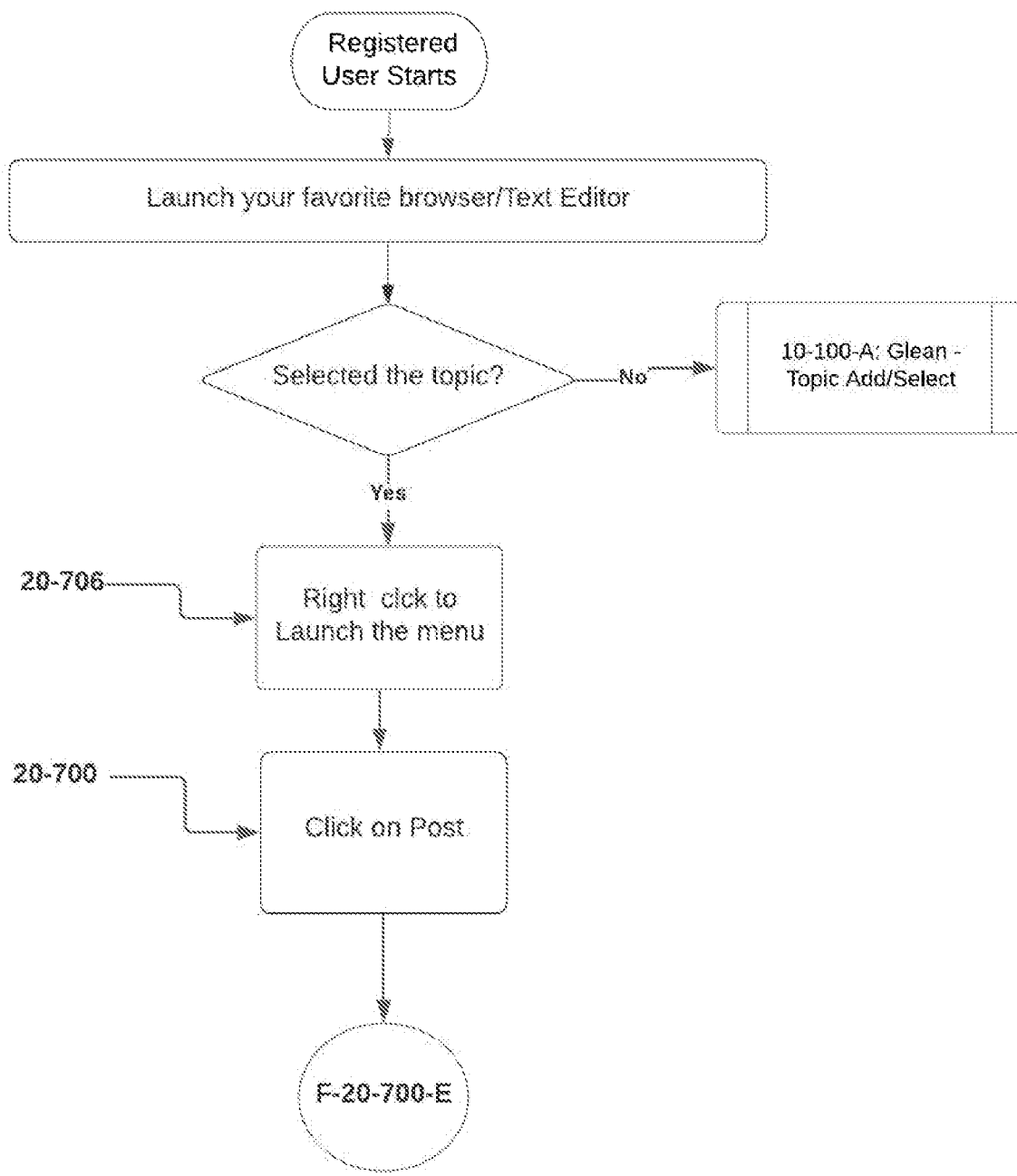
FIG. 86 illustrates flow diagram F-20-700-D: Collaborate—Post By Settings [Page].

FIG. 86 illustrates flow diagram F-20-700-D of FIG. 60 with screen diagram S-20-700-D.

Figure 61:
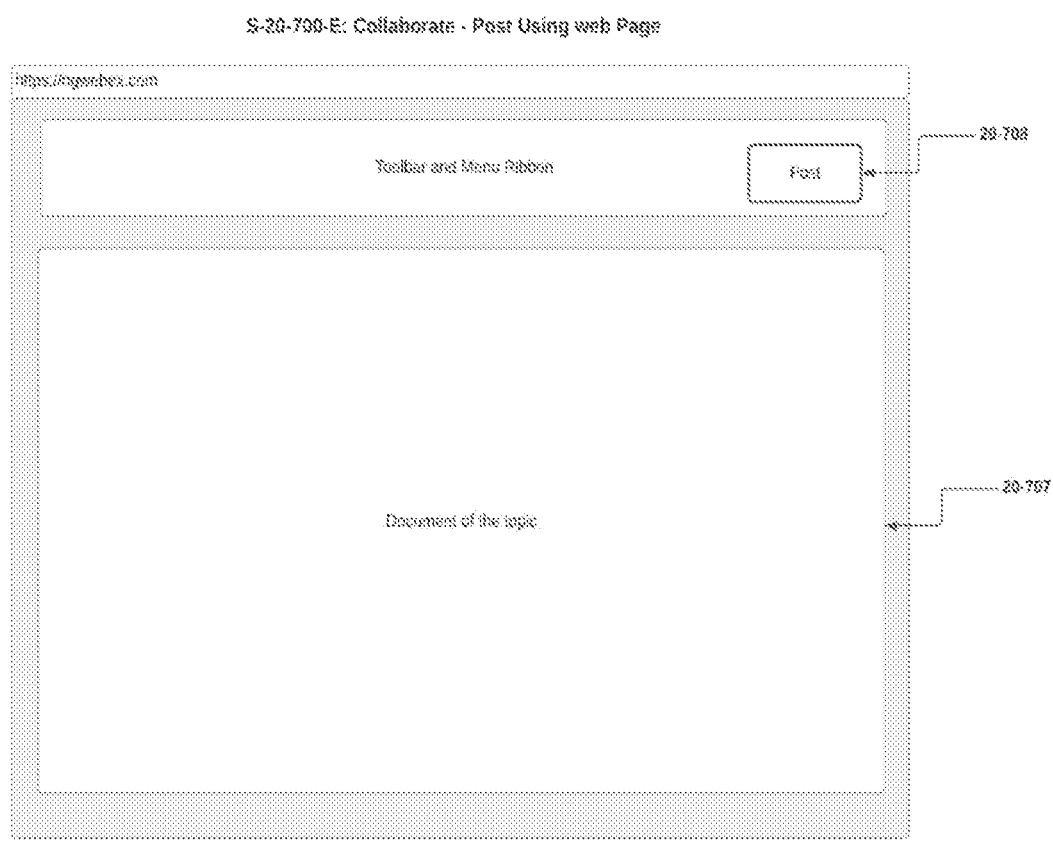
FIG. 61 illustrates screen diagram S-20-700-E: Collaborate—Post Using web Page.

FIG. 61 with screen diagram S-20-700-E is an illustrative screen display of posting a message page. User can view the document 20707 and post the message 20-708.

Figure 87:
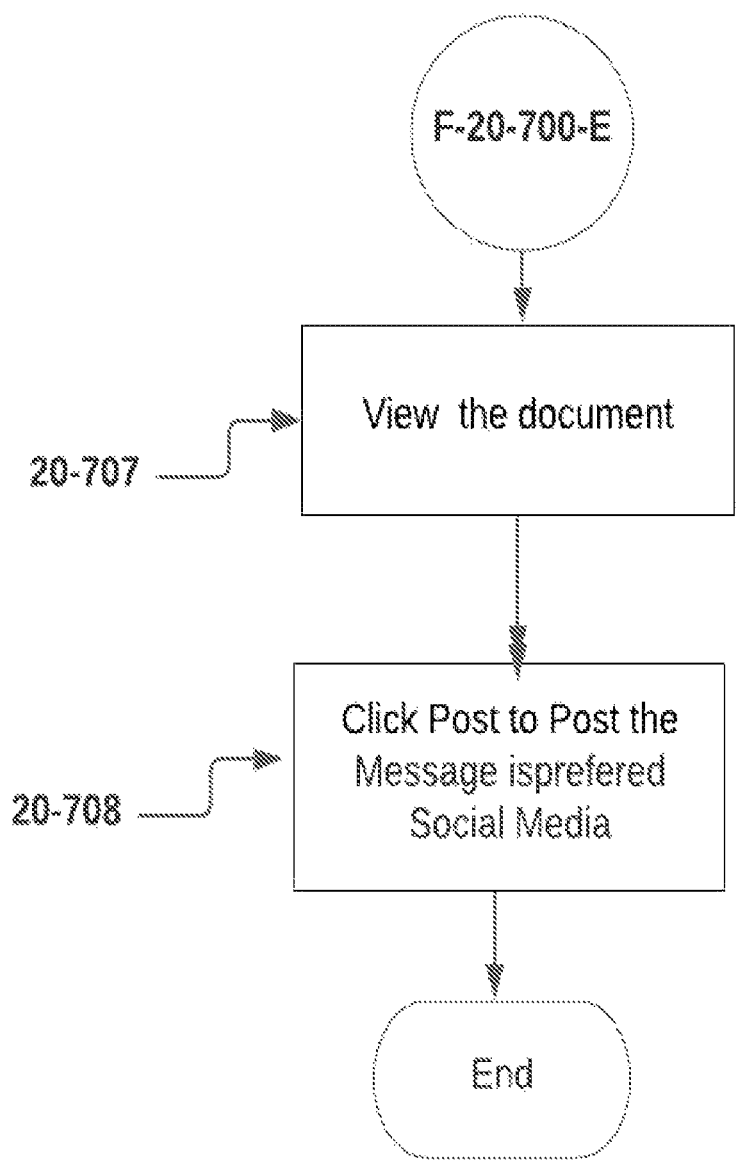
FIG. 87 illustrates flow diagram F-20-700-E: Collaborate—Post Using web Page.

FIG. 87 illustrates flow diagram F-20-700-E of FIG. 61 with screen diagram S-20-700-E.

Figure 62:
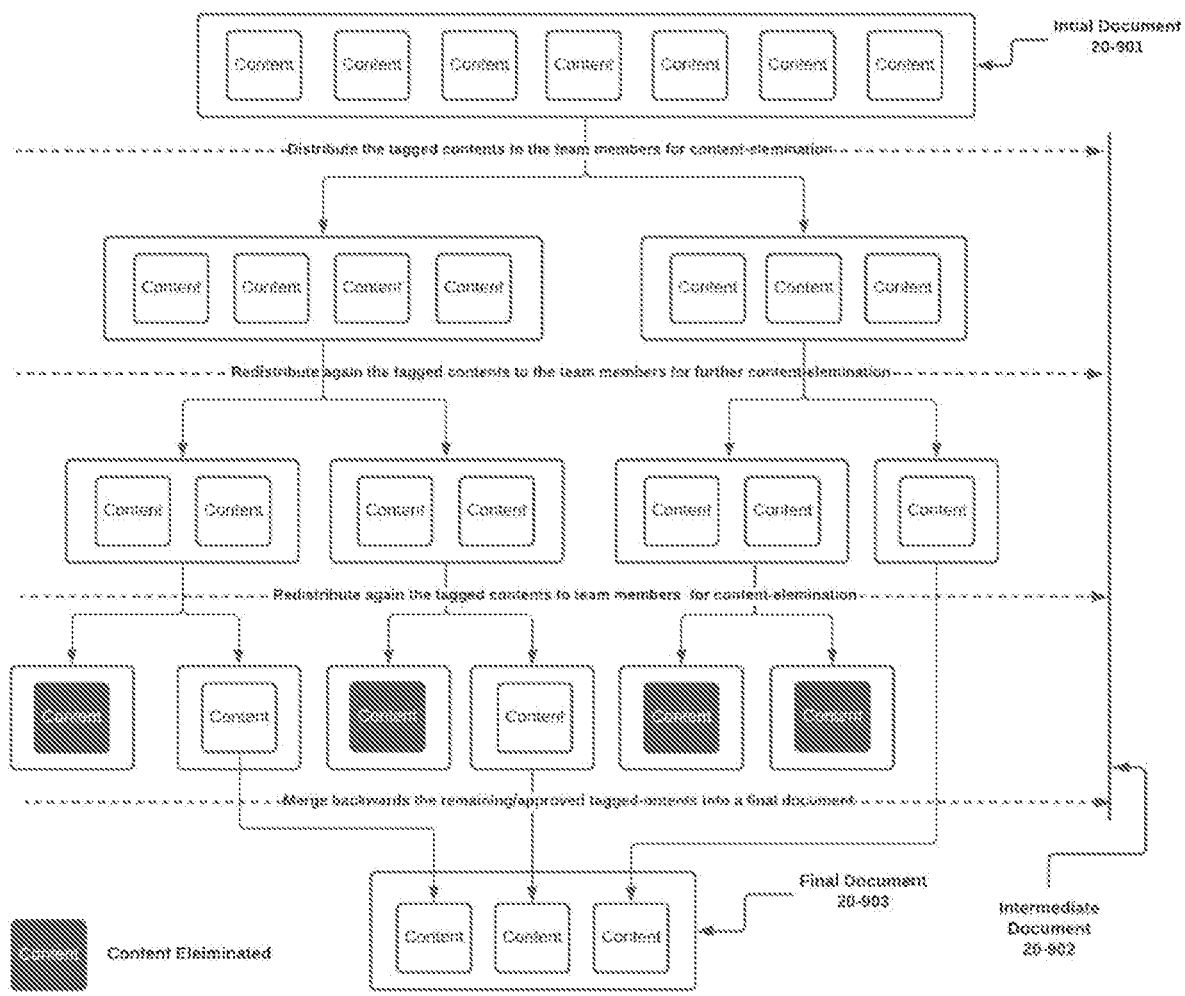
FIG. 62 illustrates screen diagram S-20-900: (Team)-Auto-Divide and Conquer (Distribute-Merge) Procedures.

FIG. 62 with screen diagram S-20-900 is an illustrative screen display of Divide and Conquer procedure. Recursively authorized team members can assign/re-assign the gleaned tags with meta data links to other team members for review. Assigned member can remove and/or update the tag. Assigned team members can further divide and distribute the tags to other team members for reviewing purpose. This process can be continued till the team members share the workload and complete the review process and have reviewed all the tags. All the reviewed tags can merge backwards recursively to build the final document.

Figure 88:
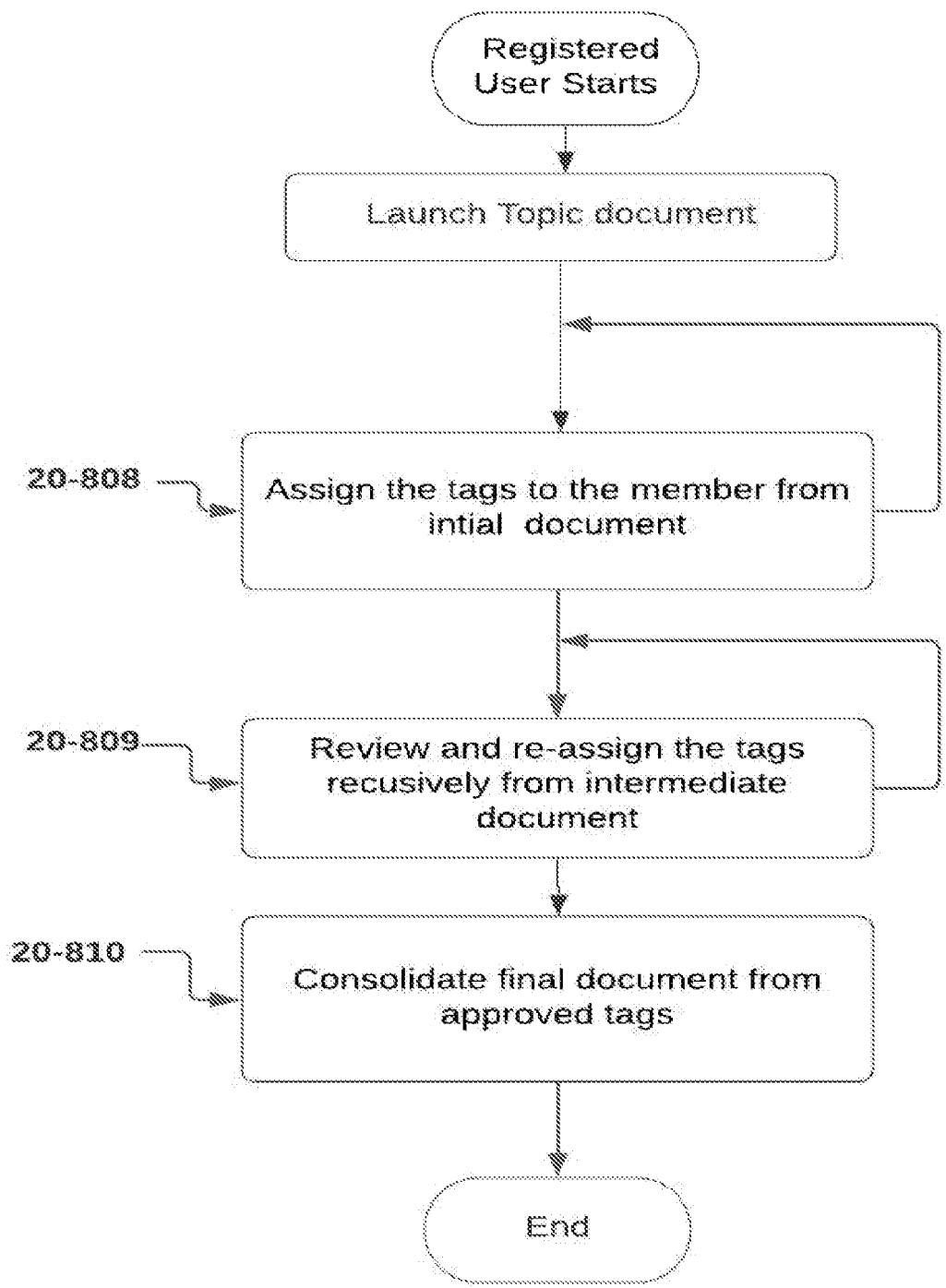
FIG. 88 illustrates flow diagram F-20-900: (Team)-Auto-Divide and Conquer (Distribute-Merge) Procedures.

FIG. 88 illustrates flow diagram F-20-900 of FIG. 62 with screen diagram S-20-900.

Publishing

Figure 89:
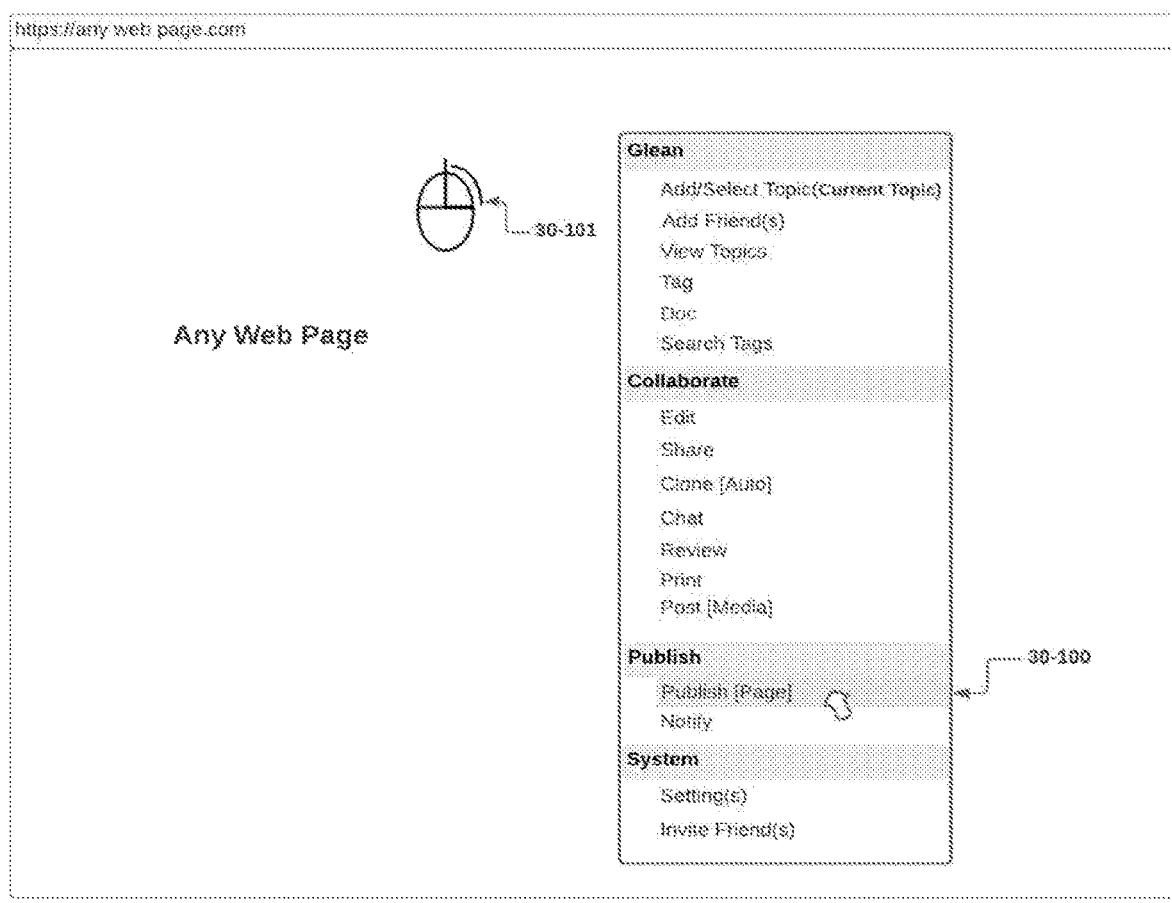
FIG. 89 illustrates screen diagram S-30-100-A: Publish—Auto Publish Topic Document By Settings [Edit/Review Page].

FIG. 89 with screen diagram S-30-100-A is an illustrative screen display of the publishing the document to the team/public from the system web page for the selected topic. A topic must be selected as a pre-requisite to publish the document. From any web page or any other document (example: WORD, EXCEL, PDF, etc.), the user can right click the mouse 30101 to view list of menu options FIG. 3 with main menu diagram S-00 for further action. User selects the menu "Publish" 30-100. The document page is displayed FIG. 90 with screen diagram S-30-100-B.

Figure 99:
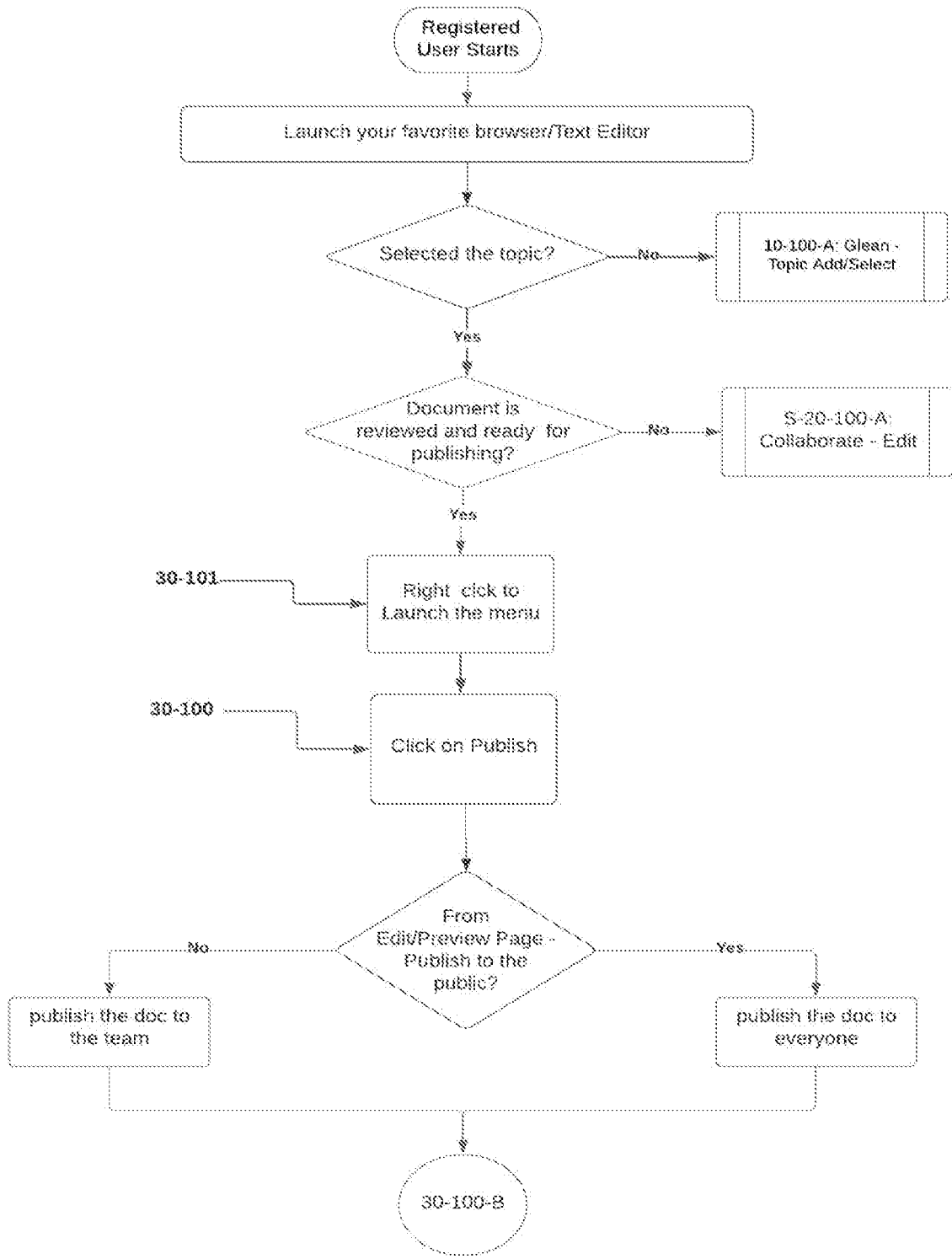
FIG. 99 illustrates flow diagram F-30-100-A: Publish—Auto Publish Topic Document By Settings [Edit/Review Page].

FIG. 99 illustrates flow diagram F-30-100-A of FIG. 89 with screen diagram S-30-100-A.

Figure 90:
FIG. 90 illustrates screen diagram S-30-100-B: Publish—Publish Using web Page.

FIG. 90 with screen diagram S-30-100-B is an illustrative screen display of viewing and publishing the document for the selected topic. User can view/review the document 30-102. Once the user reviewed the document, he/she can publish the document 10-103.

Figure 100:
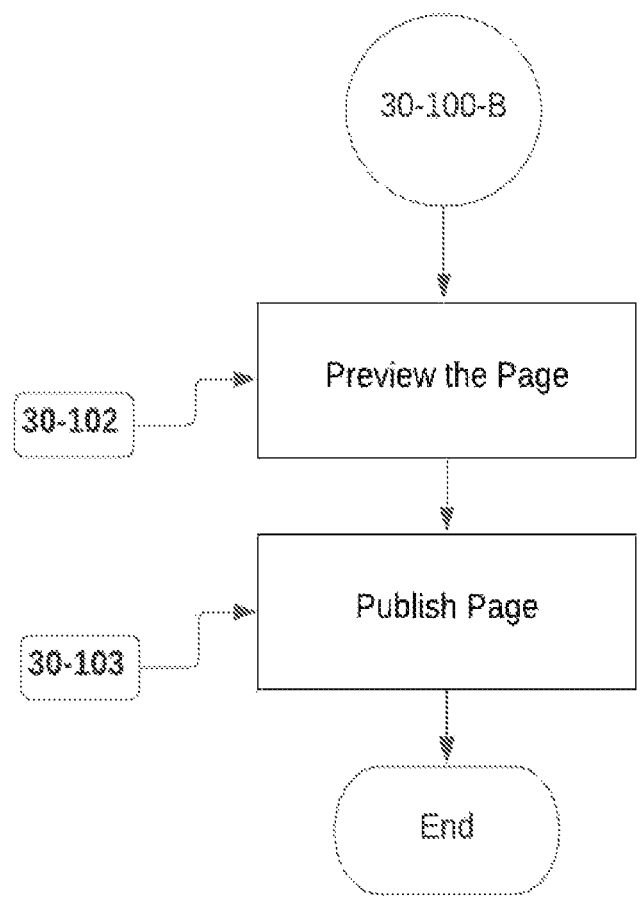
FIG. 100 illustrates flow diagram F-30-100-B: Publish—Publish Using web Page.

FIG. 100 illustrates flow diagram F-30-100-B of FIG. 90 with screen diagram S-30-100-B.

Figure 91:
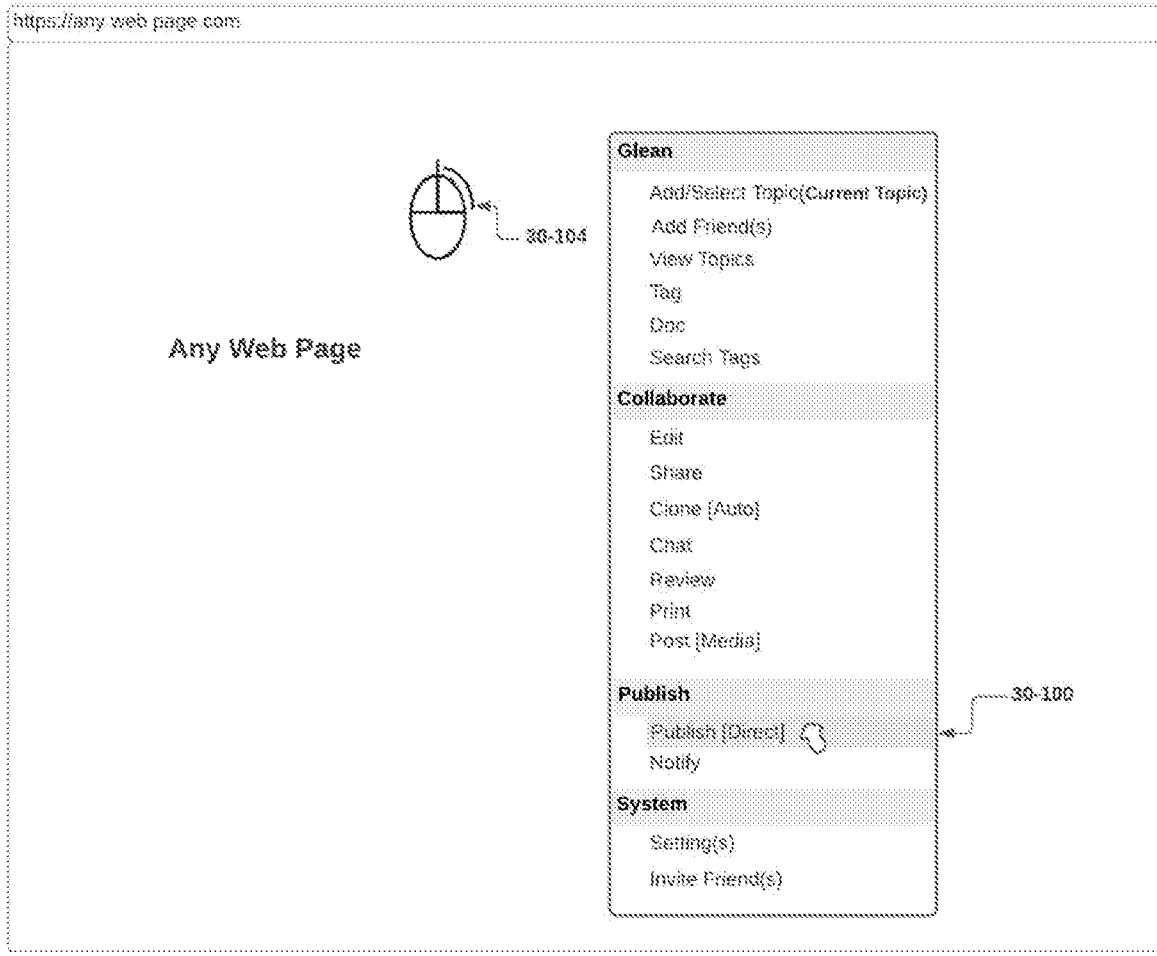
FIG. 91 illustrates screen diagram S-30-100-C: Publish—Auto Publish Topic Document By Settings [Direct/Goto Published Page].

FIG. 91 with screen diagram S-30-100-C is an illustrative screen display of the publishing the document to the team/public from any web page/document for the selected topic. A topic must be selected as a pre-requisite to publish the document. From any web page or any other document (example: WORD, EXCEL, PDF, etc.), the user can right click the mouse 30-104 to view list of menu options FIG. 3 with main menu diagram S-00 for further action. User selects the menu "Publish" 30-100.

Figure 92:
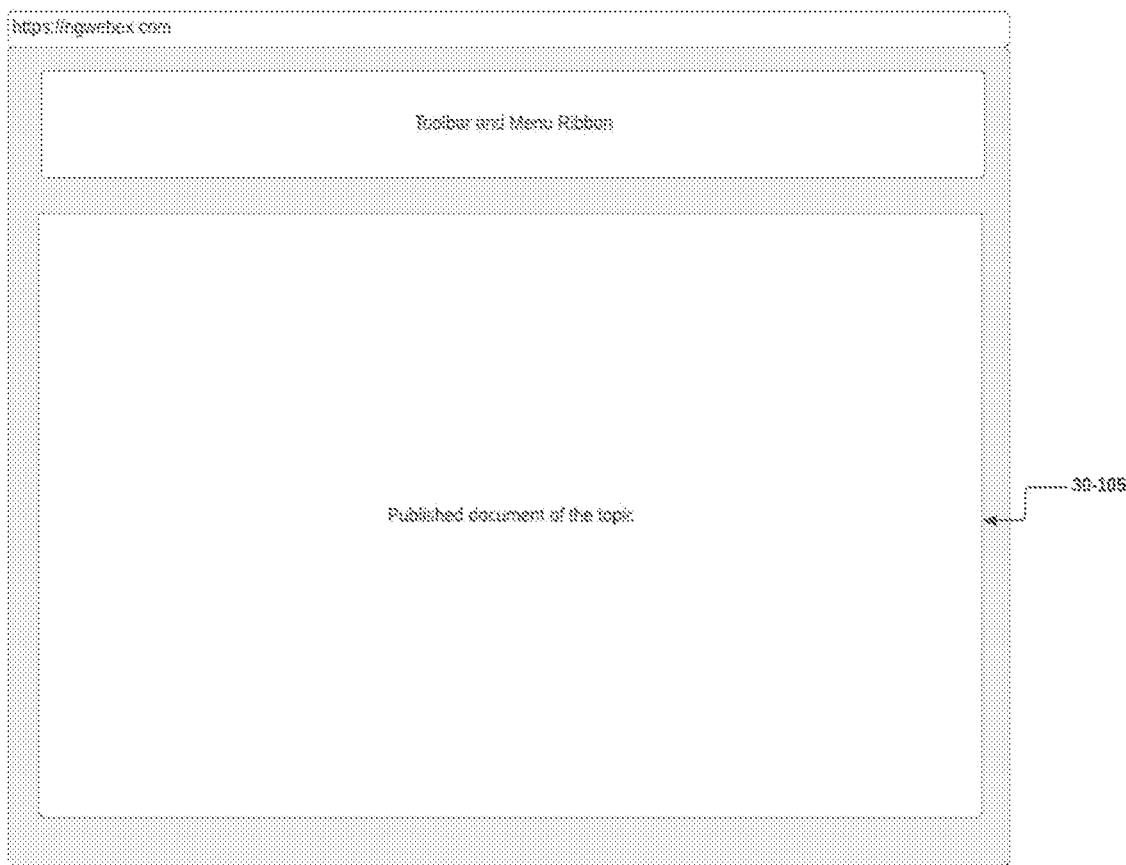
FIG. 92 illustrates screen diagram S-30-100-D: Publish—Published Page.

The document will be published, and the page is displayed FIG. 92 with screen diagram S-30-100-D.

Figure 101:
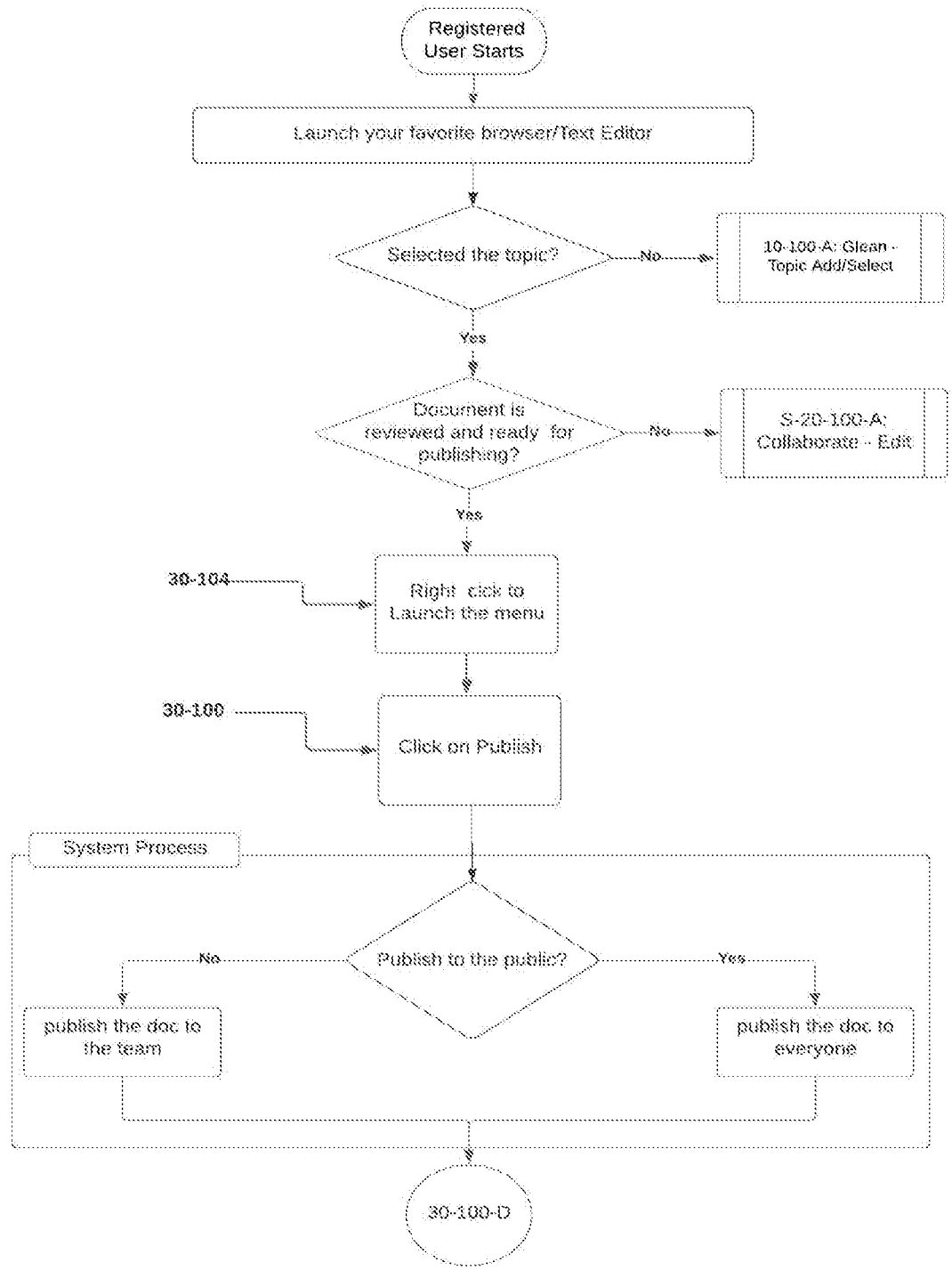
FIG. 101 illustrates flow diagram F-30-100-C: Publish—Auto Publish Topic Document By Settings [Direct/Goto Published Page].

FIG. 101 illustrates flow diagram F-30-100-C of FIG. 91 with screen diagram S-30-100-C.

FIG. 92 with screen diagram S-30-100-D is an illustrative screen display of viewing the published document for the selected topic. User can view the published document 30-105.

Figure 102:
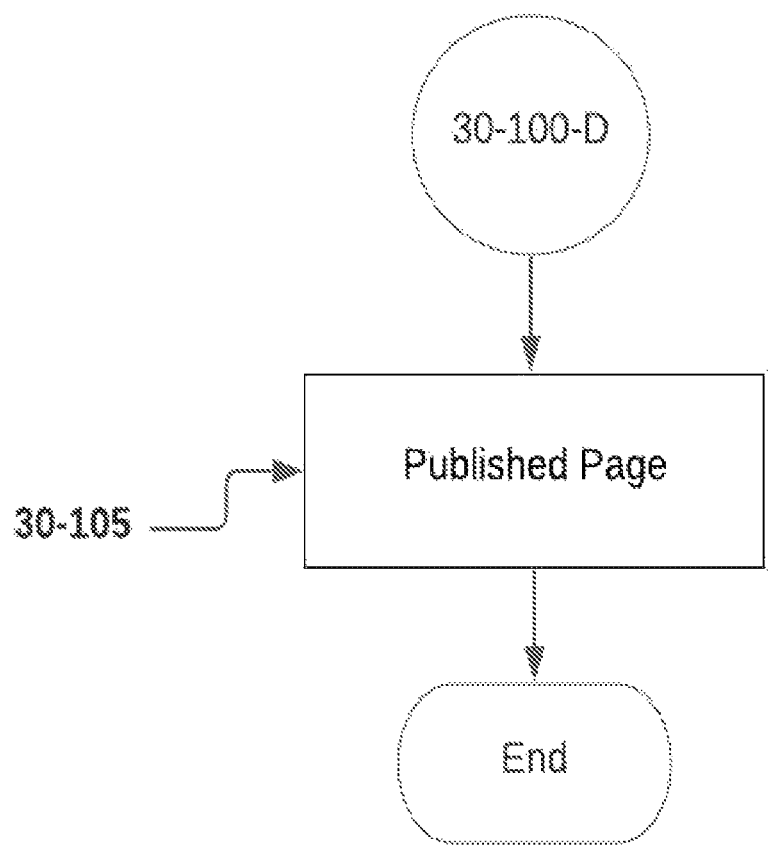
FIG. 102 illustrates flow diagram F-30-100-D: Publish—Published Page.

FIG. 102 illustrates flow diagram F-30-100-D of FIG. 92 with screen diagram S-30-100-D.

Figure 93:
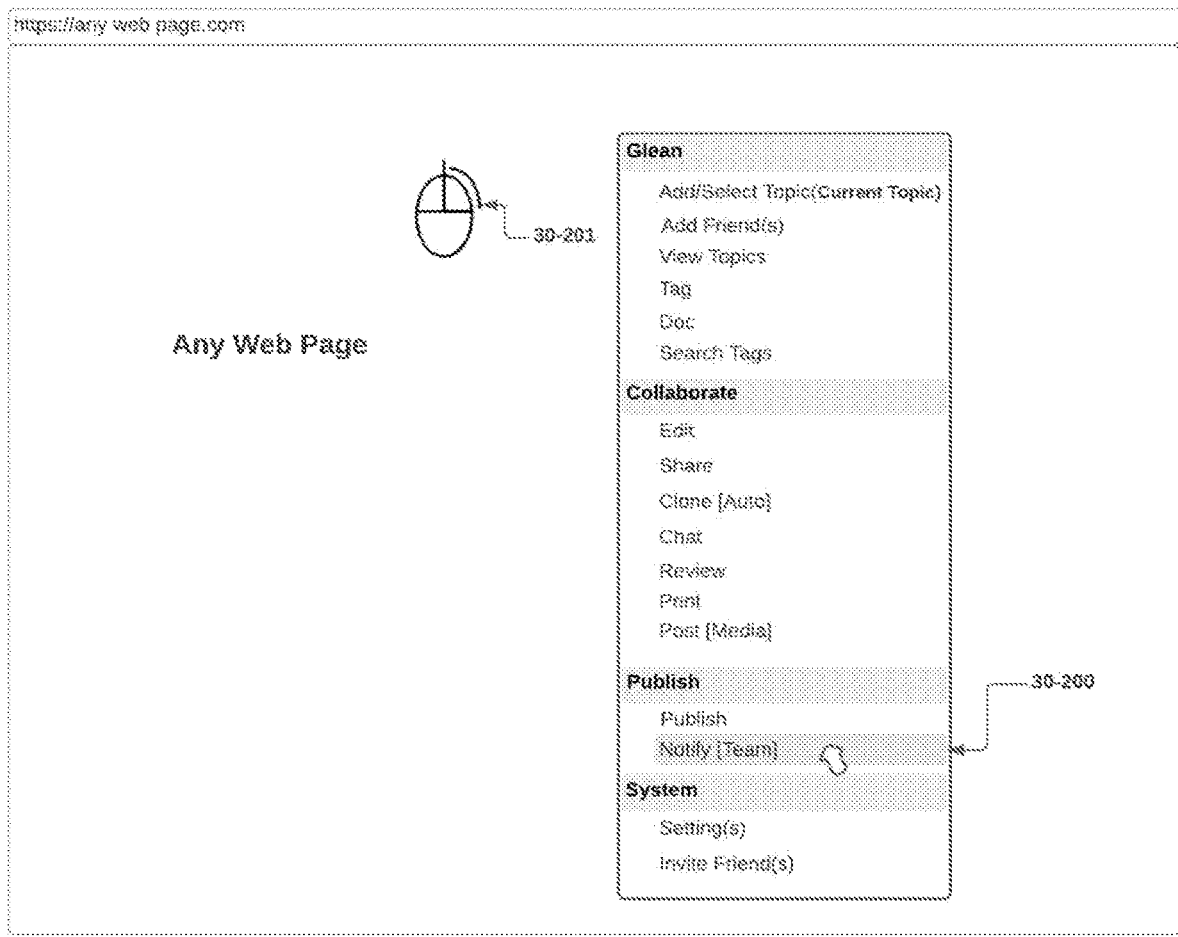
FIG. 93 illustrates screen diagram S-30-200-A: Publish—Auto Notify [Email/Phone] Topic Publication To The Team.

FIG. 93 with screen diagram S-30-200-A is an illustrative screen display of notifying the team (based on personalized setting) once the document is published. A topic must be selected as a pre-requisite to notify the team. From any web page or any other document (example: WORD, EXCEL, PDF, etc.), the user can right click the mouse 30-201 to view list of menu options FIG. 3 with main menu diagram S-00 for further action. User selects the menu "Email/Phone/Notify" 30-200. A notification will be sent to the team based on pre-defined notification template to as per settings.

Figure 103:
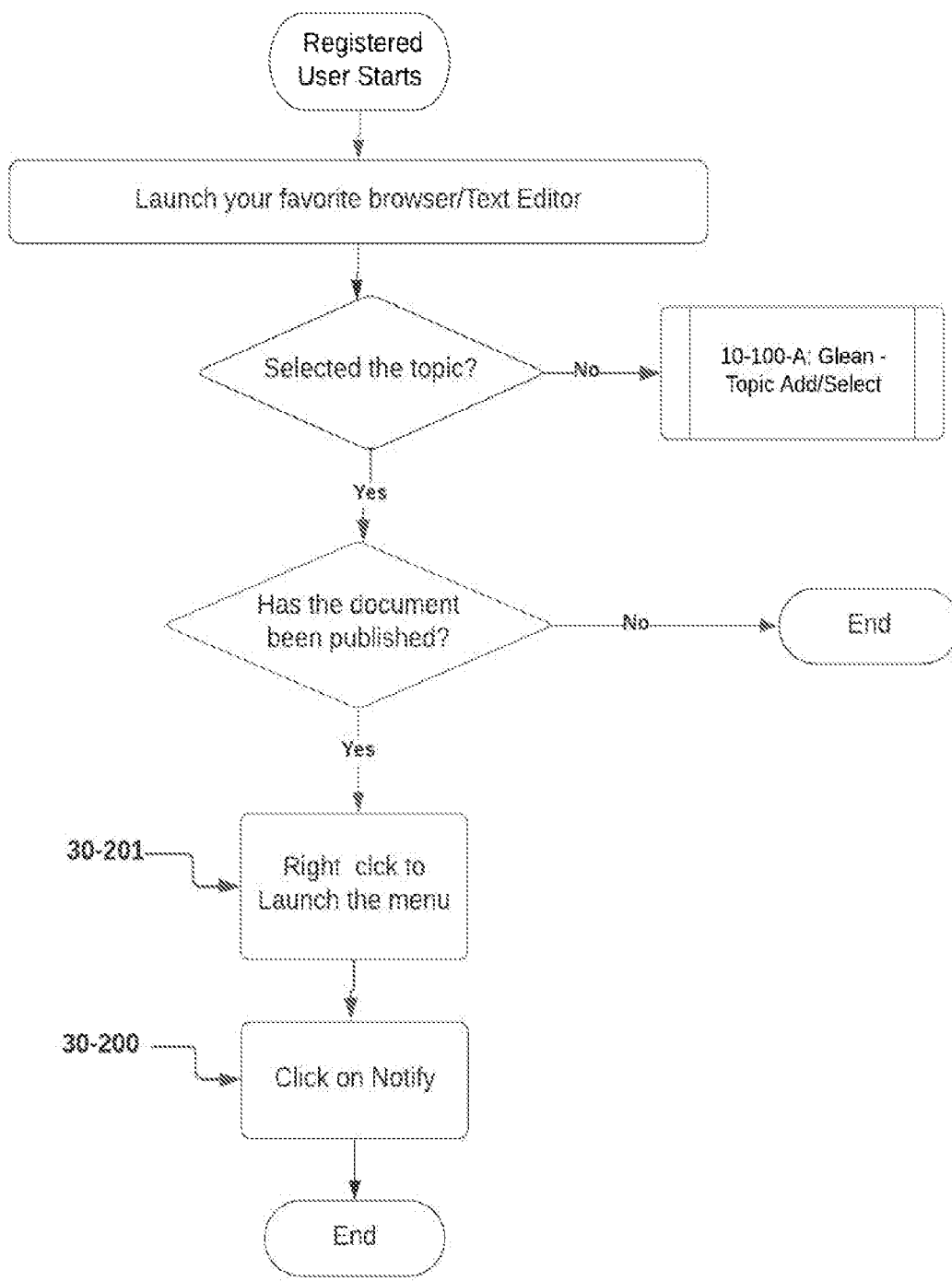
FIG. 103 illustrates flow diagram F-30-200-A: Publish—Auto Notify [Email/Phone] Topic Publication To The Team.

FIG. 103 illustrates flow diagram F-30-200-A of FIG. 93 with screen diagram S-30-200-A.

Figure 94:
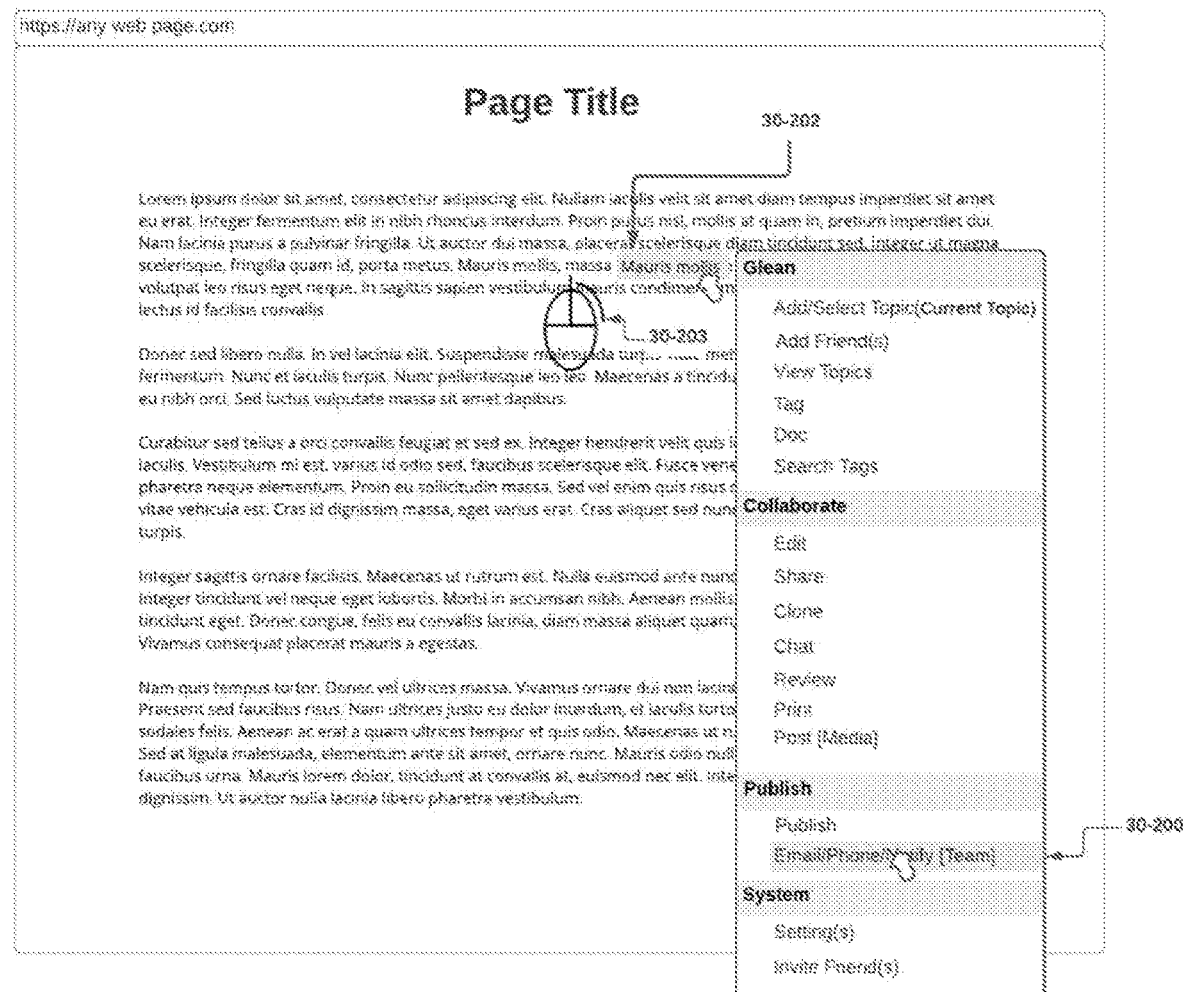
FIG. 94 illustrates screen diagram S-30-200-B: Publish—Notify Team Via Email/Phone The Publication With Content By Selection.

FIG. 94 with screen diagram S-30-200-B is an illustrative screen display of notifying the team (based on personalized setting) once the document is published. A topic must be selected as a pre-requisite to notify the team. The user can and select the notification text/content from web page or any other document (example: WORD, EXCEL, PDF, etc.) 30-202 and right click the mouse 30-204 to view list of menu options FIG. 3 with main menu diagram S-00 for further action. User selects the menu "Email/Phone/Notify" 30-200. A notification will be sent to the team based on selected text/content.

Figure 104:
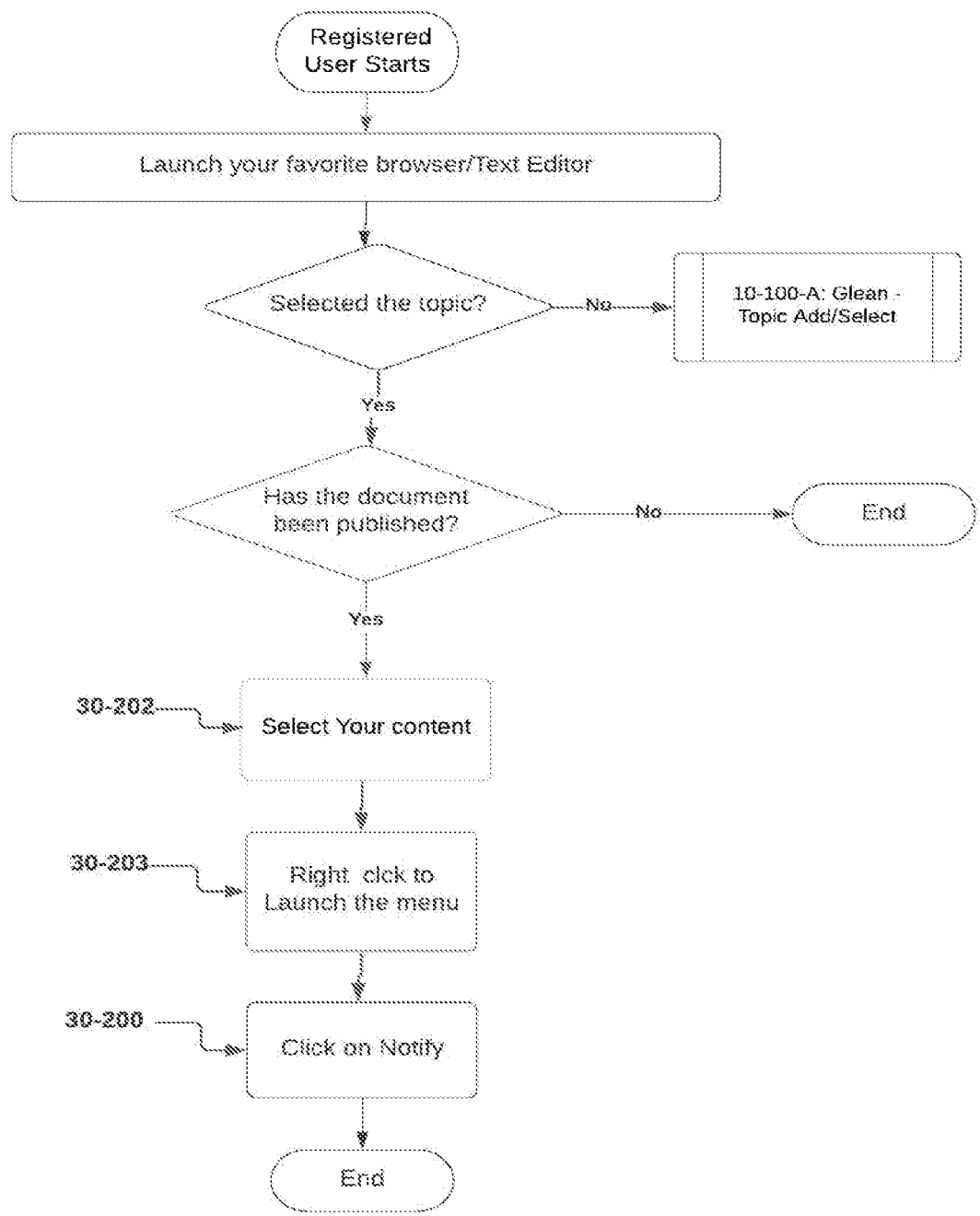
FIG. 104 illustrates flow diagram F-30-200-B: Publish—Notify Team Publication With Content By Selection.

FIG. 104 illustrates flow diagram F-30-200-B of FIG. 94 with screen diagram S-30-200-B.

Figure 95:
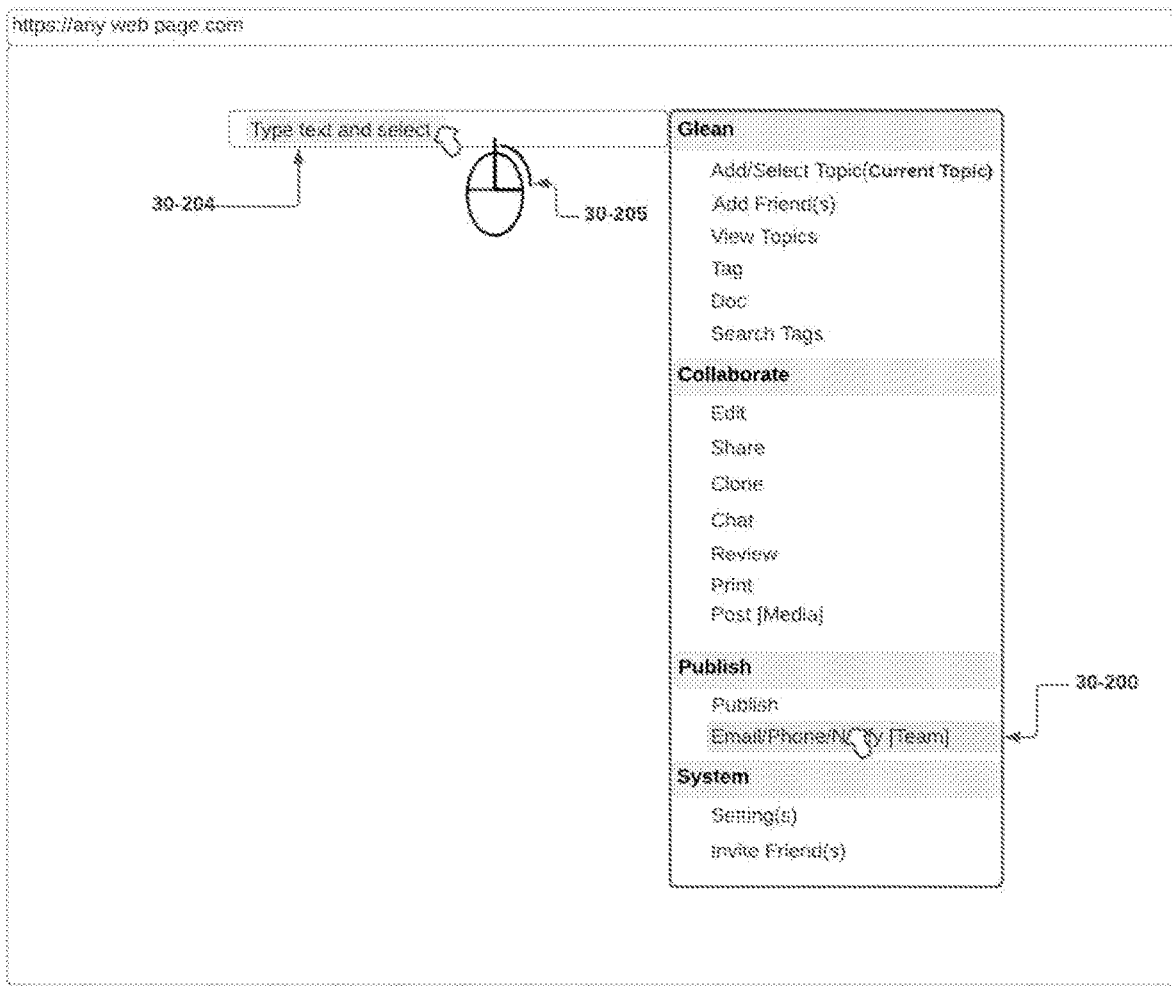
FIG. 95 illustrates screen diagram S-30-200-C: Publish—Notify Team Via Email/Phone Publication With Text By Typing.

FIG. 95 with screen diagram S-30-200-C is an illustrative screen display of notifying the team (based on personalized setting) once the document is published. A topic must be selected as a pre-requisite to notify the team. The user can type and select the notification message/text in any of the available text box/text editor from web page or any other document (example: WORD, EXCEL, PDF, etc.) 30-204 and right click the mouse 30-205 to view list of menu options FIG. 3 with main menu diagram S-00 for further action. User selects the menu "Email/Phone/Notify" 30-200. A notification will be sent to the team.

Figure 105:
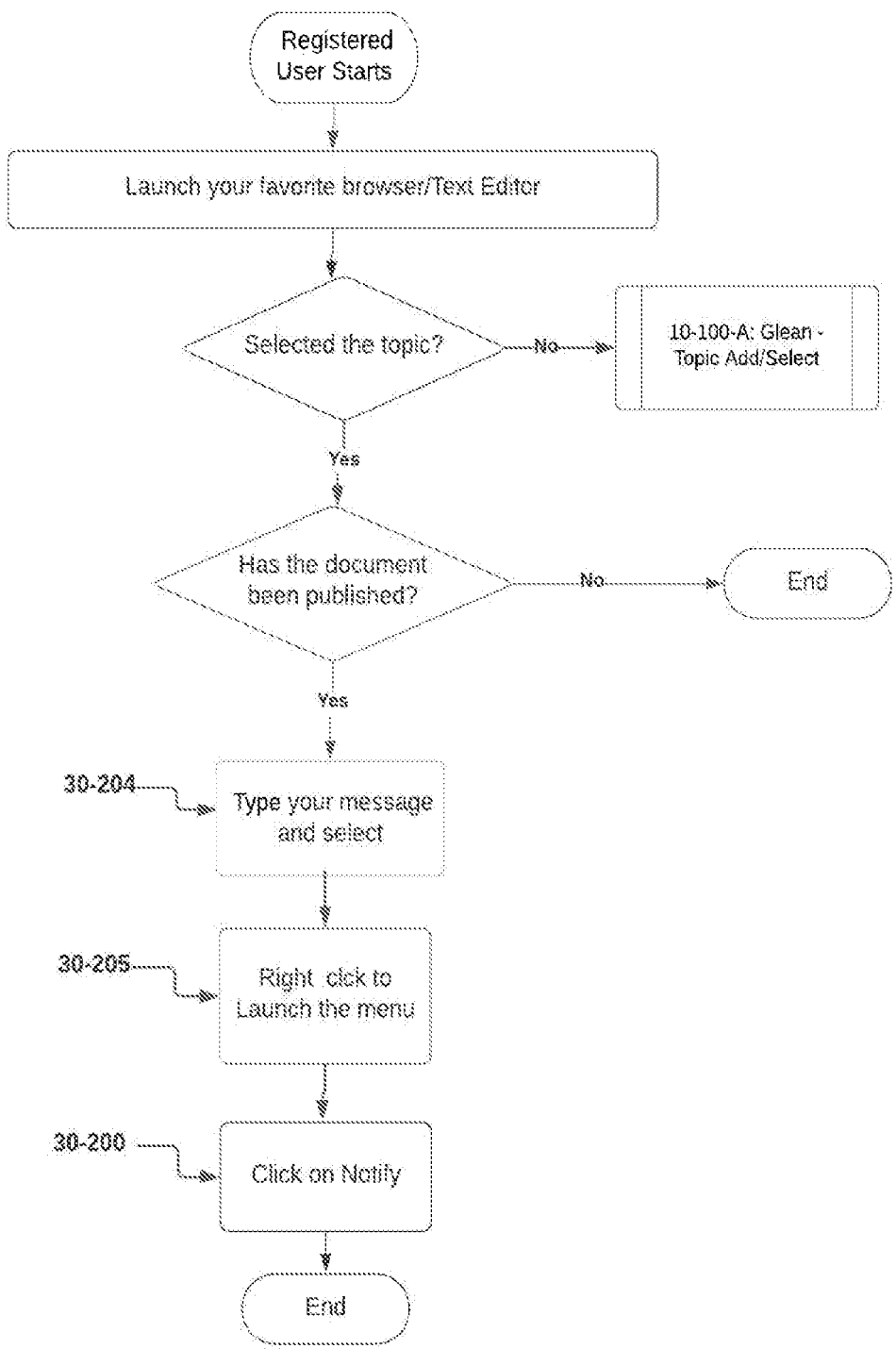
FIG. 105 illustrates flow diagram F-30-200-C: Publish—Notify Publication With Text By Typing.

FIG. 105 illustrates flow diagram F-30-200-C of FIG. 95 with screen diagram S-30-200-C.

Figure 96:
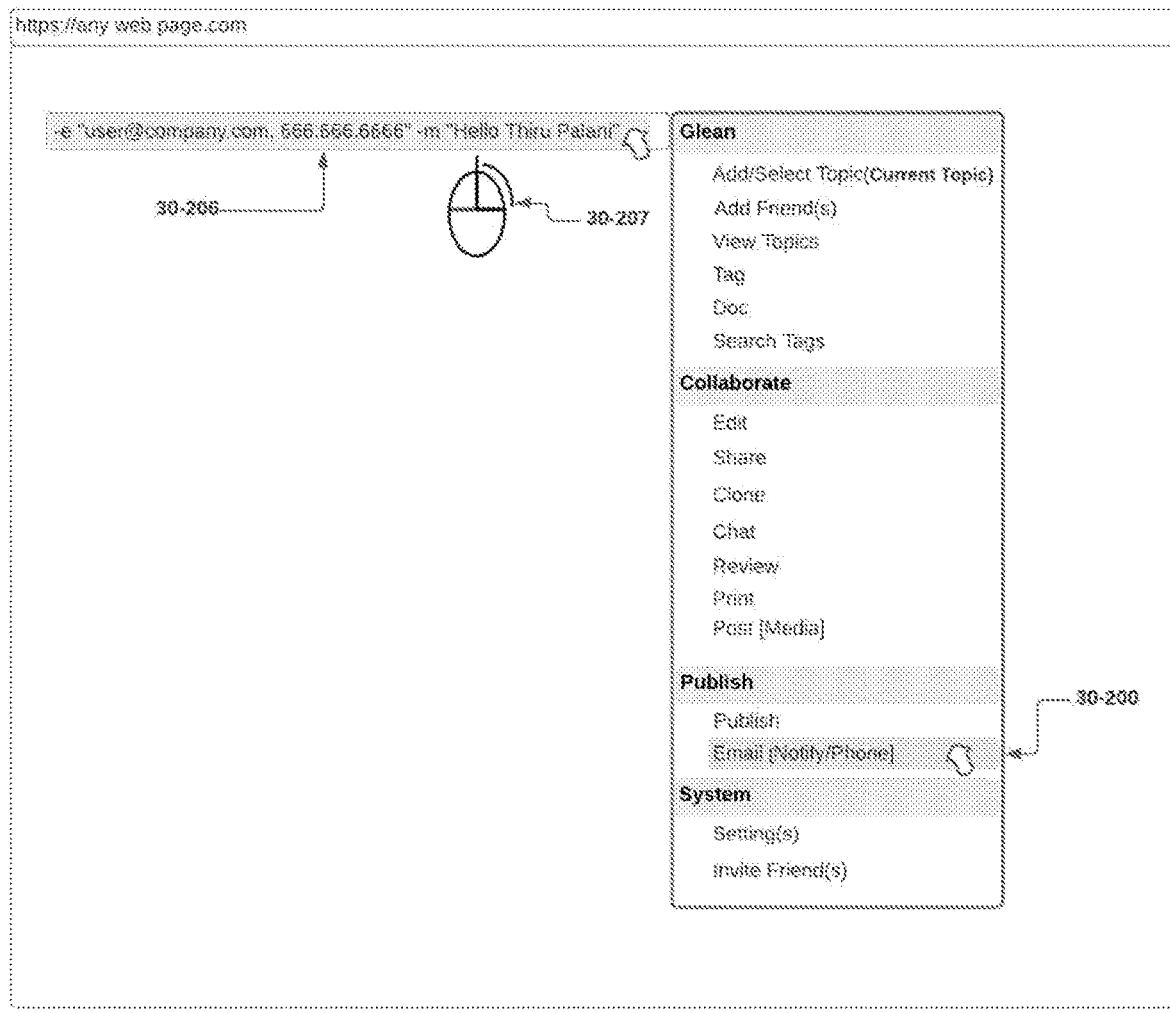
FIG. 96 illustrates screen diagram S-30-200-D: Publish—Email/Notify/Phone About DirectMessage/Publication By Typing And Selecting The Content.
Figure 106:
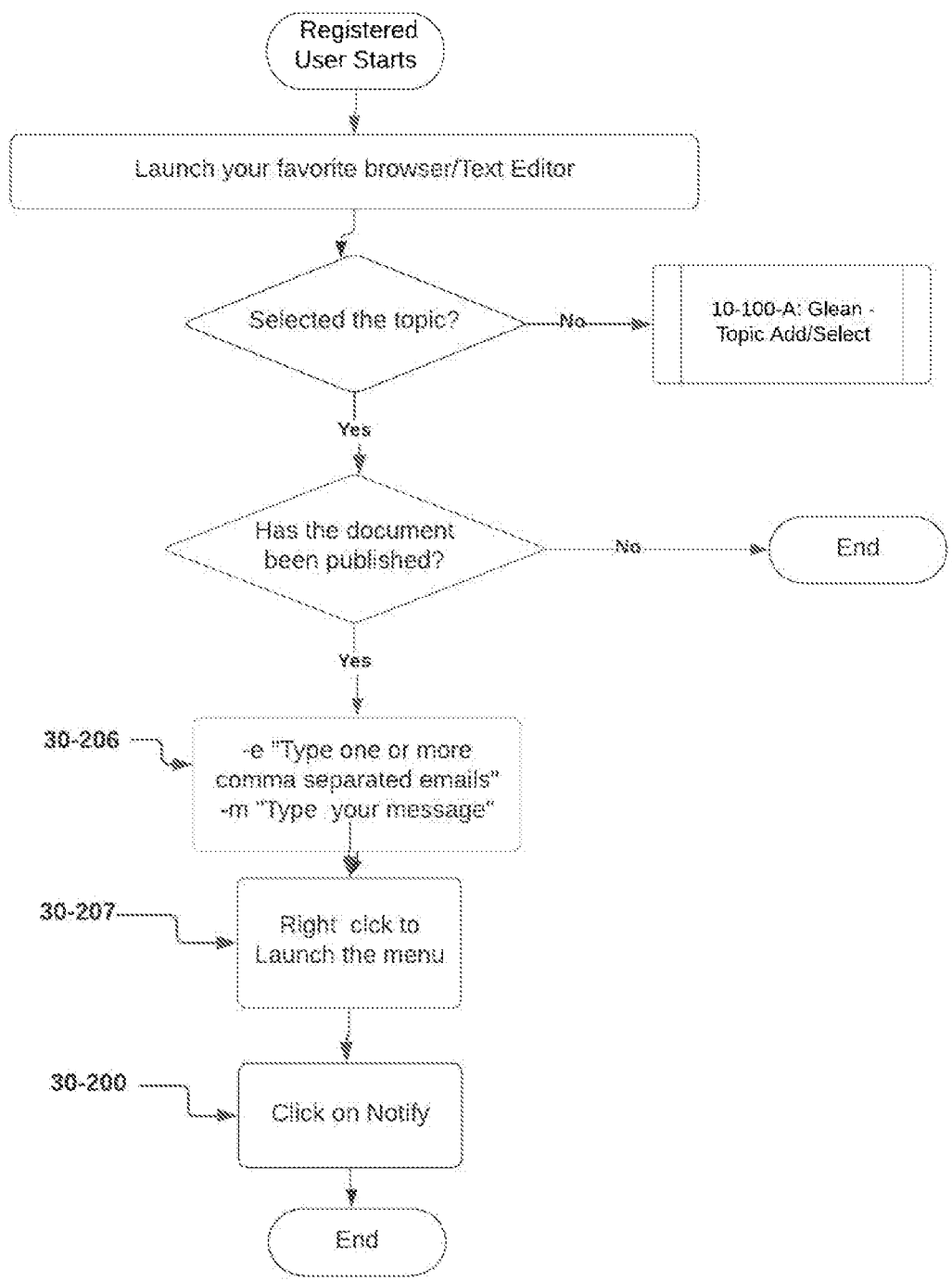
FIG. 106 illustrates flow diagram F-30-200-D: Publish—Notify Publication With Email/Phone and Message By Typing.

FIG. 96 with screen diagram S-30-200-D is an illustrative screen display of notifying anyone (based on personalized setting) once the document is published. A topic must be selected as a pre-requisite to notify the team. The user can type and select the notification message/text (user need to follow a pre-defined format to type the email address & the message) in any of the available text box/text editor from web page or any other document (example: WORD, EXCEL, PDF, etc.) 30-206 and right click the mouse 30-207 to view list of menu options FIG. 3 with main menu diagram S-00 for further action. User selects the menu "Notify" 30-200. A notification will be sent to the team. FIG. 106 illustrates flow diagram F-30-200-D of FIG. 96 with screen diagram S-30-200-D.

Figure 97:
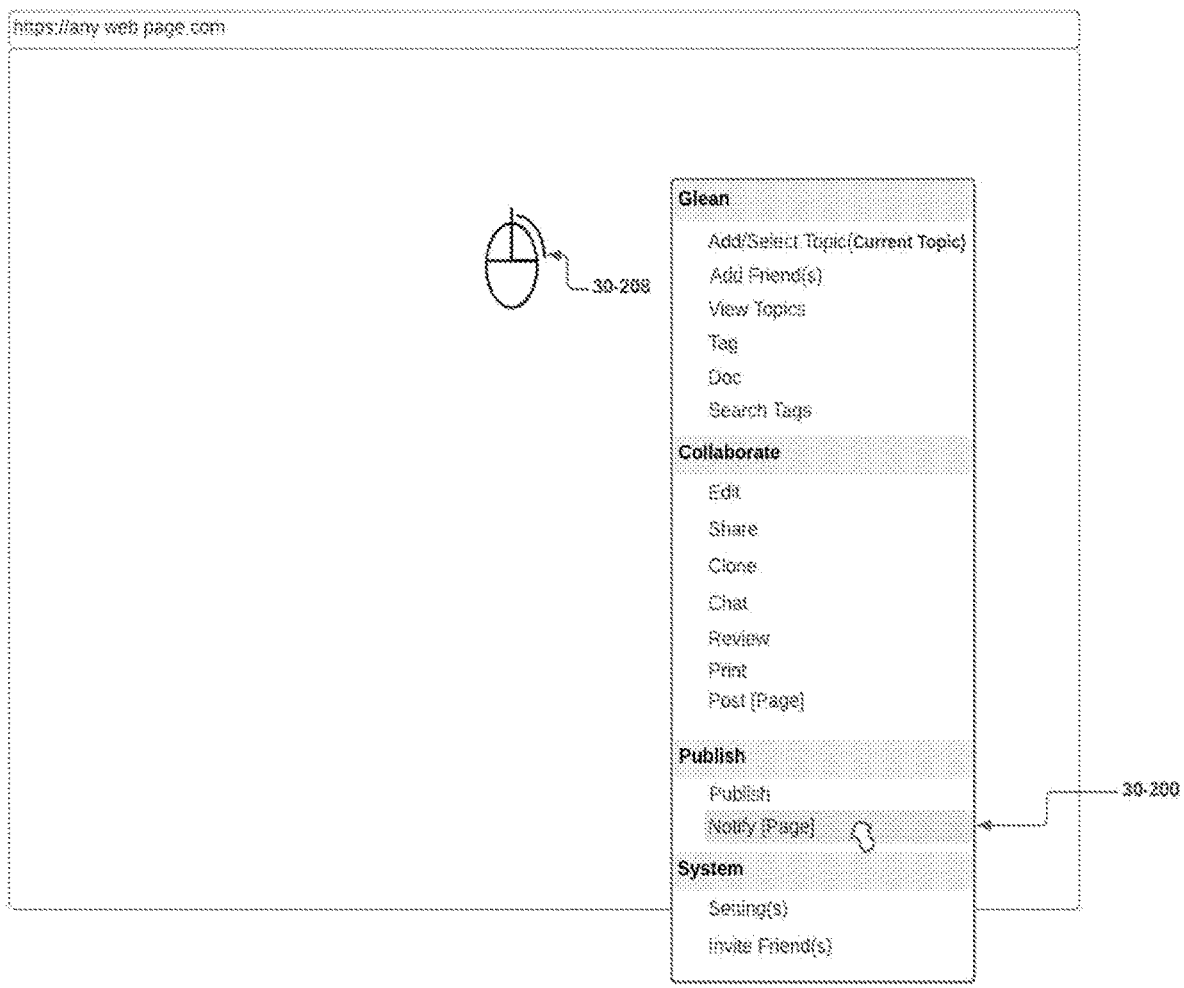
FIG. 97 illustrates screen diagram S-30-200-E: Publish—Notify Publication By Settings [Page].
Figure 107:
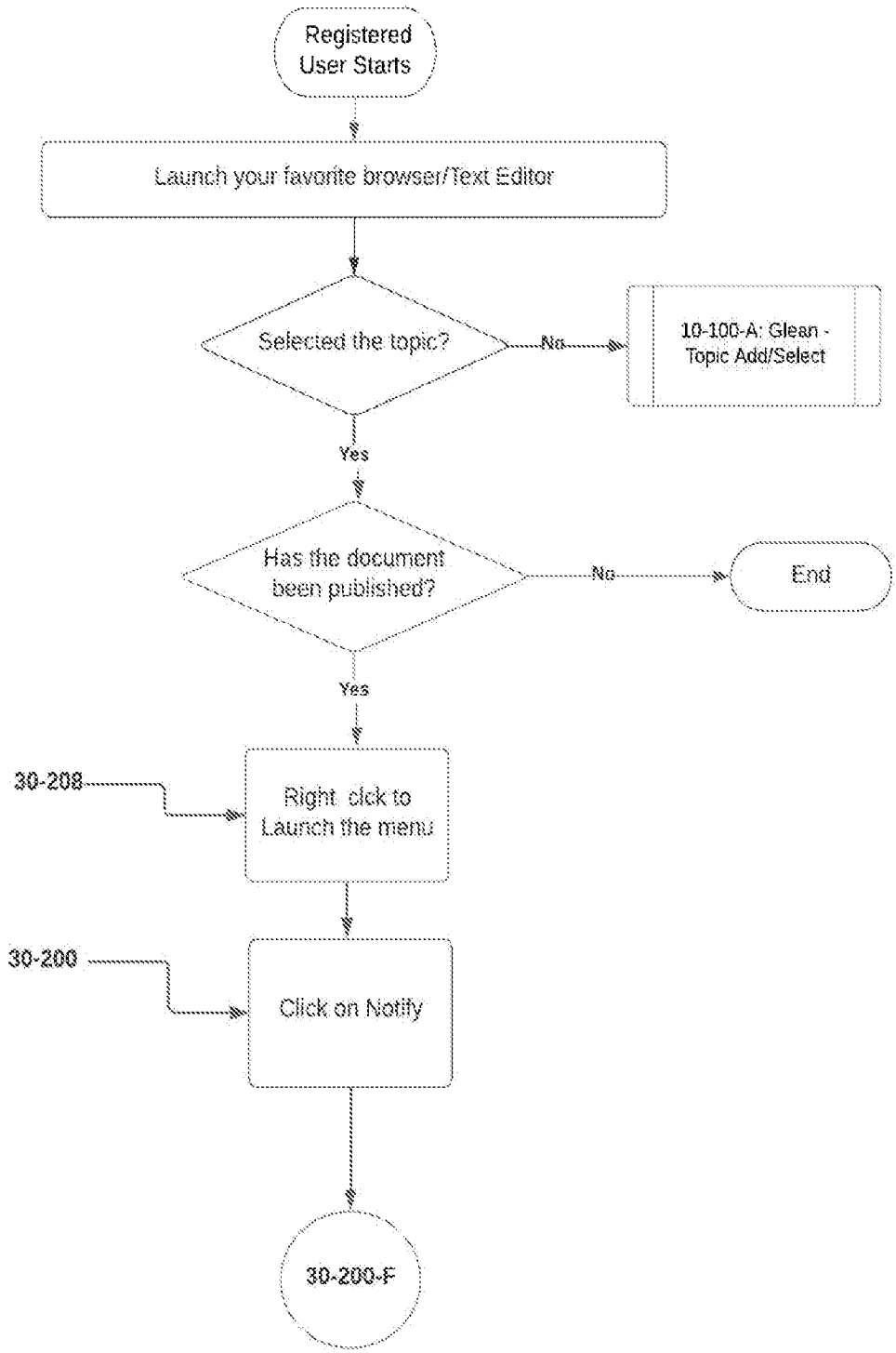
FIG. 107 illustrates flow diagram F-30-200-E: Publish—Notify Publication By Settings [Page].

FIG. 97 with screen diagram S-30-200-E is an illustrative screen display of notifying selected team member(s) (based on personalized setting) once the document is published. A topic must be selected as a pre-requisite to notify the team. From any web page or any other document (example: WORD, EXCEL, PDF, etc.), the user can right click the mouse 30-208 to view list of menu options FIG. 3 with main menu diagram S-00 for further action. User selects the menu "Notify" 30-200. The notification page is displayed FIG. 98 with screen diagram S-30-200-F. FIG. 107 illustrates flow diagram F-30-200-E of FIG. 97 with screen diagram S-30-200-E.

Figure 98:
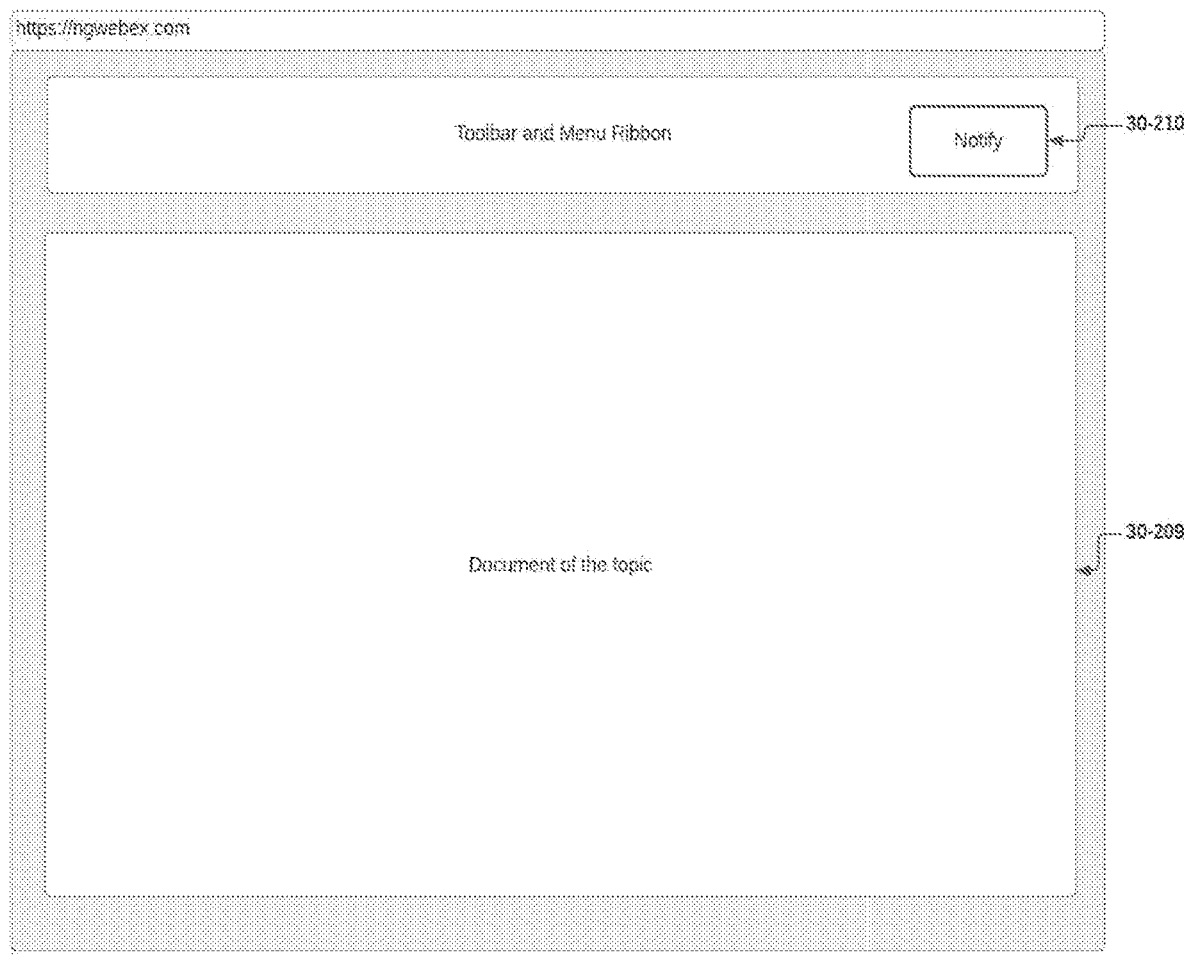
FIG. 98 illustrates screen diagram S-30-200-F: Publish—Notify Publication Using web Page.

FIG. 98 with screen diagram S-30-200-F is an illustrative screen display of notification page. User can view the published document 30209 and notify the selected team member(s) 30-210.

Figure 108:
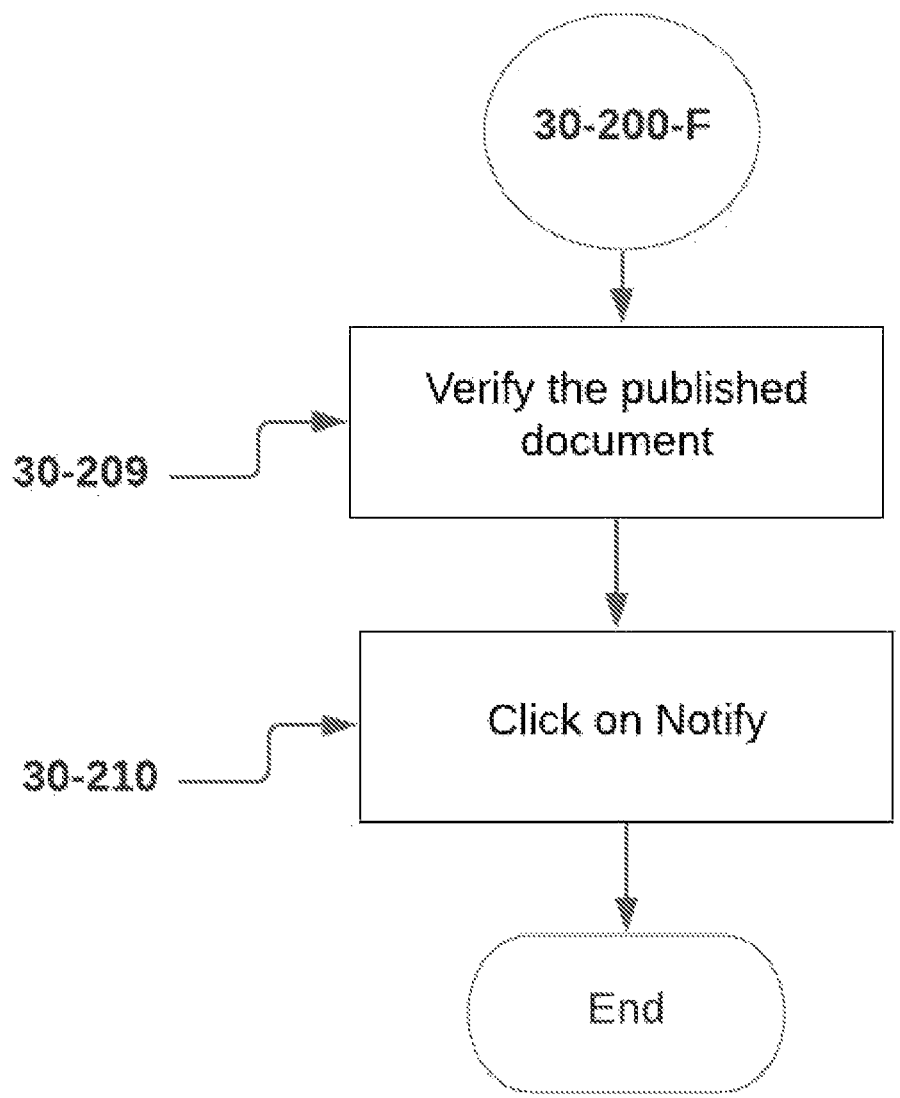
FIG. 108 illustrates flow diagram F-30-200-F: Publish—Notify Publication Using web Page.

FIG. 108 illustrates flow diagram F-30-200-F of FIG. 98 with screen diagram S-30-200-F.

Settings

Figure 109:
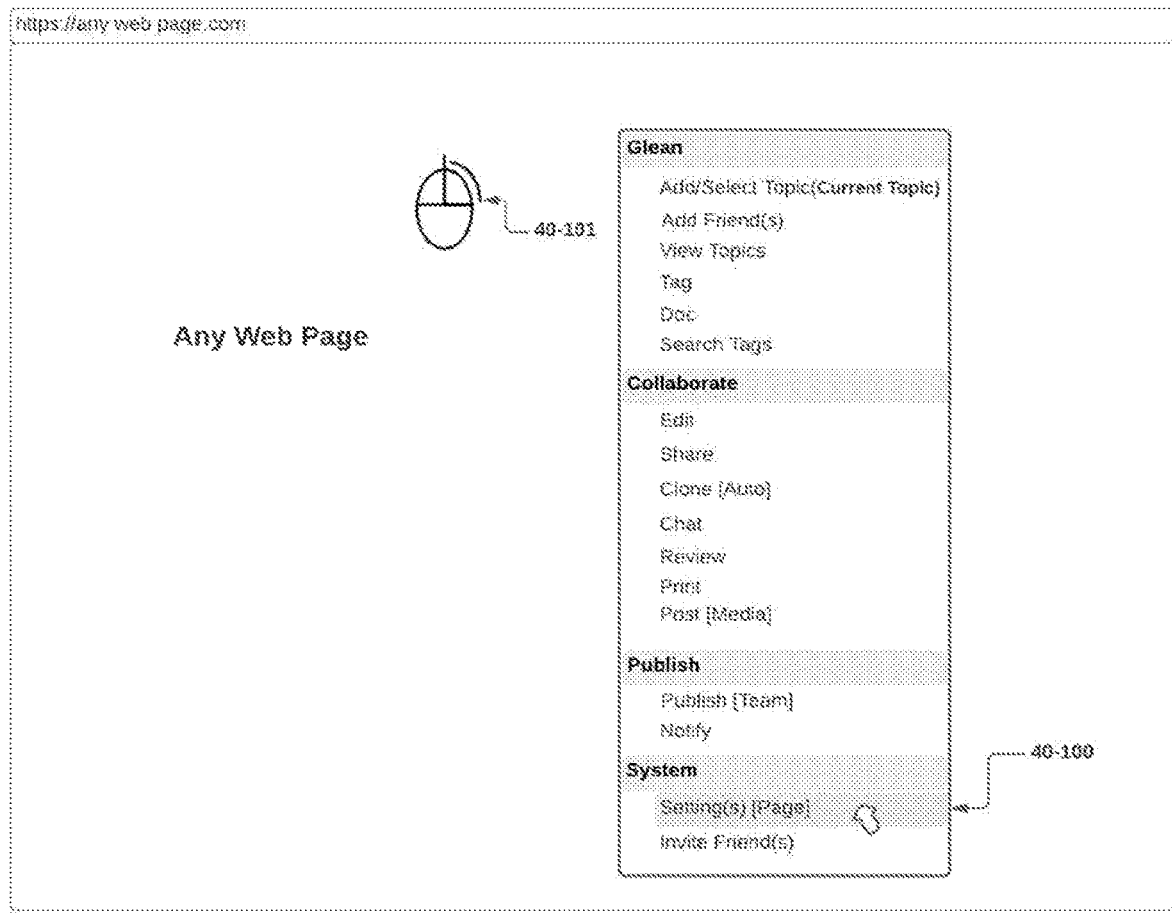
FIG. 109 illustrates screen diagram S-40-100-A: System—Topic Settings By Settings.
Figure 115:
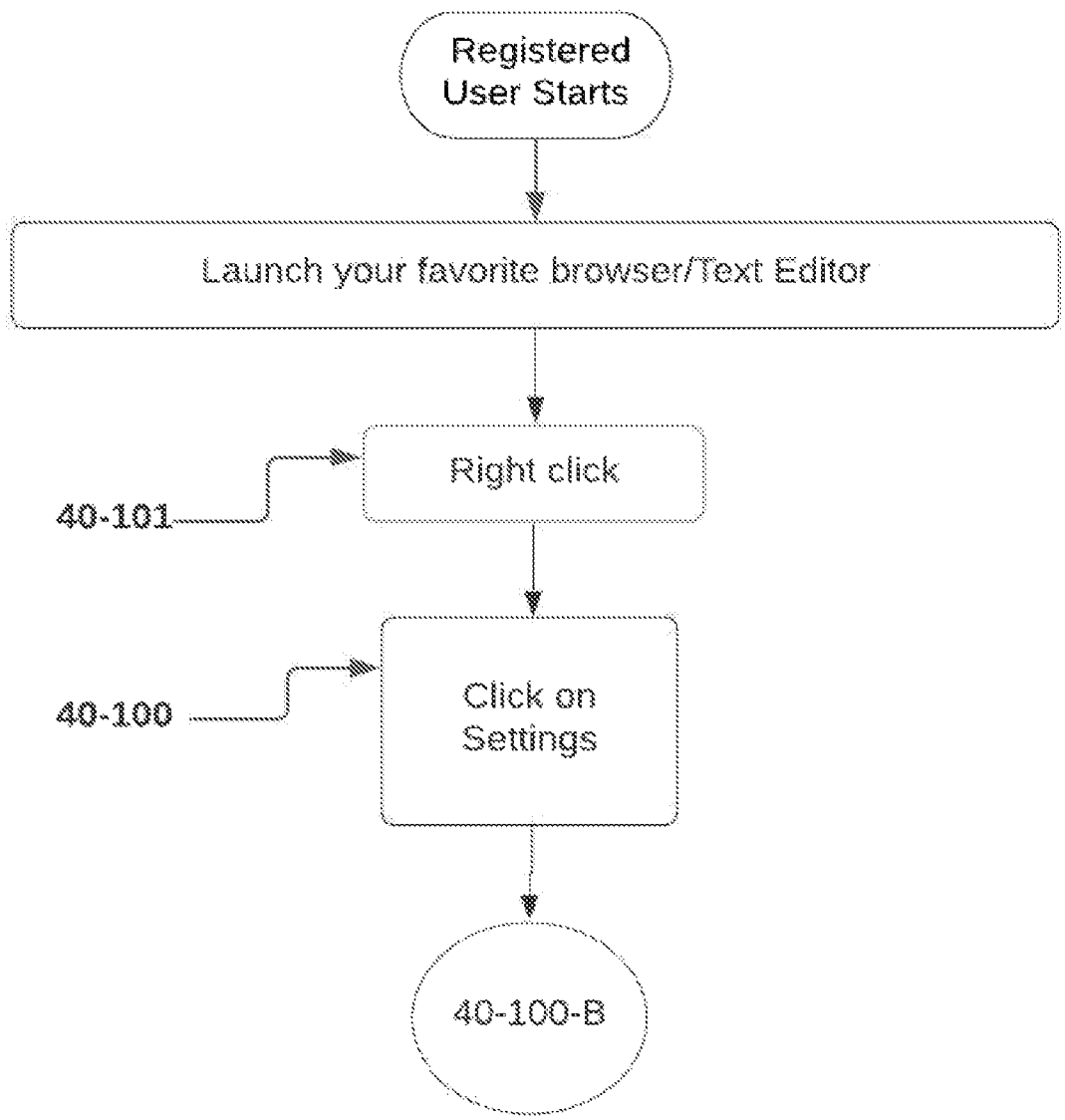
FIG. 115 illustrates flow diagram F-40-100-A: System—Setting(s).

FIG. 109 with screen diagram S-40-100-A is an illustrative screen display of system personalization settings. From any web page or any other document (example: WORD, EXCEL, PDF, etc.), the user can right click the mouse 40-101 to view list of menu options FIG. 3 with main menu diagram S-00 for further action. User selects the menu "Setting(s)" 40-100. The system personalization page is displayed FIG. 110 with screen diagram S-40-100-B. FIG. 115 illustrates flow diagram F-40-100-A of FIG. 109 with screen diagram S-40-100-A.

Figure 110:
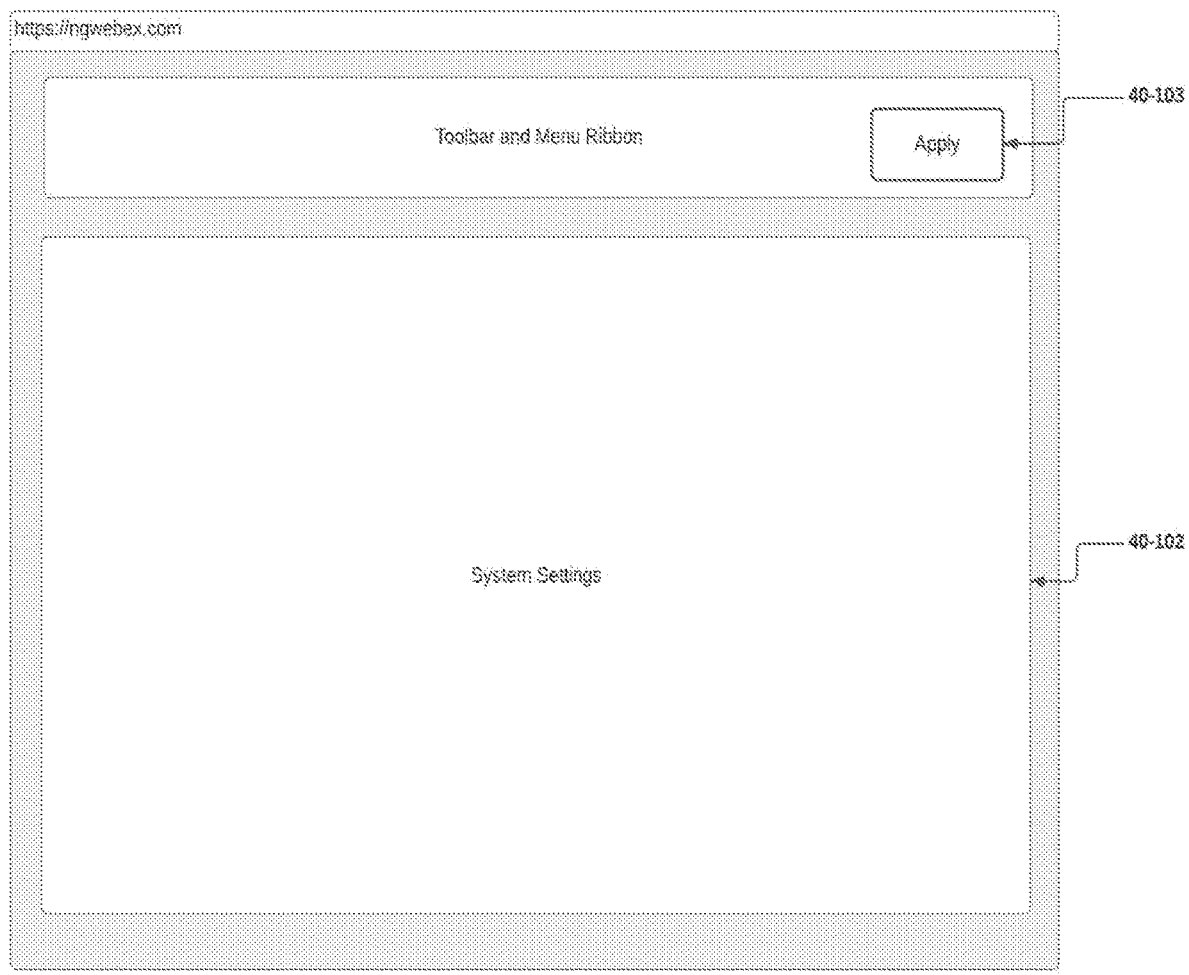
FIG. 110 illustrates screen diagram S-40-100-B: System—Set Settings Using Web Page.

FIG. 110 with screen diagram S-40-100-B is an illustrative screen display of system personalization page. User can view & configure the preference 40-102 for the various available options and apply the setting 40-103.

Figure 116:
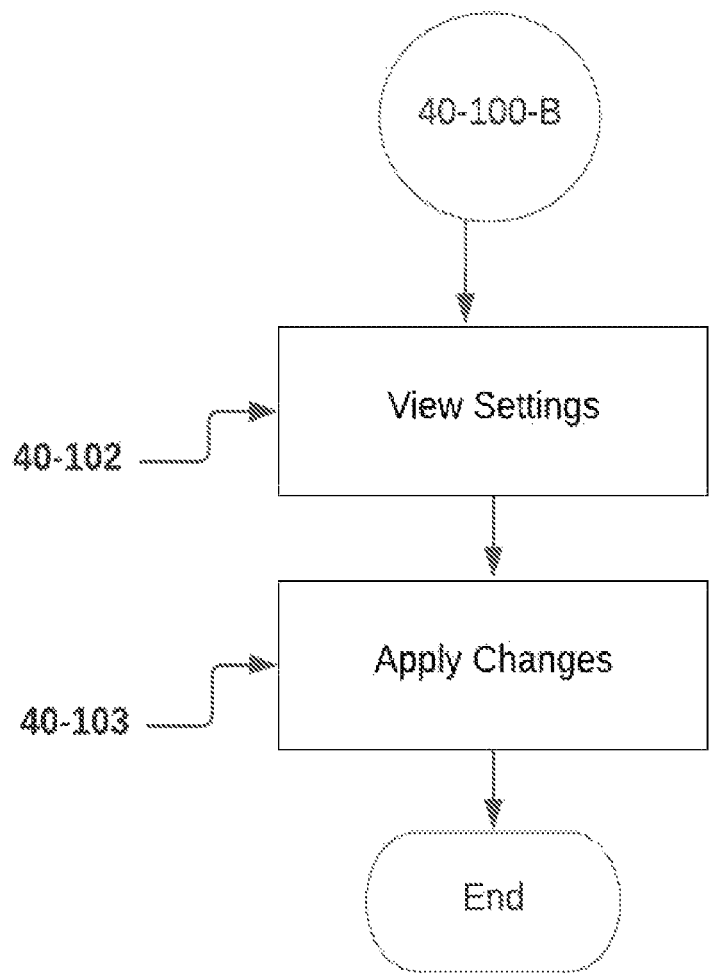
FIG. 116 illustrates flow diagram F-40-100-B: System—Set Settings Using Web Page.

FIG. 116 illustrates flow diagram F-40-100-B of FIG. 110 with screen diagram S-40-100-B.

Figure 111:
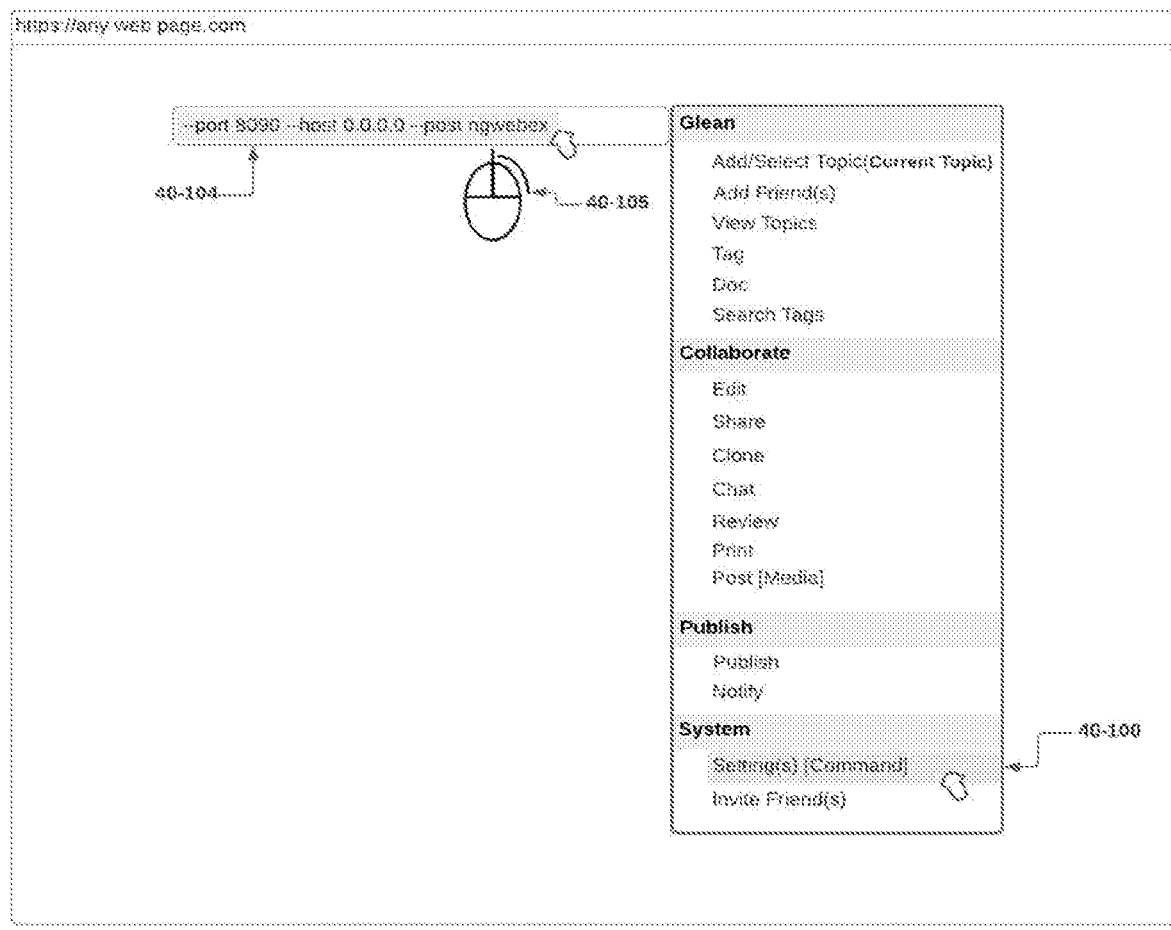
FIG. 111 illustrates screen diagram S-40-100-C: System—Advanced Settings By Command Line By Typing.

FIG. 111 with screen diagram S-40-100-C is an illustrative screen display of system personalization option for advanced user(s). The user can type and select the command (in a pre-defined format) in any of the available text box/text editor from web page or any other document (example: WORD, EXCEL, PDF, etc.) 40-104 and right click the mouse 40-105 to view list of menu options FIG. 3 with main menu diagram S-00 for further action. User selects the menu "Setting(s)" 40-100. The personalization setting is applied accordingly.

Figure 117:
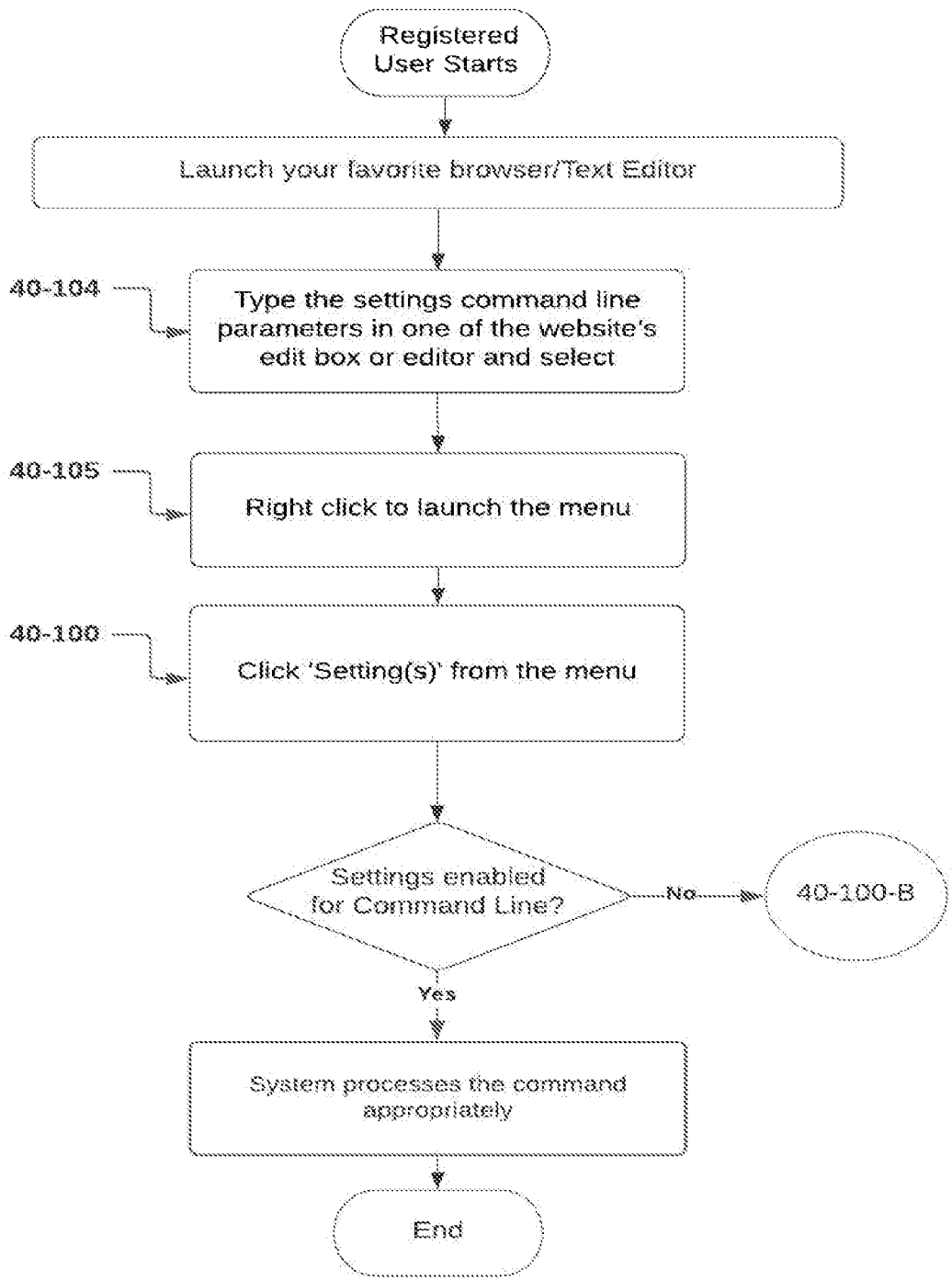
FIG. 117 illustrates flow diagram F-40-100-C: System—Advanced Settings By Command Line By Typing.

FIG. 117 illustrates flow diagram F-40-100-C of FIG. 111 with screen diagram S-40-100-C.

Figure 112:
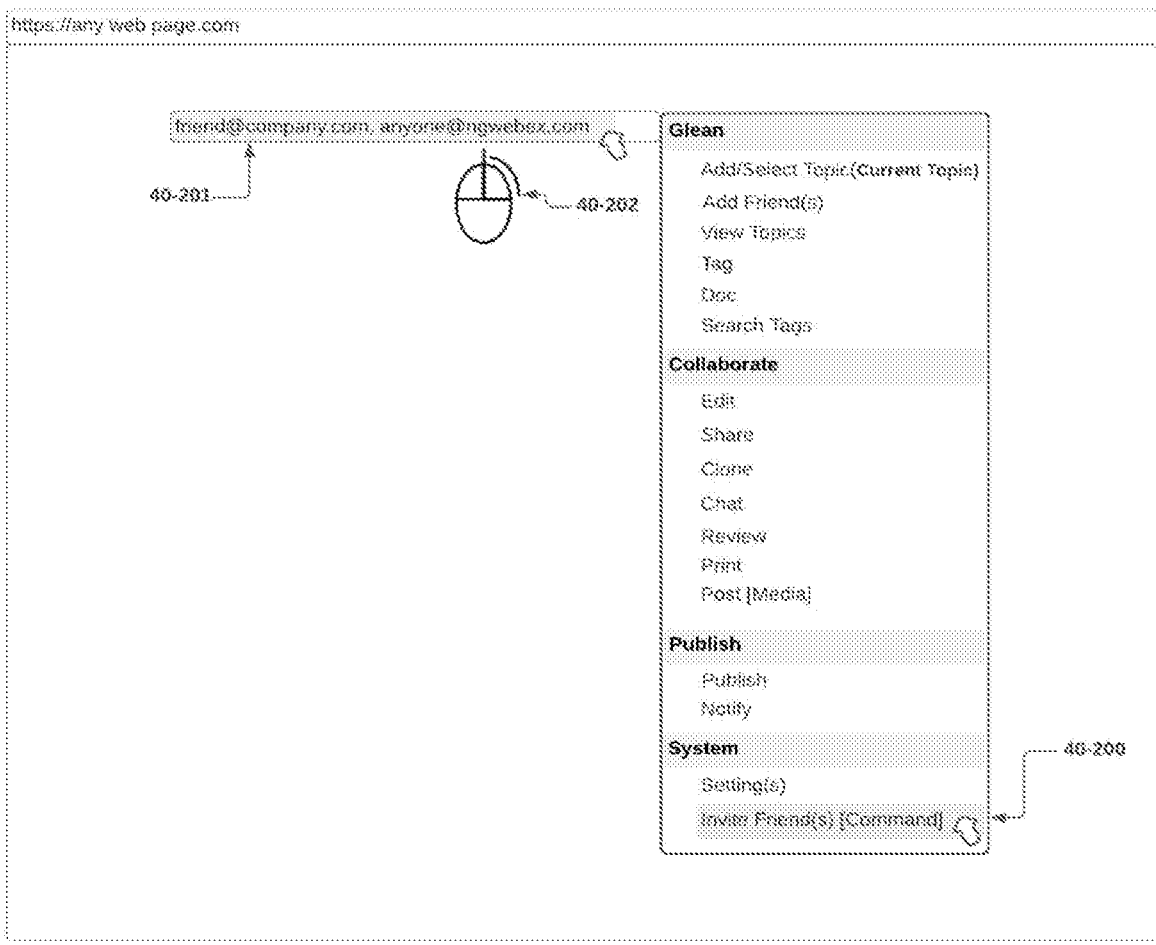
FIG. 112 illustrates screen diagram S-40-200-A: System—Invite Friends By Command Line.
Figure 118:
FIG. 118 illustrates flow diagram F-40-200-A: System—Invite Friends By Command Line.

FIG. 112 with screen diagram S-40-200-A is an illustrative screen display of inviting new friend(s) to collaborate as a team and/or to introduce the system. The user can type and select the command (in a pre-defined format) in any of the available text box/text editor from web page or any other document (example: WORD, EXCEL, PDF, etc.) 40-201 and right click the mouse 40-202 to view list of menu options FIG. 3 with main menu diagram S-00 for further action. User selects the menu "Invite Friend(s)" 40-200. The system sends an invite accordingly. FIG. 118 illustrates flow diagram F-40-200-A of FIG. 112 with screen diagram S-40-200-A.

Figure 113:
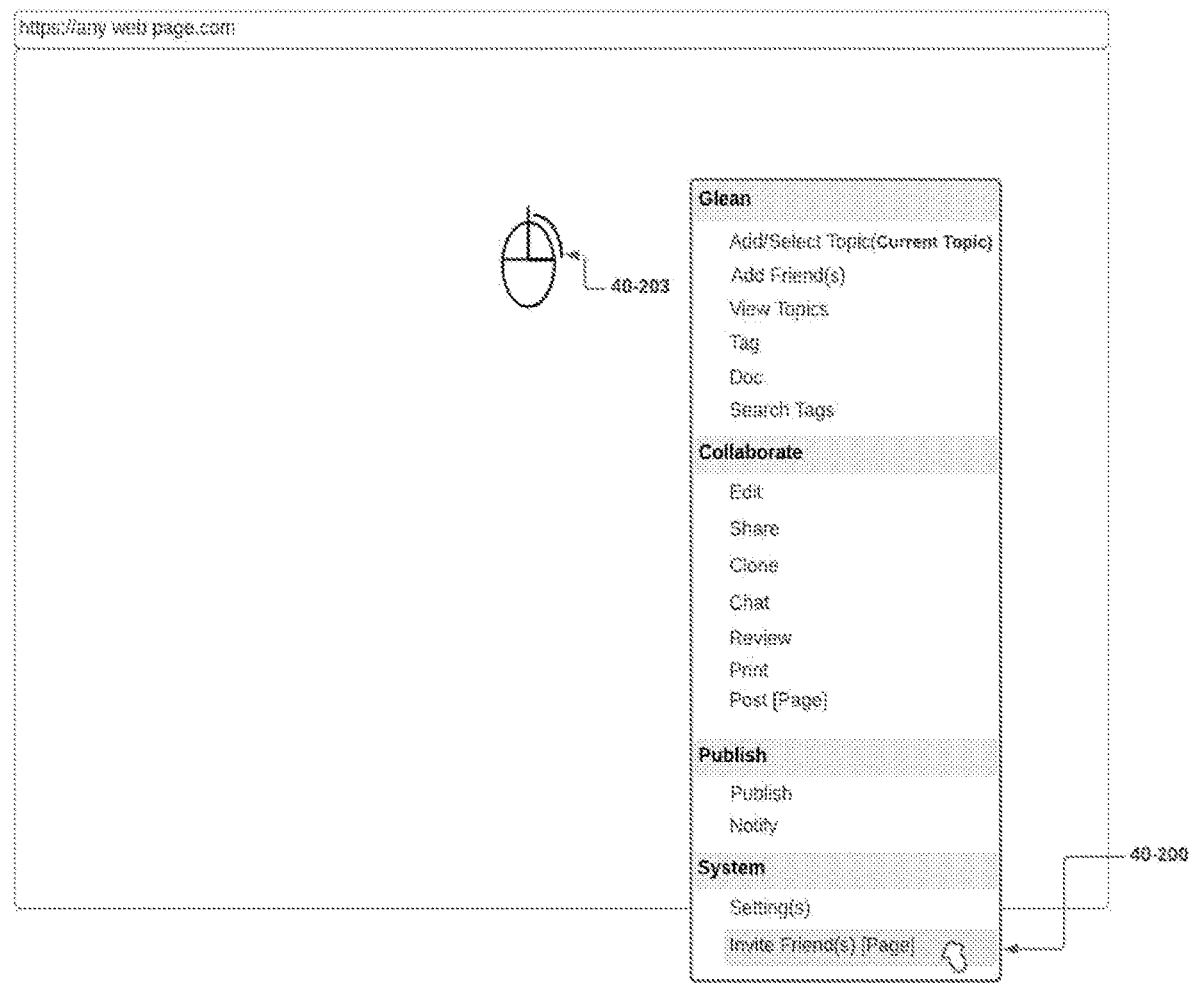
FIG. 113 illustrates screen diagram S-40-200-B: System—Invite Friends By Settings [Page].
Figure 114:
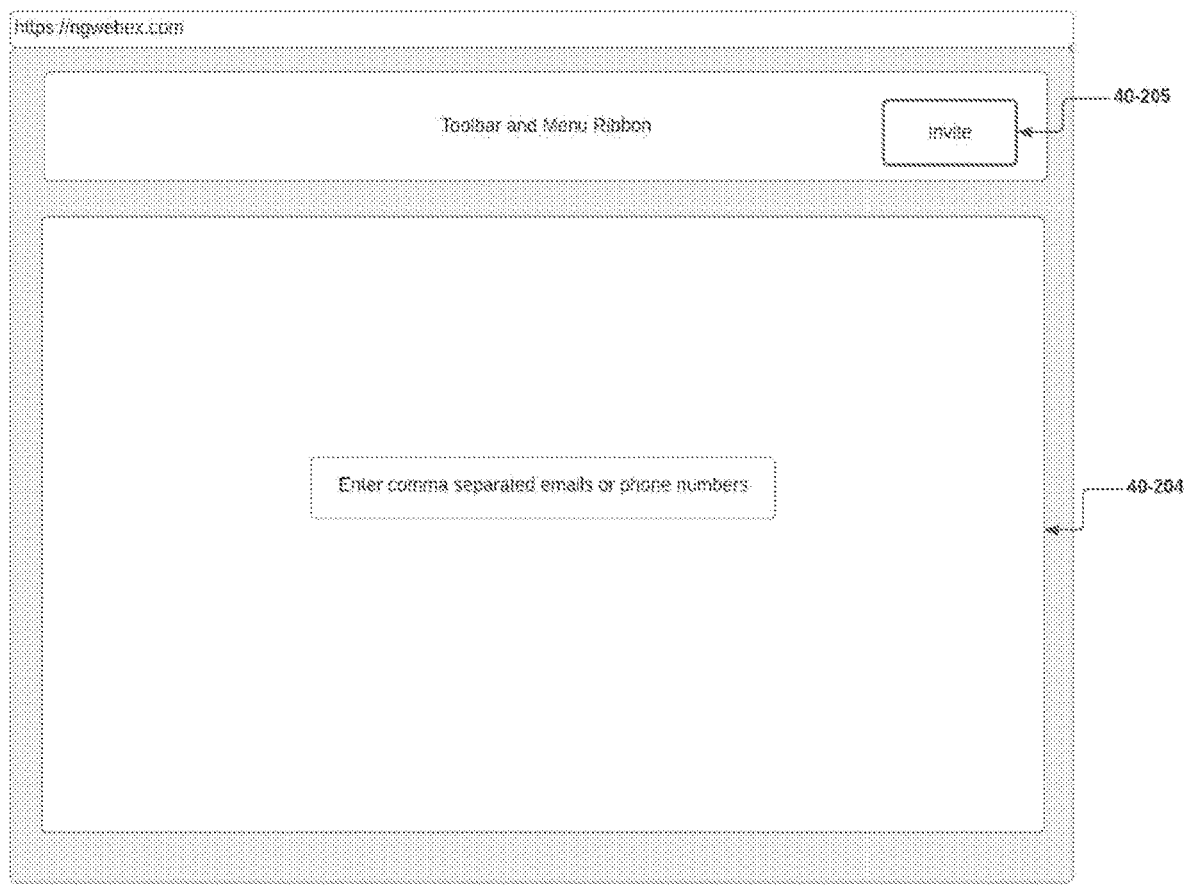
FIG. 114 illustrates screen diagram S-40-200-C: System—Invite Friends Using Web Page.

FIG. 113 with screen diagram S-40-200-B is an illustrative screen display of inviting new friend(s) to collaborate as a team and/or to introduce the system. From any web page or any other document (example: WORD, EXCEL, PDF, etc.), the user can right click the mouse 40-203 to view list of menu options FIG. 3 with main menu diagram S-00 for further action. User selects the menu "Invite Friend(s)" 40-200. The system settings page is displayed FIG. [S-40-200-C].

Figure 119:
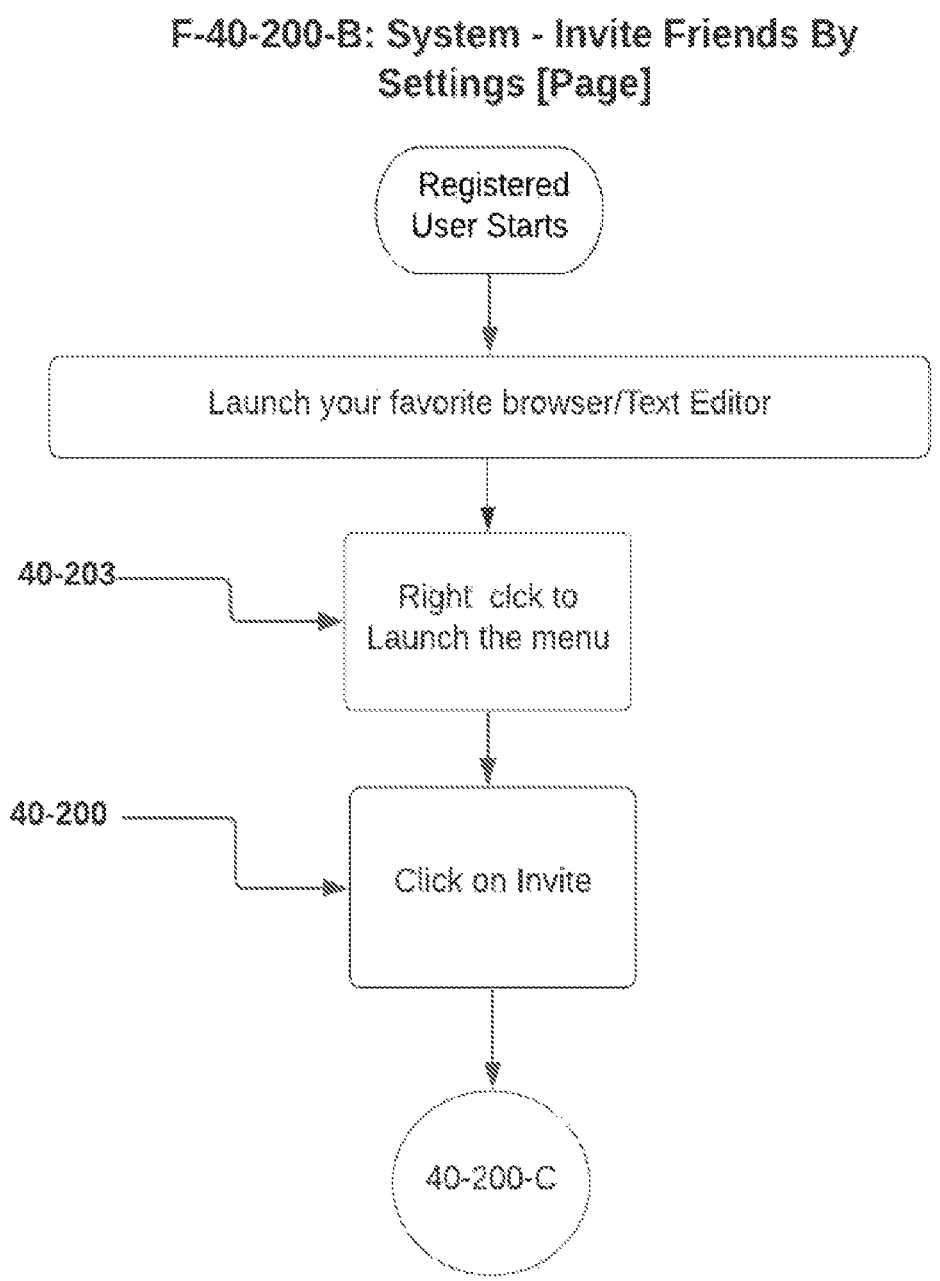
FIG. 119 illustrates flow diagram F-40-200-B: System—Invite Friends By Settings [Page].

FIG. 119 illustrates flow diagram F-40-200-B of FIG. 113 with screen diagram S-40-200-B.

FIG. 115 with screen diagram S-40-200-C is an illustrative screen display of friend(s) invitation page 40-204. User can view, type the email address(s) the friends and send invite 40-205.

Figure 120:
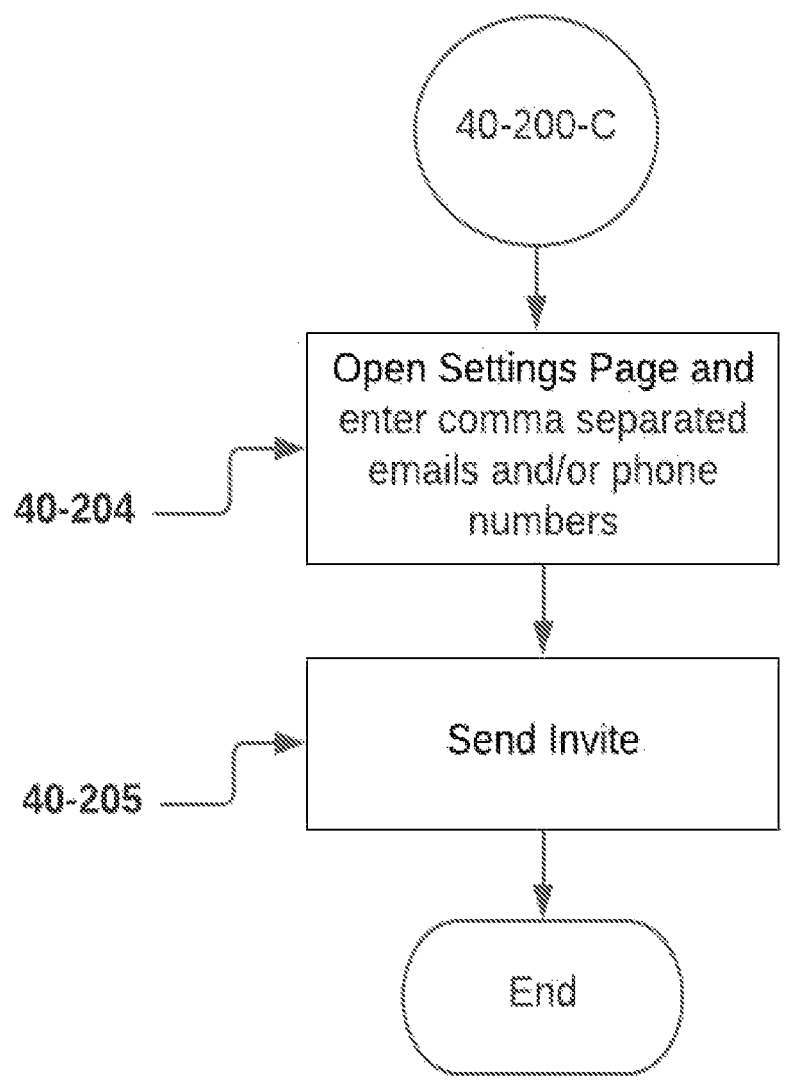
FIG. 120 illustrates flow diagram F-40-200-C: System—Invite Friends Using Web Page.

FIG. 120 illustrates flow diagram F-40-200-C of FIG. 115 with screen diagram S-40-200-C.

Claims List (34)

1. Method of gleaning a content with metadata to the document/topic by typing and selecting the content in any editable html element available on any webpage or, from any other document editor/viewer without additional UI in a single action.
2. Glean a new content using claim 1 and create a new document/topic or switch to an existing document/topic.
3. Glean a new content using claim 1 and add member(s) by email address(s) to the document/topic.
4. Glean a new content using claim 1 and View/Search existing document/topic.
5. Glean a new content using claim 1 and tag it to the document/topic.
6. Glean a new content using claim 1 and search for existing tagged contents.
7. Glean a new message content using claim 1 and send email notification to friends
8. Glean a new email address(s) content using claim 1 and share the document/topic with friends for collaboration.
9. Glean a new message and email address(s) content together using claim 1 and send email to invite friends.
10. Glean a new content using claim 1 and post on Social Media(s).
11. Glean a new content using claim 1 and post/chat on IM(s).
12. Glean a new content using claim 1 and clone the current document/topic.
13. Glean a new content using claim 1 and configure personal settings.
14. Method of gleaning a content with metadata to the document/topic by selecting the content available on any webpage or from any other document editor/viewer without additional UI in a single action.
15. Glean a new content using claim 14 and create a new document/topic or switch to an existing document/topic.
16. Glean a new content using claim 14 and add member(s) by email address(s) to the document/topic.
17. Glean a new content using claim 14 and View/Search existing document/topic.
18. Glean a new content using claim 14 and tag it to the document/topic.
19. Glean a new content using claim 14 and Search for existing tagged contents.
20. Glean a new message content using claim 14 and send email notification to friends.
21. Glean a new email address(s) content using claim 14 and share the document/topic with friends for collaboration.
22. Glean a new content using claim 14 and post on Social Media(s).
23. Glean a new content using claim 14 and chat on IM(s).
24. Glean a new content using claim 14 and clone the current document/topic.
25. Method of gleaning a new text content as a new document/topic or switch to an existing document/topic via any Chat/IM applications.
26. Method of gleaning any new content via Chat/IM applications and tag it to the document/topic that was created/selected using claim 25.
27. Method of gleaning a new text content as a new document/topic or switch to an existing document/topic via any legitimate Email application.
28. Method of gleaning any new content via legitimate Email application and tag it to the document/topic that was created/selected using claim 27.
29. Method of gleaning a new content as a new document/topic or switch to an existing document/topic via any legitimate MMS or SMS capable devices.
30. Method of gleaning any new content via any legitimate MMS or SMS capable devices and tag it to the document/topic that was created using claim 29.
31. Method of gleaning content with metadata just by selecting the content to tag it to the document/topic from any webpage or, document editor/viewer without additional UI.
32. The method of user triggering any of the following operations directly without navigation from any web page/editor/viewer on the current document/topic without additional UI.

A method of dynamically composing and viewing the document using the gleaned content(s) as per the ranking priority metadata preferences.

Print the document/topic with all the related references.

Clone the document/topic.

Post the document/topic to the selected social media(s).

Share the document/topic to the team members.

Email the document/topic to the preferred user emails.

Publish the document/topic page with restricted users.

Notify the team members via email on the publication of the document/topic.
33. The method of navigating to any of the web pages as shown in the following list for collaboration on the document/topic in a single user-action from any web page or document editor/viewer without additional UI.

Print document/topic.

Edit document/topic.

Chat on document/topic.

Clone the document/topic.

Post the document/topic to the social media.

Compare and review any of the two documents/topics side by side.

Share the document/topic.

Publish document/topic.

Notify the members about the publication of the document/topic.

Personal settings.

Invite friends to document/topic.
34. The method of auto-moderation on gleaned contents of the document/topic that uses divide-conquer process which recursively distributes each tagged content with metadata to each team member for review and the approved items constitute the final document.

Glossary

Add Friends

Friends are users from respective user's friends list. Add them to your topic's team member list.

Click

To carry out a computer operation by pressing a button on the mouse or keyboard.

Content

Content could be any one or all these information Text, Images, Audio, Videos etc.

Divide and Conquer divide and conquer is an algorithm design paradigm based on multi-branched recursion. A divide-and conquer algorithm works by recursively breaking; down a problem into two or more sub-problems of the same or related type, until these become simple enough to be solved directly.

Document/Topic

Title/Header/Display Name/Label/Tag of the document that contains one or more gleaned content. It could be interchangeably used with document.

Edit Box

Any editable html control in a web page where the user can enter a new content or edit the existing content/text.

Friends List

The user can send a friend request to an already existing or brand-new user to the system and add them to your user's friends list.

GCP

Glean, Collaborate and Publish

Gleaning extract (information) from various sources. collect gradually and bit by bit.

IM

Internet Messenger.

Invite

Invite a new member to the system or to the team (acknowledgement and registration required).

Metadata

A set of data that describes and gives information about other data. For example, gleaned content may have time, location, trend, page-ranking, user-behavioral data, reference, URL, etc., data.

MMS

MMS (Multimedia Message Service) is a media messaging service component of most telephone, Internet, and mobile device systems.

Moderation

Moderation is the process of eliminating or lessening extremes. It is used to ensure normality throughout the medium on which it is being conducted. Common uses of moderation include: Ensuring consistency and accuracy in the marking of student assessments.

Notify

Broadcast Event's Notification.

References/Sources

It could be any one or more of URL, webpage, document, person, place, phone, IM, email, etc.

Share

Share the content with a friend or team for collaboration.

SMS

SMS (Short Message Service) is a text messaging service component of most telephone, Internet, and mobile device systems.

Tag

Tag is a document/topic name which is applied as a label against each gleaned content.

Topic

Title/Header/Display Name/Label/Tag of the document that contains one or more gleaned content. It could be interchangeably used with document.

UI

User Interface where the user can communicate, trigger an event, enter, store, and retrieve information in the system.

Unwanted-Content-Elimination

Removing/Deleting the tagged content that are no longer required as part of the document/topic.

The invention claimed is:

1. A method of gleaning contents with metadata to a topic from a plurality of applications utilizing a plugin of a menu driven system by one or more users of a team to form a collaborative document:

displaying a user interface of a first application of the plurality of applications with contents to a first user of the team;

receiving a first user interaction, wherein the first user interaction comprises a first user input into a first text box on the first application, a selection of the first user input, and a request for a first context menu for gleaning from the menu system;

in response to the first user interaction, display the first context menu for gleaning, wherein the first context menu includes a plurality of options to create a new topic or switch to an existing topic, add one or more members to a topic, tagging a content to a topic, view or search existing topics, send email notification to members of the team, post selected contents to a second application, and configure personal settings for the menu system;

receiving a second user interaction, wherein the second user interaction comprises a selection of the option to create a new topic from the first context menu;

based on the second user interaction, create a new topic based on the first content;

receiving a third user interaction, wherein the third user interaction comprises a second user input into a second text box on the first application, selecting the second user input, and a request for a second context menu for gleaning;

in response to the third user interaction, display the second context menu for gleaning;

receiving a fourth user interaction of a selection of the option for tagging a content from the second context menu;

based on the fourth user interaction, tagging the second content to the new topic;

receiving a fifth user interaction, wherein the fifth user interaction comprises a selection of a third content displayed on the first application and a request for a third context menu for gleaning;

in response to the fifth user interaction, display the third context menu;

receiving a sixth user interaction of a selection of an option for tagging a content from the third context menu;

based on to the sixth user interaction, tagging the third content to the new topic;

receiving a seventh user interaction, wherein the seventh user interaction comprises a third user input into a third text box on the first application, selecting the third user input, and a request for a fourth context menu for gleaning;

in response to the seventh user interaction, display the fourth context menu for gleaning;

receiving an eighth user interaction of a selection of an option for adding user from the fourth context menu;

based on the eighth user interaction, adding one or more new members by email address to the new topic;

receiving a ninth user interaction, where the ninth user interaction comprise a request for a fifth context menu for gleaning, and a selection of an option for publishing from the fifth context menu;

in response to the ninth user interaction, display a collaborative document based on the new topic in a web browser comprising the new topic, the second and the third contents with metadata tagged to the new topic by the first user, and formatted references for the second and the third contents.

2. The method of claim 1 where the third content include one or more from text, images, audio, or video.

3. The method of claim 1 where the plurality of applications includes a web browser, a document viewer, a document editor, a social media application, an email application, a messaging application, a SMS or MMS messaging application.

4. The method of claim 1, the method further comprises:
in accordance with a determination that auto-tagging is set in a personal setting of the menu system, receiving a user selection of a fourth content displayed in the first application,
automatically tagging the fourth content to the new topic based on the selection of the fourth content without invoking any menu.

5. The method of claim 1, the method further comprises:
receiving a user input to select an existing topic through the menu system;
receiving a tenth user interaction, wherein the tenth user interaction comprises a selection of a fifth content displayed in the first application, and a selection of an option for tagging a content through the menu system;
based on to the tenth user interaction, tagging the fifth content to the existing topic;
displaying a user interface of a second application of the plurality of applications to the first user;
receiving an eleventh user interaction, where the eleventh user interaction comprise a request for a sixth context menu for gleaning from the second application, and a selection of an option from the sixth context menu;
in response to the eleventh user interaction, display a second collaborative document in the second application comprising the existing topic, and at least the fifth content tagged to the existing topic by the first user.

6. The method of claim 5, where the option from the sixth context menu can be an option for viewing, an option for editing, an option for reviewing, or an option for printing.

7. The method of claim 5, where the option is an option for editing the second document, the second document further including a plurality of gleaned contents as per the ranking priority metadata preferences, and the second document is further edited by the first user.

8. The method of claim 1, the method further comprises:
receiving a twelfth user interaction, wherein the twelfth user interaction comprises a selection of a sixth content displayed in the first application, and a selection of an option through the menu system;
based on to the twelfth user interaction, displaying the sixth content in a third application.

9. The method of claim 8, where the option can be a chat option, or a post option.

10. The method of claim 9, where in accordance with the option being a chat option, displaying the sixth content in an IM application as configured by the user.

11. The method of claim 1, the method further comprises:
receiving user selection of a notify option from the menu system, in response sending email notifications to the team.

12. The method of claim 1, the method further comprises:
sending email notifications to the team.

13. The method of claim 1, the method further comprises:
receiving user selection of a clone option from the menu system, in response cloning the collaborative document with another name.

14. The method of claim 1, the method further comprises:
receiving user selection of a share option from the menu system, in response sending email notification about the collaborative document to one or more users.

15. The method of claim 1, the method further comprises:
receiving user selection of an invite friend option from the menu system, in response sending email to one or more users for signing up.

16. The method of claim 1, the method further comprises:
receiving user selection of a topic name and further user selection of a search topic option from the menu system to verify the topic name's existence, in response displaying a list of search result in a web browser.

17. The method of claim 1, the method further comprises:
receiving user selection of a seventh content in the first application, and further user selection of a search tags option from the menu system to verify if the seventh content is already tagged under the new topic, in response displaying a list of tags search results in a web browser.

18. A system comprising a processor that executes instructions for performing a method of gleaning contents to a topic from a plurality of applications utilizing a plugin of a menu driven system by one or more users of a team to form a collaborative document, the method comprises:
displaying a user interface of a first application of the plurality of applications with contents to a first user of the team;
receiving a first user interaction, wherein the first user interaction comprises a first user input into a first text box on the first application, a selection of the first user input, and a request for a first context menu for gleaning from the menu system;
in response to the first user interaction, display the first context menu for gleaning, wherein the first context menu includes a plurality of options to create a new topic or switch to an existing topic, add one or more members to a topic, tagging a content to a topic, view or search existing topics, send email notification to members of the team, post selected contents to a second application, and configure personal settings for the menu system;
receiving a second user interaction, wherein the second user interaction comprises a selection of the option to create a new topic from the first context menu;
based on the second user interaction, create a new topic based on the first content;
receiving a third user interaction, wherein the third user interaction comprises a second user input into a second text box on the first application, selecting the second user input, and a request for a second context menu for gleaning;
in response to the third user interaction, display the second context menu for gleaning;
receiving a fourth user interaction of a selection of the option for tagging a content from the second context menu;
based on the fourth user interaction, tagging the second content to the new topic;
receiving a fifth user interaction, wherein the fifth user interaction comprises a selection of a third content displayed on the first application and a request for a third context menu for gleaning;

in response to the fifth user interaction, display the third context menu;

receiving a sixth user interaction of a selection of an option for tagging a content from the third context menu;

based on to the sixth user interaction, tagging the third content to the new topic;

receiving a seventh user interaction, wherein the seventh user interaction comprises a third user input into a third text box on the first application, selecting the third user input, and a request for a fourth context menu for gleaning;

in response to the seventh user interaction, display the fourth context menu for gleaning;

receiving an eighth user interaction of a selection of an option for adding user from the fourth context menu;

based on the eighth user interaction, adding one or more new members by email address to the new topic;

receiving a ninth user interaction, where the ninth user interaction comprise a request for a fifth context menu for gleaning, and a selection of an option for publishing from the fifth context menu;

in response to the ninth user interaction, display a collaborative document based on the new topic in a web browser comprising the new topic, the second and the third contents with metadata tagged to the new topic by the first user, and formatted references for the second and the third contents.

19. The system of claim 18, where the third content include one or more from text, images, audio, or video.

20. The system of claim 18, where the plurality of applications includes a web browser, a document viewer, document editor, a social media application, an email application, a messaging application, a SMS or MMS messaging application.

21. The system of claim 18, the processor executing instructions for performing the method, the method further comprises:
in accordance with a determination that auto-tagging is set in a personal setting of the menu system, receiving a user selection of a fourth content displayed in the first application,
automatically tagging the fourth content to the new topic based on the selection of the fourth content without invoking any menu.

22. The system of claim 18, the processor executing instructions for performing the method, the method further comprises:
receiving a user input to select an existing topic through the menu system;
receiving a tenth user interaction, wherein the tenth user interaction comprises a selection of a fifth content displayed in the first application, and a selection of an option for tagging a content through the menu system;
based on to the tenth user interaction, tagging the fifth content to the existing topic;
displaying a user interface of a second application of the plurality of applications to the first user;
receiving an eleventh user interaction, where the eleventh user interaction comprise a request for a sixth context menu for gleaning from the second application, and a selection of an option from the sixth context menu;
in response to the eleventh user interaction, display a second collaborative document in the second application comprising the existing topic, and at least the fifth content with metadata tagged to the existing topic by the first user.

23. The system of claim 22, where the option from the sixth context menu can be an option for viewing, an option for editing, an option for reviewing, or an option for printing.

24. The system of claim 22, where the option is an option for editing the second document, the second document further including a plurality of gleaned contents as per the ranking priority metadata preferences, and the second document is further edited by the first user.

25. The system of claim 18, the processor executing instructions for performing the method, the method further comprises:
receiving a twelfth user interaction, wherein the twelfth user interaction comprises a selection of a sixth content displayed in the first application, and a selection of an option through the menu system;
based on to the twelfth user interaction, displaying the sixth content in a third application.

26. The system of claim 25, where the option can be a chat option, or a post option.

27. The system of claim 26, where in accordance with the option being a chat option, displaying the sixth content in an IM application as configured by the user.

28. The system of claim 18, the processor executing instructions for performing the method, the method further comprises:
receiving user selection of a notify option from the menu system, in response sending notifications to the team.

29. The system of claim 18, the processor executing instructions for performing the method, the method further comprises:
sending email notifications to the team.

30. The system of claim 18, the processor executing instructions for performing the method, the method further comprises:
receiving user selection of a clone option from the menu system, in response cloning the collaborative document with another name.

31. The system of claim 18, the processor executing instructions for performing the method, the method further comprises:
receiving user selection of a share option from the menu system, in response sending email notification about the collaborative document to one or more users.

32. The system of claim 18, the processor executing instructions for performing the method, the method further comprises:
receiving user selection of an invite friend option from the menu system, in response sending email to one or more users for signing up.

33. The system of claim 18, the processor executing instructions for performing the method, the method further comprises:
receiving user selection of a topic name and further user selection of a search topic option from the menu system to verify the topic name's existence, in response displaying a list of search result in a web browser.

34. The system of claim 18, the processor executing instructions for performing the method, the method further comprises:
receiving user selection of a seventh content in the first application, and further user selection of a search tags option from the menu system to verify if the seventh content is already tagged under the new topic, in response displaying a list of tags search results in a web browser.

* * * * *